(12) United States Patent
Oshima et al.

(10) Patent No.: US 9,247,180 B2
(45) Date of Patent: Jan. 26, 2016

(54) VIDEO DISPLAY METHOD USING VISIBLE LIGHT COMMUNICATION IMAGE INCLUDING STRIPE PATTERNS HAVING DIFFERENT PITCHES

(71) Applicant: PANASONIC CORPORATION, Osaka (JP)

(72) Inventors: Mitsuaki Oshima, Kyoto (JP); Hideki Aoyama, Osaka (JP); Koji Nakanishi, Osaka (JP); Koji Aoto, Hyogo (JP); Toshiyuki Maeda, Hyogo (JP); Akira Shiokawa, Osaka (JP); Akihiro Ueki, Osaka (JP); Takashi Suzuki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/087,707

(22) Filed: Nov. 22, 2013

(65) Prior Publication Data

US 2014/0184914 A1 Jul. 3, 2014

Related U.S. Application Data

(60) Provisional application No. 61/896,874, filed on Oct. 29, 2013, provisional application No. 61/746,315, filed on Dec. 27, 2012.

(30) Foreign Application Priority Data

Dec. 27, 2012 (JP) .................................. 2012-286339
Sep. 30, 2013 (JP) .................................. 2013-203349
Oct. 29, 2013 (JP) .................................. 2013-224801

(51) Int. Cl.
*H04N 5/445* (2011.01)
*G06T 1/00* (2006.01)

(Continued)

(52) U.S. Cl.
CPC .................. *H04N 5/445* (2013.01); *G06F 3/14* (2013.01); *G06T 1/0028* (2013.01);

(Continued)

(58) Field of Classification Search
None
See application file for complete search history.

(56) References Cited

U.S. PATENT DOCUMENTS 5,734,328 A   3/1998  Shinbori
5,765,176 A * 6/1998  Bloomberg .................... 715/209

(Continued)

FOREIGN PATENT DOCUMENTS

AU    2007253450    11/2007
EP    1912354       4/2008

(Continued)

OTHER PUBLICATIONS

Gao et al.; "Understanding 2D-BarCode Technology and Applications in M-Commerce—Design and Implementation of a 2D Barcode Processing Solution;" IEEE Computer Society 31st Annual International Computer Software and Applications Conference(COMPSAC 2007); Aug. 2007.*

(Continued)

*Primary Examiner* — Edward Martello
(74) *Attorney, Agent, or Firm* — Greenblum & Bernstein, P.L.C

(57) ABSTRACT

A video display method in which a visible light communication signal can be appropriately transmitted includes: Step SL11 of generating a first visible light communication image that is an image having a stripe pattern for visible light communication, by encoding the visible light communication signal; Step SL12 of displaying, in a predetermined frame, an image included in the video signal; and Step SL13 of displaying, in the predetermined frame, the first visible light communication image sequentially thereafter an identification image that is an image having luminance uniformly lower than average luminance of the image that is displayed.

13 Claims, 82 Drawing Sheets

(51) Int. Cl.
   *H04N 21/2547*    (2011.01)
   *H04N 21/414*     (2011.01)
   *H04N 21/4223*    (2011.01)
   *H04N 21/431*     (2011.01)
   *H04N 21/4363*    (2011.01)
   *H04N 21/8352*    (2011.01)
   *H04N 21/8358*    (2011.01)
   *G06F 3/14*       (2006.01)
   *H04N 21/61*      (2011.01)
   *H04N 21/654*     (2011.01)
   *H04N 21/658*     (2011.01)
   *H04N 21/81*      (2011.01)
   *G09G 3/34*       (2006.01)

(52) U.S. Cl.
   CPC ......... *G06T 1/0085* (2013.01); *H04N 21/2547* (2013.01); *H04N 21/41407* (2013.01); *H04N 21/41415* (2013.01); *H04N 21/4223* (2013.01); *H04N 21/4318* (2013.01); *H04N 21/43637* (2013.01); *H04N 21/8352* (2013.01); *H04N 21/8358* (2013.01); *G09G 3/3406* (2013.01); *G09G 2310/024* (2013.01); *G09G 2320/0261* (2013.01); *G09G 2320/0646* (2013.01); *G09G 2340/125* (2013.01); *G09G 2370/022* (2013.01); *G09G 2370/04* (2013.01); *G09G 2370/16* (2013.01); *G09G 2370/18* (2013.01); *G09G 2370/20* (2013.01); *H04N 21/6175* (2013.01); *H04N 21/654* (2013.01); *H04N 21/6581* (2013.01); *H04N 21/8133* (2013.01)

(56) References Cited

U.S. PATENT DOCUMENTS

| | | | |
|---|---|---|---|
| 5,974,348 | A | 10/1999 | Rocks |
| 6,347,163 | B2* | 2/2002 | Roustaei ................. 382/324 |
| 6,933,956 | B2 | 8/2005 | Sato et al. |
| 7,308,194 | B2 | 12/2007 | Iizuka et al. |
| 7,415,212 | B2 | 8/2008 | Matsushita et al. |
| 7,502,053 | B2 | 3/2009 | Kagawa et al. |
| 7,570,246 | B2 | 8/2009 | Maniam et al. |
| 7,715,723 | B2 | 5/2010 | Kagawa et al. |
| RE42,848 | E | 10/2011 | Sato et al. |
| 8,093,988 | B2 | 1/2012 | Takene et al. |
| 8,264,546 | B2 | 9/2012 | Witt |
| 8,331,724 | B2 | 12/2012 | Rhoads |
| 8,334,901 | B1 | 12/2012 | Ganick et al. |
| RE44,004 | E | 2/2013 | Sato et al. |
| 8,451,264 | B2* | 5/2013 | Yamaguchi et al. .......... 345/418 |
| 8,493,485 | B2 | 7/2013 | Hirose |
| 8,550,366 | B2 | 10/2013 | Myodo et al. |
| 8,571,217 | B2 | 10/2013 | Ishii et al. |
| 8,587,680 | B2 | 11/2013 | Okumura et al. |
| 8,594,840 | B1 | 11/2013 | Chiappetta et al. |
| 8,634,725 | B2 | 1/2014 | Jang et al. |
| 8,648,911 | B2 | 2/2014 | Okumura |
| 8,720,779 | B2 | 5/2014 | Asami |
| 8,749,470 | B2 | 6/2014 | Furihata et al. |
| 8,823,852 | B2 | 9/2014 | Yamada et al. |
| 8,908,074 | B2 | 12/2014 | Oshima et al. |
| 8,913,144 | B2 | 12/2014 | Oshima et al. |
| 8,965,216 | B2 | 2/2015 | Oshima et al. |
| 2002/0167701 | A1 | 11/2002 | Hirata |
| 2003/0026422 | A1* | 2/2003 | Gerheim et al. ............. 380/210 |
| 2003/0058262 | A1 | 3/2003 | Sato et al. |
| 2003/0076338 | A1 | 4/2003 | Hashimoto |
| 2003/0171096 | A1 | 9/2003 | Ilan et al. |
| 2004/0101309 | A1 | 5/2004 | Beyette, Jr. et al. |
| 2004/0125053 | A1 | 7/2004 | Fujisawa |
| 2004/0161246 | A1 | 8/2004 | Matsushita et al. |
| 2005/0018058 | A1 | 1/2005 | Aliaga et al. |
| 2005/0190274 | A1 | 9/2005 | Yoshikawa et al. |
| 2006/0056855 | A1 | 3/2006 | Nakagawa et al. |
| 2006/0171360 | A1 | 8/2006 | Kim et al. |
| 2006/0239675 | A1 | 10/2006 | Iizuka et al. |
| 2006/0242908 | A1 | 11/2006 | McKinney |
| 2007/0024571 | A1 | 2/2007 | Maniam et al. |
| 2007/0058987 | A1 | 3/2007 | Suzuki |
| 2007/0070060 | A1 | 3/2007 | Kagawa et al. |
| 2007/0092264 | A1 | 4/2007 | Suzuki et al. |
| 2008/0018751 | A1 | 1/2008 | Kushida |
| 2008/0023546 | A1 | 1/2008 | Myodo et al. |
| 2008/0044188 | A1 | 2/2008 | Kagawa et al. |
| 2008/0055041 | A1 | 3/2008 | Takene et al. |
| 2008/0063410 | A1 | 3/2008 | Irie |
| 2008/0180547 | A1 | 7/2008 | Hirose |
| 2008/0205848 | A1 | 8/2008 | Kobayashi |
| 2008/0290988 | A1 | 11/2008 | Crawford |
| 2008/0297615 | A1 | 12/2008 | Kagawa et al. |
| 2009/0052902 | A1 | 2/2009 | Shinokura |
| 2009/0129781 | A1 | 5/2009 | Irie et al. |
| 2009/0135271 | A1 | 5/2009 | Kurane |
| 2010/0034540 | A1 | 2/2010 | Togashi |
| 2010/0107189 | A1 | 4/2010 | Steelberg et al. |
| 2010/0116888 | A1 | 5/2010 | Asami |
| 2010/0315395 | A1 | 12/2010 | Kang et al. |
| 2011/0007160 | A1 | 1/2011 | Okumura |
| 2011/0007171 | A1 | 1/2011 | Okumura et al. |
| 2011/0025730 | A1 | 2/2011 | Ajichi |
| 2011/0063510 | A1 | 3/2011 | Lee et al. |
| 2011/0064416 | A1 | 3/2011 | Rajagopal et al. |
| 2011/0227827 | A1* | 9/2011 | Solomon et al. .............. 345/158 |
| 2011/0229147 | A1 | 9/2011 | Yokoi |
| 2011/0243325 | A1 | 10/2011 | Ishii et al. |
| 2011/0299857 | A1 | 12/2011 | Rekimoto |
| 2012/0076509 | A1 | 3/2012 | Gurovich et al. |
| 2012/0080515 | A1 | 4/2012 | van der Merwe |
| 2012/0133815 | A1 | 5/2012 | Nakanishi et al. |
| 2012/0155889 | A1 | 6/2012 | Kim et al. |
| 2012/0220311 | A1 | 8/2012 | Rodriguez et al. |
| 2012/0224743 | A1* | 9/2012 | Rodriguez et al. ............ 382/103 |
| 2012/0281987 | A1 | 11/2012 | Schenk et al. |
| 2012/0328302 | A1 | 12/2012 | Iizuka et al. |
| 2013/0141555 | A1 | 6/2013 | Ganick et al. |
| 2013/0170695 | A1 | 7/2013 | Anan et al. |
| 2013/0201369 | A1 | 8/2013 | Hirose |
| 2013/0251374 | A1 | 9/2013 | Chen et al. |
| 2013/0251375 | A1 | 9/2013 | Ozaki et al. |
| 2013/0271631 | A1 | 10/2013 | Tatsuzawa et al. |
| 2013/0272717 | A1 | 10/2013 | Deguchi et al. |
| 2013/0329440 | A1 | 12/2013 | Tsutsumi et al. |
| 2013/0330088 | A1 | 12/2013 | Oshima et al. |
| 2013/0335592 | A1 | 12/2013 | Yamada et al. |
| 2013/0337787 | A1 | 12/2013 | Yamada et al. |
| 2014/0037296 | A1 | 2/2014 | Yamada et al. |
| 2014/0117074 | A1 | 5/2014 | Kim |
| 2014/0184883 | A1 | 7/2014 | Shimamoto |
| 2014/0185860 | A1 | 7/2014 | Oshima et al. |
| 2014/0186026 | A1 | 7/2014 | Oshima et al. |
| 2014/0186047 | A1 | 7/2014 | Oshima et al. |
| 2014/0186048 | A1 | 7/2014 | Oshima et al. |
| 2014/0186049 | A1 | 7/2014 | Oshima et al. |
| 2014/0186050 | A1 | 7/2014 | Oshima et al. |
| 2014/0186052 | A1 | 7/2014 | Oshima et al. |
| 2014/0186055 | A1 | 7/2014 | Oshima et al. |
| 2014/0192185 | A1 | 7/2014 | Oshima et al. |
| 2014/0192226 | A1 | 7/2014 | Oshima et al. |
| 2014/0204129 | A1 | 7/2014 | Oshima et al. |
| 2014/0205136 | A1 | 7/2014 | Oshima et al. |
| 2014/0207517 | A1 | 7/2014 | Oshima et al. |
| 2014/0212145 | A1 | 7/2014 | Oshima et al. |
| 2014/0212146 | A1 | 7/2014 | Oshima et al. |
| 2014/0232896 | A1 | 8/2014 | Oshima et al. |
| 2014/0232903 | A1 | 8/2014 | Oshima et al. |
| 2014/0286644 | A1 | 9/2014 | Oshima et al. |
| 2014/0290138 | A1 | 10/2014 | Oshima et al. |
| 2014/0294397 | A1 | 10/2014 | Oshima et al. |
| 2014/0294398 | A1 | 10/2014 | Oshima et al. |
| 2014/0307155 | A1 | 10/2014 | Oshima et al. |
| 2014/0307156 | A1 | 10/2014 | Oshima et al. |
| 2014/0307157 | A1 | 10/2014 | Oshima et al. |

(56) References Cited

U.S. PATENT DOCUMENTS

| | | |
|---|---|---|
| 2014/0376922 A1 | 12/2014 | Oshima et al. |
| 2015/0030335 A1 | 1/2015 | Son et al. |
| 2015/0050027 A1 | 2/2015 | Oshima et al. |

FOREIGN PATENT DOCUMENTS

| | | |
|---|---|---|
| EP | 2503852 | 9/2012 |
| JP | 07-200428 | 8/1995 |
| JP | 2002-144984 | 5/2002 |
| JP | 2002-290335 | 10/2002 |
| JP | 2003-179556 | 6/2003 |
| JP | 2003-281482 | 10/2003 |
| JP | 2004-072365 | 3/2004 |
| JP | 2004-306902 | 11/2004 |
| JP | 2005-160119 | 6/2005 |
| JP | 2006-020294 | 1/2006 |
| JP | 2006-092486 | 4/2006 |
| JP | 2006-121466 | 5/2006 |
| JP | 2006-227204 | 8/2006 |
| JP | 2006-319545 | 11/2006 |
| JP | 2006-340138 | 12/2006 |
| JP | 2007-019936 | 1/2007 |
| JP | 2007-036833 | 2/2007 |
| JP | 2007-043706 | 2/2007 |
| JP | 2007-049584 | 2/2007 |
| JP | 2007-060093 | 3/2007 |
| JP | 2007-082098 | 3/2007 |
| JP | 2007-096548 | 4/2007 |
| JP | 2007-124404 | 5/2007 |
| JP | 2007-189341 | 7/2007 |
| JP | 2007-201681 | 8/2007 |
| JP | 2007-221570 | 8/2007 |
| JP | 2007-228512 | 9/2007 |
| JP | 2007-248861 | 9/2007 |
| JP | 2007-295442 | 11/2007 |
| JP | 2007-312383 | 11/2007 |
| JP | 2008-015402 | 1/2008 |
| JP | 2008-033625 | 2/2008 |
| JP | 2008-057129 | 3/2008 |
| JP | 2008-124922 | 5/2008 |
| JP | 2008-187615 | 8/2008 |
| JP | 2008-252466 | 10/2008 |
| JP | 2008-252570 | 10/2008 |
| JP | 2008-282253 | 11/2008 |
| JP | 2008-292397 | 12/2008 |
| JP | 2009-88704 | 4/2009 |
| JP | 2009-130771 | 6/2009 |
| JP | 2009-206620 | 9/2009 |
| JP | 2009-212768 | 9/2009 |
| JP | 2009-232083 | 10/2009 |
| JP | 2009-538071 | 10/2009 |
| JP | 2009-290359 | 12/2009 |
| JP | 2010-103746 | 5/2010 |
| JP | 2010-117871 | 5/2010 |
| JP | 2010-152285 | 7/2010 |
| JP | 2010-226172 | 10/2010 |
| JP | 2010-232912 | 10/2010 |
| JP | 2010-258645 | 11/2010 |
| JP | 2010-268264 | 11/2010 |
| JP | 2010-278573 | 12/2010 |
| JP | 2010-287820 | 12/2010 |
| JP | 2011/023819 | 2/2011 |
| JP | 2011-29871 | 2/2011 |
| JP | 2011-250231 | 12/2011 |
| JP | 2011-254317 | 12/2011 |
| JP | 2012-010269 | 1/2012 |
| JP | 2012-043193 | 3/2012 |
| JP | 2012-95214 | 5/2012 |
| JP | 2012-169189 | 9/2012 |
| JP | 2012-205168 | 10/2012 |
| JP | 2012-244549 | 12/2012 |
| JP | 2013-042221 | 2/2013 |
| JP | 2013-197849 | 9/2013 |
| JP | 2013-223043 | 10/2013 |
| JP | 2013-223047 | 10/2013 |
| JP | 2013-223209 | 10/2013 |
| JP | 2013-235505 | 11/2013 |
| JP | 5393917 | 1/2014 |
| JP | 5395293 | 1/2014 |
| JP | 5405695 | 2/2014 |
| JP | 5541153 | 7/2014 |
| WO | 94/26063 | 11/1994 |
| WO | 96/36163 | 11/1996 |
| WO | 03/036829 | 5/2003 |
| WO | 2005/001593 | 1/2005 |
| WO | 2006/013755 | 2/2006 |
| WO | 2007/004530 | 1/2007 |
| WO | 2007/032276 | 3/2007 |
| WO | 2007/135014 | 11/2007 |
| WO | 2008/133303 | 11/2008 |
| WO | 2009/113415 | 9/2009 |
| WO | 2009/113416 | 9/2009 |
| WO | 2009/144853 | 12/2009 |
| WO | 2010/071193 | 6/2010 |
| WO | 2011/034346 | 3/2011 |
| WO | 2011/086517 | 7/2011 |
| WO | 2011/155130 | 12/2011 |
| WO | 2012/026039 | 3/2012 |
| WO | 2012/120853 | 9/2012 |
| WO | 2012/123572 | 9/2012 |
| WO | 2013/171954 | 11/2013 |
| WO | 2013/175803 | 11/2013 |

OTHER PUBLICATIONS

International Search Report, mailed Feb. 10, 2014 for International Application No. PCT/JP2013/006869.
Office Action, mailed Aug. 25, 2014, in related U.S. Appl. No. 13/902,215.
Office Action, mailed Sep. 18, 2014, in related U.S. Appl. No. 14/142,372.
Office Action, mailed Oct. 1, 2014, in related U.S. Appl. No. 14/302,913.
U.S. Appl. No. 14/315,509, filed Jun. 26, 2014.
U.S. Appl. No. 14/315,867, filed Jun. 26, 2014.
U.S. Appl. No. 14/315,792, filed Jun. 26, 2014.
U.S. Appl. No. 14/315,732, filed Jun. 26, 2014.
U.S. Appl. No. 14/302,966, filed Jun. 12, 2014.
U.S. Appl. No. 14/302,913, filed Jun. 12, 2014.
U.S. Appl. No. 14/142,413, filed Dec. 27, 2013.
U.S. Appl. No. 14/142,372, filed Dec. 27, 2013.
International Search Report, mailed Feb. 25, 2014, in International Application No. PCT/JP2013/006895.
Written Opinion of the International Search Authority, mailed Feb. 25, 2014, in International Application No. PCT/JP2013/006895 (English Language Translation).
Office Action, mailed Jan. 29, 2014, in the corresponding U.S. Appl. No. 13/902,393.
Office Action, mailed on Jun. 20, 2014, in the corresponding U.S. Appl. No. 14/087,635.
Office Action, mailed Nov. 8, 2013, in the corresponding U.S. Appl. No. 13/902,436.
Office Action, mailed on Jul. 3, 2014, in the corresponding U.S. Appl. No. 14/141,833.
Office Action, mailed on Apr. 14, 2014, in related U.S. Appl. No. 13/911,530.
Office Action, mailed on Apr. 16, 2014, in related U.S. Appl. No. 13/902,393.
Office Action, mailed on Aug. 4, 2014, in related U.S. Appl. No. 14/210,688.
Office Action, mailed on Feb. 4, 2014, in related U.S. Appl. No. 13/911,530.
Office Action, mailed on Jul. 2, 2014, in related U.S. Appl. No. 14/087,619.
Office Action, mailed on Jul. 2, 2014, in related U.S. Appl. No. 14/261,572.
Office Action, mailed on Jul. 29, 2014, in related U.S. Appl. No. 14/087,639.

(56) References Cited

OTHER PUBLICATIONS

Office Action, mailed on Aug. 5, 2014, in related U.S. Appl. No. 13/902,393.
Office Action, mailed on Aug. 5, 2014, in related U.S. Appl. No. 13/911,530.
Office Action, mailed on Aug. 8, 2014, in related U.S. Appl. No. 14/315,509.
International Search Report, mailed Feb. 4, 2014, in International Application No. PCT/JP2013/006858.
International Search Report, mailed Feb. 4, 2014, in International Application No. PCT/JP2013/006861.
International Search Report, mailed Feb. 4, 2014, in International Application No. PCT/JP2013/006863.
International Search Report, mailed Feb. 10, 2014, in International Application No. PCT/JP2013/006859.
International Search Report, mailed Feb. 10, 2014, in International Application No. PCT/JP2013/006860.
International Search Report, mailed Feb. 18, 2014, in International Application No. PCT/JP2013/006871.
International Search Report, mailed Jun. 18, 2013, in International Application No. PCT/JP2013/003319.
Written Opinion of the International Searching Authority, mailed Jun. 18, 2013, in International Application No. PCT/JP2013/003319 (English language translation).
International Search Report, mailed Feb. 10, 2014, in International Application No. PCT/JP2013/006870.
Written Opinion of the International Search Authority, mailed Feb. 10, 2014, in International Application No. PCT/JP2013/006870 (English language translation).
Office Action, mailed Nov. 21, 2014, in related U.S. Appl. No. 14/261,572.
International Search Report, issued Feb. 4, 2014, in International Application No. PCT/JP2013/006857.
Written Opinion of the International Search Authority, mailed Feb. 4, 2014, in International Application No. PCT/JP2013/006857 (English language translation).
Takao Nakamura et al., "Fast Watermark Detection Scheme from Analog Image for Camera-Equipped Cellular Phone", IEICE Transactions, D-II, vol. J87-D-II, No. 12, pp. 2145-2155, Dec. 2004 (with English language translation).
Dai Yamanaka et al., "An investigation for the Adoption of Subcarrier Modulation to Wireless Visible Light Communication using Imaging Sensor", The Institute of Electronics, Information and Communication Engineers IEICE Technical Report, Jan. 4, 2007, vol. 106, No. 450, pp. 25-30 (with English language translation).
International Search Report, mailed Jun. 18, 2013, in International Application No. PCT/JP2013/003318.
Written Opinion of the International Searching Authority, mailed Feb. 4, 2014, in International Application No. PCT/JP2013/006894 (English language translation).
International Search Report, mailed Mar. 11, 2014, in International Application No. PCT/JP2013/007709.
Written Opinion of the International Searching Authority, mailed Mar. 11, 2014, in International Application No. PCT/JP2013/007709 (English language translation).
International Search Report, mailed Feb. 10, 2014, in International Application No. PCT/JP2013/007708.
International Search Report, mailed Feb. 10, 2014, in International Application No. PCT/JP2013/007684.
International Search Report, mailed Mar. 11, 2014, in International Application No. PCT/JP2013/007675.
Written Opinion of the International Searching Authority, mailed Mar. 11, 2014, in International Application No. PCT/JP2013/007675 (English language translation).
International Search Report, mailed Feb. 4, 2014, in International Application No. PCT/JP2013/006894.
Written Opinion of the International Searching Authority, mailed Feb. 18, 2014, in International Application No. PCT/JP2013/006871 (English language translation).
Written Opinion of the International Searching Authority, mailed Feb. 4, 2014, in International Application No. PCT/JP2013/006858 (English language translation).
Written Opinion of the International Searching Authority, mailed Feb. 10, 2014, in International Application No. PCT/JP2013/006860 (English language translation).
Written Opinion of the International Searching Authority, mailed Feb. 4, 2014, in International Application No. PCT/JP2013/006861 (English language translation).
International Search Report, mailed Feb. 3, 2015, in International Application No. PCT/JP2014/006448.
Extended European Search Report, mailed May 21, 2015, from the European Patent Office in related European Patent Application No. 13793716.5.
Extended European Search Report, mailed Jun. 1, 2015, from the European Patent Office in related European Patent Application No. 13793777.7.
Jiang Liu et al., "Foundational Analysis of Spatial Optical Wireless Communication Utilizing Image Sensor", Imaging Systems and Techniques (IST), 2011 IEEE International Conference on Imaging Systems and Techniques, IEEE, May 17, 2011, pp. 205-209, XP031907193.
USPTO Office Action, mailed Jun. 23, 2015, in related U.S. Appl. No. 14/142,413.
Christos Danakis et al., "Using a CMOS Camera Sensor for Visible Light Communication", 2012 IEEE Globecom Workshops, U.S., Dec. 3, 2012, pp. 1244-1248.
USPTO Office Action, mailed Apr. 28, 2015, in related U.S. Appl. No. 14/141,833.
Japan Office Action, mailed Jul. 28, 2015, for Japanese Patent Application No. 2015-129247.
USPTO Office Action, mailed May 22, 2014, for the corresponding U.S. Appl. No. 14/087,645.
Extended European Search Report, mailed Nov. 10, 2015, in related European Application No. 13869757.8.
Extended European Search Report, mailed Nov. 10, 2015, in related European Application No. 13868814.8.
Extended European Search Report, mailed Nov. 10, 2015, in related European Application No. 13868307.3.
Extended European Search Report, mailed Nov. 10, 2015, in related European Application No. 13868118.4.
Extended European Search Report, mailed Nov. 10, 2015, in related European Application No. 13867350.4.
Extended European Search Report, mailed Nov. 23, 2015, in related European Application No. 13867905.5.
Extended European Search Report, mailed Nov. 23, 2015, in related European Application No. 13866705.0.

* cited by examiner

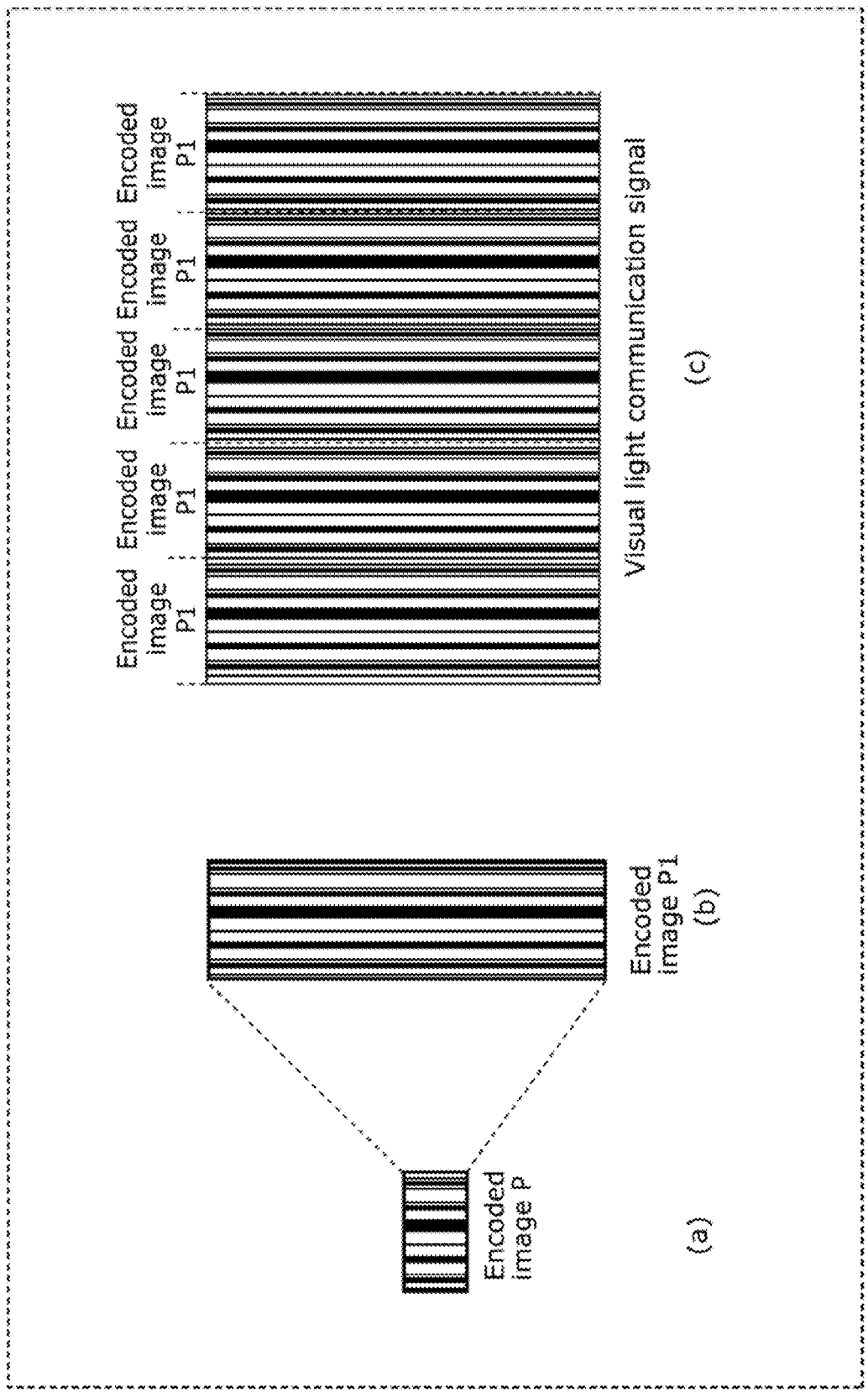

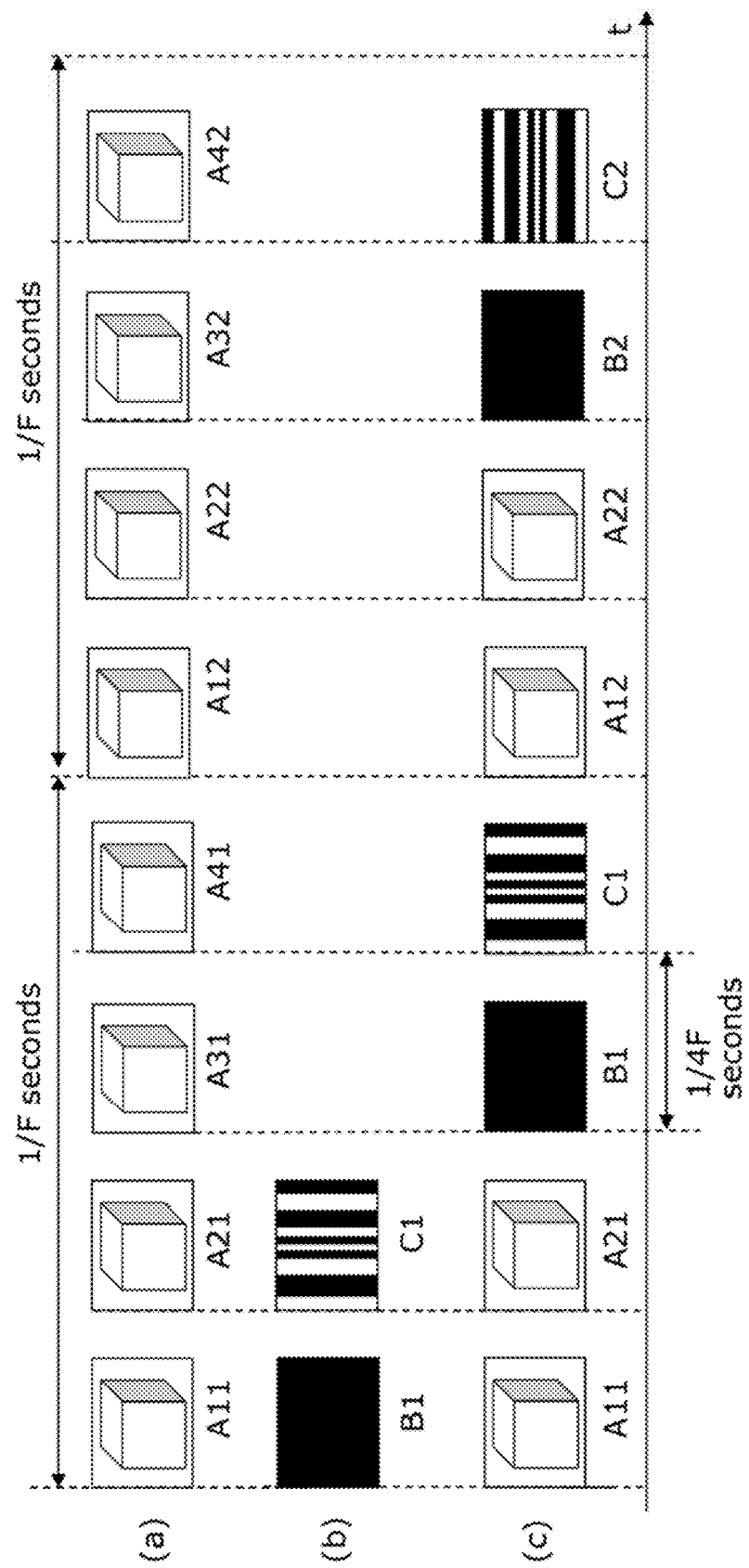

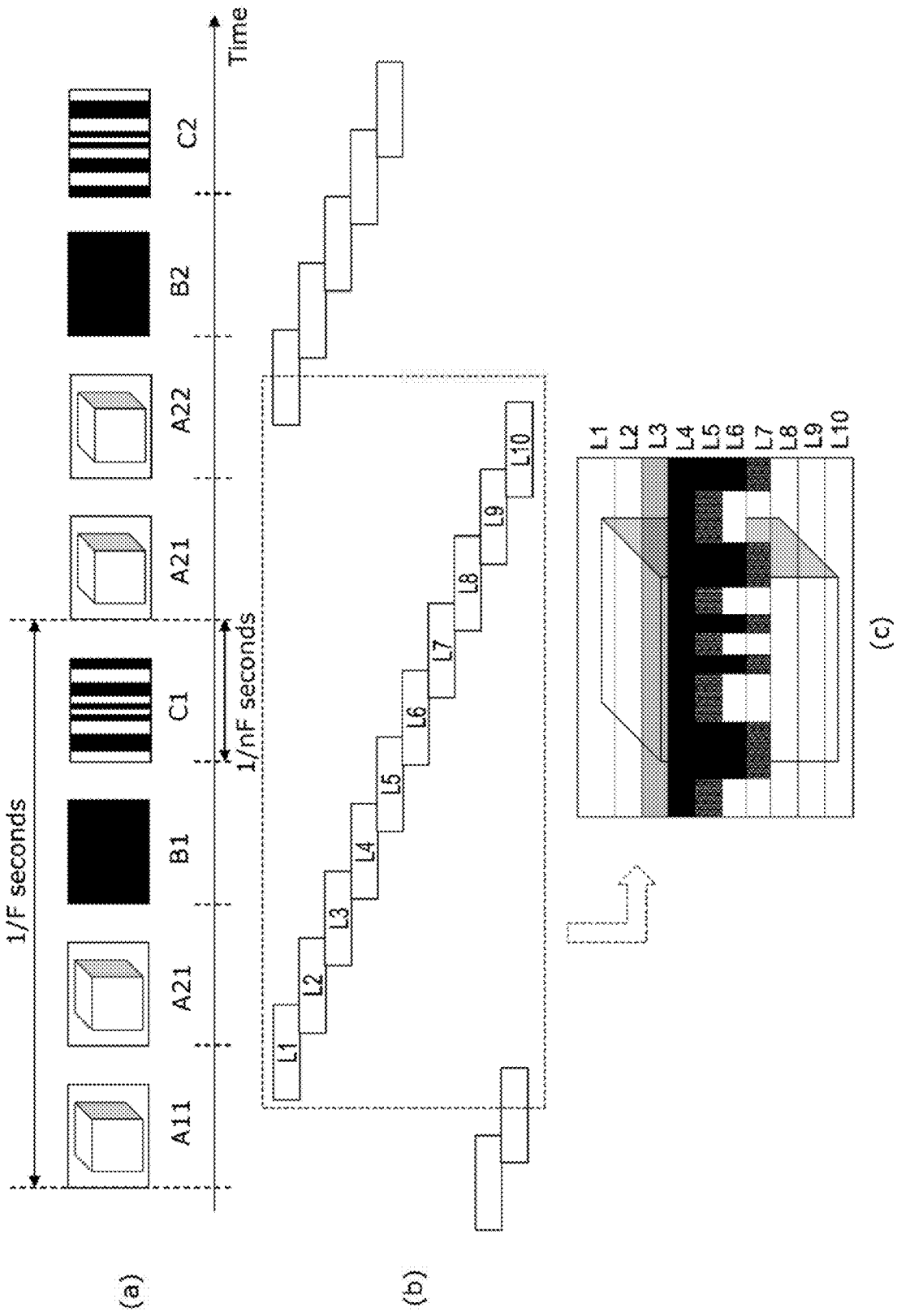

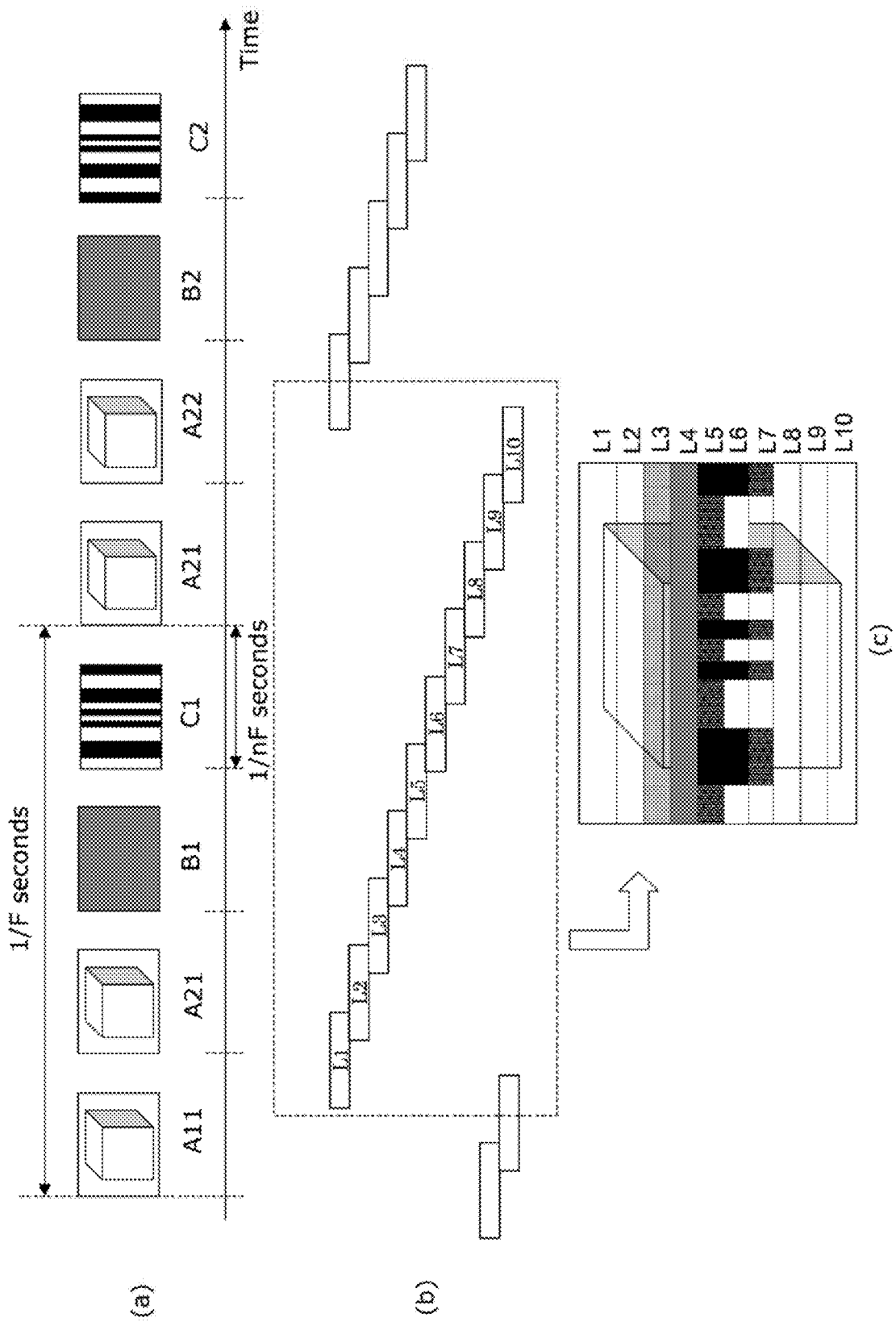

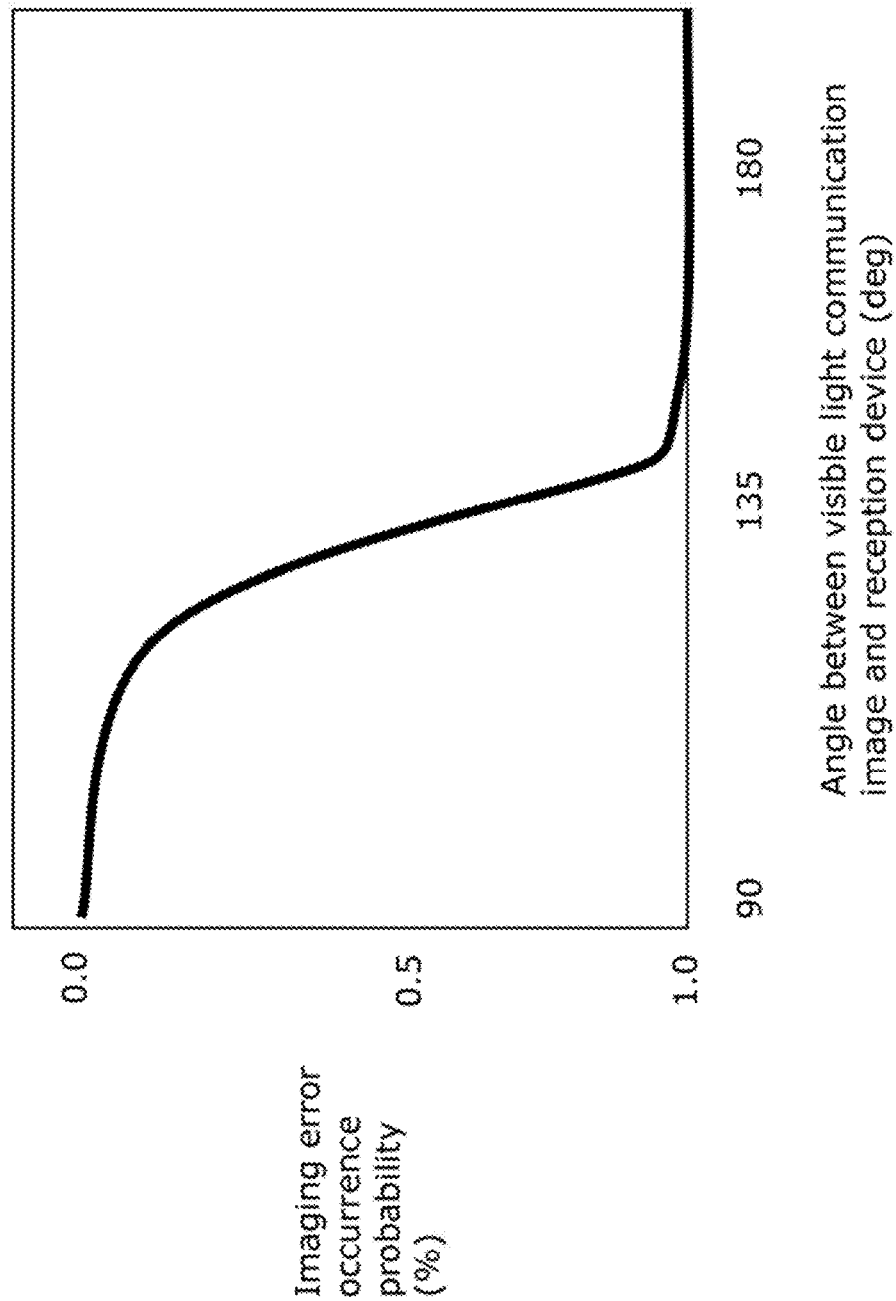

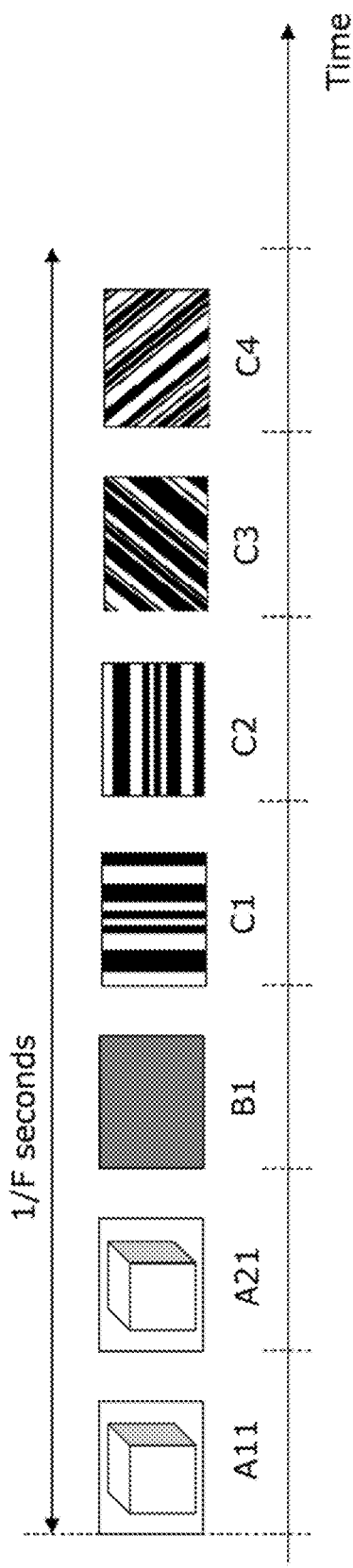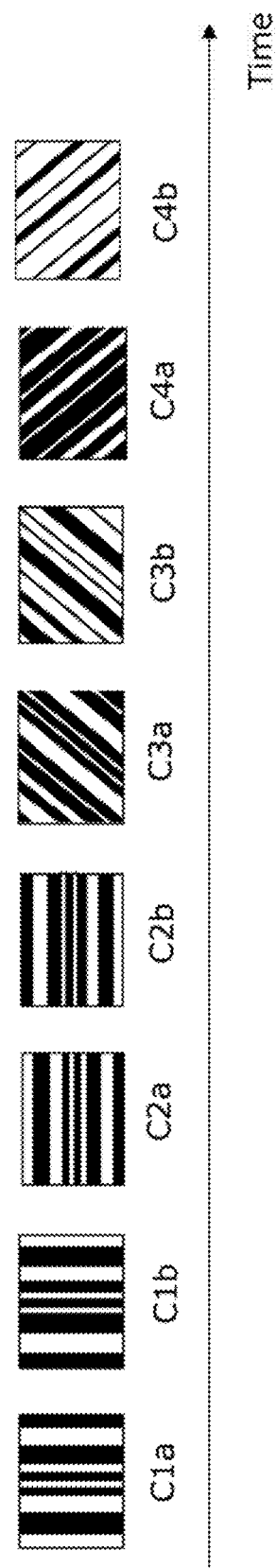
FIG. 8A
FIG. 8B

FIG. 14
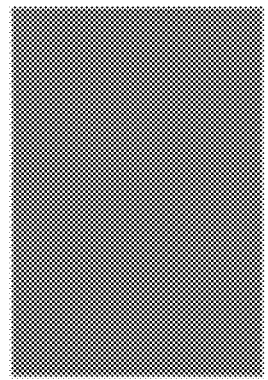
A
(a) ··· Transmit signals of negative and positive in one frame
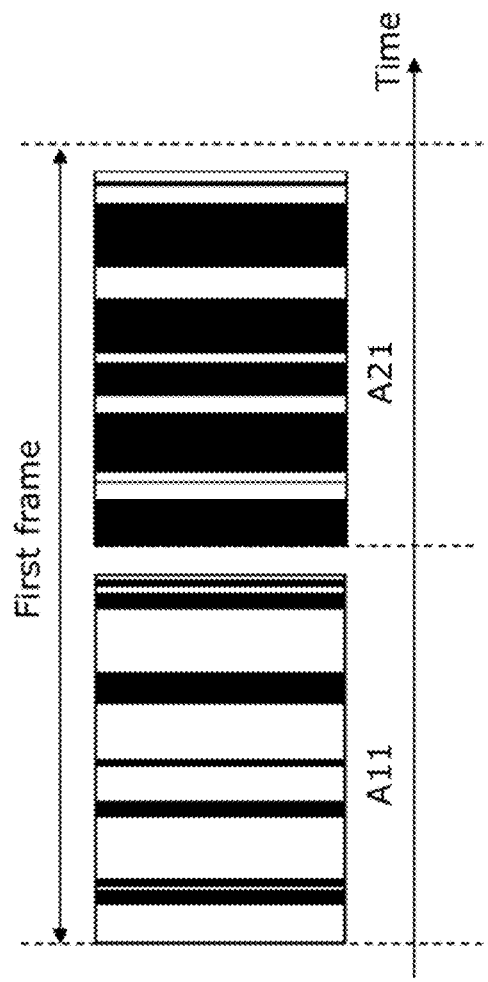

FIG. 22

|     | 1 | 2 | 4  | 8 | 16 |
|-----|---|---|----|---|----|
| C=1 |   | 1 |    |   |    |
| C=2 | 1 | -1|    |   |    |
| C=3 |   | 1 | -1 |   |    |
|     |   | 1 | -1 |   |    |

(a)

|     | 1 | 2 | 4 | 2' | 4' | 8 | 16 |
|-----|---|---|---|----|----|---|----|
| C=3 |   | 1 | 1 | -1 | -1 |   |    |

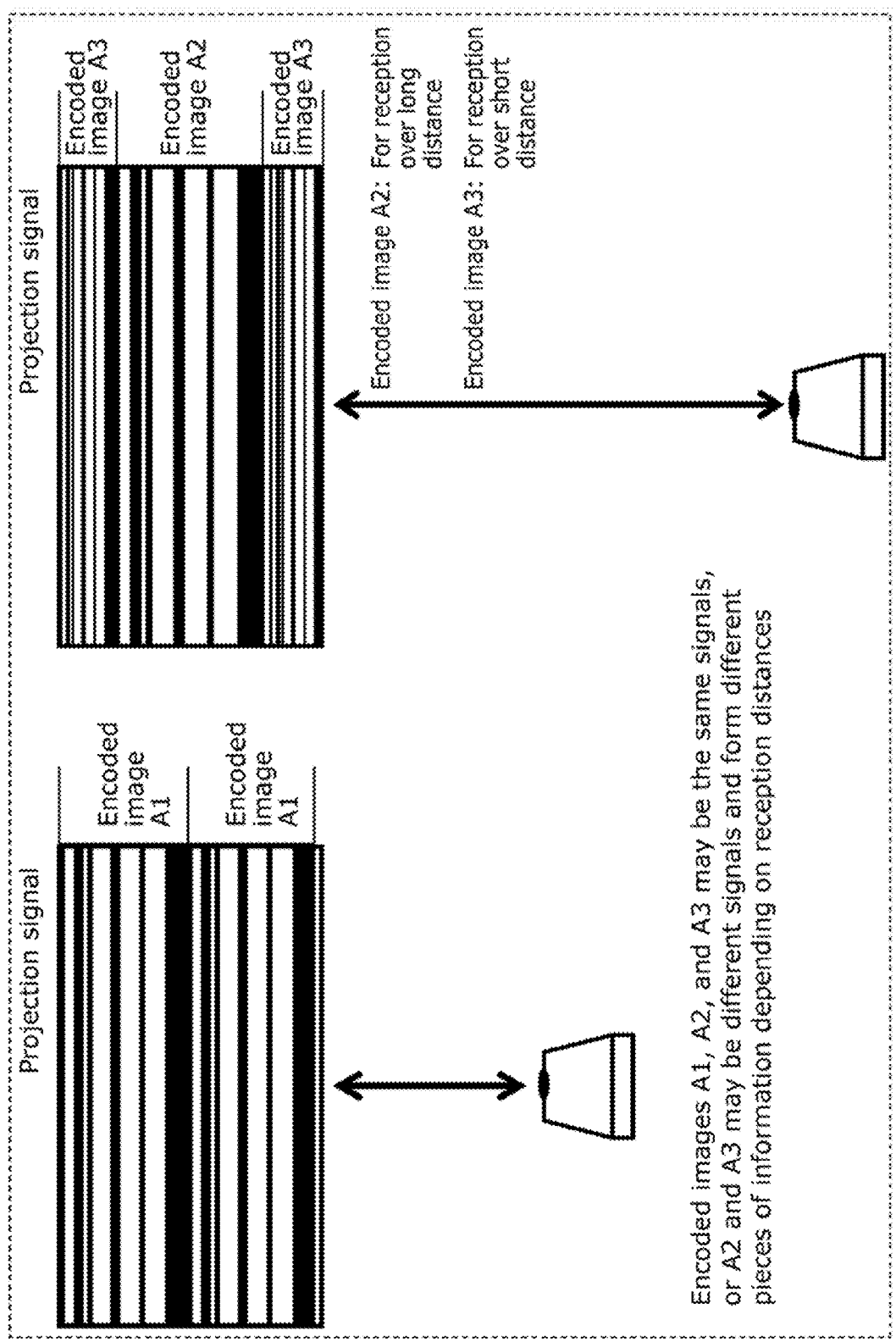

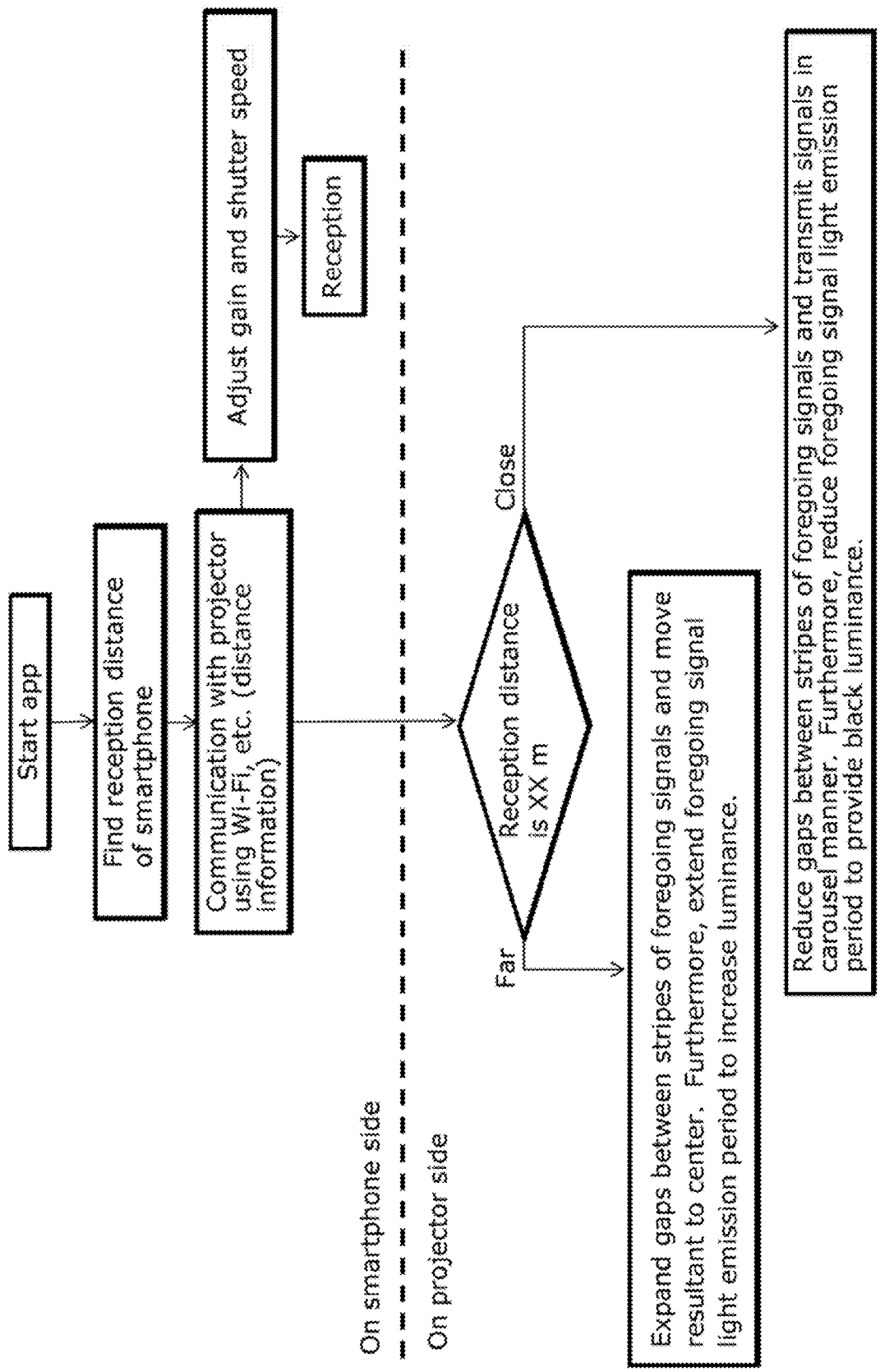

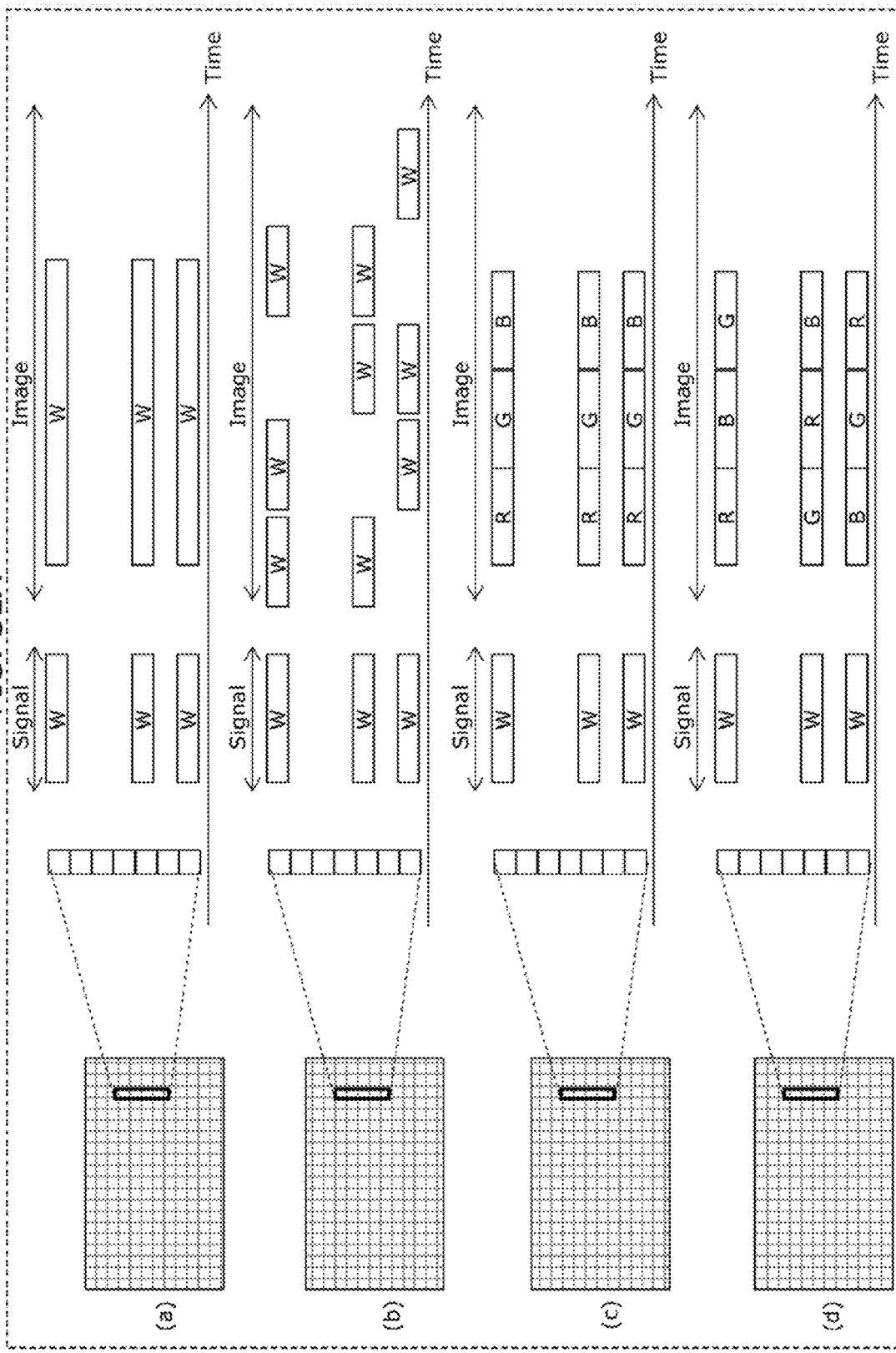

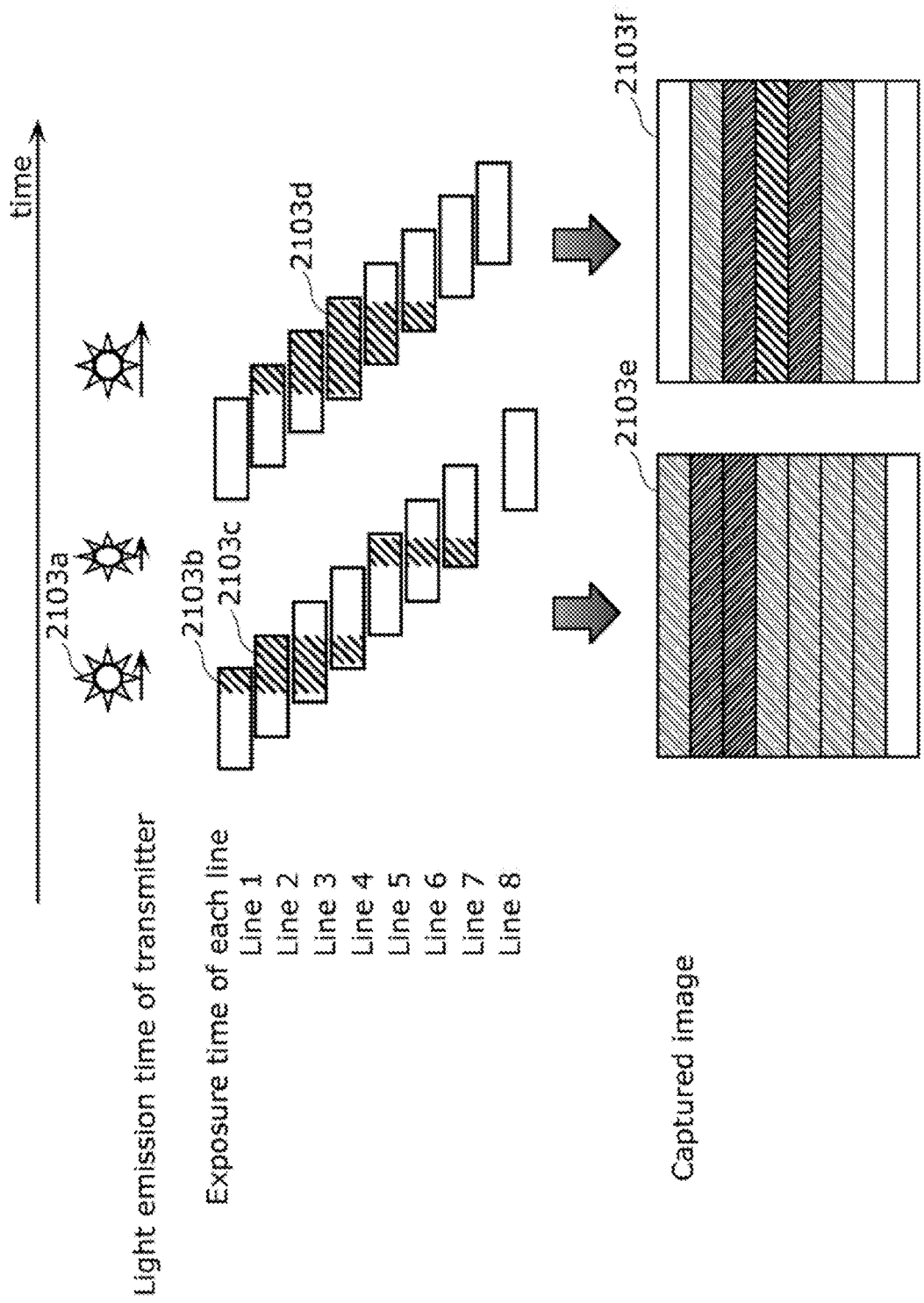

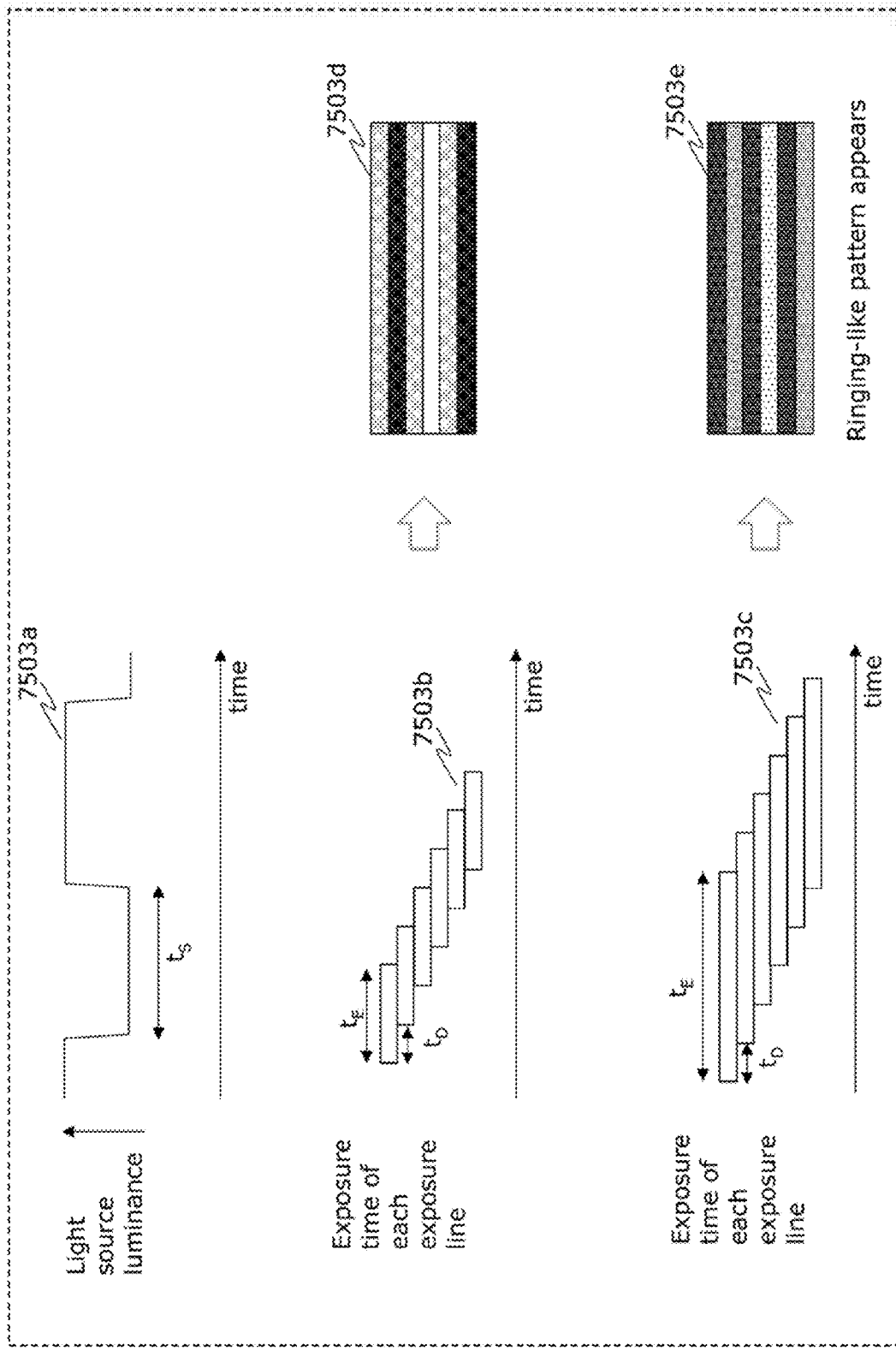

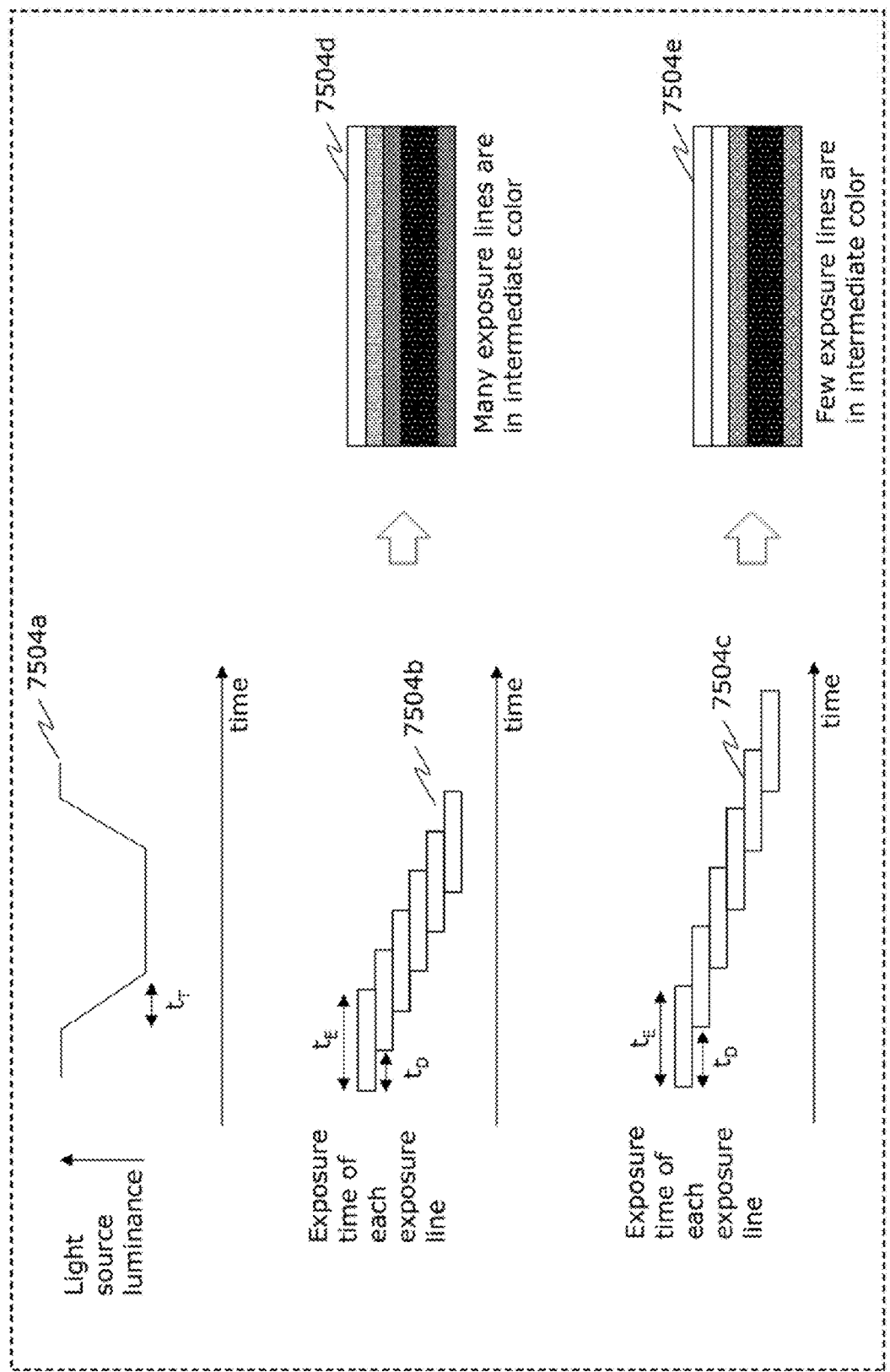

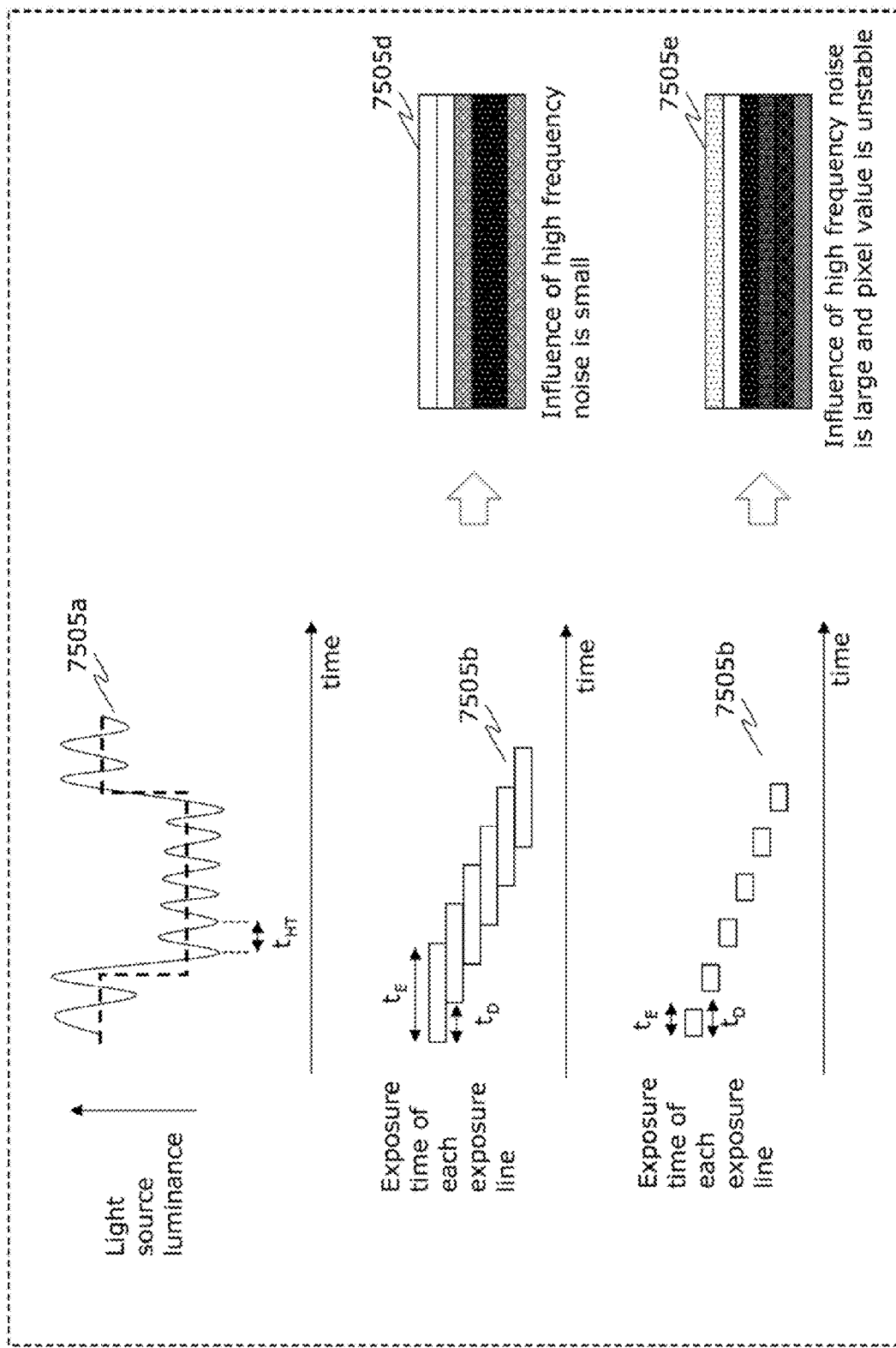

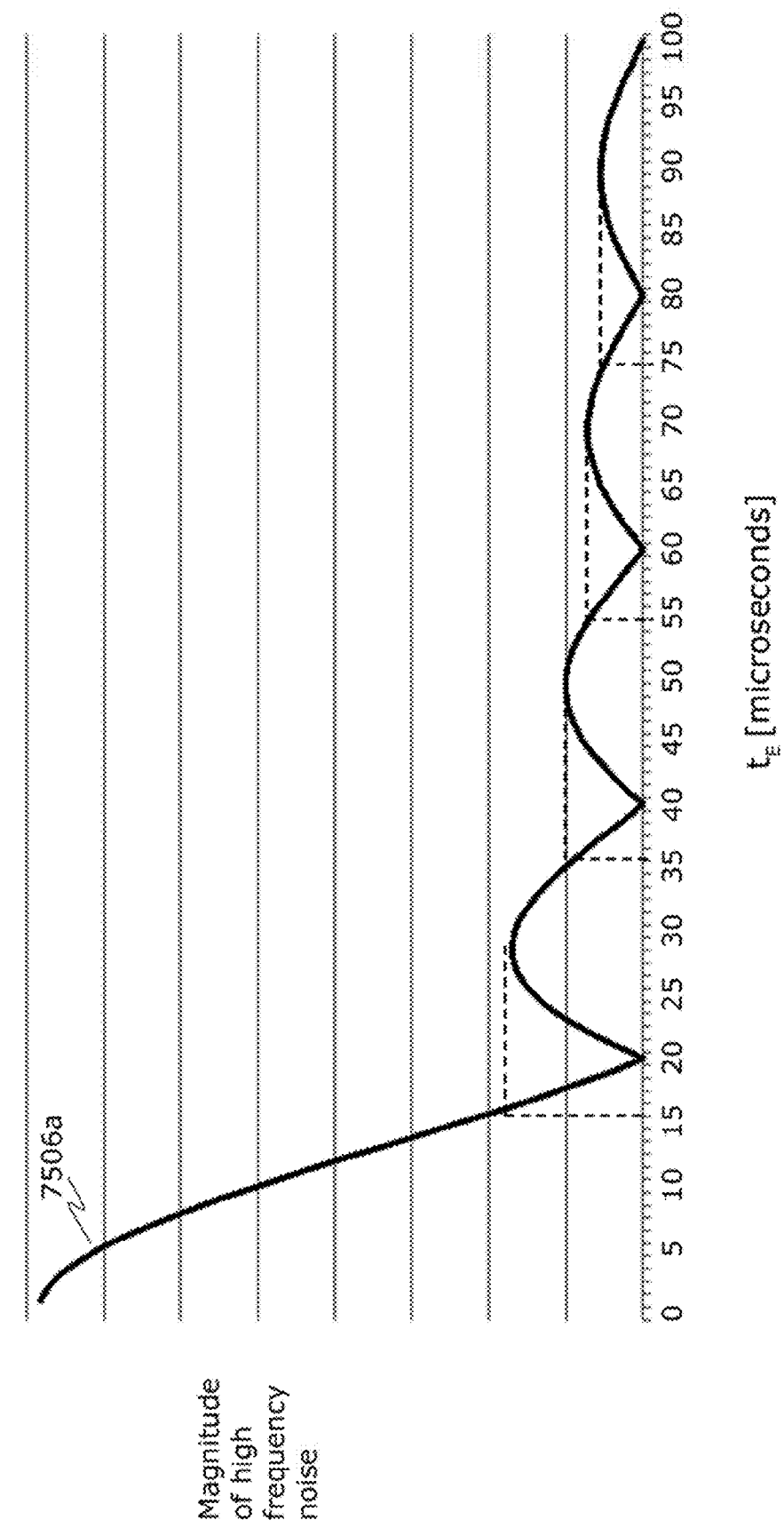

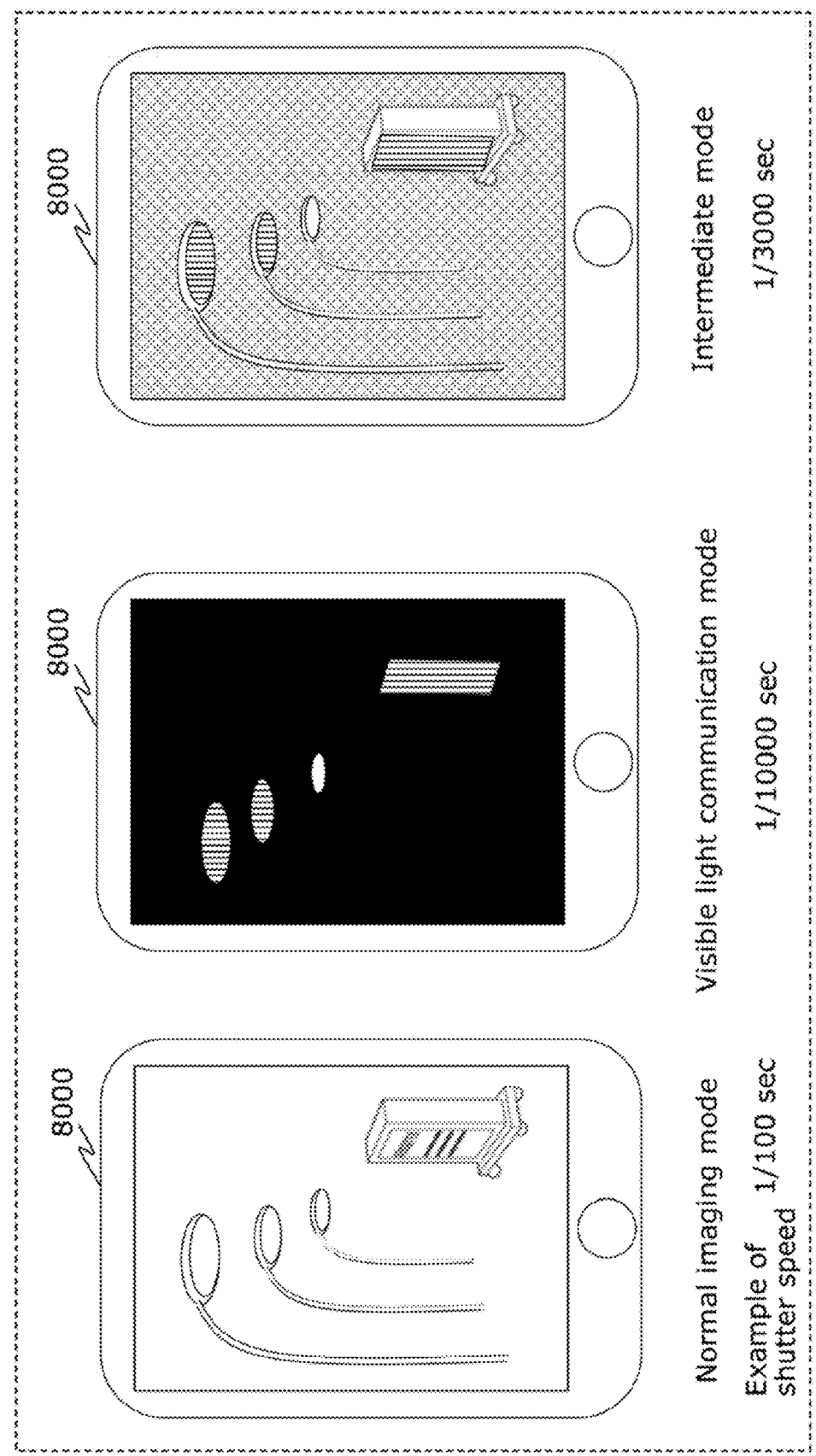

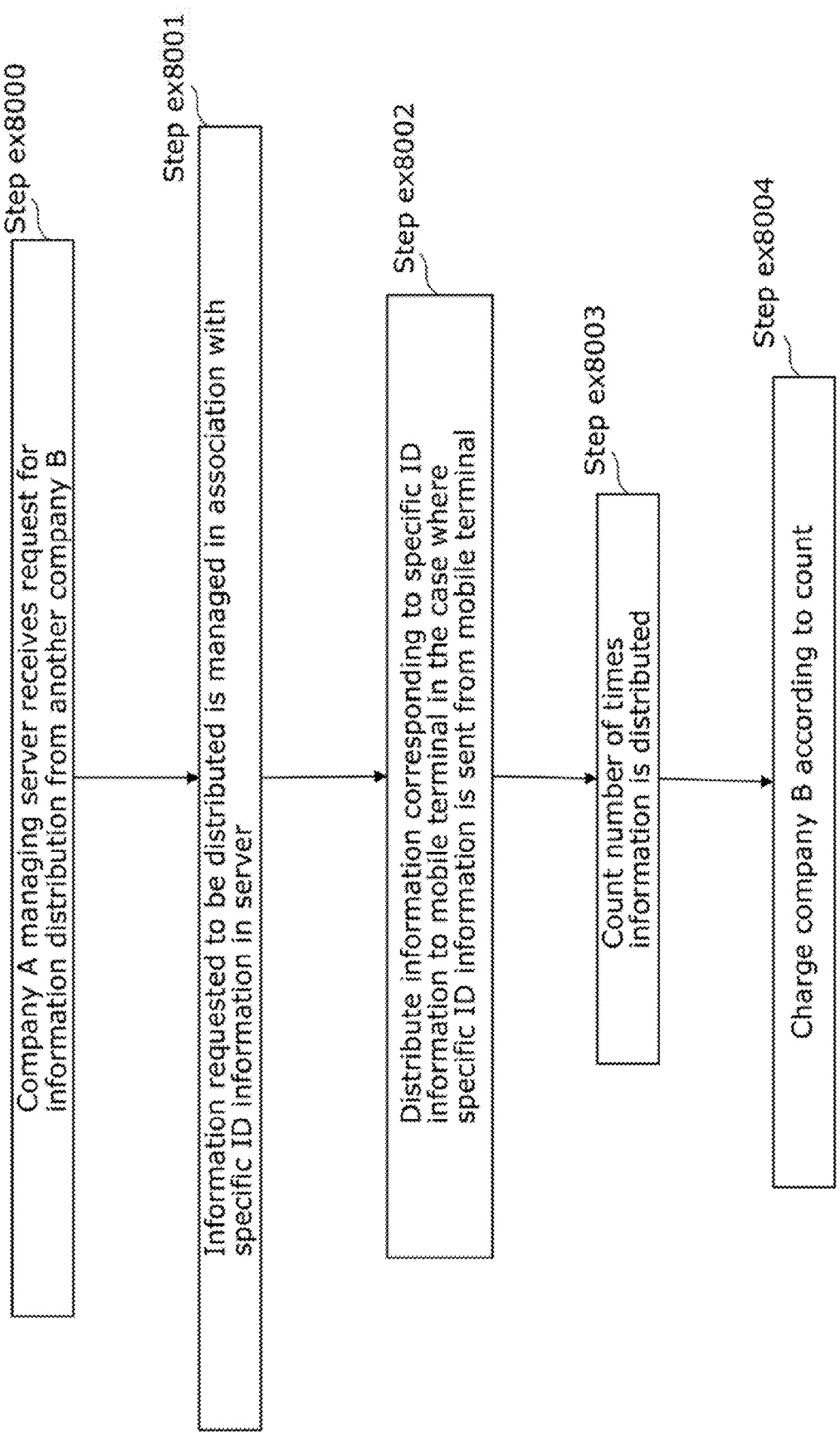

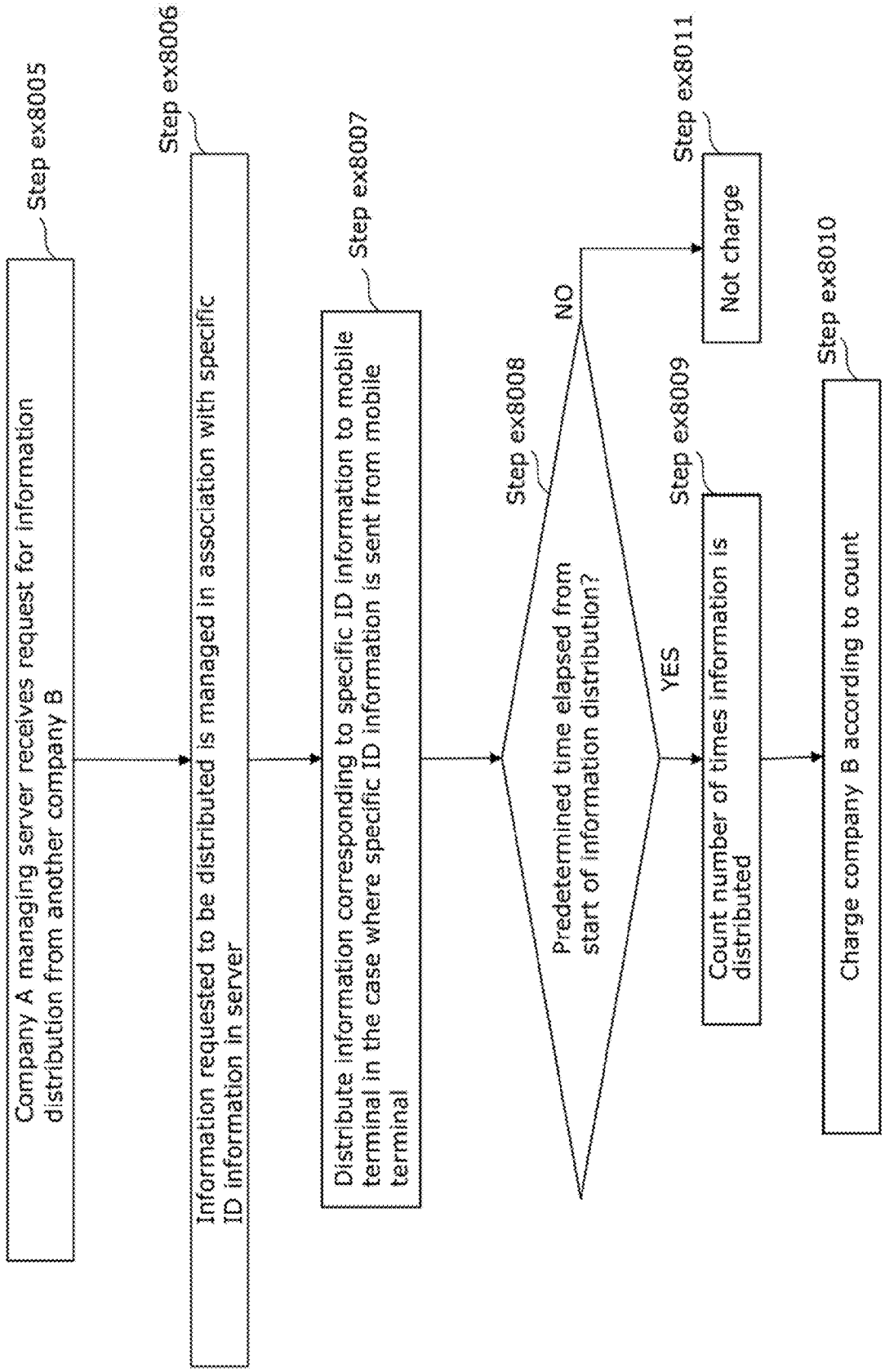

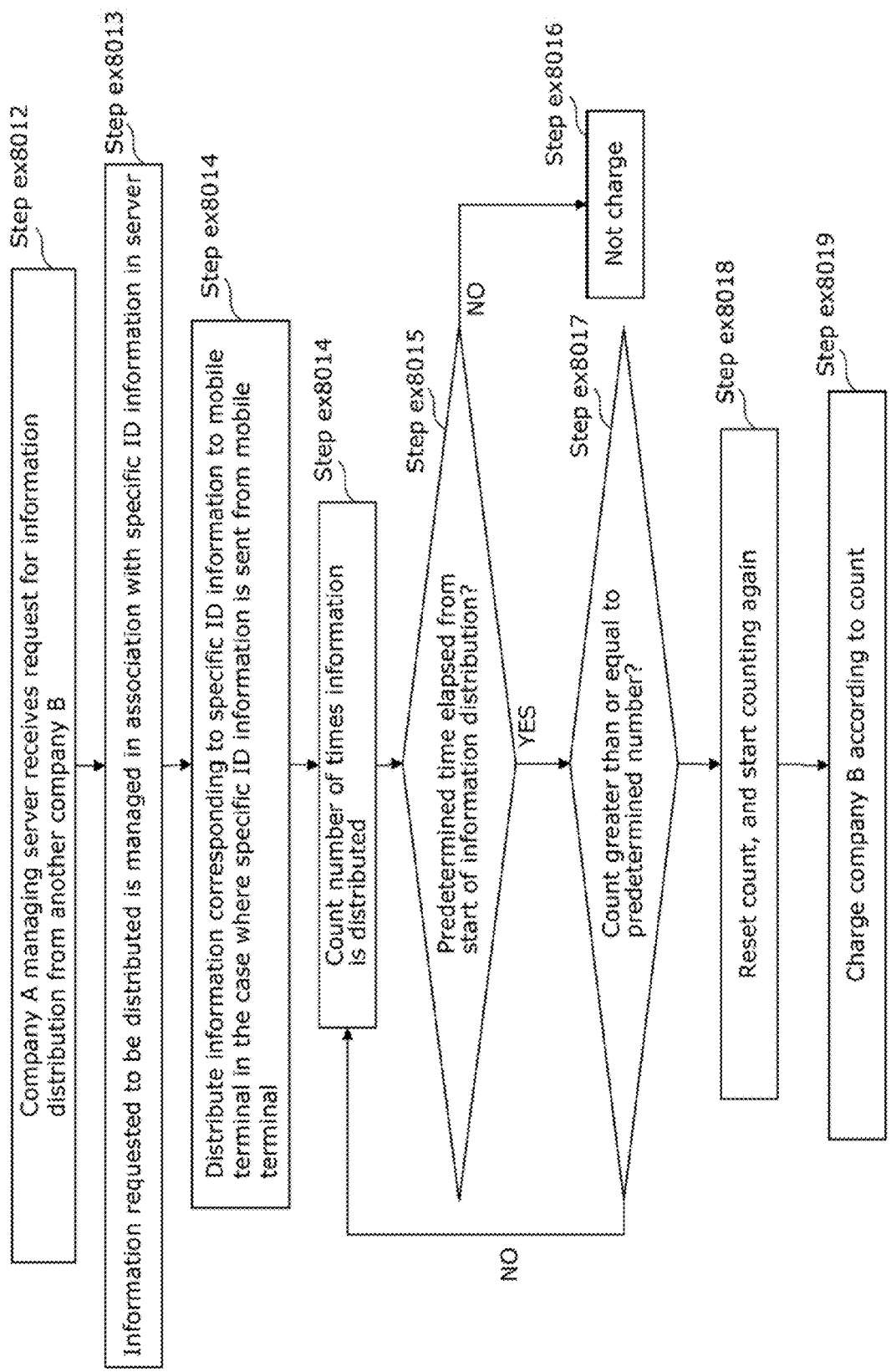

VIDEO DISPLAY METHOD USING VISIBLE LIGHT COMMUNICATION IMAGE INCLUDING STRIPE PATTERNS HAVING DIFFERENT PITCHES

CROSS REFERENCE TO RELATED APPLICATION

The present application claims the benefit of U.S. Provisional Patent Application No. 61/746,315 filed on Dec. 27, 2012, Japanese Patent Application No. 2012-286339 filed on Dec. 27, 2012, Japanese Patent Application No. 2013-203349 filed on Sep. 30, 2013. U.S. Provisional Patent Application No. 61/896,874 filed on Oct. 29, 2013, and Japanese Patent Application No. 2013-224801 filed on Oct. 29, 2013. The entire disclosures of the above-identified applications, including the specifications, drawings and claims are incorporated herein by reference in their entirety.

FIELD

The present disclosure relates to, for example, video display methods of displaying images included in video signals.

BACKGROUND

Communication techniques using visible light have been proposed. For example, as in Patent Literatures (PTLs) 1 and 2, there are proposals on a video display apparatus including a display, a projector, etc., to superimpose visible light communication information on normal video to be displayed and then display resultant video.

In addition, there are the digital watermark technology applied to printed materials, and techniques of displaying QR codes (registered trademark), barcodes, etc., in images and using encoded signals thereof to spread information to the Internet world though imaging devices such as mobile phones, smart phones, and digital cameras.

However, since these are achieved by superimposition of encoded visible light communication signals as a part of control on a backlight while video signals are displayed by way of driving each pixel and controlling the backlight, these can be applied only to video display devices which display video by controlling the two systems.

Another devised method is, for example, superimposing information on an entire image inconspicuously in the form of watermark and decoding the superimposed information on a receiver side, that is, transmitting and receiving, in or without synchronization with video, relevant information, etc., that is information different from the video, using a video display apparatus. There has also been an, approach such as attempting to separate information quickly with use of an existing typical receiver although some deterioration is seen in video.

CITATION LIST

Patent Literature

[Patent Literature 1] Japanese Unexamined Patent Application Publication No. 2007-43706
[Patent Literature 2] Japanese Unexamined Patent Application Publication No. 2009-212768

SUMMARY

Technical Problem

However, the conventional video display methods have a problem that signals for visible light communication cannot be appropriately transmitted.

Solution to Problem

A video display method in the present disclosure is a video display method of displaying, on a per frame basis, an image included in a video signal, and may include: generating a first visible light communication image by encoding a visible light communication signal, the first visible light communication image being an image having a stripe pattern for visible light communication; displaying, in a predetermined frame, the image included in the video signal; and displaying, in the predetermined frame, the first visible light communication image sequentially after an identification image that is an image having luminance uniformly lower than average luminance of the image that is displayed.

Additional benefits and advantages of the disclosed embodiments will be apparent from the Specification and Drawings. These benefits and/or advantages may be individually obtained by the various embodiments and features of the Specification and Drawings, which need not all be provided in order to obtain one or more of such benefits and/or advantages.

Advantageous Effects

According to the present disclosure, signals for visible light communication can be appropriately transmitted.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 schematically illustrates an example of a visible light communication image and encoded images.

FIG. 5 explains an example of an operation of the video display apparatus according to Embodiment 1 which mixes a visible light communication image into normal video and displays resultant video.

FIG. 6A explains an operation of the video display apparatus and the reception device according to Embodiment 1.

FIG. 6B explains an operation of the video display apparatus and the reception device according to Embodiment 1.

FIG. 7 illustrates an example of an angle between the visible light communication image and the reception device, and an imaging error occurrence probability.

FIG. 8A explains another example of an operation of the video display apparatus according to Embodiment 1 which mixes a visible light communication image into normal video and displays resultant video.

FIG. 8B explains another example of an operation of the video display apparatus according to Embodiment 1 which mixes a visible light communication image into normal video and displays resultant video.

FIG. 14 schematically illustrates an example in which two encoded images are grouped as a set to reduce the conspicuity.

FIG. 22 illustrates an example of the method of adjusting and inserting the encoded image.

FIG. 25 illustrates an example of the method of adjusting and inserting the encoded image.

FIG. 29 schematically illustrates an example of the encoded image which is displayed according to the focal distance.

FIG. 30 is a flowchart illustrating an example of a focal distance interlock operation in the receiver which captures an image projected by the projector.

FIG. 31A is a video output view illustrating examples for avoiding erroneous recognition of encoded images and similar video patterns.

FIG. 53A is a diagram illustrating an example of an observation method of luminance of a light emitting unit in Embodiment 2.

FIG. 53E is a diagram illustrating an example of an observation method of luminance of a light emitting unit in Embodiment 2.

FIG. 53F is a diagram illustrating an example of an observation method of luminance of a light emitting unit in Embodiment 2.

FIG. 53G is a diagram illustrating an example of an observation method of luminance of a light emitting unit in Embodiment 2.

FIG. 53H is a diagram illustrating an example of an observation method of luminance of a light emitting unit in Embodiment 2.

FIG. 54 is a diagram illustrating an example of each mode of a receiver in Embodiment 2.

FIG. 69 is a flowchart illustrating flow of service provision.

FIG. 70 is a flowchart illustrating service provision in another example.

FIG. 71 is a flowchart illustrating service provision in another example.

DESCRIPTION OF EMBODIMENTS

Figure 1:
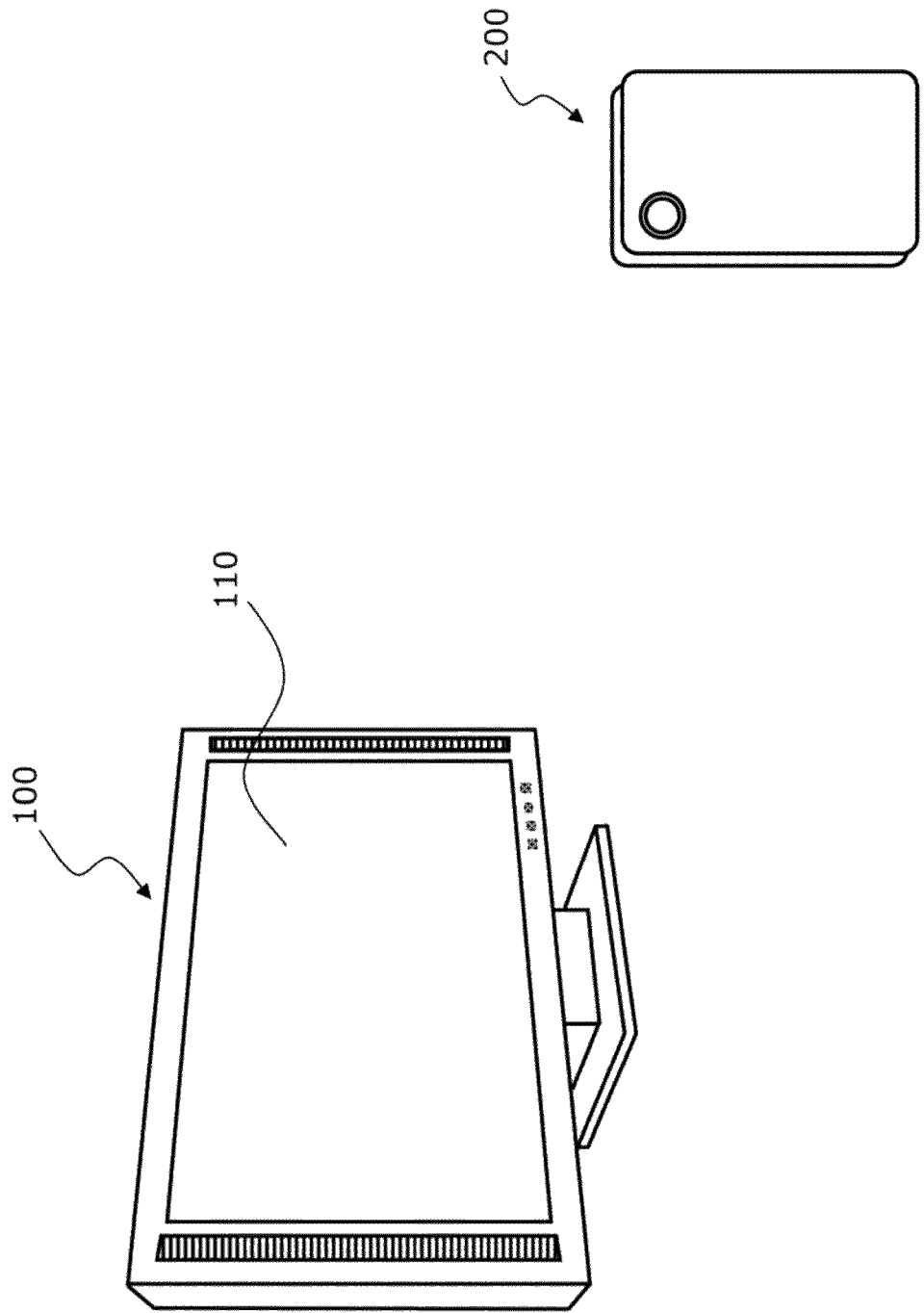
FIG. 1 schematically illustrates an example of a visible light communication system according to Embodiment 1.

The following describes embodiments in detail with reference to the drawings as appropriate. Descriptions which are more detailed than necessary may, however, be omitted. For example, detailed descriptions on already well-known matters and overlapping descriptions on substantially the same configurations may be omitted. The reason for this is to avoid the following description becoming unnecessarily redundant, thereby helping those skilled in the art easily understand it.

It is to be noted that the Applicants provide the drawings and the following description to help those skilled in the art fully understand the present disclosure and do not intend to thereby restrict the subject matter recited in the Claims.

(Development into Disclosure)

In the PTL 1, a method of superimposing visible light communication signals by way of flickering a backlight is adopted. Therefore, the visible light communication signals cannot be transmitted during a period of time in which the backlight is off. During the period in which the visible light communication signals cannot be transmitted, there is no other way but to perform communication with reduced image quality so as not to cause an error in signal transmission.

Furthermore, in a recent video display apparatus, particularly, in the field of a liquid-crystal display, a projector using liquid crystals, etc., a technique called backlight scanning is adopted to improve image quality. The backlight scanning is a technique to divide a display surface into regions and control light emission of backlights so that the backlights are sequentially turned on in the respective regions on a regular basis. In the method using an imaging device or the video display apparatus using liquid crystals, a measure is taken such as limiting turning on backlights according to image signals, in order to improve deteriorating moving picture properties; when visible light communication using backlights is applied, it is difficult to concurrently achieve the improvement of the moving picture properties and the visible light communication using modulation of the backlights.

Meanwhile, in other video display apparatuses, for example, not only a projector of a type in which a digital mirror device (hereinafter referred to as DMD) is mounted, an organic EL display, and a plasma display, but also a video display apparatus using CRT, it is impossible to transmit video signals with other signals superimposed thereon through the approach as disclosed by the PTL 1 or 2. In addition, there are the digital watermark technology applied to printed materials, and a method to display QR codes (registered trademark), barcodes, etc., in images and obtain, using encoded signals thereof, information from video signals and furthermore, spread the information to the Internet world though imaging devices such as mobile phones, smartphones, and digital cameras. These methods, however, have limitations, such as the restriction on the size of a field of view and the requirement to increase the focus level to a certain level, and thus involve a problem that image recognition takes time, resulting in that dedicated video signals must be continuously output for at least a few seconds, for example, which is not good enough for general use.

Thus, the present disclosure provides a video display apparatus, a reception device, a visible light communication system (a video display system), and a video display method, which mixes encoded signals into video signals only for a very short period of time and repeats this in certain cycles, and furthermore, uses an imaging device including an image sensor of a sequential exposure type, to enable transmission of information of visible light communication as inserted into image information, without the need of synchronization, extreme concerns on the field of view, the distance to the video display apparatus, and so on, for a relatively short length of time that is at most one second, and moreover, without significant disturbance to the video signals, that is, without drastic reduction in image quality. It is to be noted that the field of view indicates a screen size in the present disclosure.

A video display method according to an aspect in the present disclosure is a video display method of displaying, on a per frame basis, an image included in a video signal, and includes: generating a first visible light communication image by encoding a visible light communication signal, the first visible light communication image being an image having a stripe pattern for visible light communication; displaying, in a predetermined frame, the image included in the video signal; and displaying, in the predetermined frame, the first visible light communication image sequentially after an identification image that is an image having luminance uniformly lower than average luminance of the image that is displayed.

With this, since the first visible light communication image is displayed after a totally black image or a uniformly gray image is displayed as an identification image, for example, a uniformly black or gray line indicating the start position of the visible light communication signals appears in a captured image obtained by using an image sensor of a sequential exposure type capturing images displayed in respective frames. Therefore, the visible light communication signals can be easily read out from the captured image. As a result, it is possible to appropriately transmit the visible light communication signals.

Furthermore, the video display method may further include: displaying, after displaying the first visible light communication image, a second visible light communication image that is an image having a stripe pattern for visible light communication.

By doing so, the visible light communication images having stripe patterns are displayed repeatedly, with the result that visible light communication signals indicated by these visible light communication images can be reliably received.

Furthermore, in the displaying of a second visible light communication image, the second visible light communication image which has the stripe pattern different in orientation from the stripe pattern of the first visible light communication image may be displayed.

By dong so, the stripe patterns of the visible light communication images displayed repeatedly are different in orientation, with the result that the decrease of the probability of receiving the visible light communication signals which depends on the orientation of each exposure line included in the image sensor can be reduced.

Furthermore, in the displaying of a second visible light communication image, a reversed image obtained by switching between two different luminance values or colors included in the stripe pattern of the first visible light communication image may be displayed as the second visible light communication image.

By doing so, the visible light communication images displayed repeatedly are displayed, for example, as reversed images such as negative and positive images, with the result that image flickering due to the visible light communication images being displayed can be reduced. Furthermore, the stripe pattern of each of the first visible light communication image and the second visible light communication image may be made up of two colors which have a complementary relationship.

Furthermore, in the displaying of a second visible light communication image, the second visible light communication image may be displayed no more than 20 milliseconds after the first visible light communication image is displayed.

By doing so, it is possible to make it difficult for the visible light communication images to be recognized by human eyes, with the result that the impact on the image of video signals can be reduced.

Furthermore, in the displaying of a second visible light communication image, the second visible light communication image, which is an image having a stripe pattern different in resolution from the stripe pattern of the first visible light communication image, may be displayed to indicate information different in amount from information indicated in the first visible light communication image.

By doing so, in the case where the first and second visible light communication images are captured at a position close thereto, a large amount of information can be obtained from one of the first and second visible light communication images. Moreover, in the case where the first and second visible light communication images are captured at a position far therefrom, even when the captured image obtained by capturing one of the above visible light communication images is unclear because the visible light communication image has a fine resolution stripe pattern, information can be appropriately obtained from the other visible light communication image which has a low resolution stripe pattern.

Furthermore, it may be that the video display method further includes: capturing the first visible light communication image; and providing, according to a result of the capturing, an instruction to change the resolution of the stripe pattern, and in the displaying of a second visible light communication image, the second visible light communication image is displayed when the instruction is provided.

By doing so, in the case where the first visible light communication image projected by the projector is captured by a smartphone, for example, the smartphone is capable of causing the projector to change the first visible light communication image into the second visible light communication image when the captured image obtained by the smartphone capturing images is unclear. As a result, the smartphone is capable of obtaining the captured image which is clear and capable of appropriately receiving the visible light communication signals.

Furthermore, it may be that the video display method further includes: identifying a focal distance for displaying the first visible light communication image on a screen by projection using a projector lens; and determining, according to the focal distance, a total number of first visible light communication images to be displayed as the first visible light communication image, and in the displaying of the first visible light communication image sequentially after an identification image, the first visible light communication images the total number of which is determined are arranged and displayed on the screen.

By doing so, for example, when the focal distance is long, that is, when the projection distance is long, the number of first visible light communication images in projection images displayed large on the screen is increased so that the probability of receiving the visible light communication signals can be increased. Moreover, for example, when the focal distance is short, that is, when the projection distance is short, the number of first visible light communication images in projection images displayed small on the screen is decreased so that the first visible light communication image can be less reduced in size, and also at this time, the probability of receiving the visible light communication signals can be increased.

Furthermore, the video display method may further include notifying a terminal device which outputs the video signal of identification information indicating that a display apparatus which displays the image included in the video signal is capable of displaying the first visible light communication image.

By doing so, for example, the display apparatus which is a projector notifies the terminal device which is a personal computer of the identification information indicating that the display apparatus is a device which supports displaying of the visible light communication images. As a result, the terminal device is capable of easily determining, based on the received identification information, whether or not the display apparatus is capable of visible light communication.

Furthermore, the video display method may further include capturing the first visible light communication image with an exposure time of $1/480$ seconds or less by an image sensor having exposure lines whose exposures are sequentially started at different points in time and each of which is exposed during a period of time which partially overlaps with a period of time during which an adjacent one of the exposure lines is exposed.

By doing so, it is possible to appropriately obtain the visible light communication signals from the first visible light communication image.

The following describes embodiments specifically with reference to the drawings.

It is to be noted that each of the embodiments described below shows a general or specific example. The numerical values, shapes, materials, structural elements, the arrangement and connection of the structural elements, steps, the processing order of the steps etc., shown in the following embodiments are mere examples and do not restrict the present disclosure. Furthermore, among the structural elements in the following embodiments, structural elements not recited in the independent claims each indicating the broadest concept are described as arbitrary structural elements.

Embodiment 1

FIG. 1 schematically illustrates an example of a video display system which enables visible light communication according to Embodiment 1.

A display apparatus 100 is a video display apparatus that is, for example, a liquid-crystal display apparatus, and is capable of displaying video on a display unit 110. Furthermore, the video displayed on this display unit 110 includes a visible light communication signal inserted or superimposed thereon which indicates information on the video that is being displayed. The visible light communication signal transmitted as displayed on the display unit 110 of the display apparatus 100 is received by a reception device 200 capturing the video displayed on the display unit 110. The reception device 200 is configured, for example, as a smartphone which incorporates an image sensor of the sequential exposure type. This allows a user to receive, for example, information regarding the video that is being displayed on the display unit 110.

It is to be noted that although Embodiment 1 cites a liquid-crystal display apparatus as an example of the display apparatus, the display apparatus may be display equipment, such as an organic EL display apparatus and a plasma display apparatus, or a display apparatus of a projection type, such as a projection display apparatus and a projector.

Furthermore, although a smartphone is cited as an example of the reception device, it is sufficient that the reception device is an electronic device in which an image sensor of a type that is capable of sequential exposure is mounted. For example, a digital still camera or the like may be used.

Figure 2:
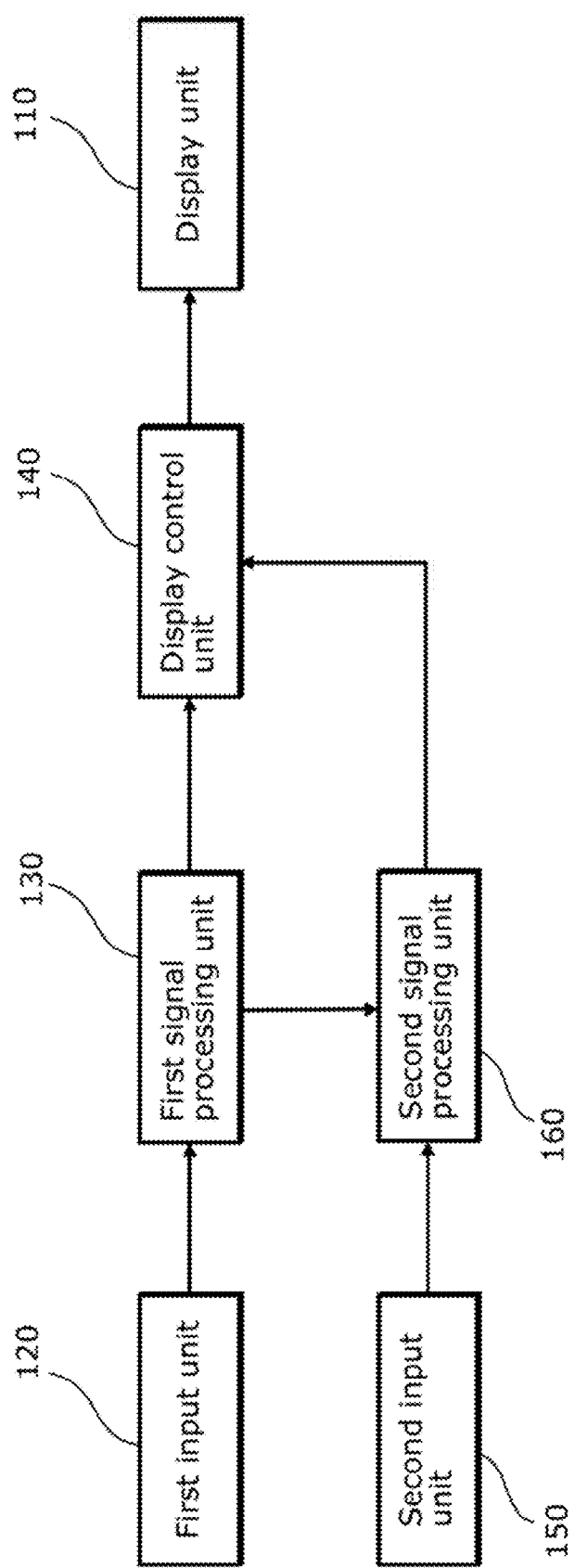
FIG. 2 is a block diagram illustrating a schematic configuration of the video display apparatus according to Embodiment 1.

FIG. 2 is a block diagram illustrating an example of a schematic configuration of the display apparatus 100 according to Embodiment 1. As illustrated in FIG. 2, the display apparatus 100 includes a display unit 110, a first input unit 120, a first signal processing unit 130, a display control unit 140, a second input unit 150, and a second signal processing unit 160.

The first input unit 120 receives a video signal regarding video which is to be displayed on the display unit 110 from broadcast waves, a video recorder, a video player, a PC, etc., through an antenna cable, a video signal line such as a composite cable, an HDMI (registered trademark) cable, a PJ link cable, etc., or a LAN cable etc., and transmits the video signal to the first signal processing unit 130. It is to be noted that signals stored on various recording media may be used in the video recorder or the video player.

The first signal processing unit 130 performs, on the received video signal, common image processing such as a decoding process, and then, divides each frame into a plurality of sub-frames. The first signal processing unit 130 transmits, to the display control unit 140 and the second signal processing unit 160, information indicating the length of the sub-frame, the level of the video signal, a display timing, brightness, and so on.

The second input unit 150 receives, through a dedicated cable, etc., or a LAN cable, etc., a visible light communication signal created by a PC or the like. It is to be noted that the visible light communication signal may be superimposed on part of the broadcast waves and input through the an cable, or signals resulting from superimposing, on the video signal, the visible light communication signal obtained from a video player which records the visible light communication signal or created separately by a PC or the like may be transmitted to and received from a video recorder or a video player through part of the lines such as an HDMI (registered trademark) cable or a PJ link cable. In the video recorder or the video player, signals stored on various recording media may be used. In addition, other than the method of receiving the visible light communication signal from outside, there is a method of reading, as information to be obtained, sever information through the Internet or the like by using information embedded in the display apparatus, such as ID of the display apparatus. The second input unit 150 transmits the received signal to the second signal processing unit 160. Hereafter, one group of a series of data of the visible light communication signal will be referred to as one block.

The second signal processing unit 160 creates a modulated signal of the visible light communication signal received from the second input unit 150 and creates a visible light communication image based on the modulated signal. Encoding of the visible light communication signal may be encoding compliant with JEITA-CP1222 or 1223 or may use a standard such as IEEE-P802.15.7. Furthermore, when only encoding is needed, a reception device which supports such encoding may be used. Other encoding methods are also possible; for example, Manchester coding or the like may be used for the modulation, and furthermore, although binary encoding is performed here, ternary or higher-order encoding is also possible, that is, it is possible to transmit an amount of information not less than twice a conventional amount of information as the fact that the tone representation can be directly used is taken into consideration.

Furthermore, the second signal processing unit 160 determines, based on information regarding brightness, etc., of video included in the video signal received from the first signal processing unit 130, which section of which sub-frame (a video signal period) among sub-frames forming one frame or among a plurality of frames the visible light communication image is to be inserted into. For example, a sub-frame is selected from a frame in which an image is displayed with relatively high brightness, and the visible light communication image is inserted thereto. Furthermore, it may be that a sub-frame in which an image is displayed with relatively high brightness is selected, and the visible light communication image is inserted thereto.

It may be that a sub-frame to be mixed is set in a frame, and furthermore, it may also be that a sub-frame in which an image is displayed with relatively high brightness on the display unit 110 is selected, and the visible light communication image is mixed thereinto. Furthermore, when the tones are represented using weighted sub-frames, there is a case where error diffusion, etc., has expanded the width of the tone representation. In this case, when a sub-frame with less weight is used, it may be that a period in which the luminance does not fluctuate even by error diffusion, etc., and the lit-up state continues is selected, and the visible light communication image is displayed in the selected period.

Furthermore, regarding a normal video view, a usable display method is to perform an operation for correcting, using another sub-field, the increase or decrease in luminance which is caused by displaying of the visible light communication image so that the video can be viewed as continuous video without causing a feeling of strangeness.

It is to be noted that a time section in which normal video is displayed and a time section in which the visible light communication image is displayed may be set or created within one frame instead of an existing sub-frame. Also in this case, a frame in which images are displayed with relatively high brightness on the display unit 110 may be selected as a frame into which the visible light communication image is to be inserted or in which the visible light communication image is to be displayed.

Furthermore, in the case where a position or a time slot into which the visible light communication image is to be inserted has been determined in advance, there is no need for the process which is performed by the second signal processing unit 160 to determine a sub-frame or a time section into which the visible light communication image is to be inserted. In this case, it is sufficient that the visible light communication image is inserted into a predetermined sub-frame or time section and displayed or output.

Furthermore, the length of time for which the visible light communication image is displayed is desired to be as short as possible but depends largely on the performance of the reception device, which will be described in detail hereinbelow.

The second signal processing unit 160 transmits, to the display control unit 140, the generated visible light communication image and display timing information indicating a subframe or time section into which the visible light communication image is to be inserted.

According to the display timing information received from each of the first signal processing unit 130 and the second signal processing unit 160, the display control unit 140 inserts, into the video signal received from the first signal processing unit 130, the visible light communication image received from the second signal processing unit 160. It is to be noted that when the response speed for video and so on are taken into consideration, it is desired that the display control unit 140 display images with use of an element capable of performing switching including a solid semiconductor element as will be described hereinbelow. The display unit 110 displays the video signal received from the display control unit 140.

Figure 3:
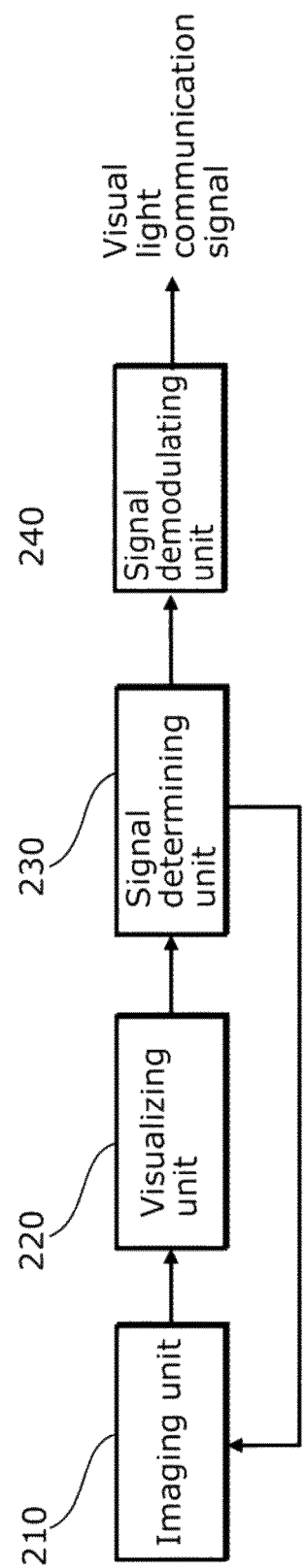
FIG. 3 is a block diagram illustrating a schematic configuration of a reception device according to Embodiment 1.

FIG. 3 is a block diagram illustrating a configuration example of the reception device 200 according to Embodiment 1.

As illustrated in FIG. 3, the reception device 200 includes an imaging unit 210, a visualizing unit 220, a signal determining unit 230, and a signal demodulating unit 240.

The imaging unit 210 captures an image displayed on the display unit 110. The imaging unit 210 includes an image sensor of the sequential exposure type, for example. Following the start of capturing an image, the image sensor performs sequential exposure along rows and stores data of the captured image into a buffer (not illustrated). There are some image sensors which perform sequential exposure on a per row basis, on a per exposure element basis, on a per certain element group basis, and so on, all of which are handled in the same manner and aim to obtain data arranged horizontally in images.

The visualizing unit 220 represents the data of image captured by the imaging unit 210 and stored in the buffer, in the form of a bit map in which luminance of each pixel is represented two-dimensionally, and outputs the bit map to the signal determining unit 230 as video.

The signal determining unit 230 determines whether or not the video received from the visualizing unit 220 includes the visible light communication image. Firstly, each group of data equivalent to the size of one block is searched for its header portion and whether or not data is included therein is determined. When determining that the received video includes the visible light communication image inserted, the signal determining unit 230 outputs the received video to the signal demodulating unit 240 and instructs the imaging unit 210 to stop the imaging operation. On the other hand, when the signal determining unit 230 determines that the received signal does not include the visible light communication image inserted, the imaging unit 210 further repeats the sequential exposure while writing data of the captured image over the data stored in the buffer. Here, the signal determining unit 230 does nothing. In the case where video including the visible light communication image inserted cannot be determined or data input is not determined even after the imaging operation for a predetermined period of time, the signal determining unit 230 causes the imaging unit 210 to stop the imaging operation. The signal determining unit 230 may return a signal as an error report.

The signal demodulating unit 240 retrieves the visible light communication image from the video provided by the signal determining unit 230 and demodulates the visible light communication image into an original visible light communication signal. The signal demodulating unit 240 decodes the binary data and stores the resultant visible light communication signal into a memory.

Next, the visible light communication image obtained by forming the visible light communication signal into an image is described.

FIG. 4 illustrates an example of the visible light communication image. FIG. 4 illustrates, in (a), an encoded image P obtained by encoding the visible light communication signal in one block, which represents brightness and darkness in the horizontal direction. The encoded image P in (a) of FIG. 4 is vertically extended, as in (b) of FIG. 4, to the vicinity of both ends of the display unit 110, resulting in an encoded image P1. Subsequently, as illustrated in (c) of FIG. 4, the encoded image P1 in (b) of FIG. 4 is repeatedly displayed five times in the horizontal direction, resulting in a final visible light communication image. Here, the number of repetitions in the horizontal direction is determined according to the size of the encoded image in one block and the size of the video.

It is to be noted that the reception probability can be expected to improve since extending the encoded image in one block allows the encoded image to be captured with a large number of exposure lines as will be described later. Furthermore, the reason for the encoded image in one block being repeatedly displayed is to cope with different fields of view which depend on a distance between the display apparatus and the reception device and performance of the imaging unit in the reception device. This means that even if the reception device is not capable of capturing the image of entire display unit 110, it is possible to obtain the encoded image P1 illustrated in (a) of FIG. 4 by capturing only a part of the visible light communication image displayed on the display unit 110. Generating the visible light communication image this way will enable to ease the restrictions in the imaging conditions of the reception device. A larger number of repetitions of the encoded image is more effective to a short-distance imaging operation. Furthermore, assuming that the reception device is capable of capturing the image of the entire screen, there is not always need to repeat the encoded image.

An operation of a visible light communication system (a video display system) according to Embodiment 1 is specifically described below. Firstly, an operation of the display apparatus 100 is described. FIG. 5 explains the operation of the display apparatus according to Embodiment 1. In FIG. 5, the horizontal direction is set to be a time axis.

FIG. 5 illustrates, in (a), images which are output from the first signal processing unit 130; in (b), images which are output from the second signal processing unit 160; and, in (c), images which are output from the display control unit 140.

Firstly, as illustrated in (a) of FIG. 5, four images are output from the first signal processing unit 130 in 1/F seconds. This indicates that the video received by the first input unit 120 is made up of four images per 1/F seconds when displayed. The first signal processing unit 130 transmits, to the display control unit 140, display timing information indicating a timing of displaying four images in 1/F seconds. Furthermore, the first signal processing unit 130 outputs images A11, A21, A31, A41, ... to the display control unit 140 per 1/F seconds. Furthermore, the first signal processing unit 130 transmits, to the second signal processing unit 160, the same display timing information as the display timing information transmitted to the display control unit 140.

Next, as illustrated in (b) of FIG. 5, the second signal processing unit 160 outputs, to the display control unit 140, a totally black image B1 held in advance and a visible light communication image C1 generated from the visible light communication signal received from the second input unit 150. In this case, the second signal processing unit 160 determines the images A1$x$, A2$x$, A3$x$, and A4$x$, as images into which the visible light communication image is to be mixed, based on brightness, etc., of the images (where x represents the ordinal number of a frame). Furthermore, the second signal processing unit 160 determines to display four images in 1/F seconds and mix a totally black image B$x$ as the third image and a visible light communication image C$x$ as the fourth image. The second signal processing unit 160 outputs information on the determined display to the display control unit 140 as the display timing information. For example, x is 1.

Next, as illustrated in FIG. 5, the display control unit 140 determines, according to the received display timing information, a timing of displaying the image A received from the first signal processing unit 130, and the totally black image B$x$ and the visible light communication image C$x$ received from the second signal processing unit 160. In this case, the display control unit 140 controls the display unit 110 so that four images are displayed in 1/F seconds. The display control unit 140 controls the display unit 110 so that among the four images, images A11 and A21 transmitted from the first signal processing unit 130 are displayed as the first and second images, the totally black image B1 transmitted from the second signal processing unit 160 is displayed as the third image, and the visible light communication image C1 transmitted from the second signal processing unit 160 is displayed as the fourth image.

Furthermore, the display control unit 140 performs such control that four images are displayed in next 1/F seconds. In this case, the display control unit 140 controls the display unit 110 so that among the four images, images A1 (x+1) and A2 (x+1) are displayed as the first and second images, a totally black image B (x+1) is displayed as the third image, and a visible light communication image C (x+1) is displayed as the fourth image. In the example of FIG. 5, a visible light communication image C2 is mixed which is formed by rotating the visible light communication image C1 in the fourth place 90 degrees and shaping the resultant into the same size as the visible light communication image C1. In short, upon mixing the visible light communication image multiple times, the same visible light communication image may be mixed multiple times, and an image resulting from reversing or rotating the original visible light communication image may be mixed. This is effective in the adjustment according to the direction, angle, etc., of the reception device 200 capturing the images. The totally black images B1 and B2 may be the same, and the visible light communication images C1 and C2 may be the same or may be different as mentioned above.

Furthermore, the images A1$x$, A2$x$, A3$x$, and A4$x$ are displayed at the interval of 1/F seconds, and so are the totally black images B$x$ and the visible light communication images C$x$.

It is to be noted that depending on video, the visible light communication image may be displayed once every a certain number of frames or displayed at random, instead of being displayed in sequential frames.

It is to be noted that the sub-frame in this embodiment is not limited to the sub-frame created for tone representation and may also be a sub-frame created for enhancement in image quality, such as what is called quad drive of a liquid-crystal display apparatus, etc.

Next, an operation of the reception device 200 is described. FIG. 6A explains the operation of the reception device according to Embodiment 1. In FIG. 6A, the horizontal direction is set to be a time axis.

FIG. 6A illustrates, in (a), images which are displayed on the display unit 110 of the display apparatus 100; in (b), exposure time of each exposure line in the imaging unit 210; and, in (c), an image captured by the reception device.

As illustrated in (a) of FIG. 6A, four images are displayed on the display unit 110 in 1/F seconds. In the example of (a) of FIG. 6A, the totally black image B1 is displayed as the third image, and the visible light communication image C1 is displayed as the fourth image, among the four images.

The imaging unit 210 captures video displayed on the display unit 110. In the case where the imaging unit 210 includes an image sensor of the sequential exposure type, the image sensor performs the sequential exposure along rows and stores data of the captured video into a buffer (not illustrated) following the start of capturing video. A unit of the sequential exposure is referred to as an exposure line because sequential per-line exposure is particularly assumed herein. In the case of (b) in FIG. 6A, the exposure is performed in the sequence of the exposure lines L1, L2, L3, . . . .

It is to be noted that although the image sensor has 10 exposure lines in (b) of FIG. 6A as an example, the number of exposure lines may be other than 10, and the shape thereof may be other than lines. The configuration is such that each of the exposure lines overlaps with another for a very short length of time, and the exposure is performed with the lines in sequence.

FIG. 6A illustrates, in (c), the image stored in the buffer at the point in time when the imaging with the whole exposure lines is completed. In this case, the beginning of an image in a frame coincides with the beginning of one unit of the imaging, but the beginning of the unit of the imaging may be different. In this case, the image captured by the reception device represents the signals in narrow horizontal stripe from the third line from the top in (c) of FIG. 6A; these horizontal stripes will be found at vertically different positions in the image and since they will always be observed, there is no need for timing control or no particular need to obtain any trigger signal from somewhere. In the case of (c) of FIG. 6A, the visible light communication image is captured with the exposure line L6.

The visualizing unit 220 represents the data of image captured by the imaging unit 210 and stored in the buffer, in the form of a bit map in which luminance of each pixel is represented two-dimensionally, and outputs the bit map to the signal determining unit 230 as video.

The signal determining unit 230 determines whether or not the video received from the visualizing unit 220 includes the visible light communication image. In the case of FIG. 6A, the signal determining unit 230 receives the video in (c) of FIG. 6A and determines that the visible light communication image has been inserted into the exposure line L6 among the exposure lines L1 to L10, outputs the received video to the signal demodulating unit 240, and instructs the imaging unit 210 to stop the imaging operation.

The signal demodulating unit 240 retrieves, from the video provided by the signal determining unit 230, an image in the exposure line L6 which indicates the visible light communication image, and decodes the image into an original visible light communication signal.

It is to be noted that the determination by the signal determining unit 230 is performed in units of received video here, but may be performed per exposure line. In this case, at the point in time when it is determined that the exposure line L6 includes the visible light communication image, the imaging unit 210 may stop the operation, avoiding determination on the exposure line L7 and the following exposure lines.

In the case described above, video is made up of F frames per second, and the period in which the visible light communication image is displayed is part of the length of one frame, that is, ¼ of one frame in this embodiment, as illustrated in FIG. 6A. The period in which the visible light communication image is displayed may be other than the ¼ frame, but is desirably at least ¼ frame or less from the perspective of making it as difficult as possible to recognize the signal. Furthermore, it is desired that the value be as small within the applicable range of the reception device as possible.

With the configuration as above, when the visible light signal encoded image is inserted for a short period of time and the exposure time is sufficiently short, that is, when, in the case of FIG. 6A, the shutter speed, i.e., the exposure time, is sufficiently faster than 1/nF seconds (where n=4 in the case of FIG. 6), any of the exposure lines will correspond to the time in which the visible light signal encoded image is displayed. Since it is desired that other images be not inserted during the exposure time of an exposure line, setting the exposure time less than half the ¼F seconds in the example of FIG. 6A makes it possible to capture images into which other images are never inserted. It is to be noted that, instead of the totally black image Bx, a totally gray image Bx may be inserted which has luminance uniformly higher than that of the totally black image as illustrated in FIG. 6B.

As above, the combination of the reception device which captures images with the imaging unit of the sequential exposure type makes it possible to transmit and receive the visible light signal easily with a configuration which is simple because of no timing restriction imposed thereon.

In addition, the relationship of (Expression 1) is desirably satisfied regarding the time in which the visible light communication image is inserted and the scanning speed and exposure time of the imaging unit of the sequential exposure type. This is because the S/N will be extremely decreased when the visible light communication image is subjected to the exposure with the exposure line together with video signals before and after the visible light communication image.

$$\text{Exposure time of 1 exposure line} < 1/(2 \times nF) \quad \text{(Expression 1)}$$

In (Expression 1), n is the number of sub-frames obtained by equally dividing one frame of video, and F is the number of frames which are displayed in one second. Both n and F are positive integers.

Considering the length of time in which the visible light communication image or the encoded image is less likely to be recognized by human eyes as an afterimage, the exposure time of one exposure line in which the visible light communication image or the encoded image is displayed is desirably 1 millisecond or less, more desirably 0.2 milliseconds or less. When the common number of frames in video signals at present, F=60, is applied, n>8 is desirable and n>40 is more desirable to satisfy (Expression 1).

The following describes the reason for setting the range desirable as the time in which the visible light communication image or the encoded image is displayed. This is because the temporal resolution of human eyes is generally said to be approximately 50 milliseconds in terms of time, and an image below this level will be recognized as an afterimage in which the image is mixed up with preceding or succeeding video. Meanwhile, the limit of human eye to notice a difference in luminance varies from person to person, but it is said that most people recognize that there is a difference in luminance when the difference in luminance from adjacent regions is roughly 2%. Accordingly, in order that the inserted visible light communication image or encoded image is mixed up with the preceding or succeeding image and not recognized as a difference in luminance, the duration is desired to be 2% of 50 milliseconds, that is, less than or equal to 1 millisecond.

Since the use of frames as they are creates concerns for an adverse effect such as the problem of subliminal stimuli, the required minimum number of frames is determined where n=2. This means that, as a specific numerical value, it is desirable to select a shutter speed or exposure time lower than 1/480. Details will be described later.

Furthermore, as a specific approach for outputting the visible light communication image or the encoded image for a very short period of time from a video device, a device which operates fast, such as PDP and EL, is capable of supporting this technique by being controlled with a drive signal, but LCD or the like is not capable of supporting it even when driven faster in the case where the response speed of the LCD is slow. In such a case, when especially a backlight is an LED or the like which is capable of flickering fast, it is possible to display the image for a short length of time by turning off the LED. As to a projector, an LCOS or the like which uses liquid crystals can likewise display the image for a short length of time by controlling the light source. Furthermore, in the case of a projector which adopts a method of emitting light to a projection object with use of a digital mirror device (DMD) or the like mirror device which is capable of being driven fast, it is possible to display the image for a short length of time by controlling the DMD, and it is also possible to cut time by controlling the light source, and furthermore, these can be combined to shorten the time.

It is to be noted that although the case where the visible light communication signals are aligned in the horizontal direction is described in Embodiment 1, this is not the only example. In the case where the visible light communication signals are aligned in the horizontal direction, the encoded image has vertical stripes. Therefore, unless the imaging unit 210 of the reception device 200 captures images in the vertical direction of sequential exposure on a per horizontal direction basis, it is not possible to obtain the encoded image of the visible light communication signals.

Furthermore, capturing an image with the reception device tilted at an angle of a certain degree or more results in one group of data, i.e., one block, being not entirely included in the imaging range or results in the orientation being parallel to the stripes of the stripe pattern, which cause a problem that the data cannot be obtained, for example.

FIG. 7 illustrates an example of the relationship of an angle between the visible light communication image and the reception device, a reception error occurrence probability, and a required image size.

As illustrated in FIG. 7, the relationship of the stripe pattern of the visible light communication image, the angle of the reception device, and the imaging reception error occurrence probability is represented by a graph in the form of substantially the cosine law. This shows that the field of view obtained with one exposure line of the reception device, that is, the range of data of image that can be captured with one exposure line of the reception device, decreases in size according to the cosine law as the angle changes, and when the range of data of image that can be captured with one exposure line decreases in size to the area substantially equivalent to that of one block, the error recognition probability thereof increases abruptly. FIG. 7 illustrates a result of when the visible light communication image or the encoded image which has data of 4 blocks stored for the entire screen is used and the reception device captures the image substantially from such a position that the entire screen can be covered, and the result shows that, with an angle up to approximately 135 degrees (in the case where the reception device is tilted at 45 degrees upon capturing the image), it is possible to obtain data without problems. The angle from which an abrupt change occurs depends on how many blocks of data are stored for the entire screen and at what distance the image is captured from the position where the image appears in what size on the entire screen. Furthermore, since it will also be theoretically impossible to obtain data when the reception device is vertically oriented, it is conceivable that, depending on in which orientation (vertically or horizontally) a viewer places the reception device, there will be a situation in which the visible light communication signal is unable to be received at all. To solve such troubles, the visible light communication images may be arranged vertically or obliquely or with a pattern in which a vertical portion and a horizontal portion are reversed.

For example, as illustrated in FIG. 8A, the following may be displayed: a visible light communication image C1 having a vertical stripe pattern; a visible light communication image C2 having a horizontal stripe pattern; a visible light communication image C3 having an oblique stripe pattern; and a visible light communication image C4 having an oblique stripe pattern in which stripes are oblique in the opposite direction to those in the visible light communication image C3. Furthermore, as illustrated in FIG. 8B, the following may be displayed: a visible light communication image C1a having a vertical stripe pattern; a visible light communication image C1b that is an image obtained by reversing the luminance (white and black) of the visible light communication image C1a; a visible light communication image C2a having a horizontal stripe pattern; a visible light communication image C2b that is an image obtained by reversing the luminance (white and black) of the visible light communication image C2a; a visible light communication image C3a having an oblique stripe pattern; a visible light communication image C3b that is an image obtained by reversing the luminance (white and black) of the visible light communication image C3a; a visible light communication image C4a having an oblique stripe pattern in which stripes are oblique in the opposite direction to those in the visible light communication image C3a; and a visible light communication image C4b that is an image obtained by reversing the luminance (white and black) of the visible light communication image C4a.

Figure 9:
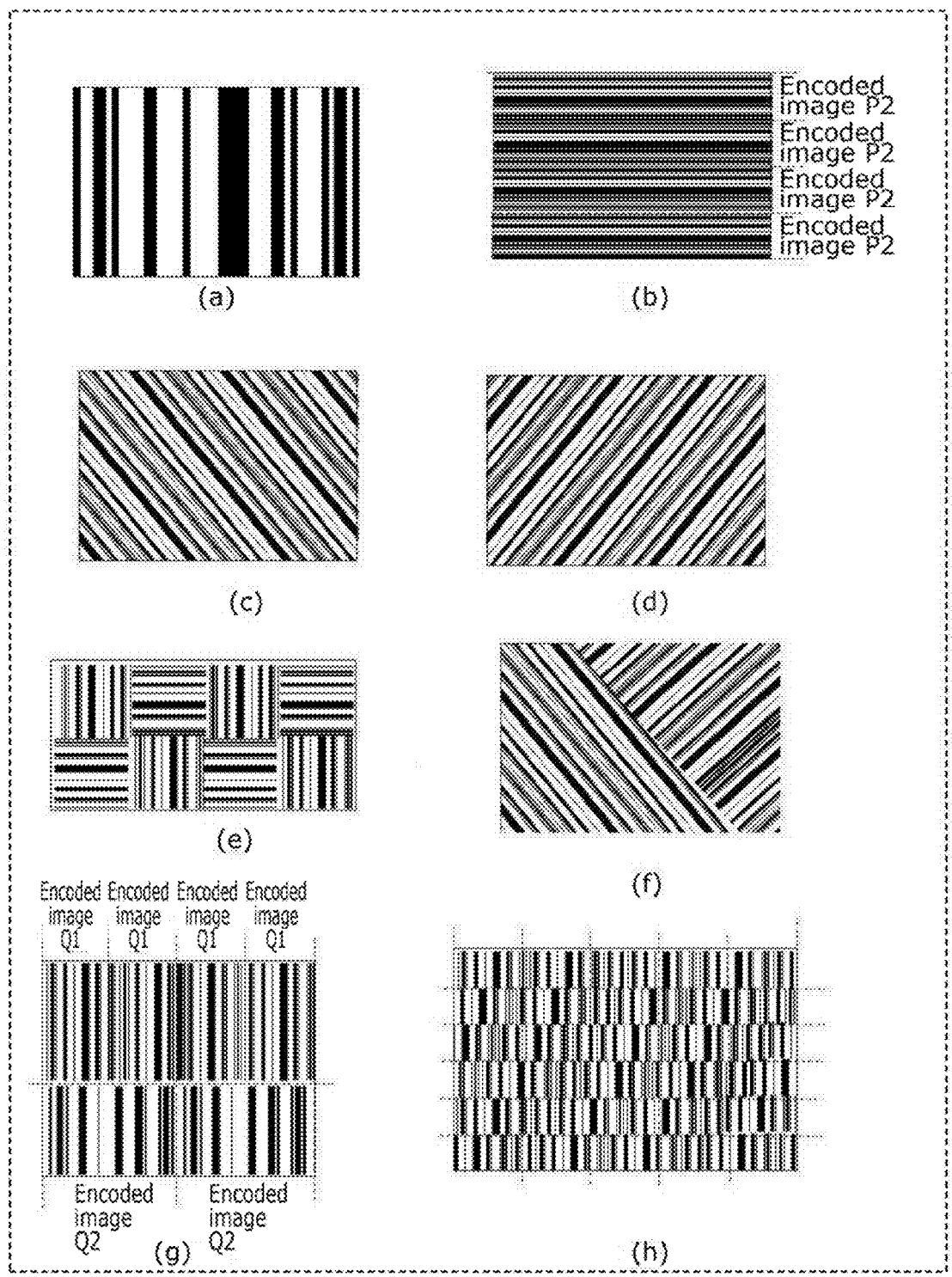
FIG. 9 illustrates other generation examples of the visible light communication image and schematically illustrates an example of the relationship between a stripe pattern of the visible light communication image, an angle of a receiver, and a required image size.

FIG. 9 illustrates, in (a), an example in which only one encoded image P illustrated in FIG. 4 is displayed on the entire screen. With such a design, the restrictions based on the pixel size of the captured visible light communication image will be eased, so that the reception from a location far from the display unit 110 becomes possible. FIG. 9 illustrates, in (b), an image in which the encoded image P has horizontal stripes and is repeatedly vertically displayed four times just as in FIG. 4. In this case, the reception is possible in a direction in which the sequential exposure lines of the receiver are substantially vertical. FIG. 9 illustrates, in (c), an example of the encoded image which has stripes obliquely aligned at approximately 45 degrees on the entire screen. FIG. 9 illustrates, in (d), an example of the encoded image which has stripes obliquely aligned at approximately 45 degrees in the opposite direction to those in (c). The subsequent images each illustrate an example in which any of FIG. 4 and (a) to (d) of FIG. 9 is used as a basic form and combined with another. In the case of (e) of FIG. 9 with a checkered pattern having such a design, capturing an image with a field of view greater than or equal to a unit of at least one region of the checkered pattern on the screen makes it possible to receive a signal no matter which direction the imaging device of the receiver is oriented in or what degrees the imaging device of the receiver is tilted at. FIG. 9 illustrates, in (f), an encoded image in which stripes are aligned obliquely at 45 degrees in a direction on about half the screen and in its perpendicular direction on the rest of the screen. FIG. 9 illustrates, in (g), an image in which one data block is repeated so that four data blocks are displayed in total (in the horizontal direction since the stripes are vertical) on the upper part of the screen while two data blocks are displayed in total on the lower half of the screen. This is based on the fact that a larger number of blocks are advantageous when the distance between the imaging location of the receiver and the display surface is short because an image captured by the receiver will be large and have high resolution. However, when an image is captured from a relatively far location, a smaller number of data blocks are preferred because the resolution will be low. Therefore, in order to cope with either situation, an image in which these are combined may be created and displayed. Although the example of four blocks and two blocks is shown here, other combinations of numbers may be possible. FIG. 9 illustrates, in (h), an image obtained by vertically dividing one image and changing the phase of stripes of the visible light communication image in each region. With this, the preventive effect for flickering upon eye-gaze movement can be expected because it is possible to avoid localization of brightness and darkness depending on positions. Although the image has vertical stripes and is vertically divided into 5 regions in which the phase is caused to change sequentially so that blocks on the top and on the bottom have the same phase here, the number of divisions is not limited to this number and the change in phase may be random.

Furthermore, each of the images illustrated in FIG. 4 and FIG. 9 or an image resulting from rotating each of these images certain degrees has advantages and disadvantages; therefore, an image may be used in which such images are arbitrarily rotated and combined according to application.

Moreover, in the case of being temporally repeatedly displayed, these images may be changed sequentially or at random on a per frame basis according to application.

It is to be noted that with a display device in which a period during which not the entire screen is displayed at the same time is present, such as a liquid-crystal device which performs sequential scanning that is backlight scanning, the communication probability can be expected to improve with the use of a stripe pattern with stripes perpendicular to the direction of scanning. In a common liquid-crystal display apparatus, since the scanning is performed in the vertical direction, it is desirable to apply horizontal stripes, that is, (b) of FIG. 4.

The luminance level of the totally black image does not need to match with that of a black part in the visible light communication image or the encoded image, that is, the luminance of a part with low luminance. However, in consideration of sensitivity for receiving the visible light communication signal, the luminance of an image whose over luminance level is low is desirably as low as possible. As in (a), (b), and (c) of FIG. 10, the above two black-white reversed images may be used as one set for two respective sections obtained by dividing the sub-frame or time section which is included in one frame and in which the visible light communication image is displayed. Furthermore, a combination of colors which have a complementary relationship with each other, such as R and C, may be used. When two colors having a complementary relationship are used, a combination of reversed images may be used as in the case of black and white.

In this embodiment, the visible light communication signal is encoded and then output as image data; in order to clearly show the boundaries of blocks in the data, a frame-like image signal, which is never included in a normal encoded signal, may be inserted before or after the visible light communication signal so that when two or more frame-like image signals are recognized, it is determined that signals of one block have been obtained, and such frame-like image signals may be used to determine the size of the signals of one block in an image.

Figure 11:
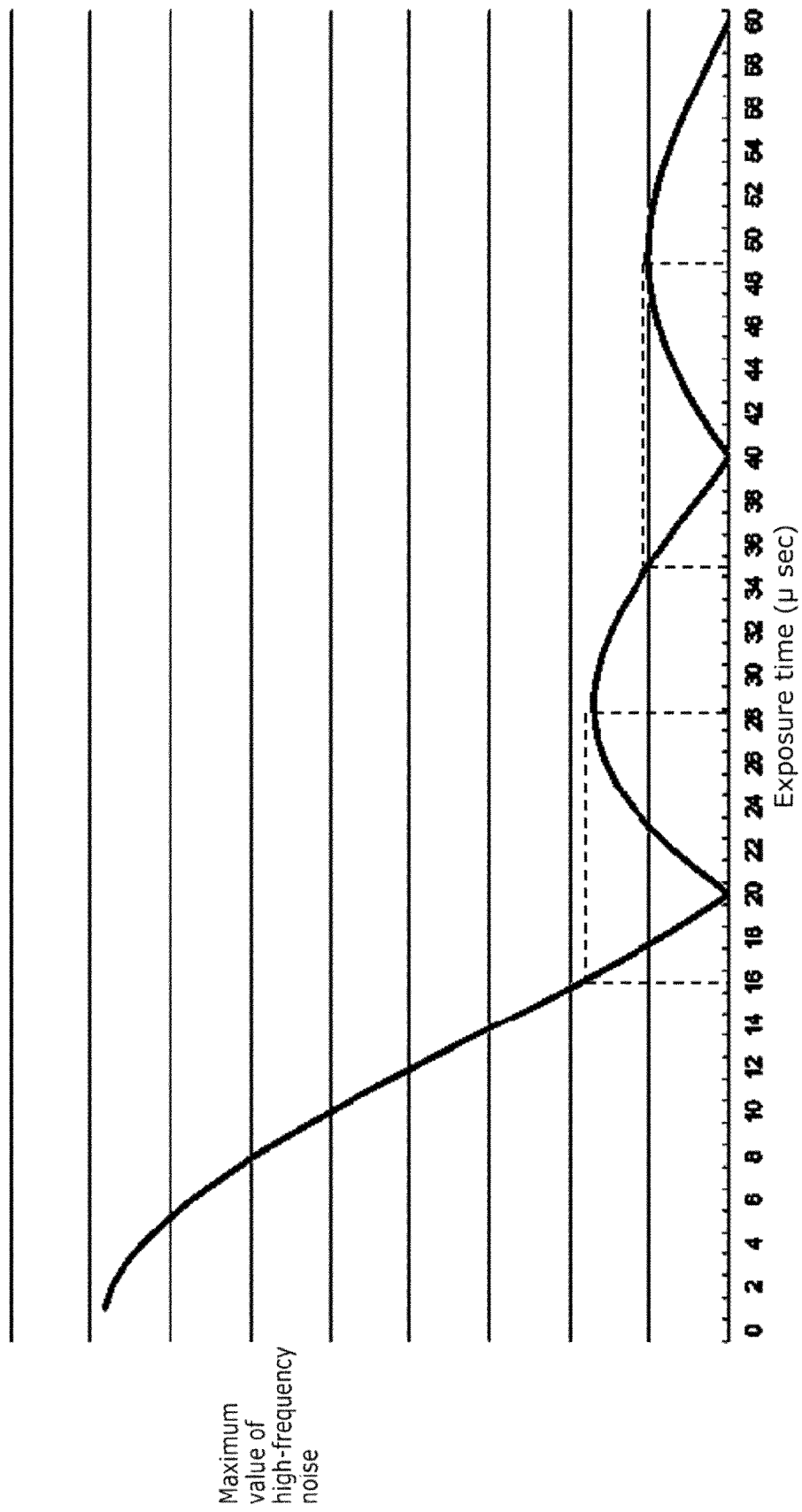
FIG. 11 illustrates the relation between high-frequency noise of light source luminance, such as surround lighting, and exposure time.

FIG. 11 illustrates the relation between high-frequency noise of light source luminance, such as surround lighting, and exposure time. The longer the exposure time relative to the cycle of high-frequency noise, the lesser the impact of the high-frequency noise on the captured image, which makes it easier to estimate the light source luminance. When the exposure time is an integral multiple of the cycle of high-frequency noise, the impact of the high-frequency noise is absent, which makes the reception of the visible light communication signal easiest. The main cause of the high-frequency noise originates from a switching power circuit, and since the length of its cycle is 20 microseconds or less in many switching power supplies for lighting, setting the exposure time to 20μ seconds or more will make it possible to easily estimate the light source luminance.

It is to be noted that although the display which displays video, namely, the display apparatus 100, is given as an example in this embodiment, a device which projects video, such as a projector, may be used instead as illustrated in FIG. 1. Furthermore, although the smartphone 200 is given as an example of the electronic device which receives the visible light communication signal, the electronic device is not limited to the smartphone and may be a digital still camera and the like as long as the electronic device is capable of receiving the visible light communication signal and includes an image sensor of a type capable of sequential exposure.

Next, the tone representation in displayed video is described. This content is a matter of course for those skilled in the art and is, therefore, explained briefly. As a display, some PDPs divide each frame into weighted sub-fields (sub-frames) and represent tones according to a combination of lighting and non-lighting of the sub-fields. Some LCDs also divide each frame into weighted sub-fields as in the case of the PDPs, and some LCDs adjust the luminance of each color by simply controlling the length of time for which the shutter is open within each frame, and thereby represent tones. Many organic EL displays adopt either one of the above driving methods. Meanwhile, as a projector or the like, a projector using liquid crystals or a projector using LCOS adopts the same or like tone representation method as the liquid-crystal display. A projector using DMD represents tones by adjusting, for each frame, the length of time for beams of light to be projected from the light source of each color toward the projection lens, using an element in which mirrors capable of rapidly switching the direction of light from the light source between the projection lens and the damper are two-dimensionally arrayed for the number of pixels. The DMD projector divides each frame into a larger number of time sections, converts the video signal into a control signal for DMD, and projects video through the projection lens. Thus, recent video display apparatuses which display video signals control the light emission time of RGB or primary colors including other colors than RGB within each frame to display video, meaning that it is not difficult in principle to insert an image into a time section no more than one frame.

The above embodiment is further described below.

FIG. 2 is a block diagram illustrating a schematic configuration of the video display apparatus 100. As illustrated in FIG. 2, the display apparatus 100 includes a first input unit 120, a first signal processing unit 130, a display control unit 140, a display unit 110, a second input unit 150, and a second signal processing unit 160.

The first input unit 120 receives a video signal regarding video which is to be displayed on the display unit 110. This video signal is transmitted to the first signal processing unit 130 and then subjected to general image processing such as image quality processing. Subsequently, the video signal is transmitted to the display control unit 140.

The display control unit 140 controls the display unit 110 based on the video signal to cause video to be displayed thereon. The display unit 110 is, for example, a projection lens of a projector or a screen on which a light signal from the projection lens is projected. The display control unit 140 controls the reflection direction of DMD, and so on, based on the video signal.

The second input unit 150 receives a signal which is used for visible light communication. The received visible light communication signal is transmitted to the second signal processing unit 160 where the processing of encoding the visible light communication signal and creation of an image based on the encoded visible light communication signal, and so on are performed. Furthermore, to the second signal processing unit 160, the video signal from the first signal processing unit 130 is also transmitted. This video signal includes information on brightness, etc., of video. The second signal processing unit 160 determines, based on this information, which one of the time sections in each frame is to be used as a visible light communication section. For example, the time section in which an image is displayed with relatively high brightness on the display unit 110 may be set as the visible light communication section. Subsequently, the visible light communication signal encoded in the second signal processing unit 160 is formed into an image, and in the visible light communication section, the visible light communication signal resulting from the encoding and the image formation is displayed instead of a normal video signal as the video signal on the display unit 110 through the display control unit 140 so that a viewer can watch video.

It is to be noted that in the case where a time slot for the visible light communication section has been determined in advance, there is no need for the above process in the second signal processing unit 160 to determine the visible light communication section.

Furthermore, the length of time in which the image obtained by encoding the visible light communication signal is displayed is desired to be as short as possible but depends largely on the performance of the receiver, which will be described in detail hereinbelow.

Furthermore, regarding how to handle the video signal before or after the signal obtained by encoding the visible light communication signal when the signal is displayed, it may be that the image obtained by encoding the visible light communication signal is displayed only for a corresponding period and an image from a normal video signal is displayed for the other periods. In this case, the video signal will change for the visible light communication image or encoded image inserted, but this may be dealt with by correction of a signal of another part of the video signal within one frame, or it may also be that a signal processed in the normal video processing unit is transmitted as it is to the display control unit and thus displayed. Moreover, another applicable method is to ignore all the video signals in the corresponding one frame except the visible light communication image or the encoded image and display black or gray with a certain tone together with preceding or succeeding video, to emphasize only that signal to the receiver.

Next, the visible light communication image or the encoded image is described. FIG. 4 illustrates an example of the visible light communication image or the encoded image. In this figure, data obtained by encoding the visible light signal is represented in the form of bright and dark indications in the horizontal direction, and with this representation, vertically extends to the vicinity of both ends as an image. This displays the same patterns in the horizontal direction by repeating data of the encoded image several times vertically (horizontally). This is to avoid the restrictions such as the requirement on the image sensor of the receiver to capture an image with a field of view that is large enough to cover the entire screen, and a larger number of repetitions are therefore effective in capturing an image at a shorter distance. In addition, when it is assumed that an image of the entire screen is captured, one image is sufficient without such repetitions. An example of creating the image will be described in detail later, and with reference to the example of FIG. 4, an embodiment for receiving the visible light communication signal is described using an example.

FIG. 5 illustrates the relevancy on the receiver of when the visible light communication image or the encoded image is mixed into normal video and displayed.

Assuming that time flows in the horizontal direction, the image sensor of the sequential exposure type starts to operate when the receiver starts to receive signals through scanning while the video including the corresponding visible light communication image or encoded image is displayed. Here, in particular, the sequential exposure and storing of data are carried out in sequence along rows. There are some image sensors which perform sequential exposure on a per row basis, on a per exposure element basis, on a per certain element group basis, and so on, all of which are handled in the same manner and aim to obtain data arranged horizontally in images. At this time, unless the stored data is a signal determined to correspond to the visible light communication signal, the sequential exposure continues further, and when the stored data is determined to correspond to such signal, the stored data is taken out and the signal thereof is transmitted to the part which performs decoding.

In this example, the signals are aligned in the horizontal direction, with the result that the stripes are vertical, meaning that the image sensor of the receiver needs to capture images in the vertical direction of sequential exposure on a per horizontal direction basis to obtain the data. Furthermore, capturing an image with the receiver tilted at an angle of a certain degree or more results in one group of data being not entirely included in the imaging range or results in the orientation being parallel to the stripes of the stripe pattern, which cause a problem that the data cannot be obtained, for example.

FIG. 7 illustrates an example of the relationship between a stripe pattern of the visible light communication image, an angle of the receiver, and a required image size. Thus, the graph is in the form of substantially the cosine law, indicating that a degree up to approximately 30 degrees does not cause major problems. On the other hand, since there will also be theoretically no chance to obtain data when the receiver is vertically oriented, it is conceivable that, depending on in which orientation (vertically or horizontally) a viewer places the receiver, there will be a situation in which the visible light communication signal is unable to be received at all. As an example to solve such troubles, various signal patterns illustrated in FIG. 9 may be used.

Patterns may be vertical, horizontal, and oblique stripes and may also have the vertical portion and the horizontal portion reversed, for example.

FIG. 6A illustrates performance and setting of the image sensor of the receiver, the relationship of a period in which the visible light communication image or the encoded image is displayed, and so on. A unit of the sequential exposure is referred to as an exposure line because sequential per-line exposure is particularly assumed herein. Although the number of exposure lines in FIG. 6A is 10 as an example, the number of exposure lines may be other than this, and the exposure lines may have a form other than the form of lines. The configuration is such that each of the exposure lines overlaps with another for a very short length of time, and the exposure is performed with the lines in sequence. As illustrated in the drawing, assume that F frames are included in video of one second. The visible light communication image or the encoded image is displayed in part of the frame. Although this part is 1/n of one frame in this embodiment, it may be possible to set other values. Such a value is desirably at least ¼ or less and as small within the applicable range of the receiver as possible from the perspective of making it as difficult as possible to recognize the signal. In this figure, an example is shown of an image captured by the receiver using the image sensor for sequential exposure while video is displayed. In FIG. 6A, the beginning of an image in a frame coincides with the beginning of one unit of the imaging, but the beginning of the unit of the imaging may be different. The image captured by the receiver represents the signals in narrow horizontal stripes from the third line from the top of FIG. 6A; these horizontal stripes will be found at vertically different positions in the image and since they will always be observed, there is no need for timing control or no need to obtain any trigger signal from somewhere. With the configuration as above, the visible light communication image or the encoded image is inserted for a very short period of time, and the exposure time is set to be sufficiently short. Here, based on FIG. 9, when a shutter speed is sufficiently faster than 1/nF seconds, any of the exposure lines will correspond to the time in which the visible light signal image or the encoded image is displayed. Since it is desired that other images be not inserted during the exposure time of an exposure line, setting the exposure time less than half the 1/nF seconds in the case of FIG. 6A makes it possible to capture images into which other images are never inserted. As above, the combination of the receiver which captures images by the image sensor of the sequential exposure type makes it possible to transmit and receive the visible light signal easily with a configuration which is simple because of no timing restriction imposed thereon.

In addition, the relationship below is desirably satisfied regarding the time in which the visible light communication image or the encoded image is inserted and the scanning speed and shutter speed of the image sensor of the sequential exposure type. This is because the S/N will be extremely decreased when the visible light communication image or the encoded image is subjected to the exposure with the exposure line together with video signals before and after the visible light communication image, and it is desirable to provide a configuration which satisfies the condition as given by the above (Expression 1).

Here, considering the length of time in which an image is less likely to be recognized by human eyes as an afterimage, the exposure time is 1 millisecond or less, desirably 0.2 milliseconds or less. When the common number of frames at present, F=60, is applied, n>8 is desirable and n>40 is more desirable to satisfy Expression 1.

This is because the resolution of human eyes is approximately 50 milliseconds in terms of time, and an image below this level will be recognized as an afterimage in which the image is mixed up with preceding or succeeding video. Meanwhile, the limit of human eye to notice a difference in luminance is said to be 2%, and when the visible light communication image is inserted in a very short period of time and mixed up with the preceding or succeeding image, the visible light communication image cannot be recognized as a difference in luminance if the very short period of time is 2% of 50 milliseconds, that is, less than or equal to 1 millisecond; therefore, the duration is desired to be less than or equal to 1 millisecond. Furthermore, a common video display apparatus represents colors as RGB values, and when a chromatic difference $\Delta u'v'$ of these colors with the same luminance is approximately 0.3, the difference is conspicuous, which corresponds to a difference of approximately 20% in RGB homochromatic energy ratio. Accordingly, it is more desirable that the visible light communication image be displayed in a period of time less than or equal to 0.2 milliseconds.

It is to be noted that with a common image sensor of the sequential exposure type, the afterimage is left completely as an image unless one frame is divided into at least two sections in consideration of versatility, and when one frame is used as it is, there is a concern of an adverse effect such as the problem of subliminal stimuli; therefore, the minimum required shutter speed is determined where n=2, and, as a specific numerical value, 1/480 is an example of the shutter speed.

Furthermore, although a totally black image is placed before the visible light communication image or the encoded image in FIG. 6A, this is not always necessary because this aims to avoid the reception of the signal mixed with the video signal image as mentioned above. However, since the insertion of such a signal eases the restrictions on the performance of the receiver, a totally black image may be inserted in a certain period of time. Furthermore, the totally black image is inserted only at the preceding position in FIG. 6A, a certain effect can be expected from the insertion only at the succeeding position. Moreover, the insertion both at the preceding and succeeding positions will make an improvement on the restrictions on the desirable range, resulting in the above time in which the visible light communication image or the encoded image is inserted being replaced by time which also includes time for the totally black images at the preceding and succeeding positions. It is to be noted that the portion for which the totally black image is written is not limited to the image level of 0%, that is, the image level is not limited to 0% as long as the image has the same level on the entire screen.

Although the method of repeatedly displaying one image for a certain period of time has been described for the visible light signal image or the encoded image, displaying an image with black and white reversed (which is also referred to as a reversed image, a black-white reversed image, an inverse image, a reverse phase image, or an inverted phase image) sequentially with the image example illustrated in FIG. 4 or FIG. 9 will leave only an averaged image on human eyes, which further reduces the recognition of stripe pattern. In other words, a synthesized, fully uniform image at the averaged gray level is recognized, which only leads to somewhat decreased contrast. The white and black representation is not limited to the 100% level and the 0% level and may be one level with relatively high luminance and one level with relatively low luminance. It is to be noted that when this difference in level is high, the restrictions on the receiver and so on are eased while the averaged luminance of signals is higher, which causes negative effects such as decreased contrast or increased conspicuity of the signal image; therefore, it is desirable to select a level which is good from a comprehensive perspective.

As to the white and black representation, the white may be represented by displaying all the RGB colors, but, particularly as a method for lowering the luminance, a color other than white may be used to lower the luminance of a high luminance portion of the stripes. Furthermore, in order to reduce the conspicuity of the stripes, it may likewise be that the black means low luminance and is, therefore, represented using all the RGB colors or is not black which represents the meaning of a non-display state. Moreover, although it has been assumed that the stripe pattern is created using a high luminance portion and a low luminance portion, this may be represented as a stripe pattern with R and G stripes or the like which shows a combination separable by color. However, in this case, a receiver mounted with an image sensor and software capable of separating the RGB colors needs to be used at the time of capturing an image.

In addition, when repeatedly displayed, the stripe pattern may be made less conspicuous by scrolling that is little-by-little movement on the screen, and the signal encoded image may be divided into two or more regions in each of which the scrolling is performed. In this case, each scrolling movement may be different in direction, speed, etc., or scroll operations may be performed in synchronization with each other.

Figure 12:
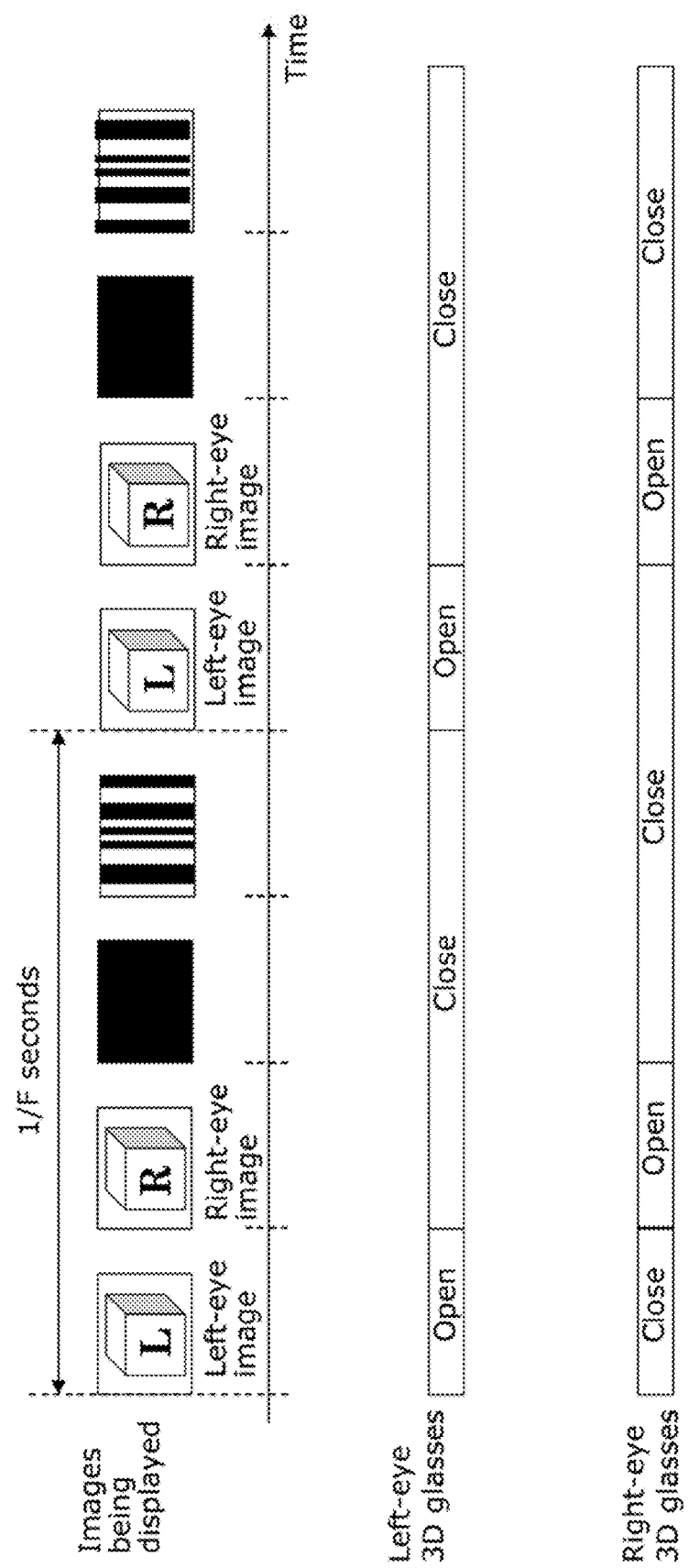
FIG. 12 illustrates an example of a case where a video display method according to Embodiment 1 is applied to a 3D display system.

As illustrated in FIG. 12, 3D video for glasses, recently adopted in a variety of video, is output to only one of the left and right eyes at a point in time when a video signal is output. The visible light signal encoded image is not output to the both eyes. In a period for which the visible light communication image is displayed, the shutters of glasses are closed so that a viewer can watch the video without a feeling of strangeness.

In order to provide such functions, the display apparatus 100 in this embodiment includes: the second signal processing unit 160 which creates a modulated signal of the visible light communication signal; a time control unit for creating the visible light communication image or the encoded image based on the modulated signal and displaying the image for a certain period of time; and a video output unit for outputting the visible light communication image. This means that the display apparatus 100 includes a mechanism which receives a signal indicating a time slot in which a signal image is to be displayed or transferred and outputs the signal image from the video output unit for a certain period of time. It is to be noted that when the response speed for video and so on are taken into consideration, it is desired that images be displayed with use of an element capable of performing switching including a solid semiconductor element.

Furthermore, although the configuration in this embodiment is such that a portion of the display unit 110 corresponding to the top portion thereof preferentially outputs the visible light communication signal, it is sufficient that the region which gives priority to the visible light communication signal is at least one region of the display unit 110. In addition, it is desired that such a region be large when the accuracy of signal transmission is demanded, and when the image quality is prioritized, such a region be as small a region as possible out of the minimum unit of the backlight scanning.

Furthermore, at the time of encoding of the visible light communication signal, it may be possible to perform encoding compliant with JEITA-CP1222 or 1223 or use a standard such as IEEE-P802.15.7. Furthermore, when only encoding is needed, a reception device which supports such encoding may be used. Other encoding methods, for example, Manchester coding or the like, may be used for modulation. Moreover, although binary encoding is performed here, ternary or higher-order encoding is also possible, that is, it is possible to transmit an amount of information not less than twice a conventional amount of information as the fact that the tone representation can be directly used is taken into consideration.

Furthermore, although the image sensor of the receiver needs to complete a series of signals in one image in this embodiment, it may be possible that, when the amount of information is large, information is written in the header portion of the encoded signal as to, for example, whether or not such a signal screen (the visible light communication image or the encoded image) is included and in which section such a screen is present out of a plurality of sections obtained by dividing the information due to the amount being large. As a specific example, it becomes possible to divide the above information into images by using the preamble and type of the standard JEITA-CP1222. It goes without saying that the method of the division, how to output the divided signals, and how to store such divided information into an image are not limited to this example. Furthermore, there is a method of repeatedly displaying a signal image to transmit the visible light communication signal without fail, and in this method, it may be that one image resulting from the division, which is based on the visible light communication signal, is repeatedly displayed, and then, a succeeding image resulting from the division is repeatedly displayed. There is also a method of sequentially displaying images based on a series of signals resulting from the division, and repeatedly displaying these images as one set. Out of these options, either may be selected according to the size of the amount of information, the type of normal video signals, and so on.

As above, Embodiment 1 has been described as an example of the implementation in the present disclosure. However, without limitations to the above, the present disclosure is applicable to embodiments obtained through changes, replacement, addition, omission, etc., to the above embodiment. Furthermore, it is possible to make a new embodiment by combining the structural elements described in the above Embodiment 1.

Thus, Variations are collectively described below.

In Embodiment 1, as a position example of the encoded image in the visible light communication image, an example has been described in which the encoded image is vertically extended and repeatedly positioned several times in the horizontal direction. However, the position example is not limited to this example.

FIG. 9 illustrates other generation examples of the visible light communication image.

In (a) of FIG. 9, an example is illustrated in which the encoded image P in (a) of FIG. 9 is extended to the entire screen and displayed. With such a design, the restrictions based on the pixel size of the captured image will be eased, so that the reception from a location far from the display unit 110 becomes possible.

In (b) of FIG. 9, an image is illustrated in which an encoded image P2 obtained by horizontally extending the encoded image P in (a) of FIG. 9 rotated 90 degrees is repeatedly displayed four times in the vertical direction. In this case, the reception is possible in the direction in which the sequential exposure lines of the reception device are substantially vertical.

In (c) of FIG. 9, an example of the visible light communication image is illustrated which results from the encoded image P in (a) of FIG. 4 being obliquely rotated approximately 45 degrees counterclockwise and extended to the entire screen. In (d) of this figure, an example of the visible light communication image is illustrated which results from the visible light communication image in (c) of this figure being obliquely rotated approximately 45 degrees clockwise.

The arrangements in (a) to (d) of FIG. 9 can be used as basic forms and combined together to provide various arrangements. For example, FIG. 9 illustrates, in (e), an example of the screen divided into 8 regions in which the visible light communication images with vertical stripes and horizontal stripes are mixed to form a checkered pattern. In the case of such arrangement, capturing an image with a field of view greater than or equal to a unit of at least one unit of the checkered pattern on the screen makes it possible to receive a signal no matter which direction the imaging unit of the reception device is oriented in or what degrees the imaging unit of the reception device is tilted at. In (f) of FIG. 9, an example of the combined arrangements is illustrated in which the arrangement in (c) of this figure and the arrangement in (d) of this figure are placed in regions obtained by obliquely dividing the screen.

In (g) of FIG. 9, an example is illustrated in which an encoded image Q1 generated by vertically extending an original encoded image is repeatedly placed four times in total in the horizontal direction on the upper part of the screen while an encoded image Q2 generated by horizontally extending the original encoded image is repeatedly placed twice in total in the horizontal direction on the lower part of the screen. With such arrangement, when the distance between the imaging location of the reception device and the display unit is short, an image captured by the reception device will be large and have high resolution, and when captured from a relatively far location, the image will have low resolution. This means that when an image is captured in a short distance from the display unit 110, it is preferred that the number of display repetitions be large, while, at a far location, it is preferred that the number of display repetitions be small. Thus, when the image is displayed as in (g) of FIG. 9, it is possible to cope with either situation. It is to be noted that although the combination of arrangements with the image repeated twice and four times are illustrated in (g) of FIG. 9, other combinations of numbers may be possible.

In (h) of FIG. 9, an image is illustrated in which the visible light communication image is generated and horizontally repeated to form a design that is vertically divided into five regions in each of which the visible light communication image has stripes different in phase. With this, the preventive effect for flickering upon eye-gaze movement can be expected because it is possible to avoid localization of brightness and darkness depending on positions. Although the visible light communication image having vertical stripes is provided in five vertical divisions in which the phase is caused to change so that the divisions on the top and on the bottom have the same phase here, the number of divisions, the change in phase, etc., are not limited to those and may be random.

Furthermore, each of the images described with reference to FIG. 4 and FIG. 9 has advantages and disadvantages; therefore, an image may be used in which such images are arbitrarily rotated and combined according to application. In addition, at this time, the image may be rotated to any degrees when used.

Moreover, in the case where the visible light communication image is temporally repeatedly displayed, the displaying of the image may be changed in display order or at random on a per frame basis according to application.

It is to be noted that with a display apparatus in which a period during which not the entire screen is displayed at the same time is present, such as a liquid-crystal display apparatus which performs sequential scanning that is backlight scanning, the communication probability can be expected to improve with the use of a stripe pattern with stripes perpendicular to the direction of scanning. In a common liquid-crystal display apparatus, since the scanning is performed in the vertical direction, it is desirable to apply an image having horizontal stripes as illustrated in (b) of FIG. 4. Furthermore, although four images are displayed for 1/F seconds and as the fourth image, the image obtained by encoding the visible light communication signal is displayed in Embodiment 1, this is not the only example. For example, it may be that the visible light communication image is displayed only for a corresponding period and an image from a normal video signal is displayed for the other periods. In this case, the video signal will change for the visible light communication image inserted, but this may be dealt with by correction of a signal of another part of the video signal within one frame.

It may also be that a signal processed in the normal video processing unit is transmitted as it is to the display control unit and thus displayed. Moreover, another applicable method is to ignore all the video signals in the corresponding one frame except the visible light communication image and display black or gray with a certain tone together with preceding or succeeding video, to emphasize only that signal to the reception device.

Furthermore, although a totally black image is placed before the visible light signal image in Embodiment 1, this is not always necessary because this aims to avoid the reception of the signal mixed with the video signal image. However, since the insertion of such a signal eases the restrictions on the performance of the reception device, a totally black image may be inserted in a certain period of time.

Furthermore, a totally black image is inserted only before the visible light communication image in Embodiment 1, but may be inserted after the visible light communication image. Moreover, a totally black image may be inserted both before and after the visible light communication image. In this case, time which also includes time for the totally black images on the preceding and succeeding positions replaces the above time in which the visible light signal encoded image is inserted.

Furthermore, the totally black image is not limited to an image the entire surface of which has a luminance level of 0%. The luminance level of the totally black image is not limited to 0% as long as the luminance across the entire surface thereof is at a low level. Furthermore, its luminance level does not need to match with that of a black part in the visible light communication image, that is, the luminance of a part with low luminance. However, in consideration of sensitivity for receiving the visible light communication signal, the luminance of an image whose overall luminance level is low is desirably as low as possible.

Figure 10:
FIG. 10 illustrates other display examples of the visible light communication image.

Furthermore, as to the visible light communication image, a method of repeatedly displaying one image for a certain period of time has bee described, but the visible light communication image illustrated in (a) of FIG. 10 and the visible light communication image in (b) of FIG. 10 in which black and white in the visible light communication image in (a) of FIG. 10 are reversed may be sequentially displayed as illustrated in FIG. 10. By doing so, only an averaged image will be left on human eyes as illustrated in (c) of FIG. 10, which further reduces the recognition of stripe pattern and only leads to somewhat decreased contrast. The white and black representation is not limited to the 100% level and the 0% level and may be a level with relatively high luminance and a level with relatively low luminance. Furthermore, when the difference in luminance level is high, the restrictions on the reception device and so on are eased while the averaged luminance of signals is higher, which causes negative effects such as decreased contrast or increased conspicuity of the signal image; therefore, it is desirable to select a level which is good from a comprehensive perspective. It may also be that a sub-frame or time section in which the visible light communication image is displayed within one frame is divided into two sections so that the above black-white reversed images are respectively used therein as two images in one set.

Furthermore, as to the white and black representation, the white may be represented by displaying all the RGB colors, but, particularly as a method for lowering the luminance, a color other than white may be used to lower the luminance of a high luminance portion of the stripes. Furthermore, in order to reduce the conspicuity of the stripes, it may likewise be that the black means low luminance and is, therefore, represented using all the RGB colors or is not black which represents the meaning of a non-display state. Moreover, although it has been assumed that the stripe pattern is created using a high luminance portion and a low luminance portion, this may be represented as a stripe pattern with R and G stripes or the like which shows a combination separable by color. Furthermore, a combination of colors which have a complementary relationship with each other, such as R and C, may be used. When two colors having a complementary relationship are used, a combination of reversed images may be used as in the case of black and white. In this case, a reception device mounted with an image sensor and software capable of separating the RGB colors needs to be used at the time of capturing an image.

In addition, when repeatedly displayed, the stripe pattern may be made less conspicuous by scrolling that is little-by-little movement on the screen, and the signal encoded image may be divided into two or more regions in each of which the scrolling is performed. In this case, each scrolling movement may be different in direction, speed, etc., or scroll operations may be performed in synchronization with each other.

Furthermore, in Embodiment 1, the visible light communication signal is encoded and then output as image data; in order to clearly show the boundaries of blocks in the data, a frame-like image signal, which is never included in a normal encoded signal, may be inserted before or after the visible light communication signal so that when two or more frame-like image signals are recognized, it is determined that signals of one block have been obtained, and such frame-like image signals may be used to determine the size of the signals of one block in an image.

Furthermore, although the image sensor of the reception device needs to complete a series of signals in one image in Embodiment 1, it may be possible that, when the amount of information is large, information is written in the header portion of the encoded signal as to, for example, whether or not such a signal screen is included and in which section such a screen is present out of a plurality of sections obtained by dividing the information due to the amount being large. As a specific example, it becomes possible to divide the above information into images by using the preamble and type of the standard JEITA-CP1222. It goes without saying that the method of the division, how to output the divided signals, and how to store such divided information into an image are not limited to this example. Furthermore, there is a method of repeatedly displaying a signal image to transmit the visible light signal information without fail, and in this method, it may be that one image resulting from the division, which is based on the visible light communication image, is repeatedly displayed, and then, a succeeding image resulting from the division is repeatedly displayed, and there is also a method of sequentially displaying images based on a series of signals resulting from the division, and repeatedly displaying these images as one set. Out of these options, either may be selected according to the size of the amount of information, the type of normal video signals, and so on.

Furthermore, the exposure time may be controlled in consideration of high-frequency noise of light source luminance such as surround lighting.

FIG. 11 illustrates the relation between exposure time and high-frequency noise of light source luminance, such as surround lighting, of when the cycle of high-frequency noise is 20 microseconds. The longer the exposure time relative to the cycle of high-frequency noise, the lesser the impact of the high-frequency noise on the captured image, which makes it easier to estimate the light source luminance. When the exposure time is an integral multiple of the cycle of high-frequency noise, the impact of the high-frequency noise is absent, which makes the reception of the visible light communication signal easiest. The main cause of the high-frequency noise originates from a switching power circuit, and since the length of its cycle is 20 microseconds or less in many switching power supplies for lighting, setting the exposure time to 20μ seconds or more will make it possible to easily estimate the light source luminance.

Furthermore, an embodiment may be possible in which the visible light communication image or the encoded image is embedded in part of the screen for normal video. In this case, the visible light communication signal can be received only from a limited part of the screen on the display unit, which imposes restrictions on the relationship between the reception device and the screen. On the other hand, this can be solved by displaying an image for guiding the reception device to turn toward the limited part of the screen in the video signal. Furthermore, although a method of inserting the visible light communication image or the encoded image with reduced conspicuity has been described in Embodiment 1, the measures devised to make the stripe pattern of the signals less conspicuous may be reduced because the region is limited here. Of course, the method which leads to reduced conspicuity may be preferentially adopted, which is, however, optional. Furthermore, it may be possible to adopt a method in which the image is displayed only sequentially or for a relatively long length of time rather than the very short length of time, such as 1 millisecond or less, desirably 0.2 milliseconds or less, and received in the same or like manner as above. In this case, the reception error probability will decrease significantly, with the result that the restrictions such as repetitive transmission are eased.

It is to be noted that although the display which displays video, namely, the display apparatus 100, is given as an example in this embodiment, a device which projects video, such as a projector, may be used instead.

Furthermore, as illustrated in FIG. 12, this may be adapted to 3D video for glasses, which has recently been adopted in a variety of video. In this case, the visible light communication image or the encoded image is output to at least one, or none, of the left and the right, at least at the same point in time for a video signal. By doing so, in a period for which the signal image is displayed, the shutters of glasses are closed so that a viewer can watch the video without a feeling of strangeness.

Furthermore, in this embodiment, in the case where the visible light communication image is recognizable by human eyes such as a case where the display frame for the visible light communication image is sequential or a relatively long length of time, the imaging unit included in the receiver does not need to be the image sensor of the sequential exposure type and only needs to be an image sensor such as CCD.

An example of signal input to the second input unit 150 is disclosed below.

There are cases (i) where the visible light communication signal is received from outside and, inside the display apparatus, is subject to the processing from decoding to the formation into an encoded image and the displaying, (ii) where the encoded image is received from outside and displayed, and (iii) where the visible light communication signal or the encoded image is recorded in a memory inside the display apparatus and displayed according to a command to output the encoded image.

In the first case and the second case, an external communication means is required. As mentioned above, the communication means may be wired or wireless, and in the case of wired connection, it is possible to apply various cables for video and signal communication, such as HDMI (registered trademark), DVI, RS232C, USB, LAN, and an RGB monitor cable. Furthermore, an independent cable such as a coaxial cable and a twisted pair cable may be used to input a signal. Furthermore, there is also a method in which a signal is superimposed on electric waves for television transmission or the like, received by an antenna or the like, and input through a coaxial cable. In the wireless communication, a signal can be input by a method using electric waves in common Wifi, Bluetooth (registered trademark), Zegbee, etc., a method using infrared rays in IrDA, etc., and also a method using near field communication such as NFC.

Specific examples of the input lines are listed below.

For the HDMI (registered trademark), desirably pins 13 and 14 may be used, or, through the time-division with information such as normal video information, pins 1, 3, 4, 6, 7, 9, 16, and 19 may be used in the communication.

For the DVI, pins 1, 2, 4, 5, 7, 9, 10, 12, 13, 16, 17, 18, 20, 21, 23, and 24 may be used in the communication through the time-division with information such as normal video information.

For the LAN, pins 1, 2, 3, and 6 may be used in the communication.

For the RS232C, pin 2 or 3 may be used in the communication.

For the USB, pin 2 or 3 may be used in the communication.

For the RGB monitor cable, pin 12 or 15 may be used in the communication through the time-division with information such as normal video information.

In the case where information superimposed on electric waves of television is input through an antenna cable or the like, a space other than the band and time-division space used for transmitting video, audio, etc., may be used. Furthermore, an area for use in teletext etc., or an area for use in data broadcasting may be used, and a method may be used in which the encoded image is transmitted in the form of a video signal on a different channel in the multiplex channels, and video signals are combined inside the display apparatus. This case corresponds to the second case stated above.

These pieces of information may be transmitted in synchronization with the video information or the like in each frame, and may also be transmitted and received for each set of a certain number of frames. In this case, it is desirable to send, in advance, an identification signal described below which indicates that such transmission will follow.

Next, specific content of communication signals and a procedure for processing and displaying the communication signals are described.

In the first case, the following may be included as communication content.

Specifically, before communication data including a plurality of pictures, an identification signal is first transmitted which indicates that data for transmitting information by the visible light communication method included in the present disclosure is to be transmitted. At this time, there may be a function which, in the case where the display device to which the identification signal has been transmitted supports the visible light communication method in the present disclosure, displays to that effect on the display surface or the projection screen through the display apparatus to inform a user that the display apparatus starts the visible light communication in the present disclosure. Furthermore, in the case where the display device supports the visible light communication and has received the identification signal, a message indicating that the display device supports the visible light communication may be displayed on a display surface of a terminal which is transmitting communication data to the display device. Data for the visible light communication is displayed in a very short length of time and is, therefore, difficult to recognize. Accordingly, when a message indicating that the display device is capable of the visible light communication is displayed on the display surface of the terminal which is transmitting communication data to the display device, or the projection screen, it is possible to easily know that the display device supports the visible light communication. The identification signal may be an identifier indicating that the visible light communication data is included. When the identifier is present, it is possible to determine that the visible light communication data is included, and when the identifier is absent, it is possible to determine that the visible light communication data is not included. The use of the identifier makes it possible to reduce the amount of data transmitted because the determination is possible by transmitting the identifier only when the visible light communication data is included. Furthermore, the identification signal may be identification information indicating whether or not the visible light communication data is included. For example, adding the identification information on a per picture basis allows identification on a per picture basis as to whether data is normal video data or communication data for visible light. It is to be noted that the identification signal that is the identifier or the identification information may be added to the header of the communication data, may be added to the header of each picture, and may be added to both the header of the communication data and the header of each picture. In the case where the identification signal is added to both the header of the communication data and the header of each picture, whether or not the display device supports the visible light communication can be determined with use of the header of the communication data, and a message indicating that the display device supports the visible light communication can be directly displayed on the display surface of the terminal which is transmitting the communication data, or the projection screen.

Furthermore, in the case of using the identifier included in the header of each picture and indicating on a per picture basis whether or not data is data for the visible light communication, processing such as changing the display method can be performed on a per picture basis. Since the display device not capable of performing the visible light communication is not capable of reading the identification signal and making the determination, an identification signal for identifying a method of encoding the communication data may be transmitted sequentially. On the transmission side, the visible light communication signal is encoded in a predetermined encoding method such as the PPM method and the Manchester method, and the identification signal indicating the encoding method is added thereto. The display device performs decoding in the method designated by the received identification signal. Furthermore, it may also be possible to transmit identification information indicating whether the vertical stripes for the visible light communication are to be displayed on the screen as vertical stripes or as horizontal stripes by 90 degree rotation.

On the basis of the identification information, the display apparatus is capable of easily switching the display format on the screen for the visible light communication between the vertical stripes and the horizontal stripes. Furthermore, the following signal required to form the image may be transmitted after the transmission of the visible light communication signal. Specifically, it may be that, for the following information to be used to create the image, one set of signals, or in the case where one image is displayed with a plurality of signals, the corresponding number of sets of signals, is transmitted and based on this, the image is created: how many sets of communication signals (visible light communication signals) are formed into images; the minimum pitch of stripes that is the minimum unit of encoded data; the length of stripes perpendicular to striped signals (display regions for the signals); the number of repetitions of the image displayed within the screen; the display region in the screen; the content to be displayed in the region other than the display region; the tones corresponding to an ON signal and OFF signal; whether the image has vertical stripes or horizontal stripes; and in the case where the image has oblique stripes, the angle of such stripes; and the threshold to stop transmission when the tone level is low.

Furthermore, as described in the present disclosure, the encoded image may be created using information other than the information required to create the image, received by the display apparatus, that is, based on environmental information such as surrounding brightness and information such as distribution, changes, etc., of brightness of the video. Subsequent to such information required to create the image, the following information for the display apparatus displaying the encoded image created may be transmitted. Specifically, information for displaying may be transmitted such as information on which period the encoded image is to be displayed in, which one of the periods within a frame the encoded image is to be displayed in, whether an OFF signal for increasing the probability of receiving the visible light communication signal, represented by black, is displayed before and after the visible light communication signal, and in the case where the OFF signal is displayed, which period the OFF signal is displayed in. The display apparatus may determine, using the received information for displaying, the timing of actual displaying, etc., and thus display the video and the encoded image, and may alternatively refer to the environmental information such as surrounding brightness and the information such as distribution, changes, etc., of brightness of the video, as mentioned above, and display the video and the encoded image using information other than the information for displaying, received by the display apparatus. Moreover, in a method of combining a plurality of inverse images and so on to make an adjustment such that the entire screen appears to have a uniform tone, it may also be possible to transmit information on, for example, how many images are combined to create the encoded image and over how many frames such combination is divided and displayed so that the display apparatus which received the information can change, based on the information, the procedure to display the encoded image. Of course, the determination may be made based not on this information but on the video information, the environmental information, and the like. It is to be noted that these identification signal and signal required to form the image may be added to the header of the communication data including a plurality of pictures and may be added to each picture. The addition to the header of the communication data makes it possible to deal with the integrated information for each unit of communication data. Meanwhile, the addition to each picture makes it possible to change the signal information on a per picture basis.

The second case is described. Also in the second case, like in the first case, the identification signal is transmitted and then, transmitted is image data already created as the encoded image outside the display apparatus based on the information for creating the image, such as the vertical or horizontal direction and pitch of stripes, the display region, and the number of repetitions.

At this time, the content of the identification signal may include information required for displaying, such as information on which period the encoded image is to be displayed in, which one of the periods within a frame the encoded image is to be displayed in, whether an OFF signal for increasing the probability of receiving the visible light communication signal, represented by black, is displayed before and after the visible light communication signal.

The received image data is stored once as the encoded image in a memory inside the display apparatus.

Subsequently, the display apparatus may determine, using the received information required for displaying, the timing of actual displaying, etc., and thus display the video and the encoded image, and may alternatively refer to the environmental information such as surrounding brightness and the information such as distribution, changes, etc., of brightness of the video, and display the video and the encoded image using information other than the information for displaying, received by the display apparatus.

Furthermore, in the second case, when the method is used in which a plurality of inverse images and so on are combined to make an adjustment such that the entire screen appears to have a uniform tone, the identification signal may include image data of the inverse images. At the time of transmitting image data after the identification signal, a plurality of encoded images may be transmitted as the image data.

Furthermore, it may be that information on, for example, over how many frames such combination is divided and displayed is transmitted so that the display apparatus which received the information can change, based on the information, the procedure to display the encoded image. Of course, the determination may be made based not on this information but on the video information, the environmental information, and the like.

In the third case, there is no particular communication with outside, meaning that in the case of displaying, the method of determination based on the environment, the video signal, and so on, may be used, or alternatively, it may be that content written as the content to be transmitted in the form of signals after the identification signal is recorded in the display apparatus in advance and then used.

[Aspect Unique to Display Such as Liquid-Crystal Display]

(Option Unique to Liquid-Crystal Display)

For a liquid-crystal panel in which transmittance, etc., is controlled for each pixel in the liquid-crystal display device, it takes an extremely long time to transition from the most transparent state to the most opaque state. Since lighting with the backlight even during the transition will cause a deterioration in vide properties, such as tailing, the backlight is repeatedly turned on and off frequently to prevent the tailing and thereby improve the video properties at present. From the perspective of the time response capability of the liquid-crystal panel, it is very difficult in the above-described method to rapidly display a black or striped encoded image after a normal video image and then return a succeeding part of the original video image soon. In the case of using the liquid-crystal display device, the liquid-crystal panel is desired to turn off the backlight at the same time as entering an operation for switching images before outputting the encoded image after the end of a period in which a video image is output within one frame, and turn on the backlight at the stage when the encoded image is output, and turn off the backlight after lighting for the above-stated very short length of time, and start returning the original video image, and when one frame ends, cause a change to normal backlight control. It is to be noted that a method which returns the original image as fast as possible may be adopted by causing the image which is created by the liquid-crystal panel to change at the point in time when the backlight is turned on when the encoded image is output because the liquid-crystal panel does not change significantly in the very short length of time. Furthermore, the above-described method in which the inverse images are inserted to make the stripe pattern less recognizable by human eyes as a measure for contrast becomes difficult to achieve. Therefore, the encoded image needs to be limited to the shortest possible period and adjusted into the encoded image the average luminance of which is as low as possible.

(Signal Level According to Environment and APL)

Recent years have seen a large number of liquid-crystal display apparatuses and so on which have a function of measuring brightness in the environment in which the display apparatus is installed, i.e., an illuminance etc., of the display surface, with a brightness sensor embedded in the display apparatus and adjusting brightness of output video according to the illuminance of the display surface. Here, the case where the function is used likewise to change the level of a signal according to the illuminance of the display surface is described. As mentioned above, the encoded signal image to be mixed with the video signal is desired to have as low brightness as possible in terms of a reduction in conspicuity. Meanwhile, a request from the receiver which captures an image of the screen and thereby receives a signal is based on the fact that the S/N ratio of the image depends on signal contrast expressed as a ratio of brightness, at the time of capturing the image, between one signal represented by black and the other signal represented by white in the encoded signals and is thus greatly influenced by external light. When the contrast is low because of great influence of external light, the contrast ratio of the video signal is also poor as it is impossible to provide the contrast which the display apparatus should essentially be able to provide in a dark room or the like (darkroom contrast). Therefore, the contrast will not be extremely low even when the luminance of the bright part (the region represented by white) in the encoded image is increased, meaning that taking an approach to higher luminance according to the strength of external light in consideration of the capability of the receiver is effective. Conversely, when the environment is dark, i.e., when the contrast will have a value closer to the darkroom contrast, the contrast level is set lower. Even when the brightness of the encoded image is lower, the contrast of an image captured by the receiver can be maintained at no lower than a certain level. Thus, the method of adjusting brightness of the encoded signal image according to the strength of external light entering the display surface (the display unit) is very effective.

Furthermore, when the average picture level (hereinafter referred to as APL) of the original images is lower than or equal to a certain level, the contrast ratio of the images is poor and even the insertion of a small number of encoded images may, therefore, have a significant impact on the contrast, leading to a conclusion that in a period during which images having the APL lower than or equal to a certain level are output, it is desired that the encoded signal have increased brightness or that no signal be mixed.

As to the APL, in the case where the APL of the video signals changes with time, setting a certain threshold and enabling or stopping the signal output according to a value of the APL as compared to the threshold cause changes among which an especially abrupt change may appear to be a phenomenon like a flashing screen to human eyes. Therefore, while accepting the possibility of the receiver failing to receive a signal when the APL is lower than or equal to a certain level, it may be possible to intentionally change the luminance of the encoded signal video slowly with time according to the APL. In addition, in order to avoid erroneous signal recognition in the receiver, it may be possible to insert, to a part into which the encoded signal is to be mixed, a gray image having the APL corresponding to that of the encoded signal image, or alternatively an image having a color mixed which corresponds thereto so that the average luminance changes slowly with time as stated above.

A specific method to achieve these measures is, as described above, the method of adjusting a signal tone, the method of adjusting a period in which the signal is output, adjusting luminance of a light source portion, such as backlight, which is reflected in luminance, or adjusting a length of light emission time of the light source portion. Furthermore, according to a situation, these can be combined to achieve the above measures.

As to the environmental illuminance and the APL, an adjustment by such a combination is further desirable.

(Mixing of Calibration Signal)

Upon the start of insertion of the encoded image or upon a change of the encoded images or between changes of the encoded images or periodically thereafter, the following signal is inserted as a calibration signal so that the receiver easily captures the encoded signal by recognizing, in advance, a color and luminance of the encoded signal in each of the ON state and the OFF state, a width of the minimum signal unit, etc., furthermore, a signal length, and so on. For example, in order to indicate the signal length, a frame is provided as a rim on the circumference. In order to indicate the signal unit length or the luminance and chromaticity of each of the ON and OFF signals, an applicable method is to display the ON signal and the OFF signal alternately on the entire screen, for example. Through the insertion of such a calibration signal, the reception performance can be expected to improve. It is to be noted that the above-described various measures devised to keep the image quality from deteriorating may be added also to the calibration signal.

(Cancellation Signal Upon Change of Signals)

In the case where a certain encoded signal continues to flow for a predetermined period and then the type of the encoded signal changes in relation to the video or completely arbitrarily, capturing one image from two or more different encoded signals with the image sensor or retrieving two or more different encoded signals at close points in time with the image sensor and then complementing each other or checking them, for example, leads to erroneous recognition or an occurrence of an error. Therefore, when the encoded signal changes, a preamble such as a header may be repeatedly output, for example, to clarify that the signal changes before or after that point.

(Interval Between Two Negative and Positive Images)

In the case where a certain encoded image and an inverse image thereof are output at a relatively short time interval, the stripe pattern will disappear, which is equivalent to a situation where there is a uniform screen that has average luminance, due to the limit of temporal resolution of human eyes as already described above, and now described is about the interval of such two images when displayed.

Figure 13:
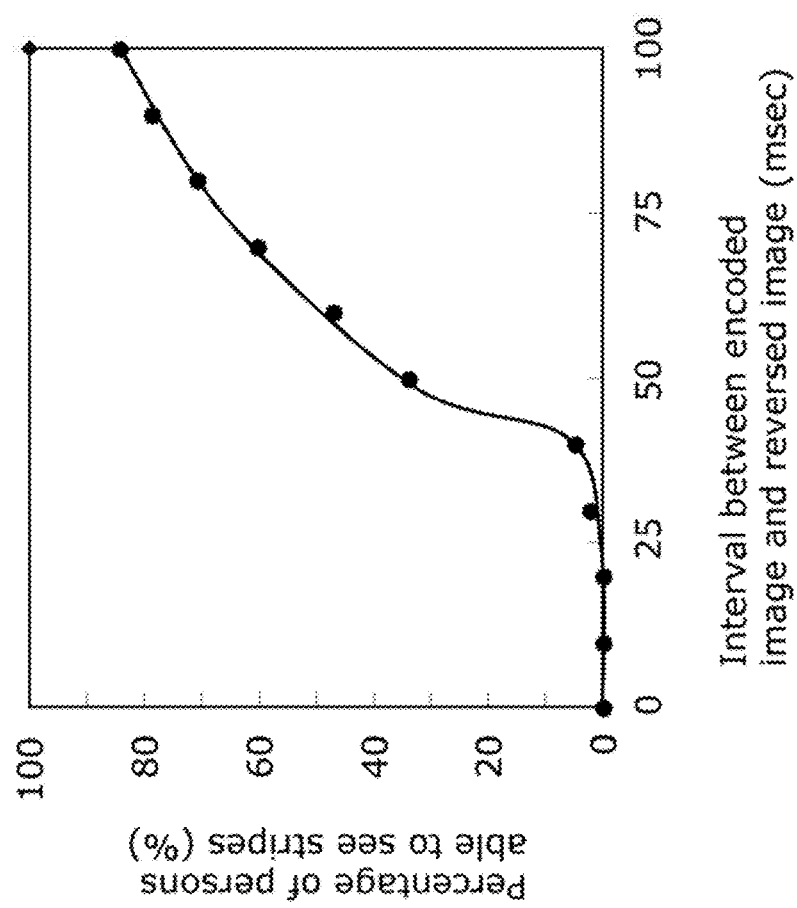
FIG. 13 illustrates the relationship between a time interval of an inverse image of an encoded image and a stripe pattern recognition rate.

As to the temporal resolution of human eyes, it is generally known that its threshold is around 50 milliseconds from which a drastic decrease starts. Accordingly, to what degree the visibility changes in relation to the interval between the encoded image and the inverse image thereof was observed, a result of which is illustrated in FIG. 13. FIG. 13 illustrates a result of experimental research on the relationship between a time interval and a percentage of persons who are able to see the stripe pattern, and during the interval, black is displayed on the entire screen. Furthermore, using the stripes which are horizontal and have a pitch of 3 mm, the visibility test was conducted in a distance of 1 mm from the screen. From this result showing a drastic rise from around 50 milliseconds as is conventionally said, it is desirable that the interval between the encoded image and the inverse image be set to 50 milliseconds or less. Moreover, a setting to 20 milliseconds or less is more desirable because the limit of visibility at which almost no one is able to see the stripe pattern is around 20 milliseconds. This result means that in normal video having 60 frames per second, outputting the inverse signal after four or more frames is not desirable. Furthermore, outputting the inverse signal within one frame is desirable.

(Restriction on Length of Time for Stripe Pattern Based on Contrast Sensitivity Function)

According to the contrast sensitivity function in the field of visual perception properties, the contrast sensitivity for a stripe pattern in a stationary state reaches the maximum with around 2 cycles/degrees which, for example, increases to approximately 10 cycles/degrees when the contrast sensitivity falls to a fraction. When the stripe pattern has a lower spatial frequency and thus lower contrast sensitivity, the temporal resolution will also be lower. It is said that around the peak, the temporal resolution will be as good as milliseconds. The spatial resolution around the peak corresponds to the case where stripes having a pitch of 9 mm are seen m a distance of 1 m, and in the case where stripes having a pitch of 3 mm are seen in a distance of 1 m, approximately 10 cycles/degrees are obtained with temporal resolution of approximately 50 milliseconds. The spatial frequency is represented by the expression: Spatial frequency [cycle/degree]=1/[arctangent (pitch

[m] of the stripes)/(distance [m] between display surface and viewer)]. Thus, the calculation based on the pitch of the stripes and the distance from a general viewer, estimated from the field of view and so on, makes it possible to determine the maximum value of the length of time.

(Three to Four Negative and Positive Images Instead of Two Negative and Positive Images)

Figure 15:
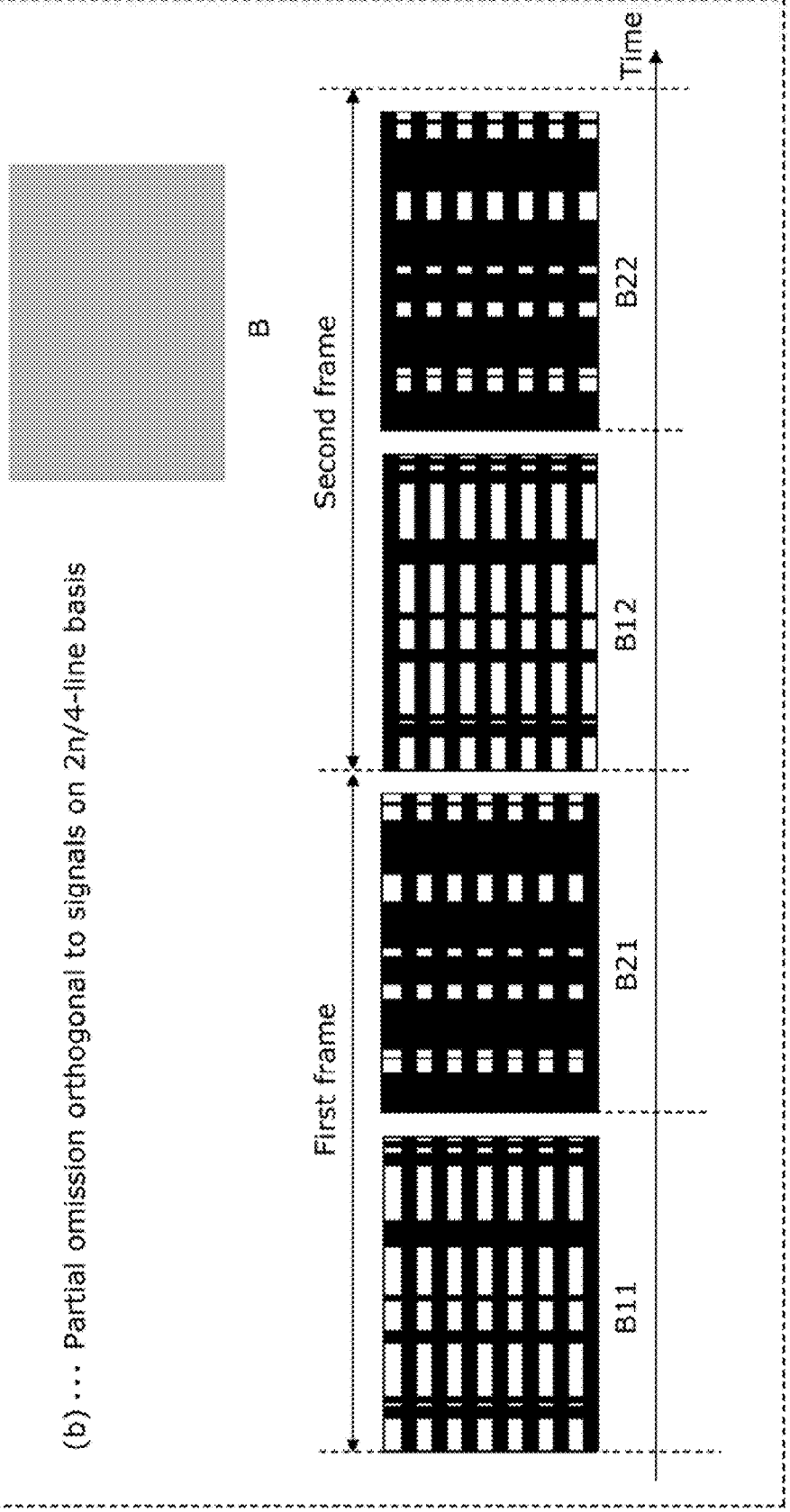
FIG. 15 schematically illustrates an example in which four encoded images are grouped as a set to reduce the conspicuity.
Figure 16:
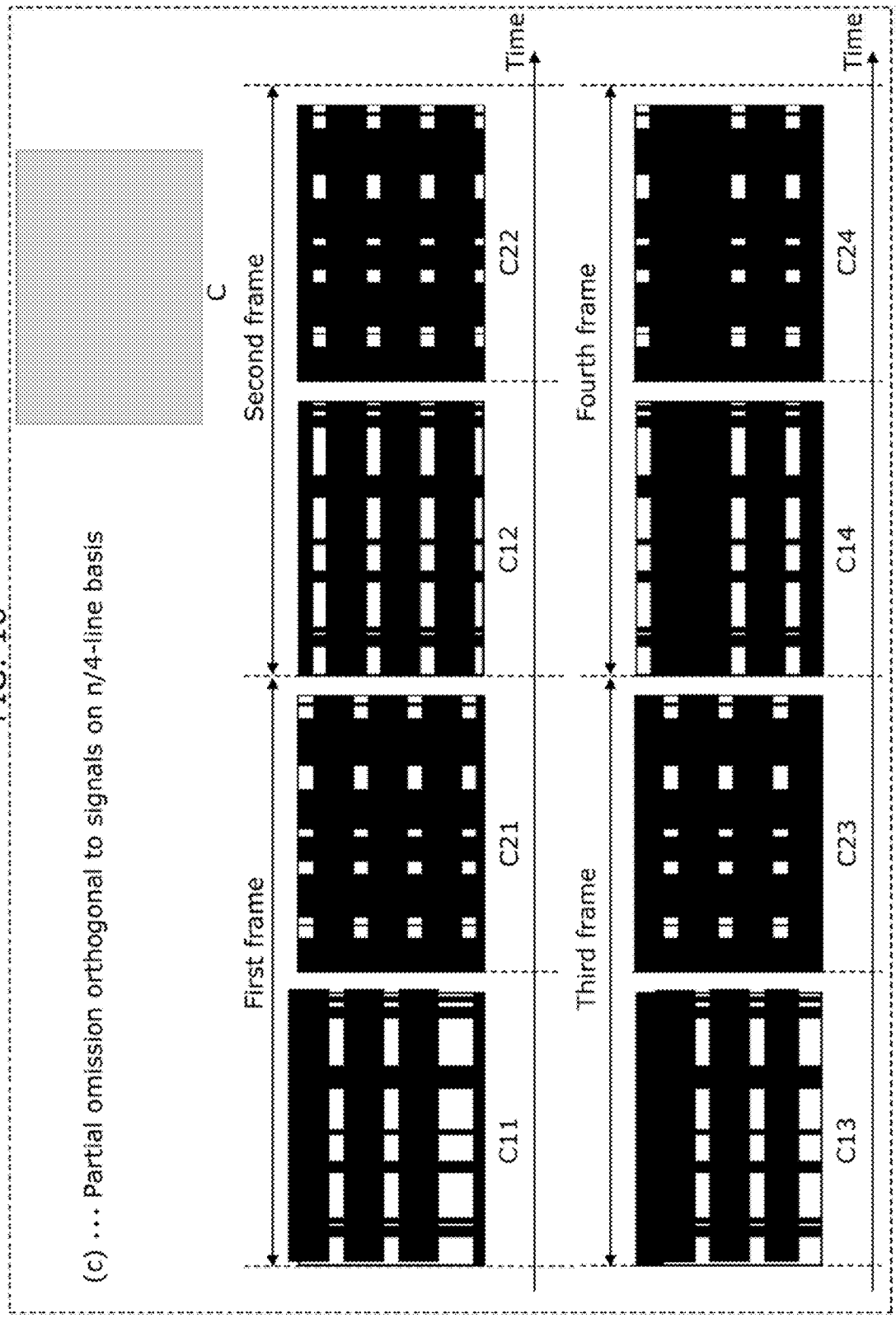
FIG. 16 schematically illustrates an example in which eight encoded images are grouped as a set to reduce the conspicuity.

As described above, the encoded signal is displayed in a very short length of time. In the case where there is influence from images such as a case where the APL is low, the foregoing has described the method in which the reversed image of the encoded signal image is used, that is, two kinds of brightness, color, or combination thereof which indicate the ON state and the OFF state are reversed. Here, in order to further avoid displaying an image having high luminance, it is also possible to adopt a method in which a set of reversed images is further divided into two or more sets, and these sets are combined to lower the peak luminance to further avoid image quality deterioration. FIGS. 14 to 16 each schematically illustrate this example. It is to be noted that although FIGS. 14 to 16 illustrate the examples in which binary signals of white and black are used, a combination of other colors may be possible, and it may also be that white does not indicate 100% lighting and black does not indicate 0% lighting, that is, the color temperature may be changed, white having lower peak luminance may be used, and black may contain some amount of light.

FIG. 14 illustrates a normal example in which one set of inverse images are inserted into one frame, which is as described above. An image B11 in FIG. 15 is obtained by perpendicularly superimposing the stripe pattern of the encoded signal in the image A11 in FIG. 14A on a pattern of white and black stripes in a 1:1 ratio. The stripe pattern of this encoded signal is superimposed on the image A21 to form an image B21, which is put in the next frame. Furthermore, black and white of the stripe pattern of this encoded signal are inverted to form a stripe pattern which is then superimposed on the image A11 and the image A21 to respectively form an image B12 and an image B22, each of which is put within a frame. By doing so, the luminance obtained as a result of synthesis of the signals in each frame will be half the luminance obtained as a result of synthesis of the original signal image and the inverse image thereof; therefore, it can be expected that this will be effective in improving video contrast. Likewise, an example in which a pattern of black and white stripes in a 3:1 ratio is superimposed perpendicularly is illustrated in FIG. 16. In this case, four divisions in the vertical direction means that synthesized images in four frames correspond to the same image as (a), resulting in synthesis luminance being so low as one fourth of the original. Thus, the encoded image is partially removed using black perpendicular to the signals so that the original image can be obtained by synthesizing a certain number of images, with the result that the luminance as a whole can be reduced. However, since the temporal resolution of human eyes is generally said to be approximately 50 milliseconds, the division into sets across a large number of frames will result in afterimages being synthesized, which reduces the effect in which the stripe pattern becomes unrecognizable; therefore, in the case of 60 frames per second, division into four or more sets is not preferable. Furthermore, in a comparison between (a) and (b), replacing the second frame in (a) with total black will result in the same luminance as in (b), and also in a comparison between (a) and (c), replacing the second to fourth frames in (a) with total black will result in the same luminance as in (c). However, a combination of (a) and total black causes a regular temporal change in luminance in video, which may cause a trouble of apparent flickering. Considering such a cause, it can be expected that the combination in (b), (c), or the like will be effective in improving the image quality.

(Treatment for Bias in Low Luminance Case)

As described above, the encoded image is inserted in between video images, and such images have certain luminance, with the result that the displayed images will have a tone higher than the tone obtained when each primary color is input in each frame. Especially, when the tone is low, the impact is significant; therefore, the method in which no signal is transmitted when the video images have a tone no higher than a certain level has already been described, and here, other methods for correction are disclosed.

Figure 17:
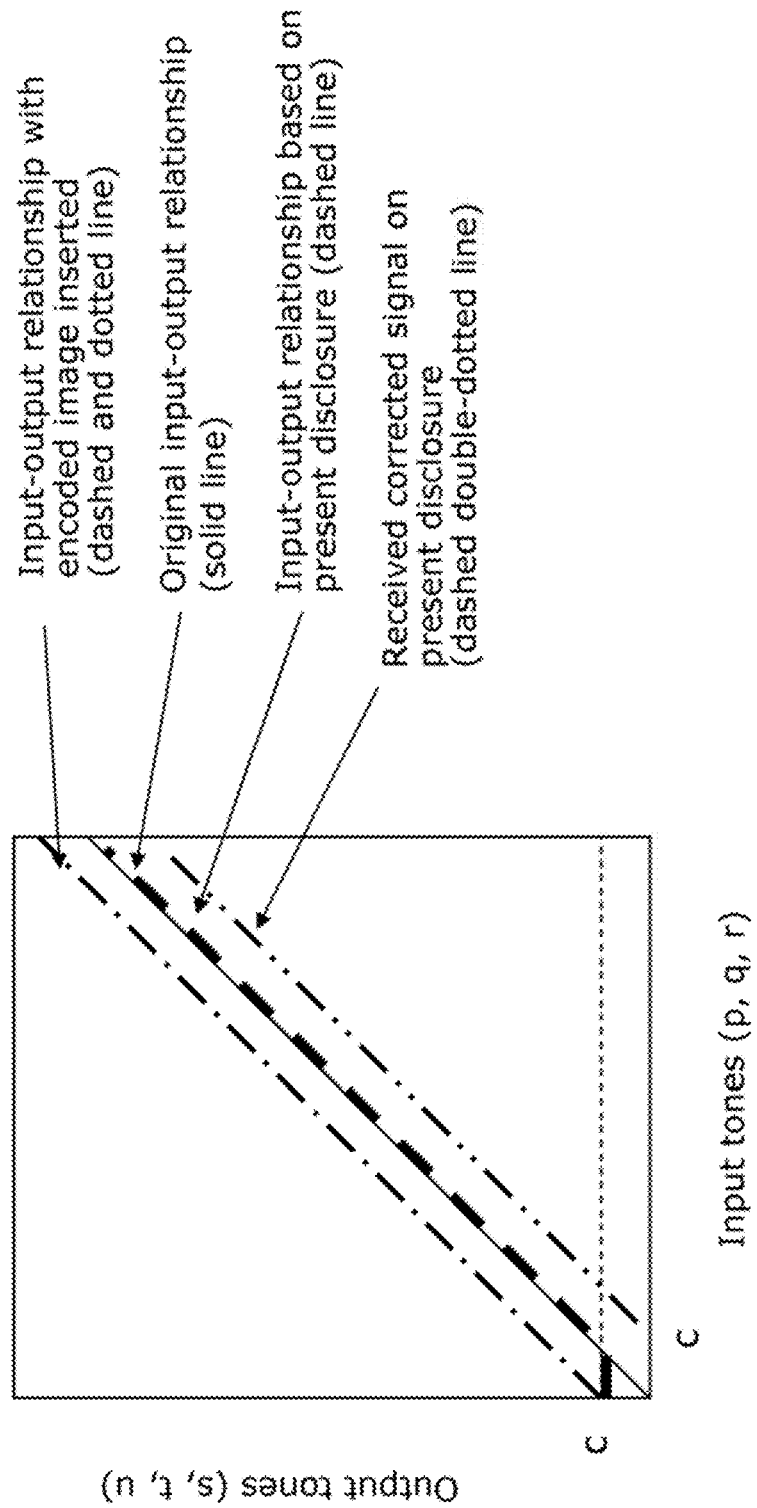
FIG. 17 illustrates an example of a correction method in which the encoded image is adjusted so as not to disturb original video.

FIG. 17 illustrates a relationship between input signals and output signals. It is to be noted that the input signals are signals already treated with correction, such as gamma correction, which is unique to a display apparatus such as a display. Assume that c is a value obtained by converting, into tone representation, total brightness of two or more images including an encoded image and an inverse image thereof as the encoded image.

Although it is primarily ideal that input and output correspond to each other one-to-one as shown by the solid line (the thin line) in FIG. 17, a result will be biased as illustrated by the dashed and dotted line therein for a tone corresponding to the synthesized (combined) brightness of the two or more encoded images. In order to correct this, the relationship $s=p+c$, $t=q+c$, and $u=r+c$ is satisfied in the above-described insertion example for encoded image, for example, where the primary colors are three colors of RGB, the input is (Rp, Gq, Br) (p, q, and r represent tones of the respective colors upon input), and the output is (Rs, Gt, Bu) (s, t, and u represent tones of the respective colors upon output). As output values, it is possible to maintain values based on the original video signal by adjusting the input signal to (Rp-c, Gq-c, Br-c) shown by the dashed double-dotted line in the figure. Here, in the case were p, q, $r<c$, the video signal is 0, and it may therefore be that such a color in the video signal is not displayed. This is represented by the dashed line in the figure; providing such a relationship will result in that although the contrast will be poorer in a low tone because the encoded signal is output at the sacrifice of the video, the image quality of the video can be maintained in the other regions.

Furthermore, as another method, no signal is output in a part with a lower tone (darker) than c that is the tone of the encoded signals synthesized while the encoded signal is superimposed only on a part with a higher tone (brighter) than the tone c.

Figure 18:
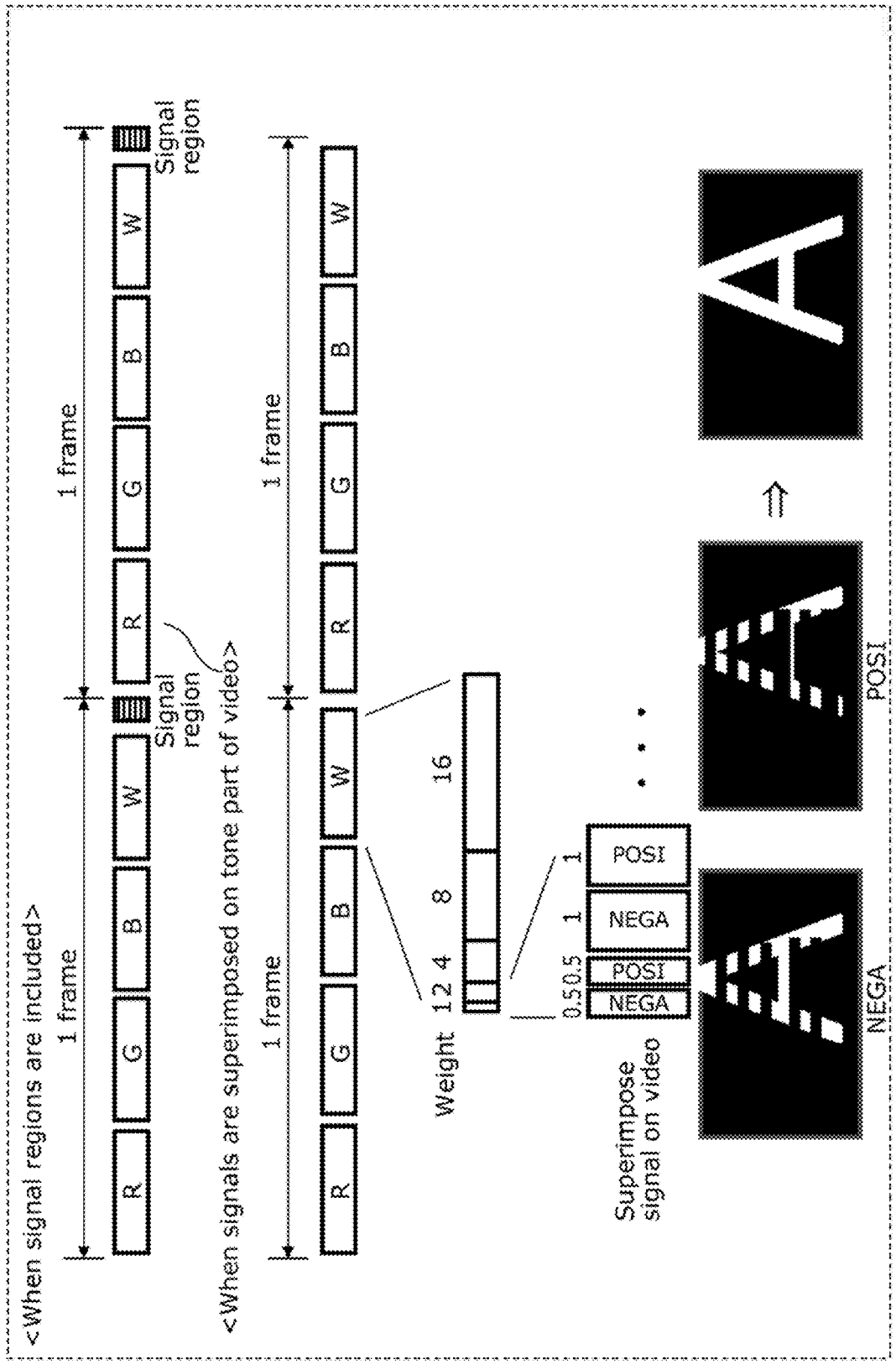
FIG. 18 illustrates an example of a method of adjusting the encoded image and inserting a resultant image so as not to disturb original video.

FIG. 18 illustrates an outline of a specific method for realizing what has been described above.

Illustrated here are a method in which a signal period is provided to provide, in advance, a period in which the encoded signal is to be displayed (the top part of this figure) and a method in which the encoded signal is inserted into the video signal (the middle part of this figure).

The top part of this figure schematically illustrates what has been described so far in a method in which R, G, and B are provided in a time division manner, and although R, G, and B may be provided in the time division manner, regions corresponding to R, G, and B may be spatially provided to represent tones using the entire time. (A projector or the like and an apparatus which sequentially changes light sources in a display operation, such as an MEMS, are adapted to the time division while an EL and a type in which RGB cells are provided in each pixel so that light is emitted therefrom, such as a PDP, are adapted to the spatial division.)

Furthermore, in the method in the top part of this figure, the PWM display method using the entire period may be possible (that is a method of controlling the luminance (tone) by adjusting the length of light emission time, in which, instead of clearly dividing frames into sub-frames and turning ON (lighting) or OFF (non-lighting) completely in the sub-frame, it may be that the pixels are turned ON all at once and a time point of turning OFF is set for each of the pixels so that the pixel is turned off accordingly, or it may conversely be that a time point of turning ON is set for each of the pixels and the pixels are turned OFF at the end), and a change in intensity by current control or the like may be used in the display operation. Although the signal is positioned at the end of a frame, this may be in the middle of a frame or at any position. Furthermore, in the case of a liquid-crystal display apparatus, which requires time to change tones on the screen, it may be that the signal and the video are positioned at a distance from each other so that as long a time as possible can be set for the tone change, and the tone c corresponding to the encoded image is represented in a method, for example, in which the backlight emits light for a predetermined length of time within the available time.

Likewise, in order to reproduce the dashed line (the thick line), assume the use of a sub-frame as illustrated in the bottom of the FIG. 18, then, where c=1, for example, a white part of each of a negative image and a positive image that are one set of reversed images of the encoded signal (hereinafter referred to as negative and positive) is represented by tone 1, with the result that both the negative and the positive are each in a sub-frame of one tone, that is, the negative and the positive are applied to portions obtained by dividing the sub-frame having a weight 2 by 2. In this case, the encoded image is not that illustrated in the bottom part of the FIG. 18, but is an image the entirety of which is composed of encoded signals, such as negative and positive illustrated in FIG. 14; in this case, low tones are sacrificed. It is to be noted that in this case, images created with the original image signals are directly displayed in all the sub-frames including the sub-frame having a weight 1.

The case of attempting to reproduce original images completely even in low tones corresponds to the bottom part of FIG. 18 as an example. In this case, no signal is superimposed on the part of a low tone (the dark part in the image) (that is, the black part of the original disassembled image (where 0 stands in the corresponding sub-frame) remains black), and the encoded signal is superimposed only on the bright part (the part for which 1 stands in the corresponding sub-frame).

Here, assume that the tone c of the encoded image is 1, the images (negative and positive) as illustrated in the bottom part of FIG. 18 are displayed in two sub-frames obtained by dividing the sub-frame having a weight 2. Only a white position in the corresponding image and a white position in the encoded image will appear in white, and all the other parts will appear in black. In all the other sub-fields, the original images remain. By doing so, if is possible to reproduce the original video images per se with the encoded image still included. A drawback in this case is that since the signal is superimposed only at the bright position, what is worse, the bright position in the corresponding sub-field, the reception probability will decrease, or no signal will be received at all. Furthermore, it should be noted that bright or dark here means bright or dark in the corresponding sub-field, that is, the signal is not superimposed only on a part which looks bright to human eyes, with the result that there will often be nothing to do with human intuitive impressions.

Although here is the example in which a combination of two images, i.e., negative and positive, that are the encoded image and the inverse image thereof, is used to provide an entire image with a uniform tone, other combination may be possible as long as that is a combination of more than one image. Furthermore, among the sub-frames having weights of powers of 2, a small sub-frame is divided into two sections to represent a combination of negative and positive as an example here. This is because, with the purpose of making the encoded signal image less conspicuous by lowering luminance thereof as much as possible, c will be a small value, such as a value of 1 or less in some cases, with the result that a frequent use of small sub-frames is predicted.

Firstly, using the above-stated threshold c for the video signal, image data is created by subtracting c from the tone of each of the primary colors in all the pixels in one image to be displayed which is included in the video, and then is disassembled into images which are to be displayed in respective sub-frames. Here, the calculation was made assuming that a white character "A" in a black background is displayed in one sub-frame. Furthermore, as a result of disassembling the encoded image having a stripe pattern in the average tone c into images in sub-frames, a horizontally striped image was displayed in one sub-frame.

In one sub-frame, the horizontally striped image that is the encoded image is superimposed on the image with the character "A" in the black background that is the image for one sub-frame of the original video signal. In this case, in both the images, only the ON signal, i.e., the white part, is displayed in white while the remaining part is displayed in black. This is indicated as "NEGA" (the bottom left part) in this figure. Meanwhile, the inverse image is also superimposed on the image with the character "A" in the black background. This image is indicated as "POSI" (the bottom middle part) in this figure. Subsequently, the same or like procedure is taken on each sub-field following the second sub-field so that the images are transmitted.

The value of the tone c is often small because it is desired that the encoded image be dark as mentioned above, and when the value of c is small, there is a low possibility that the disassembled image is present even in a large sub-frame. Accordingly, for such processing, there is little need to disassemble the frame into sub-frames of more than at least 2% of the total and perform the check processing. Thus, in the case of this example where it is assumed that there are 8 bits with powers of 2, i.e., 255 tones, the sub-fields to be prepared in advance are desirably the first sub-field and the second sub-field obtained by dividing the sub-field by two. Furthermore, in consideration of processing time, it is desired that this processing be performed with up to a 2-sub-field image structure.

The procedure as above makes it possible to transmit the encoded signal while giving little impact on the displaying of video having normal APL although images having low APL will be sacrificed according to the set threshold.

The example illustrated in FIG. 18 is described below in more detail with reference to FIG. 19 to FIG. 26.

Figure 19:
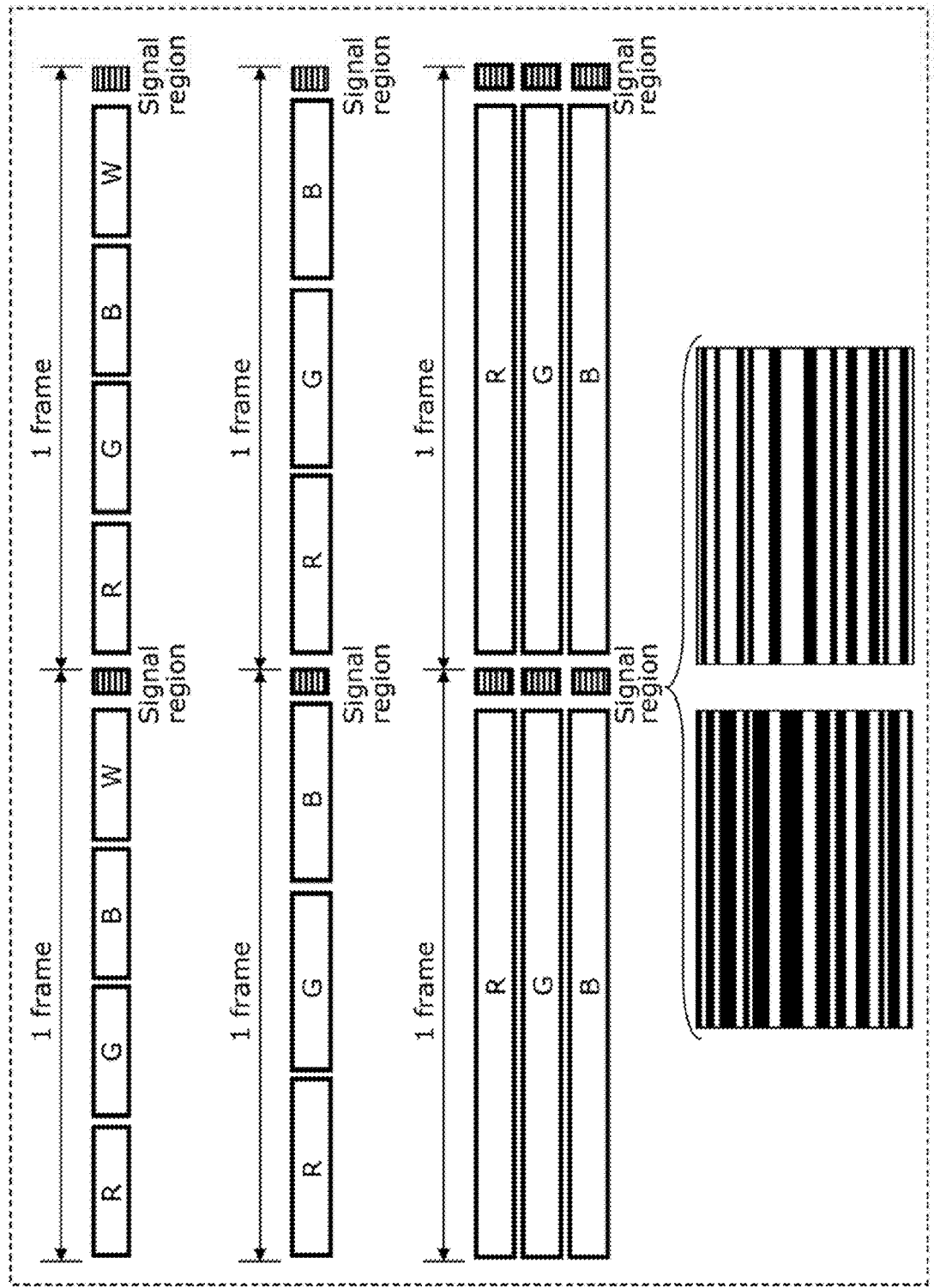
FIG. 19 illustrates an example of a method of adjusting and inserting the encoded image.

FIG. 19 illustrates a display example of the visible light communication image where the signal region is located at the end of a frame.

For example, in the case where the signal region is located at the end of a frame, the visible light communication image is displayed after the images of R, G, B, and W are sequentially displayed or after the images of R, G, and B are sequentially displayed within the frame as illustrated in FIG. 19. Alternatively, within the frame, the visible light communication image is displayed after the images of R, G, and B are displayed at the same time. The visible light communication image displayed here is the above-described negative and positive images, for example.

Figure 20:
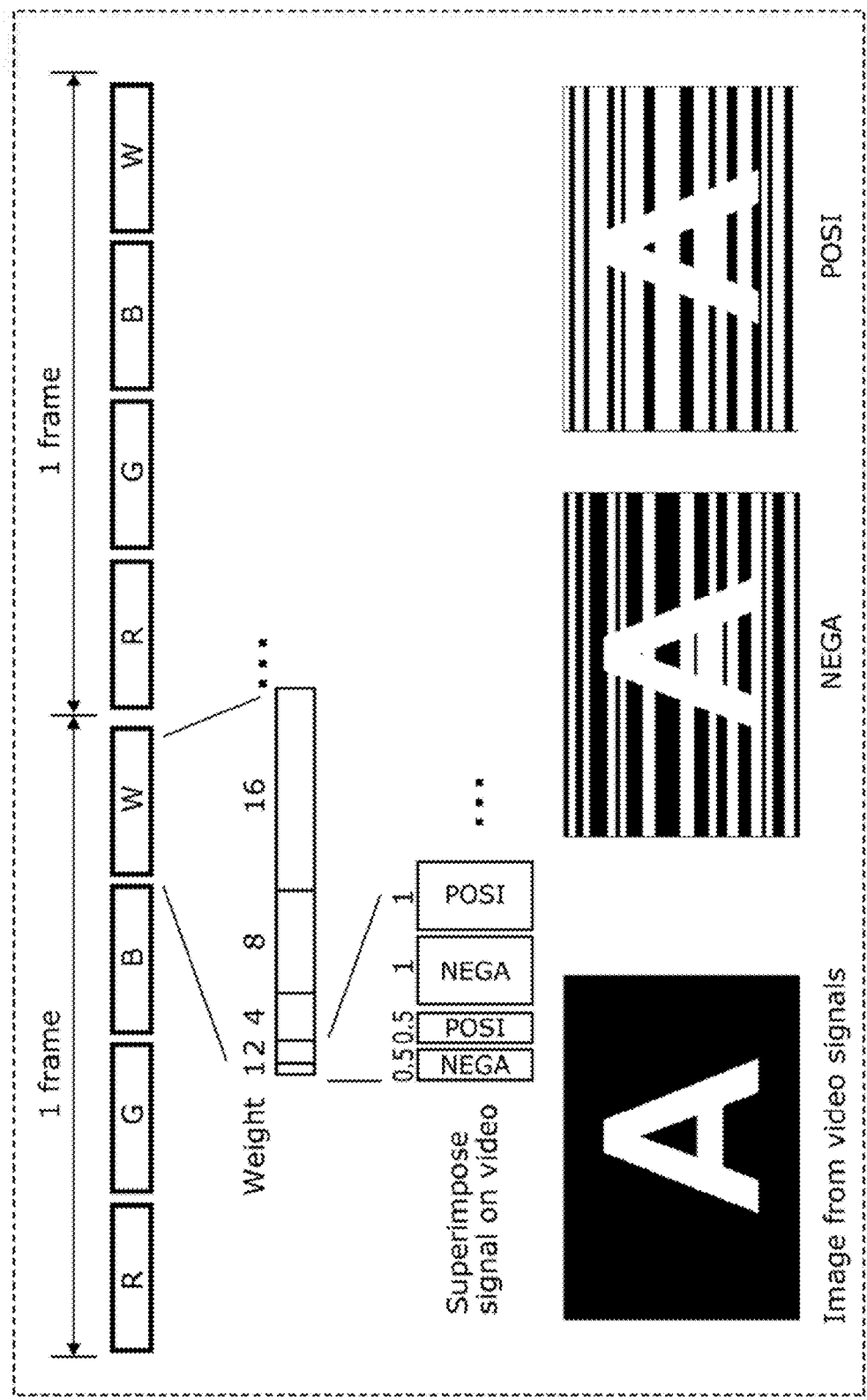
FIG. 20 illustrates an example of the method of adjusting and inserting the encoded image.

FIG. 20 illustrates an example in which the signal is superimposed on the video in a sub-frame.

Figure 21:
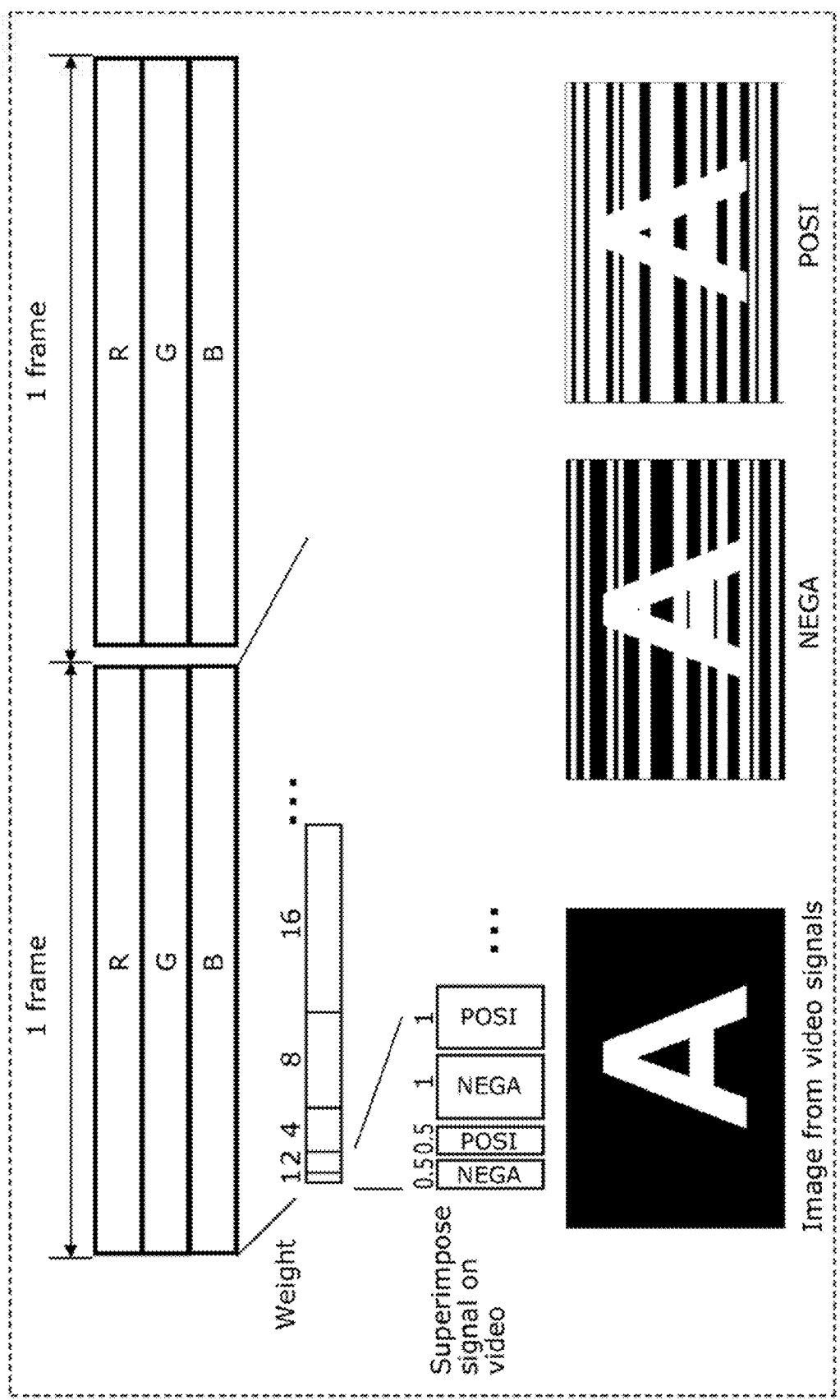
FIG. 21 illustrates an example of the method of adjusting and inserting the encoded image.

In order to display the tone c of the visible light communication image, a component is calculated by subtracting c from each tone of the input video signal. As a result, the input and the output have the relationship shown by the dashed double-dotted line in FIG. 17. Furthermore, in order to display the tone c of the visible light communication image, a sub-frame having a weight determined by the tone c×2 is divided. On each of the video images (the images of the video signals) which is in a division sub-frame obtained as a result of such division, the negative or positive of the visible light communication image is superimposed. Here, assuming that 1 is given to a high-luminance part and 0 is given to a low-luminance part, the logical sum of luminance is used to superimpose the negative or positive of the visible light communication image on the video image. By doing so, the signal of the visible light communication image is given a higher priority than the video signal, resulting in the input and the output having the relationship shown by the dashed line in FIG. 17. Although FIG. 20 illustrates the example in which one frame is divided in a time division manner based on R, G, B, and W, the same or like processing as the example of time division can be applied even in the case where one frame is expressed by R, G, and B cell divisions as illustrated in FIG. 21.

For example, when the tone c is 1 (c=1), 1 is subtracted from the tone of each component of the video signal, and then the sub-frame is divided. At this time, when the tone resulting from the subtraction of 1 will be a negative value, the tone is made 0. In order to provide the tone c=1, each of the negative and the positive needs to have a tone 1; therefore, the sub-frame having a weight 2 is divided into two division sub-frames. On the video image in each of the division sub-frames obtained as a result of this division, the negative or the positive is superimposed (the logical addition). In sub-frames other than the sub-frame having the weight 2, the video images which follow the relationship shown by the dashed double-dotted line in FIG. 17 are displayed through normal processing.

Furthermore, when the tone c is 2 (c=2), 2 is subtracted from the tone of each component of the video signal, and then the sub-frame is divided. Also at this time, when the tone resulting from the subtraction of 2 will be a negative value, the tone is made 0. In order to provide the tone c=2, each of the negative and the positive needs to have a tone 2; therefore, the sub-frame having a weight 4 is divided into two division sub-frames. On the video image in each of the division sub-frames obtained as a result of this division, the negative or the positive is superimposed. In sub-frames other than the sub-frame having the weight 2, the video images which follow the relationship shown by the dashed double-dotted line in FIG. 17 are displayed through normal processing.

Furthermore, when the tone c is 3 (c=3), 3 is subtracted from the tone of each component of the video signal, and then the sub-frame is divided. Also at this time, when the tone resulting from the subtraction of 3 will be a negative value, the tone is made 0. In order to provide the tone c=3, each of the negative and the positive needs to have a tone 3; therefore, the sub-frames having weights 1 and 4 are each divided into two division sub-frames. On the video image in each of the division sub-frames obtained as a result of this division, the negative or the positive is superimposed. In sub-frames other than the sub-frame having the weight 2, the video images which follow the relationship shown by the dashed double-dotted line in FIG. 17 are displayed through normal processing.

FIG. 22 illustrates the division of a sub-frame and a position at which the negative or the positive is superimposed. Here, 1 represents the positive, and −1 represents the negative. As illustrated in (a) of FIG. 22, where c=1, the sub-frame having a weight 2 is divided into division sub-frames, and the negative or the positive is superimposed on the video image in each of the division sub-frames. Furthermore, in the sub-frames illustrated as gray regions in FIG. 22, the video images which follow the relationship shown by the dashed double-dotted line in FIG. 17 are displayed through normal processing. The same applies to the cases where c=2 and where c=3. Furthermore, where c=3, as illustrated in (a) of FIG. 22, the negative and the positive are displayed in the sub-frame having a weight 2, and subsequently in the sub-frame having a weight 4, the negative and the positive are displayed. Thus, in the case where the visible light communication images are sequentially displayed in the order: negative, positive, negative, and positive, the reception device will be under more severe restrictions. Therefore, as illustrated in (b) of FIG. 22, the order of the division sub-frames having the weight 2 and the weight 3 may be changed. As a result, the visible light communication images are sequentially displayed in the order: negative, negative, positive, and positive, which allows the restrictions under which the reception device is to be eased.

Figure 23:
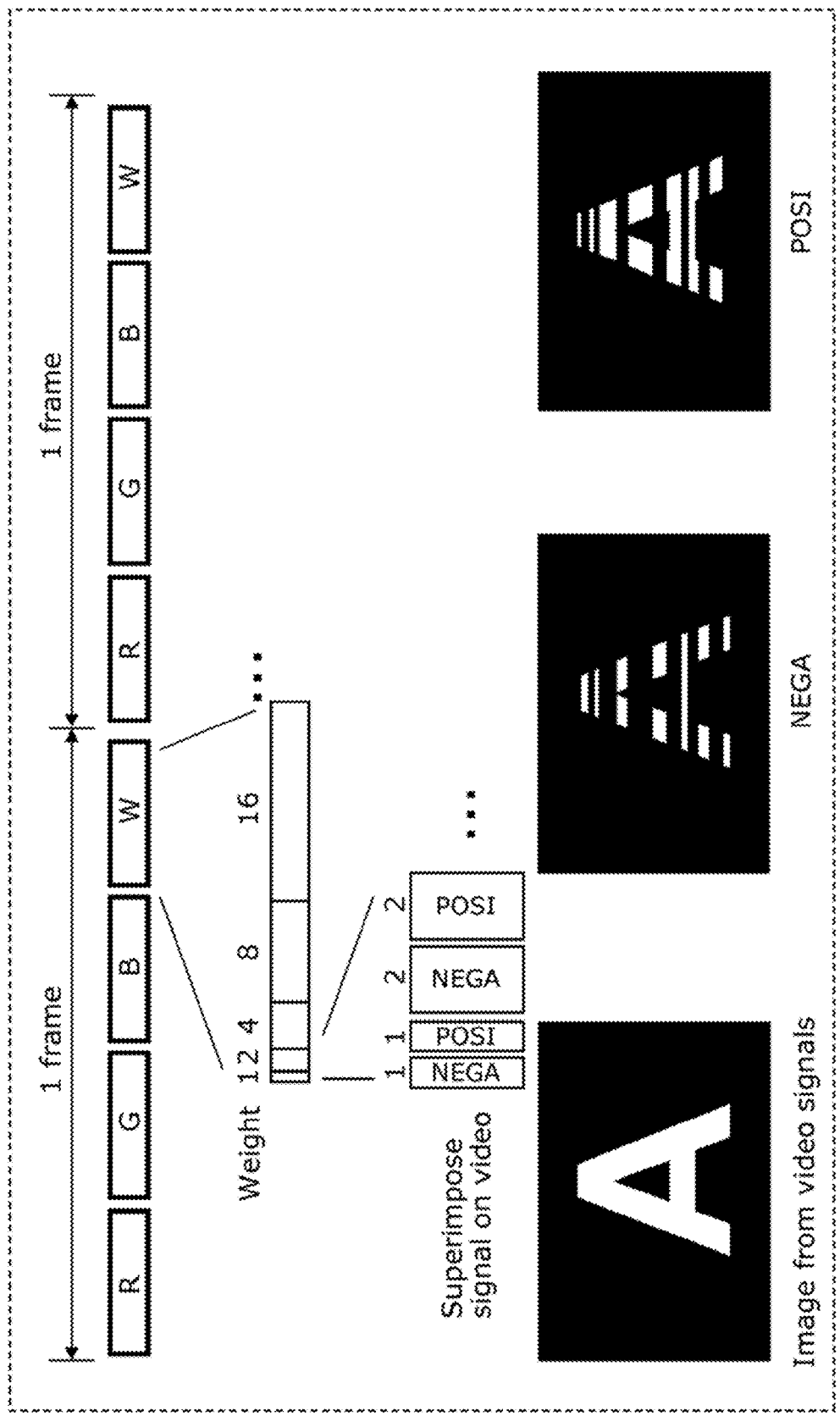
FIG. 23 illustrates an example of the method of adjusting and inserting the encoded image.

FIG. 23 illustrates another example in which the signal is superimposed on the video in a sub-frame.

Figure 24:
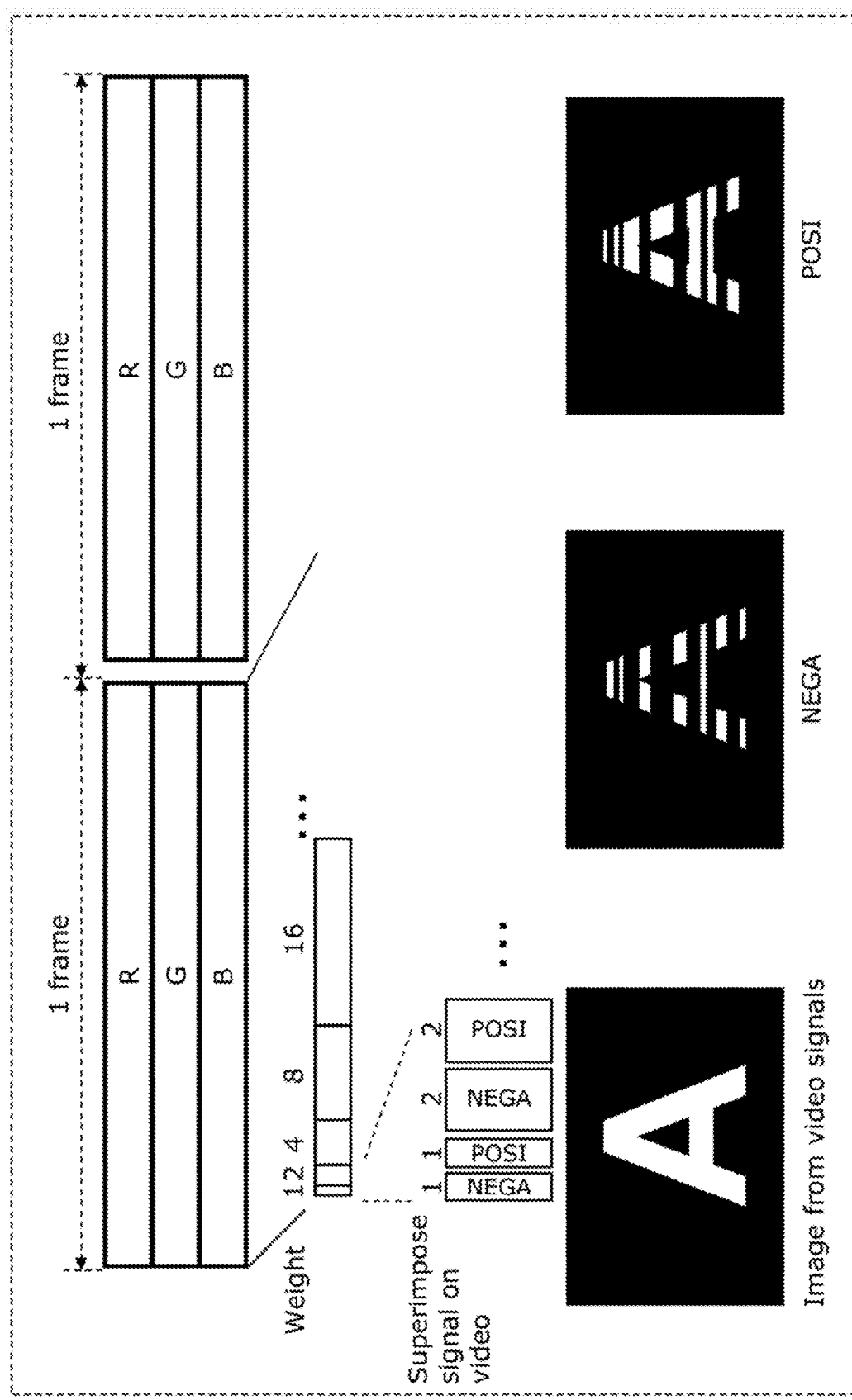
FIG. 24 illustrates an example of the method of adjusting and inserting the encoded image.

The sub-frame is divided in order that each tone of the received video signal is displayed, that is, so that the input and the output have the relationship shown by the solid line in FIG. 17. In order to display the tone c of the visible light communication image, a sub-frame corresponding to the tone c is added. On each of the video images (the images of the video signals) which is in the sub-frame corresponding to the tone c, the negative or positive of the visible light communication image is superimposed. Here, assuming that 1 is given to a high-luminance part and 0 is given to a low-luminance part, the logical product of luminance is used to superimpose the negative or positive of the visible light communication image on the video image. By doing so, the video signal is given a higher priority than the signal of the visible light communication image, resulting in the input and the output having the relationship shown by the solid line in FIG. 17. Although FIG. 23 illustrates the example in which one frame is divided in a time division manner based on R, G, B, and W, the same or like processing as the example of time division can be applied even in the case where one frame is expressed by R, G, and B cell divisions as illustrated in FIG. 24.

For example, when the tone c is 1 (c=1), the sub-frame is divided for each component of the video signal. In order to provide the tone c=1, each of the negative and the positive needs to have a tone 1; therefore, the sub-frame having a weight 1 is added, and the negative or the positive is superimposed (logical multiplication) on the video signal in each of the sub-frames having the weight 1. In sub-frames other than the two sub-frames having the weight 1, the video images which follow the relationship shown by the solid line in FIG. 17 are displayed through normal processing.

Furthermore, when the tone c is 2 (c=2), the sub-frame is divided for each component of the video signal. In order to provide the tone c=2, each of the negative and the positive needs to have a tone 2; therefore, the sub-frame having a weight 2 is added, and the negative or the positive is superimposed (logical multiplication) on the video signal in each of the sub-frames having the weight 2. In sub-frames other than the two sub-frames having the weight 2, the video images which follow the relationship shown by the solid line in FIG. 17 are displayed through normal processing.

Furthermore, when the tone c is 3 (c=2), the sub-frame is divided for each component of the video signal. In order to provide the tone c=3, each of the negative and the positive needs to have a tone 3; therefore, the sub-frame having a weight 1 and the sub-frame having a weight 2 are added, and the negative or the positive is superimposed (logical multiplication) on the video signal in each of the two sub-frames having the weight 1 and the two sub-frames having the weight 2. In sub-frames other than the two sub-frames having the weight 1 and the two sub-frames having the weight 2, the video images which follow the relationship shown by the solid line in FIG. 17 are displayed through normal processing.

Figure 25:
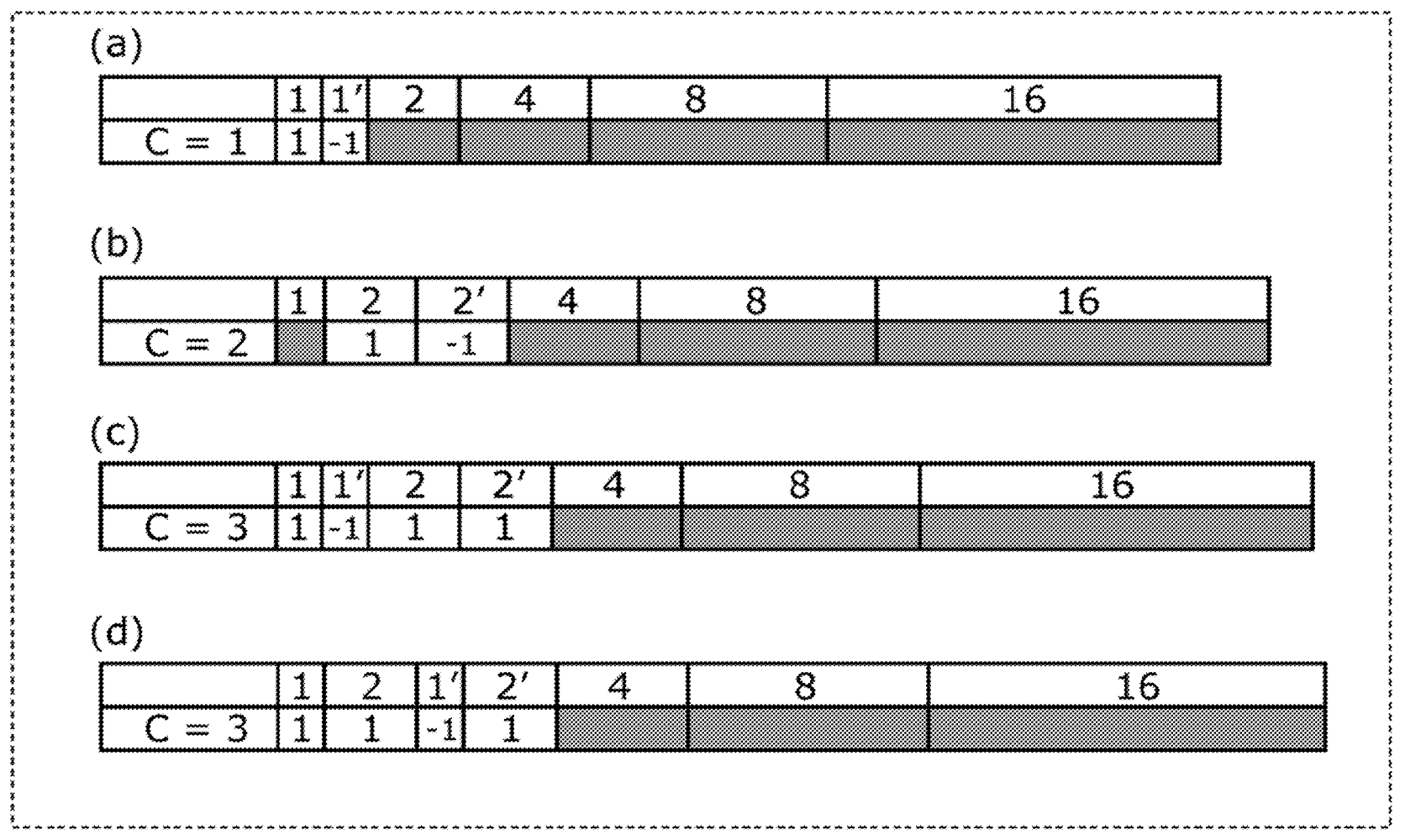
Figure 26:
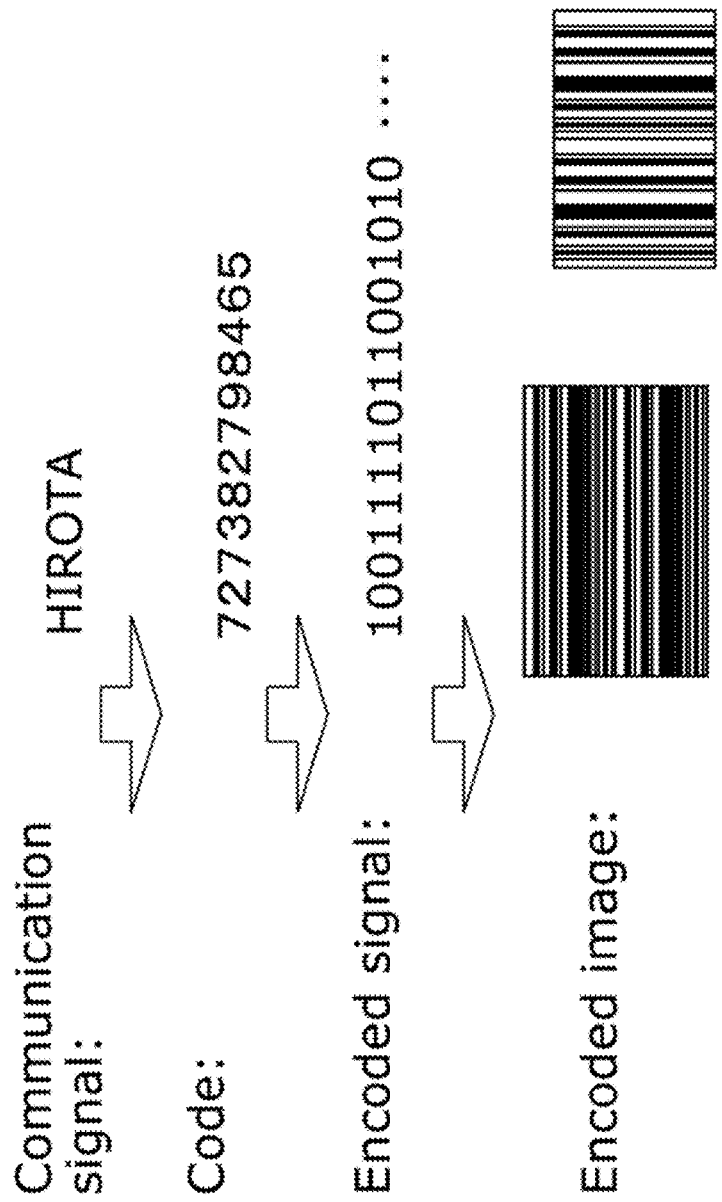
FIG. 26 explains the encoded image.

FIG. 25 illustrates the addition of a sub-frame and a position at which the negative or the positive is superimposed. Here, 1 represents the positive, and −1 represents the negative. As illustrated in (a) of FIG. 25, where c=1, the sub-frame having a weight 1 (the sub-frame having a weight 1') is added, and the negative or the positive is superimposed on the video image in each of the sub-frames having the weight 1. Furthermore, in the sub-frames illustrated as gray regions in FIG. 25, the video images which follow the relationship shown by the solid line in FIG. 17 are displayed through normal processing. The same applies to the cases where c=2 and where c=3. Furthermore, where c=3, as illustrated in (c) of FIG. 25, the negative and the positive are displayed in the sub-frame having the weight 1 and the sub-frame having the weight 1', and subsequently in the sub-frame having the weight 2 and the sub-frame having the weight 2', the negative and the positive are displayed. Thus, in the case where the visible light communication images are sequentially displayed in the order: negative, positive, negative, and positive, the reception device will be under more severe restrictions. Therefore, as illustrated in (d) of FIG. 25, the order of the sub-frame having the weight 1' and the sub-frame having the weight 2 may be changed. As a result, the visible light communication images are sequentially displayed in the order: negative, negative, positive, and positive, which allows the restrictions under which the reception device is to be eased. In addition, when R, G, and B are displayed in a time division manner, the tone 3 may be created where c=3. Furthermore, in the case where R, G, and B are divided into cells, the RGB match with the original image is not always obtained, which means that it is desirable that the visible light communication images be continuous across multiple sub-frames. Here, FIG. 26 illustrates an example of generation of the encoded image.

Here, the terms in this embodiment are defined as follows. The encoded image is an image having a stripe patter which represents an array of numerical values obtained by encoding the visible light communication signal. Specifically, the visible light communication signal is coded in a certain way and thereby converted into an array of numerical values of 0 and 1. The numerical values in this array are altered into straight lines of two kinds, bright and dark, each having a certain width, and in the direction perpendicular to the straight lines, these straight lines are arranged in the order of the arrayed numerical values, with the result that a stripe pattern emerges, which is the encoded image.

The tone is an indicator which indicates a luminance level of each of the primary colors for light, such as R, G, and B (which need not be limited to the three primary colors) when one image included in the video signal is represented by a combination of the primary colors. For example, in an image represented by colors each having 8 bits, each of the colors is represented by a combination of tones 0 to 255, and the tone indicates a numerical value having a linear relationship with luminance of each of the primary colors except gamma correction, digital correction, or the like.

The frame is a period of time in which one image included in the video signal is displayed. Since 60 images are displayed per second with a normal video signal, the frame is 1/60 seconds.

The sub-frame is also referred to as a sub-field and is a unit of display sections obtained by dividing one frame for displaying one image included in the video signal. In the case of a liquid-crystal display in which light emission energy per unit of time can be adjusted, an EL device in which the resistance is variable, and the like, it is possible to change luminance by adjusting light emission energy per unit of time instead of dividing a frame into sub-frames, but if this is not sufficient, it is also possible to increase the number of possible luminance levels (the number of outcomes, i.e., the number of tones) obtained as a result of the division into sub-frames. Furthermore, the tone may be represented along with the control on a length of time of light emission within each sub-frame. In the case of a display of a type in which the light emission energy per unit of time cannot be adjusted and moreover, the primary colors are separated in a cell array, that is, a plasma display, an EL device in which the resistance is fixed, and so on, the tone is represented only by adjusting the length of time of light emission. However, basically, weighted sub-frames are created, the ON state or OFF state is maintained for the entire period of each of the sub-frames, and the total weights of the sub-frames in the ON state represent a tone. In the minimum case, for example, in the case of 8 bits, the combination of powers of 2 (n=0 to 7) means that numerical values 0 to 255 can be represented without redundancy. However, on an actual display, video having a tone which repeatedly changes between tone 127 and tone 128, for example, may show different pseudo video due to the structure of the video along with movement of human eyes; therefore, redundancy is often given on purpose to take a measure to avoid such changes caused by an extreme sub-frame combination.

In the case of a display apparatus of a type in which the light emission energy per unit of time cannot be adjusted and moreover, the primary colors etc., are separated in time series, that is, a projector using the DMD, a display using the MEMS, and so on, the tone is represented only by adjusting the length of time of light emission, but since the operation of the DMD, MEMS, and so on is so fast that a two-dimensional function of writing and saving driving data is not needed, a method of controlling luminance for light emission is adopted in which the frame is divided into sub-frames to perform PWN control (that is, to control the period of the ON state) within each of the sub-frames. However, since the primary colors such as R, G, and B, etc., are separated in time series, one primary color per frame gives a strange impression (such as pseudo video outlines) to human eye when the light emission involves different gravity centers, for example; therefore, the frame is relatively finely divided into sub-frames, and the PWM drive is effected in each of the sub-frames. There has also been implementation of measures against the pseudo video outlines and so on, in which redundancy is used.

The tone of the encoded image is defined as follows. Specifically, the encoded signal is based on the premise that two or more reversed videos are combined and the combination is represented in the same color (the same primary color components with the same brightness) across the entirety. On such a premise, the tone in which the same luminance as the luminance of each of the primary colors in the resultant image in the same color across the entirety is output when the video signal is output is defined as the tone of the encoded signal. For example, in the case of two complete reversed images in one set, there are bright and dark parts, and the tone in which luminance equivalent to the luminance of the bright part is represented is the tone of the encoded image.

It is to be noted that the tone c is represented as an integer in the above-described example, but may be a decimal. For example, in the case of obtaining c=0.67, setting c=1, c=1, and c=0 for the three consecutive frames makes it possible to obtain c=6.7 as a whole of the three frames. In other words, the error diffusion allows the tone c to be treated as a decimal.

(Aspect Unique to Projector Including DLP)
(Correction Based on Focal Distance)

The following describes about how to deal with the case where the distance between the projector and the projection screen is changed to change the field of view or where the distance needs to be changed upon use due to the environment in the installation location or the like cause.

Figure 27:
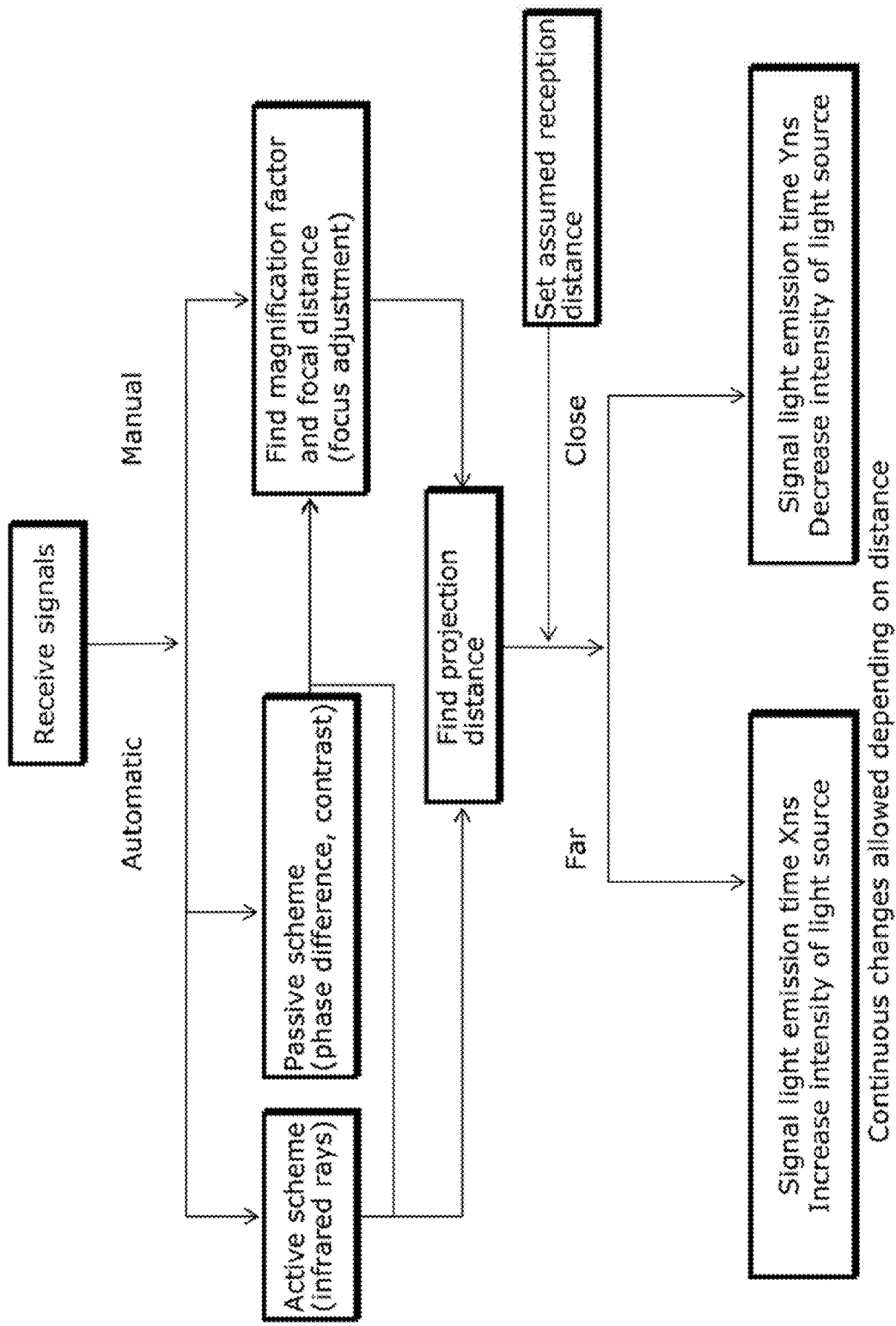
FIG. 27 is a flowchart illustrating an example of a focal distance adjustment/interlock operation in a projector.

In order to change the distance when projecting an image, it is necessary to adjust the focal point of the projector when projecting an image on the projection screen. The adjustment of the focal point in this case includes both an automatic focal point and a manual focal point as illustrated in FIG. 27. In the automatic case, information on lens shape combinations for focusing remains within the projector. In the manual case, a user moves the position of the focal point back and forth by using a remote controller or the like while observing the projection screen, and stops the operation at a position where the image comes into focus, thereby bringing the image into focus. Thus, the information with which the distance between the projector and the projection screen can be calculated remains in the main body of the projector, and from this information, the distance between the projector and the projection screen is calculated.

In this case, together with the focal distance, the field of view is inversely proportional to the distance as properties of the projector. Although the luminance on the projection screen depends on the material of the projection screen, the luminance decreases in inverse proportion to the square of the distance at least on the same projection screen. Meanwhile, upon capturing such an image with the receiver, the receiver may be far away in distance from the projection screen, but, in the image, the horizontal axis is the time axis, meaning that the same driving operation results in the same or like image. However, the captured image has brightness which varies depending on luminance on the projection screen from which the image is captured, meaning that when the projector and the projection screen are close, the projection screen is bright and the encoded signal from the captured image has a relatively high contrast ratio, which is good as a reception environment. On the other hand, in a greater distance, the projection screen is darker, with the result that the encoded signal from the captured image will have lower contrast. Furthermore, generally speaking, when the projector and the projection screen are away from each other, the field of view is large, with the result that it is probably often the case that a viewer tends to watch projected video from a relatively distant position accordingly, and the field of view upon capturing the encoded image therefore does not change significantly. Consequently, in order to improve the reception performance of the receiver, the encoded image needs to have higher contrast.

Figure 28:
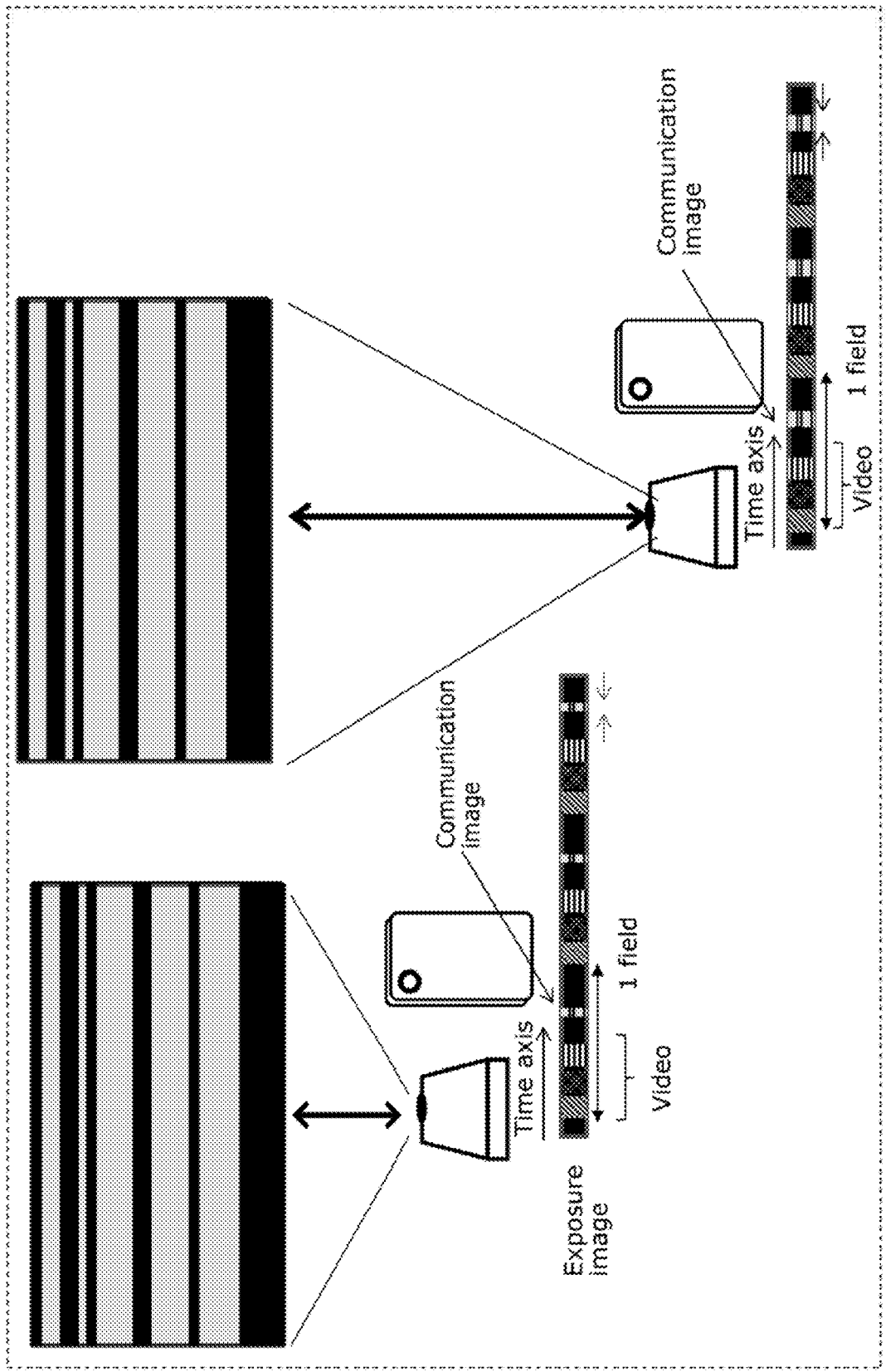
FIG. 28 schematically illustrates a case where the adjustment is performed according to a focal distance.

A specific approach is described with reference to FIG. 28. The easiest approach to increase the contrast is to increase beams of light from the projector which projects images, that is, increase the luminance of the light source, or increase the tone, or combine these, to take measures to keep the illuminance of the projection screen from significantly decreasing. Another approach is to increase the length of time for which the encoded image is projected so that the receiver can capture a larger amount of the encoded signal in the exposure image, meaning that it can be expected that this will be effective in improving the S/N ratio. As illustrated in FIG. 27, associating the distance between the projector and the projection screen with the focal distance in advance as an indicator for these operations makes it possible to maintain the reception performance in a focusing operation. Furthermore, since the contrast is greatly influenced by external light, the above-described adjustment based on environmental illuminance may be combined in the association to allow automatic control in the main body of the projector so that appropriate projection conditions are set.

Although the above assumed that a viewer tends to adjust the distance according to the field of view for video projected, there are cases where a viewer watches the projected video, focusing on a particular position such as signage, instead of viewing the whole of the projected video. When these cases are taken into consideration, it is necessary to consider that viewers in various distances will capture the encoded image. In the case where the projection screen is far away as in FIG. 29, assuming that a viewer in a long distance will look at the entire image and moreover assuming that the viewer will be likely to gaze toward the center thereof, it is desired that the entire data of one block be included around the center. Accordingly, in the above-described case where more than one data block is repeatedly displayed on one screen, the number of repetitions is desirably one or an odd number. Furthermore, in the case where the encoded image is placed by positioning the center thereof at the center around which a region of no larger than one block remains, the remaining part may be of a single color of gray having corresponding luminance or alternatively, the pitch of the data may be changed to reduce the region for one block in the communication data. In this case, the data blocks may be the same or different. Furthermore, it may be that a relatively large encoded image for one block is placed at the center while the same data in reduced size or different data or a single color with corresponding luminance and chromaticity is displayed for the remaining part. It may also be that the projector presumes the situation from the focal distance and determines an operation to perform.

On the receiver side, in the case where a smartphone is used as the receiver, for example, starting an app on the smartphone causes the imaging unit to be activated and perform the focusing operation as illustrated in the flowchart of FIG. 30. By doing so, the receiver, i.e., the smartphone, recognizes a distance between the imaging unit and the projection screen, and may adopt a method of setting, in the projector, the size and illuminance with which the signal is easy for the receiver to receive, using Wifi or the like radio signals, and thereby receiving an image.

(Correction Depending on Projection Screen: Projection Mapping)

In recent years, there are cases where a technique called projection mapping is used in which an image is displayed stereoscopically using, instead of a screen, a three-dimensional object, such as a building, which has irregularities, colors, etc., other than a screen which is flat and made of a material suited to image projection, for example. This is a technique in which the shape, color, reflectance, etc., of the projection screen are obtained in advance as prepared information and then the video signal for each projection part is corrected based on a corresponding piece of the various information so that people who look at the projected image can recognize the projected image as a natural image and that the image can be projected as an image which provides the stereoscopic effect. Furthermore, a method is devised and implemented in which, when an image is projected on a moving object such as a person and a device, an image of the target on which an image is to be projected is captured, and according to its movement, the image to be projected is corrected and the corrected image is displayed, for example. Also in such a case, the following measure or the like makes it possible to transmit the visible light communication signal which can be received with a high probability.

When the image is corrected according to movement of the target stored in advance or movement of the target the image of which has been captured, details of such correction are used to correct the encoded image in the same or like manner as with the projection image, and the encoded image thus corrected is displayed so that the receiver can capture a linear signal as a linear form. Furthermore, through comparison between the original projection image signal and the corrected signal, a part with relatively small changes can be recognized as the projection screen having less distortion including being almost flat; therefore, the encoded image can be positioned on and around this part. In this case, the encoded signal is not output to a part with heavy distortion, that is, a part corresponding to the signal that largely changes by the correction so that a restraining effect on a reception error, erroneous recognition, etc., can be expected. It is to be noted that the encoded image may be created such that the encoded signal that is output to the part with less distortion is present only on the corresponding part and at least the whole of one block of the encoded signal is included. Furthermore, as a result of creating the encoded image which has only one block corresponding to the part with less distortion, the number of pixels per one signal unit on the receiver can increase; therefore, an error reduction effect can be expected.

Furthermore, in the case where the projection video can be viewed from various directions, it is conceivable that the encoded image after the correction may be not the one with less distortion depending on the reception direction. In such a case, in order that the visible light communication signal can be received at various positions from which the video can be viewed, it may be that the encoded image is corrected to create a certain number of corrected images so that they can easily be received at various locations, that is, images with less distortion, close to the original encoded images, can be captured at various locations, and they are output in time sequence or at random repeatedly or for a certain period of time. At this time, the position at which the reception is easiest can be changed according to the video content. Furthermore, it may be that the position of the projection image to be captured for the reception is different depending on the reception position; a plurality of the encoded images at a certain point in time may be mixed to appear in different projection locations. At this time, the encoded images do not always need to be output at the same time, and it may be that time in one frame is sectioned so that the same or different encoded signals are displayed at a short time interval.

(Signal Output from Two Projectors in Combination)

In the case of a projector, a plurality of projectors, etc., may be used to create one projection image. This includes projecting a large image or an image having very high luminance, that is, a case where tubular lamps for three primary colors of R, G, and B are driven independently with lens systems to create images which are combined into one image on the projection screen. As a specific method, at least one projector displays the projection image, but only during the period of time in which the encoded image is inserted or during this period plus a short period of time before and after this period, displays nothing. At least one of the remaining projectors projects only the encoded signal with its phase in synchronization with other projectors which project the projection images. At this time, these projectors display images in synchronization by allocating time so that the projection video and the encoded image do not overlap. The projector which projects the encoded image may be a plurality of projectors which display the encoded images in the same field of view or display the encoded images in different regions with different fields of view. Furthermore, the encoded image displayed may be different depending on the location. The plurality of projectors may be used as a measure for capturing images from different positions in the above-described case of the application to the projection mapping. The installation locations, the fields of view, the projection directions, etc., of the projectors in this case are not particularly limited as long as the time allocation to the projection video and the encoded image is performed and different encoded images do not overlap temporally or spatially as mentioned above.

(DLP Specific Solution to Problem not Specific to DLP Projector)

The following describes a means for avoiding erroneous recognition upon reception in the case where the video signal indicates video including a stripe pattern or the like video which has a pattern similar to that of the encoded signal image.

Figure 31B:
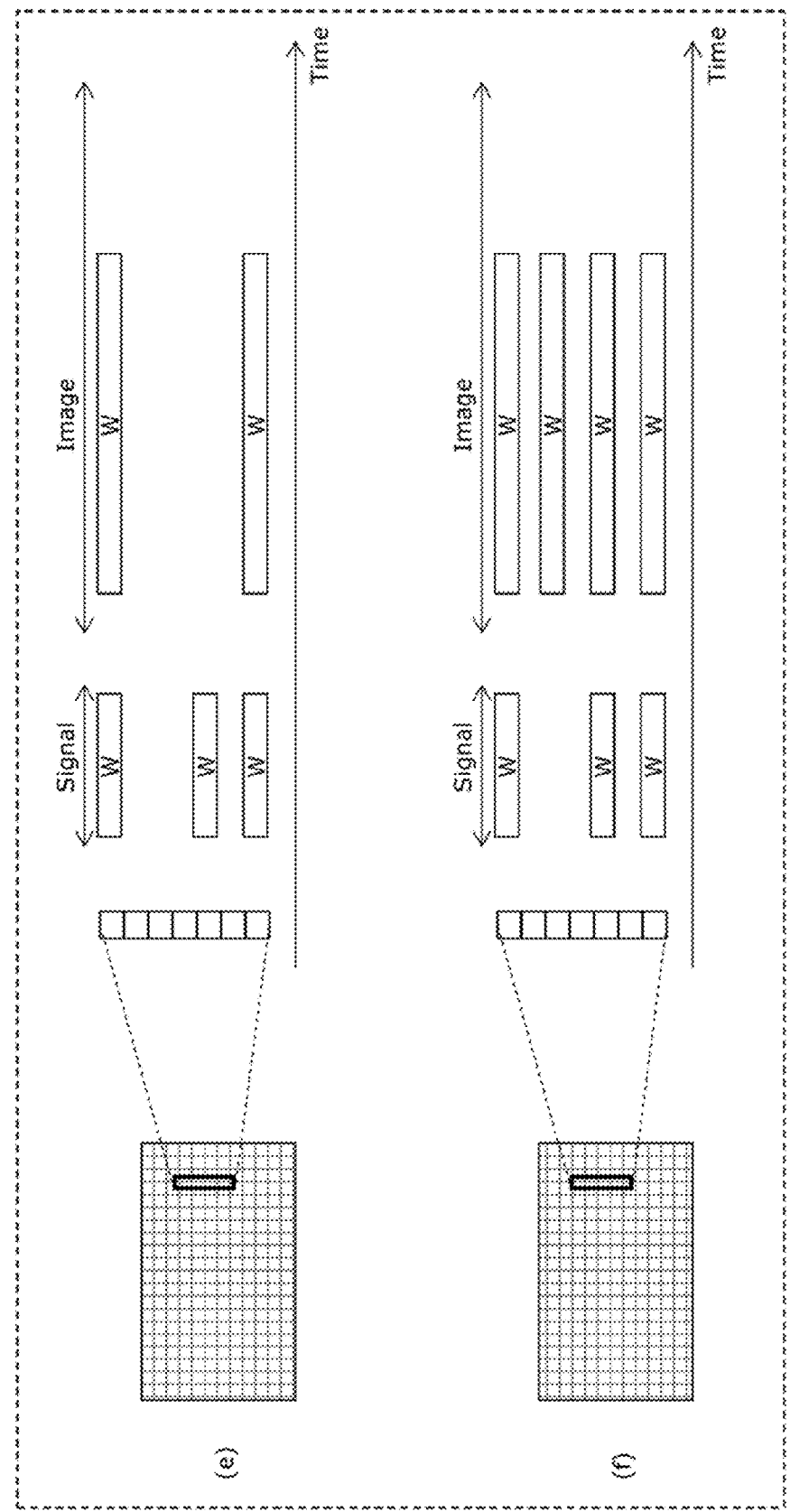
FIG. 31B is a video output view illustrating examples for avoiding erroneous recognition of encoded images and similar video patterns.

FIG. 31A and FIG. 326 each illustrate a solution applied to a projector using the DMD, a display using the MEMS, etc., in the case where the R, G, and B light sources or one light source is divided to represent R, G, B, and W tones in a time division manner.

In (a), an example is illustrated in which erroneous recognition may occur since the video signal and the encoded image are similar in structure. In other words, this is an example where both the video and the encoded image displayed have black and white stripe patterns and are, therefore, inseparable.

In (b), an example is illustrated in which the timing of output of the image of video signal is shifted as a measure. As a result of shifting, depending on the position, the timing of light emission or image projection for part of the video signal which is to be displayed in white, the video captured by the image sensor does not have a stripe pattern at that moment. Therefore, erroneous recognition will not occur, and to human eyes, the video will consequently look the same as the original video. Thus, shifting the timing of light emission or image projection depending on the position within the screen makes it possible to emit light or project an image so that the video having or containing the same stripe pattern as the encoded signal is not captured at any point in time.

In (c), an example is illustrated in which a white color in the video signal is represented through video output using light emission of primary colors such as R, G, and B, instead of using white light emission. In this configuration, instead of creating video of white in the black and white of the video signal by opening the opening or projecting an image at a point in time of light emission of white, the opening is opened or an image is projected at a point in time of light emission of each color of R, G, and B so that the colors of R, G, and B are mixed and thereby show a white color. Also in this case, it is possible to provide a configuration which makes no difference to human eyes although there is no moment that the image containing a white stripe pattern is captured by the image sensor from the video signal. As above, displaying white using other primary colors in the time division manner allows a measure.

In (d), an example is illustrated which is obtained by shifting the timing of each of R, G, and B in the configuration of (c). By shifting, depending on the position within the screen or the like, the timing of light emission of each of the primary colors such as R, G, and B included in the video, it becomes possible to deal with the case where the encoded image has a stripe pattern of colors other than black and white. In this case, the stripe pattern of R, G, or B is captured by the image sensor at no point in time, with the result that erroneous recognition for the encoded image can be avoided.

In each of (e) and (f), an example is illustrated in which part of the video signal is changed as a measure. When the video signal has a pattern which does not appear in the encoded image as a result of changing part of the video signal, erroneous recognition can be prevented. This is achieved by partially omitting the video signal in (e) and adding the video signal in (f).

The measures as above may be taken not only in the case where the stripes in the pattern of the video are parallel to the stripes in the pattern of the encoded signal or are in a similar state, but also against patterns in video with stripes at various angles. This is because, in assumed situations which vary depending on the orientation of the image sensor in the receiver upon capturing an image or depending on whether the receiver is tilted upon capturing an image, for example, there is a possibility that the video signal is erroneously recognized as the encoded signal having different pitches even when the encoded image is in such a range that can be recognized as bands perpendicular to the stripes in the pattern on the exposure lines of the image sensor, that is, in an angle range in which the reception is possible, unless they are exactly perpendicular.

Furthermore, although the method of performing the visible light communication by using the display apparatus has been described in this embodiment, the same or like method can be applied also to a lighting device such as a sign.

On the other hand, also as to the signal having the same tone, changing the combination and the timing sequence of R, G, and B leads to an increase in the number of outcomes by at least the number of bits for the number of color time divisions, resulting in an increase in communication information amount. For example, assume that the same white is output, when outputting three colors of R, G, and B in sequence, there are 3×2×1=6 sequence combinations, meaning that if the transmitter transmits them by control and the receiver receives these combinations separately in time series, it is possible to communicate six times the amount of information in the case of outputting only W. Thus, the amount of information may be increased by sequences of combinations of the primary colors. It is to be noted that such a method can be implemented not only in the projector or MEMS display of the type in which R, G, B, and W from solid light sources are divided in time series and the length of time in which each light from the light source enters a projection lens system is changed when video is displayed, but also a projector using a color wheel, etc., by the combination with flickering of a light source. In other words, when the measure of turning off the light source in a period of time for which a color other than a color on a predetermined turn in the sequence is displayed and turning on the light source in a period of time for which the color on the predetermined turn is displayed is repeated, it is often the case where the transmission speed per unit of time will decrease, but it is possible to communicate an increased amount of information by identifying the above-described color sequence.

Figure 32:
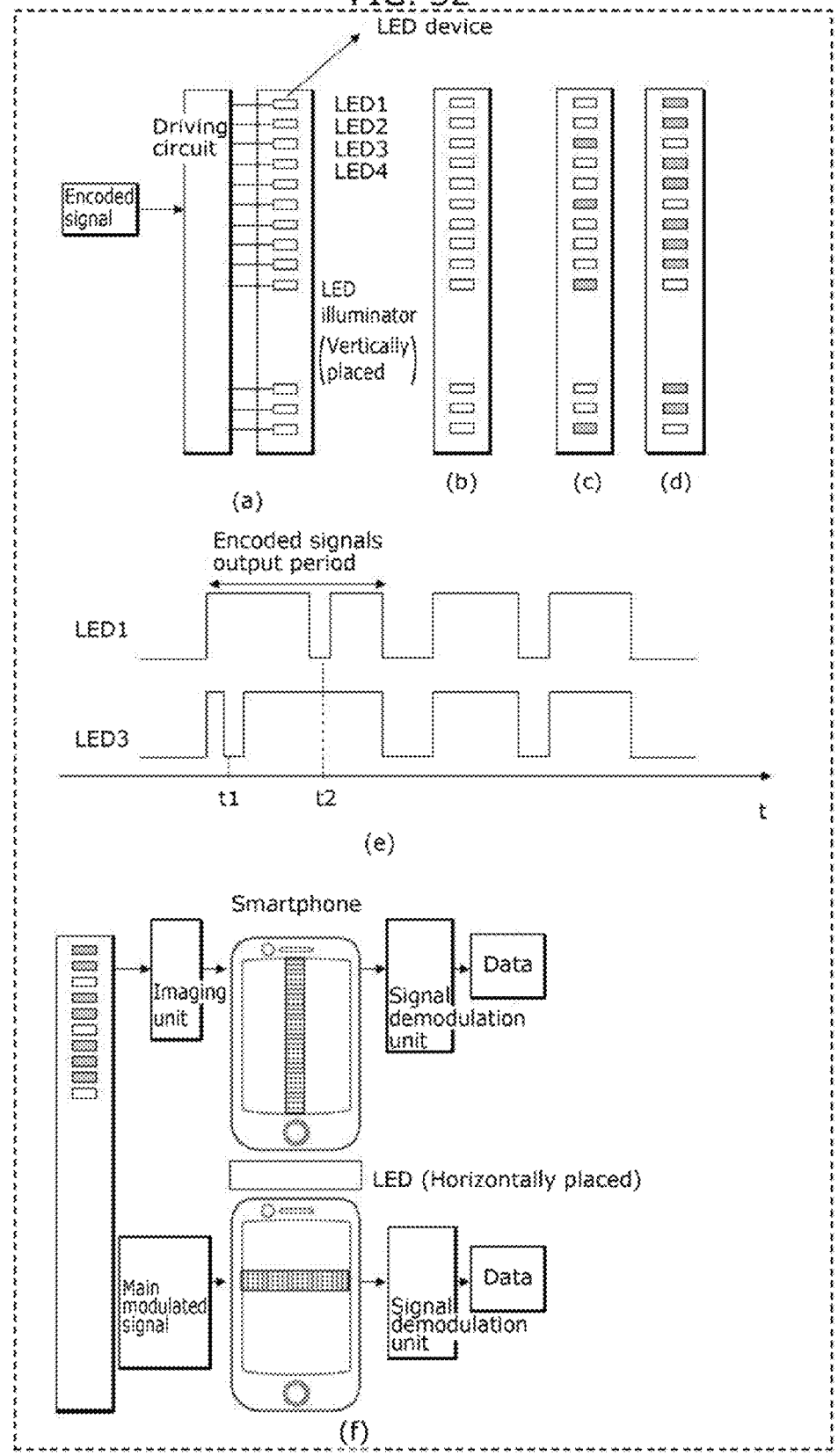
FIG. 32 illustrates an example where the video display method according to Embodiment 1 is applied to a lighting device.

FIG. 32 illustrates an example of a lighting device in which a plurality of LEDs are arranged in the vertical direction and signals thereof.

In (a) of FIG. 32, a lighting device in which a plurality of LEDs are arranged in the vertical direction is illustrated. It is assumed that each of the LED devices corresponds to the minimum unit of horizontal strips obtained by encoding the visible light communication signal, that is, to the encoded ON/OFF signal. In order that the brightness does not change depending on the signal since this is a lighting device, not only the normal signal illustrated in (b) of FIG. 32 but also the encoded signals with ON and OFF reversed illustrated in (c) and (d) of this figure may be transmitted in the period of time for which the visible light communication signal is output.

In (e) of FIG. 32, the control states of LED 1 and LED 3 in (a) of this figure are illustrated. In (e) of FIG. 32, the horizontal axis represents time. As illustrated in (e) of FIG. 32, the signal in (c) of this figure is output at a point in time t1 and the signal in (d) of this figure is output at a point in time t2 within the period of time for which the visible light communication signal is output. In other words, the control is performed so that the LED 3 is OFF at the point in time t1 and the LED 1 is OFF at the point in time t2. By repeating this operation in a predetermined cycle, the lighting device is likewise capable of transmitting the visible light communication signal. It is to be noted that considering flickering in the illumination, the OFF period at t1 and t2 is desirably 0.2 milliseconds or less.

(Encoding Scheme)

Figure 33:
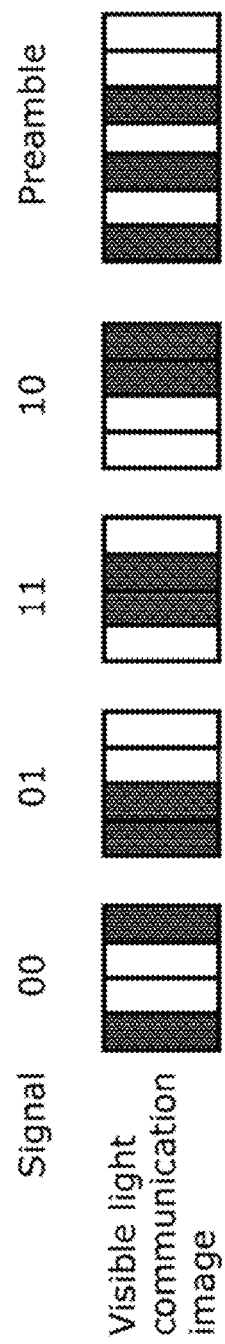
FIG. 33 is a diagram illustrating an encoding scheme.

FIG. 33 is a diagram illustrating an encoding scheme for a visible light communication image.

This encoding scheme has the advantage that flicker is unlikely to be perceived by humans, because black and white are substantially equal in proportion and so the normal phase image and the reverse phase image are substantially equal in average luminance.

(Encoding Scheme Capable of Light Reception Even in the Case of Capturing Image from Diagonal Direction)

Figure 34:
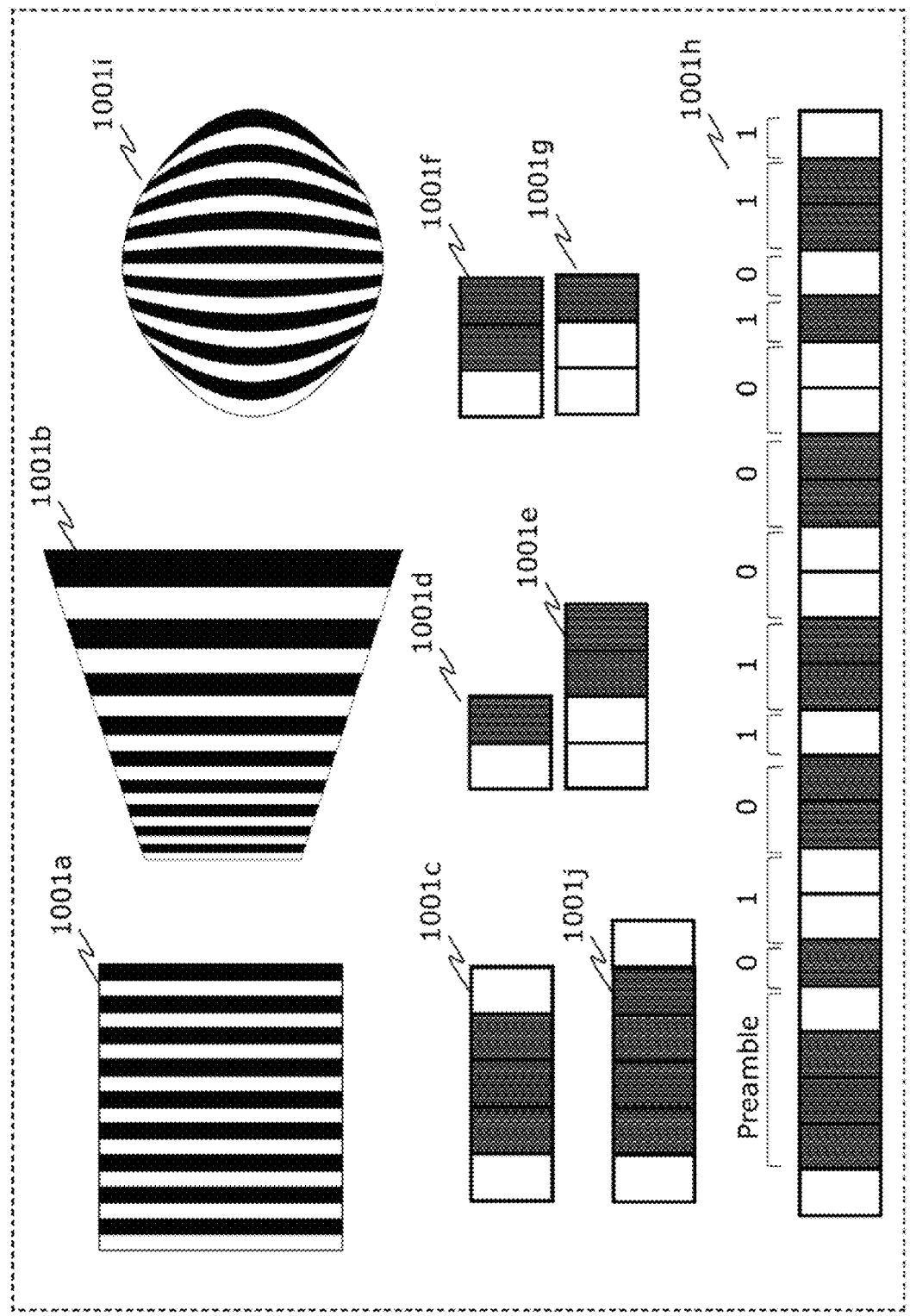
FIG. 34 is a diagram illustrating an encoding scheme that can receive light even in the case of capturing an image in an oblique direction.

FIG. 34 is a diagram illustrating an encoding scheme for a visible light communication image.

An image 1001a is an image displayed with black and white lines of uniform width. In an image 1001b obtained by capturing the image 1001a from a diagonal direction, left lines appear thinner and right lines appear thicker. In an image 1001i obtained by capturing the image 1001a in a manner of projecting the image 1001a on a curved surface, lines that differ in thickness appear.

In view of this, a visible light communication image is generated by the following encoding scheme. A visible light communication image 1001c is made up of a white line, a black line whose thickness is three times that of the white line, and a white line whose thickness is ⅓ that of the black line, from left. A preamble is encoded as such an image in which a line whose thickness is three times that of its left adjacent line is followed by a line whose thickness is ⅓ that of its left adjacent line. As in visible light communication images 1001d and 1001e, a line whose thickness is equal to that of its left adjacent line is encoded as "0". As in visible light communication images 1001f and 1001g, a line whose thickness is twice that of its left adjacent line or ½ that of its left adjacent line is encoded as "1". That is, a line whose thickness is different from that of its left adjacent line is encoded as "1". As an example using this encoding scheme, a signal including "010110001011" following the preamble is expressed by an image such as a visible light communication image 1001h. Though the line whose thickness is equal to that of its left adjacent line is encoded as "0" and the line whose thickness is different from that of its left adjacent line is encoded as "1" in this example, the line whose thickness is equal to that of its left adjacent line may be encoded as "1" and the line whose thickness is different from that of its left adjacent line as "0". Moreover, the reference thickness is not limited to the thickness of the left adjacent line, and may be the thickness of the right adjacent line. In detail, "1" or "0" may be encoded depending on whether the thickness of the line to be encoded is equal to or different from the thickness of its right adjacent line. Thus, a transmitter encodes "0" by setting the line to be encoded to be equal in thickness to the line that is different in color from and adjacent to the line to be encoded, and encodes "1" by setting the line to be encoded to be different in thickness from the line that is different in color from and adjacent to the line to be encoded.

A receiver captures the visible light communication image, and detects the thickness of the white or black line in the captured visible light communication image. The receiver compares the thickness of the line to be decoded, with the thickness of the line that is different in color from and adjacent (left adjacent or right adjacent) to the line to be decoded. The line is decoded as "0" in the case where the thicknesses are equal, and "1" in the case where the thicknesses are different. Alternatively, the line may be decoded as "1" in the case where the thicknesses are equal, and "0" in the case where the thicknesses are different. The receiver lastly decodes the data based on the decoded data sequence of 1 and 0.

This encoding scheme employs the local line thickness relation. Since the thickness ratio between neighboring lines does not change significantly as seen in the images 1001b and 1001i, the visible light communication image generated by this encoding scheme can be properly decoded even in the case of being captured from a diagonal direction or being projected on a curved surface.

This encoding scheme has the advantage that flicker is unlikely to be perceived by humans, because black and white are substantially equal in proportion and so the normal phase image and the reverse phase image are substantially equal in average luminance. This encoding scheme also has the advantage that the visible light communication images of both the normal phase signal and the reverse phase signal are decodable by the same algorithm, because the encoding scheme does not depend on the distinction between black and white.

This encoding scheme further has the advantage that a code can be added easily. As an example, a visible light communication image 1001j is a combination of a line whose thickness is four times that of its left adjacent line and a line whose thickness is ¼ that of its left adjacent line. Like this, many unique patterns such as "five times that of its left adjacent line and ⅕ that of its left adjacent line" and "three times that of its left adjacent line and ⅔ that of its left adjacent line" are available, enabling definition as a signal having a special meaning. For instance, given that one set of data can be expressed by a plurality of visible light communication images, the visible light communication image 1001j may be used as a cancel signal indicating that, since the transmission data is changed, part of the previously received data is no longer valid. Note that the colors are not limited to black and white, and any colors may be used so long as they are different. For instance, complementary colors may be used.

(Encoding Scheme that Differs in Information Amount Depending on Distance)

Figure 35:
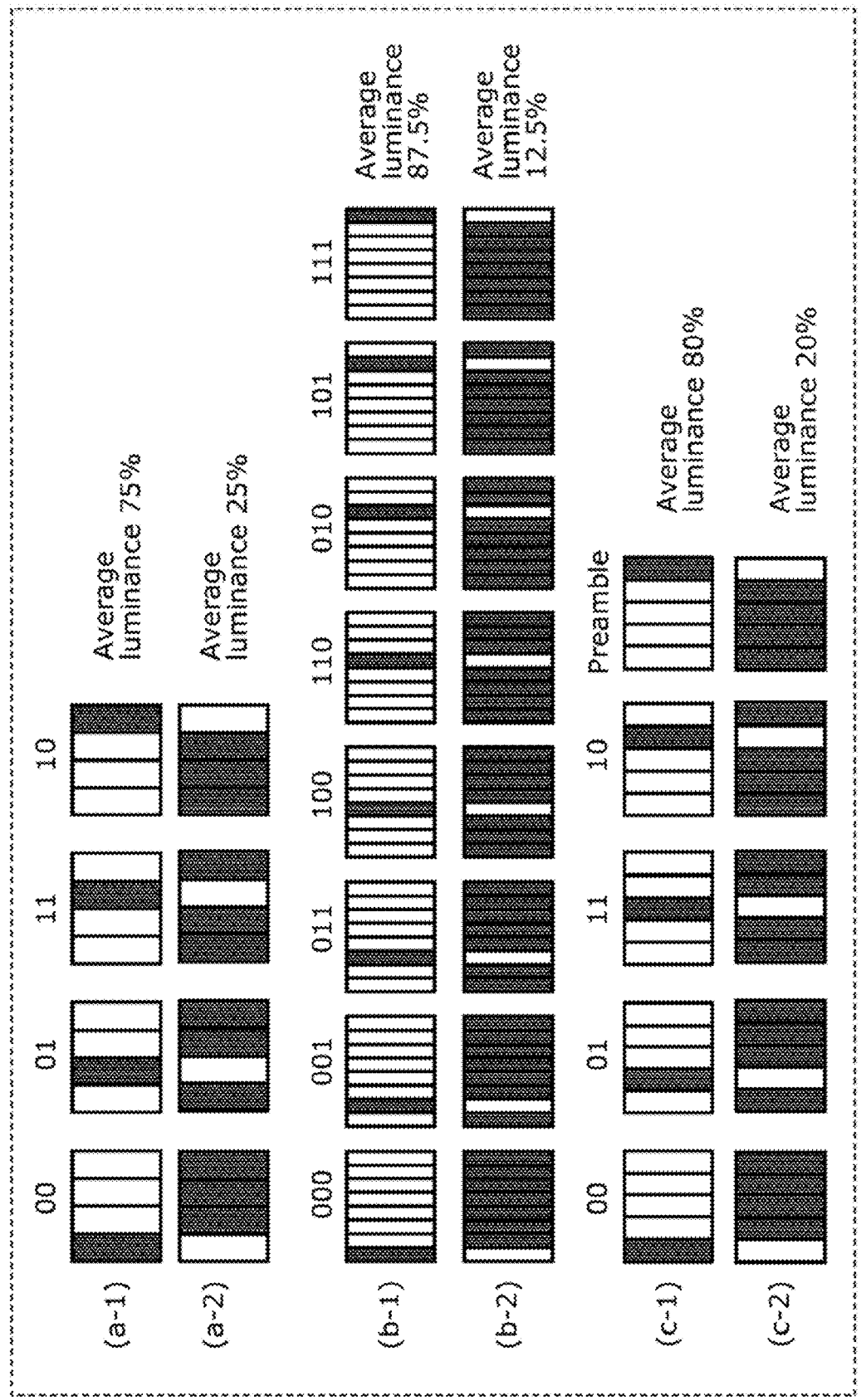
FIG. 35 is a diagram illustrating an encoding scheme that differs in information amount depending on distance.
Figure 36:
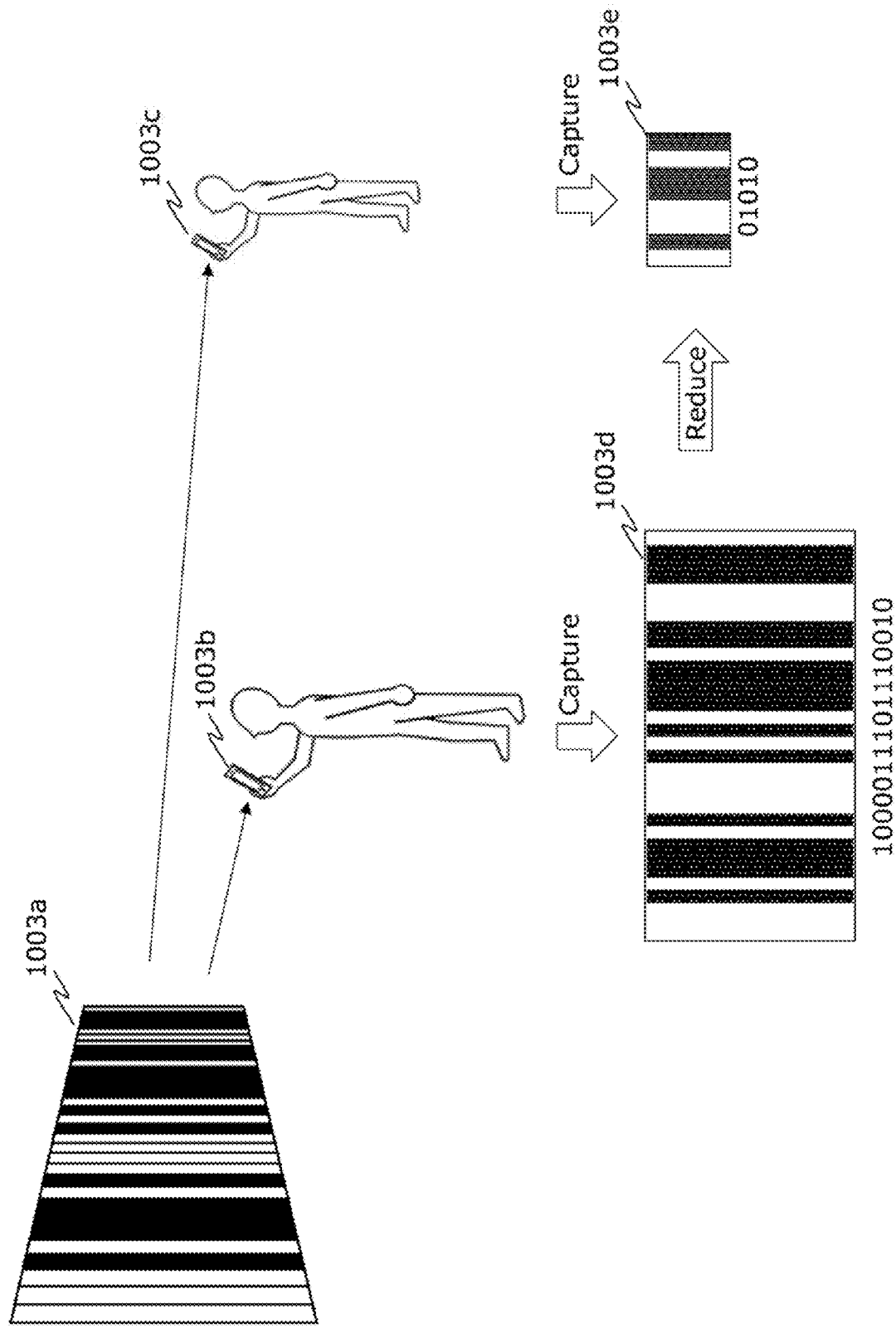
FIG. 36 is a diagram illustrating an encoding scheme that differs in information amount depending on distance.

FIGS. 35 and 36 are diagrams illustrating an encoding scheme for a visible light communication image.

As in (a-1) in FIG. 35, when a 2-bit signal is expressed in a form that one part of an image divided by four is black and the other parts are white, the average luminance of the image is 75%, where white is 100% and black is 0%. As in (a-2) in FIG. 35, when black and white are reversed, the average luminance is 25%.

An image 1003a is a visible light communication image in which the white part of the visible light communication image generated by the encoding scheme in FIG. 34 is expressed by the image in (a-1) in FIG. 35 and the black part is expressed by the image in (a-2) in FIG. 35. This visible light communication image represents signal A encoded by the encoding scheme in FIG. 34 and signal B encoded by (a-1) and (a-2) in FIG. 35. When a nearby receiver 1003b captures the visible light communication image 1003a, a fine image 1003d is obtained and both of signals A and B can be received. When a distant receiver 1003c captures the visible light communication image 1003a, a small image 1003e is obtained. In the image 1003e, the details are not recognizable, and the part corresponding to (a-1) in FIG. 35 is white and the part corresponding to (a-2) in FIG. 35 is black, so that only signal A can be received. Thus, more information can be transmitted when the distance between the visible light communication image and the receiver is shorter. The scheme for encoding signal B may be the combination of (b-1) and (b-2) or the combination of (c-1) and (c-2) in FIG. 35. It is to be noted that three or more signals may be encoded using this scheme recursively.

The use of signals A and B enables basic important information to be expressed by signal A and additional information to be expressed by signal B. In the case where the receiver transmits signals A and B to a server as ID information and the server transmits information corresponding to the ID information to the receiver, the information transmitted from the server may be varied depending on whether or not signal B is present.

Figure 37:
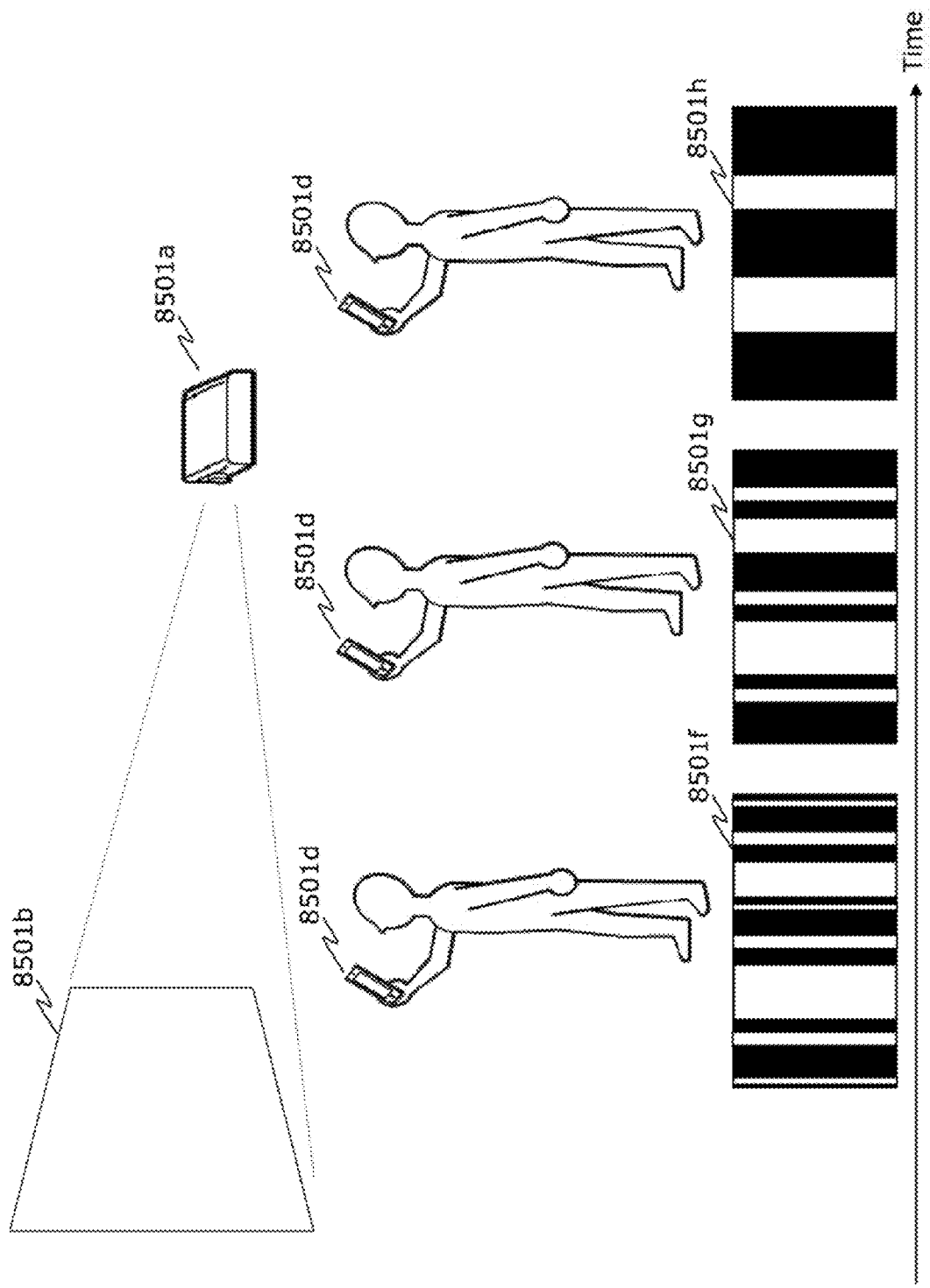
FIG. 37 illustrates an example of displaying a visible light communication image corresponding to the distance.

FIG. 37 illustrates an example in which a transmitter switches between visible light communication images.

A transmitter 8501a displays a visible light communication image 8501b. At this time, the transmitter 8501a displays, as the visible light communication image 8501b, a visible light communication image 8501f containing a large amount of information, for a receiver 8501d that is capturing that visible light communication image 8501b from a location close to the visible light communication image 8501b. Furthermore, the transmitter 8501a displays, as the visible light communication image 8501b, a visible light communication image 8501g containing a less amount of information than the visible light communication image 8501f, for the receiver 8501d that is capturing that visible light communication image 8501b from a location a little away from the visible light communication image 8501b. Furthermore, the transmitter 8501a displays, as the visible light communication image 8501b, a visible light communication image 8501h containing a less amount of information than the visible light communication image 8501g, for the receiver 8501d that is capturing that visible light communication image 8501b from a location far away from the visible light communication image 8501b. Such visible light communication images 8501f, 8501g, and 8501h are displayed continuously or intermittently. Therefore, regardless of the distance from the visible light communication image, the receiver 8501d can capture the visible light communication image and obtain information from that visible light communication image.

Figure 38:
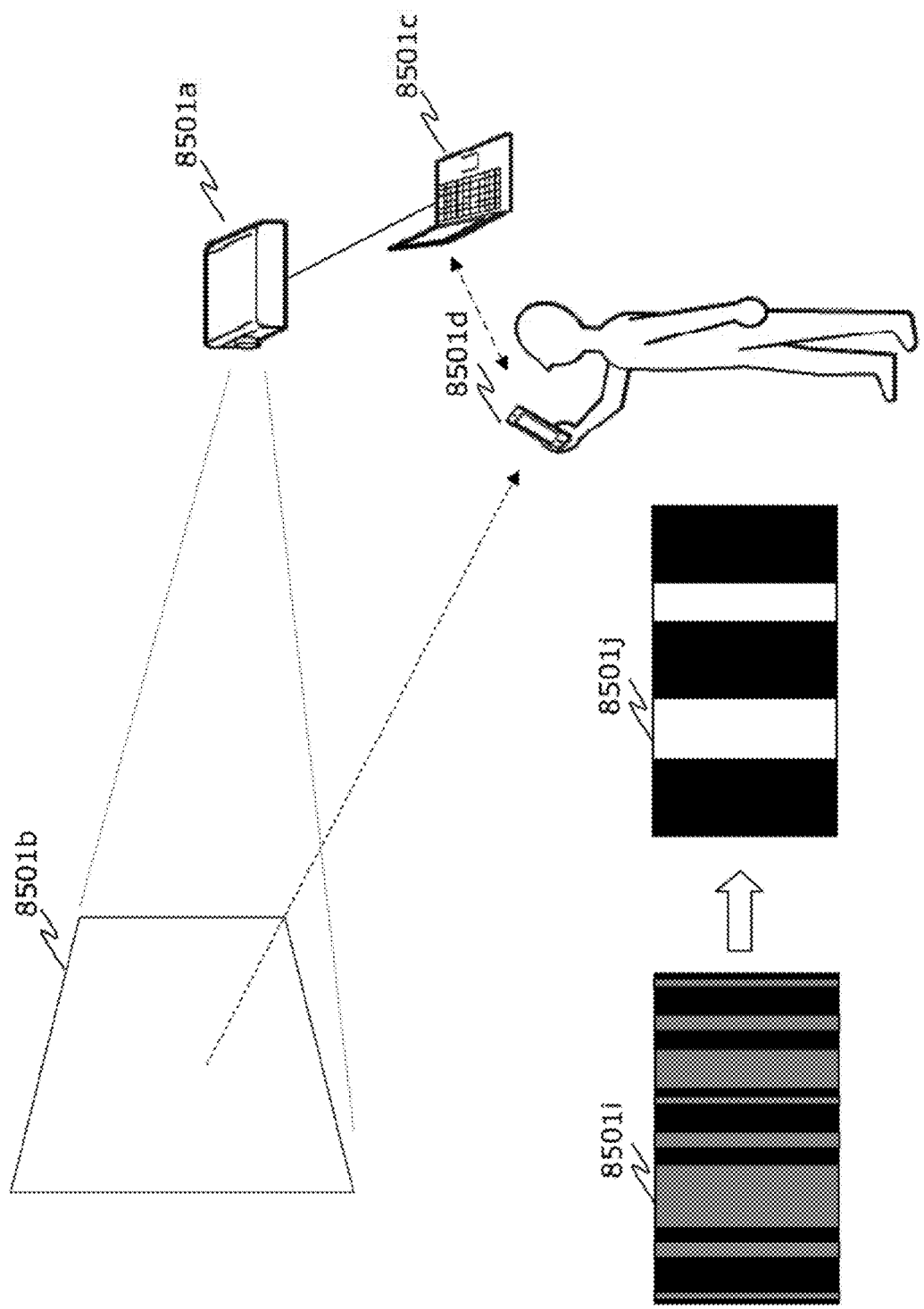
FIG. 38 illustrates an example of switching between visible light communication images according to a result of capturing an image by the reception device.

FIG. 38 illustrates an example in which the visible light communication images can be switched between according to an instruction from the receiver.

The transmitter 8501a receives video data and signal data from a device 8501c and displays the visible light communication image 8501b. The receiver 8501d captures that visible light communication image 8501b. Here, in the case where the visible light communication image 8501*b* contains a large amount of information and is, therefore, represented by a pattern with thin stripes, the receiver 8501*d* may obtain an unclear image 8501*i* through the imaging operation. In this case, the receiver 8501*d* cannot obtain information from that image 8501*i* and therefore instructs the device 8501*c* to switch the visible light communication image 8501*b* to a visible light communication image having a low resolution stripe pattern. The device 8501*c* which has received this instruction transmits other signal data to the transmitter 8501*a*, and the transmitter 8501*a* which has received the other signal data displays a visible light communication image having a low resolution stripe pattern. The receiver 8501*d* captures that visible light communication image, thereby obtaining a clear image 8501*j* and being able to appropriately obtain information from that image 8501*j*.

(Encoding Scheme with Data Division)

Figure 39:
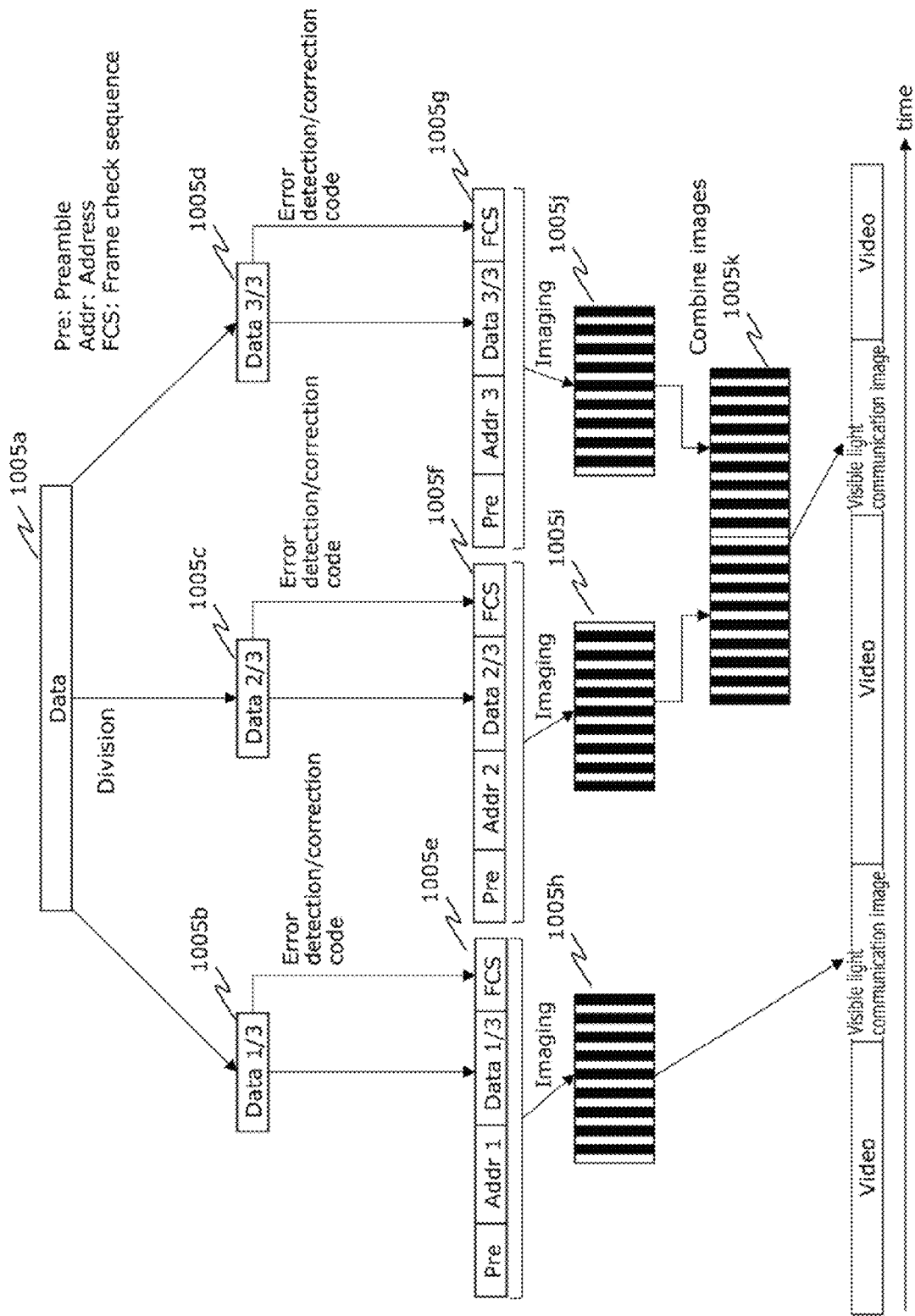
FIG. 39 is a diagram illustrating an encoding scheme that divides data.

FIG. 39 is a diagram illustrating an encoding scheme for a visible light communication image.

A transmission signal 1005*a* is divided into a plurality of data segments 1005*b*, 1005*c*, and 1005*d*. Frame data 1005*e*, 1005*f*, and 1005*g* are generated by adding, to each data segment, an address indicating the position of the data segment, a preamble, an error detection/correction code, a frame type description, and the like. The frame data are encoded to generate visible light communication images 1005*h*, 1005*i*, and 1005*j*, and the visible light communication images 1005*h*, 1005*i*, and 1005*j* are displayed. In the case where the display area is sufficiently large, a visible light communication image 1005*k* obtained by concatenating the plurality of visible light communication images may be displayed.

(Effect of Inserting Reverse Phase Image)

Figure 40:
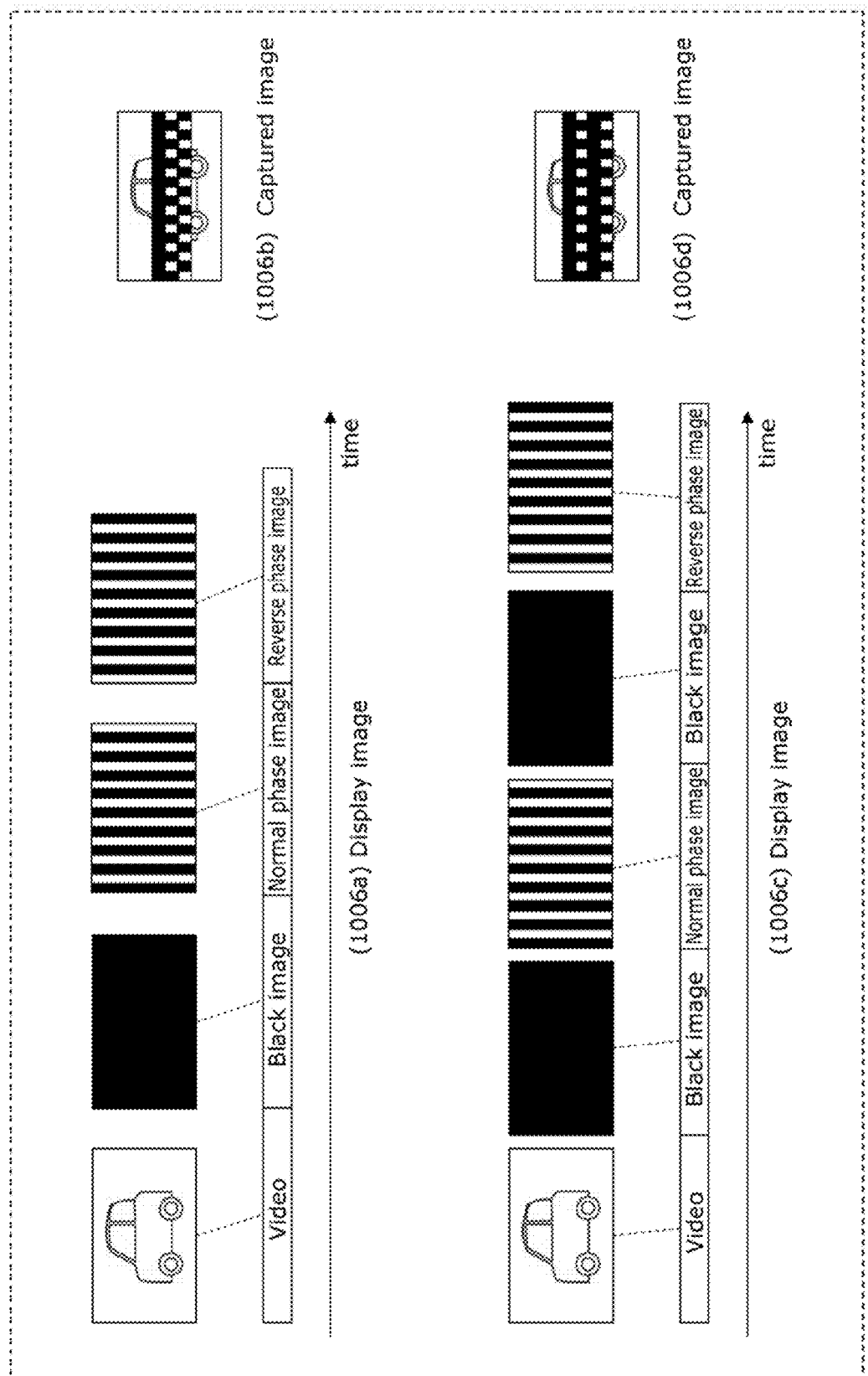
FIG. 40 illustrates time series on which video, visible light communication images, and black images are displayed.
Figure 41:
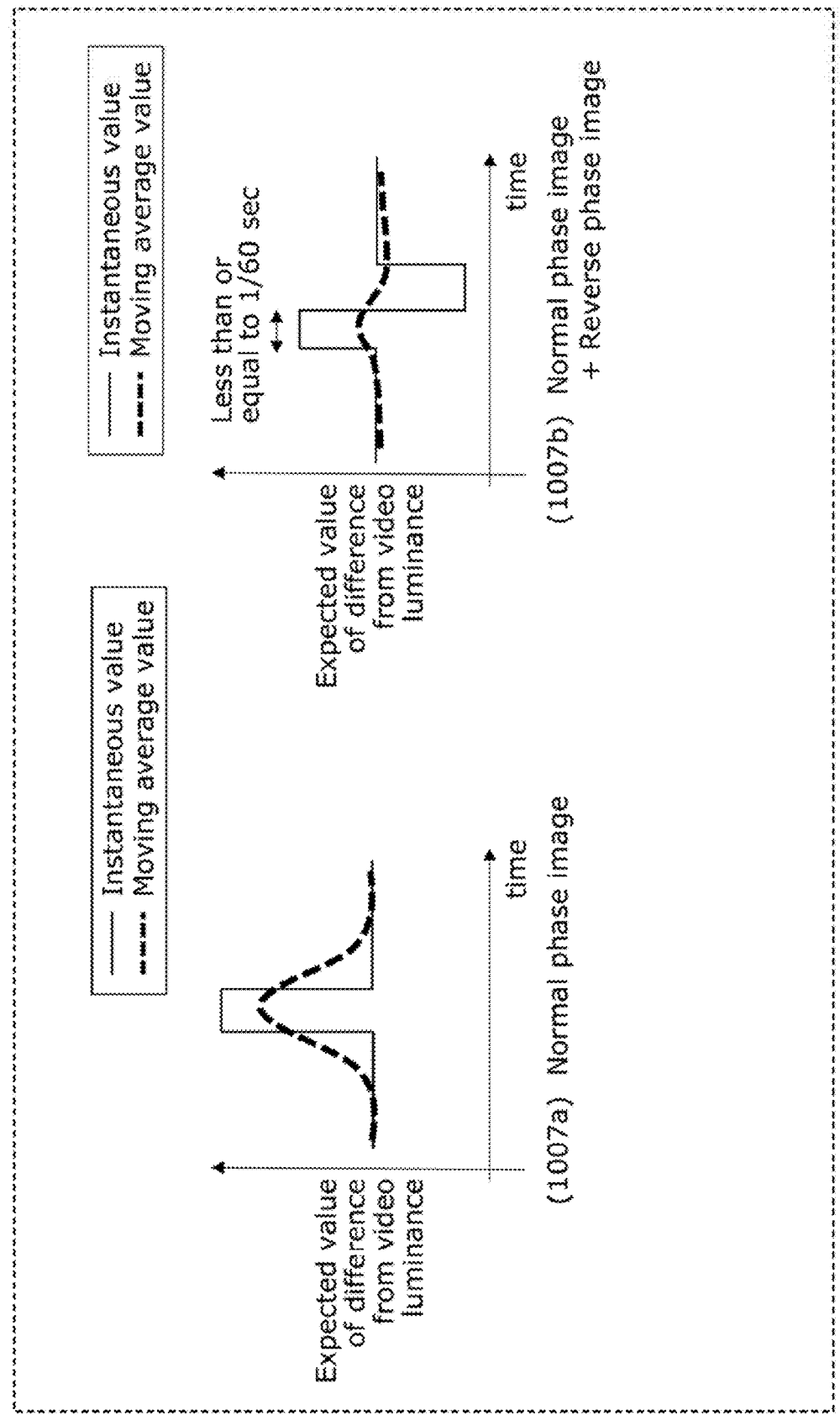
FIG. 41 is a diagram illustrating a reverse phase image insertion effect.

FIGS. 40 and 41 are diagrams illustrating an encoding scheme for a visible light communication image.

As in (1006*a*) in FIG. 40, a transmitter inserts a black image between video and a visible light communication image (normal phase image). An image obtained by capturing this by a receiver is as illustrated in (1006*b*) in FIG. 40. Since it is easy to search for a part where a simultaneously exposed pixel line is all black, the receiver can easily specify the position where the visible light communication image is captured, as the pixel position exposed after the lapse of a predetermined length of time since such exposure time. It is to be noted that video may be displayed between the black image and the visible light communication image.

As in (1006*a*) in FIG. 40, after displaying a visible light communication image (normal phase image), the transmitter displays a visible light communication image of reverse phase with black and white being inverted. The receiver calculates the difference in pixel value between the normal phase image and the reverse phase image, thus attaining an SN ratio that is twice as compared with the case of using only the normal phase image. Conversely, when ensuring the same SN ratio, the luminance difference between black and white can be reduced to half, with it being possible to suppress flicker perceived by humans. As in (1007*a*) and (1007*b*) in FIG. 41, the moving average of the expected value of the luminance difference between the video and the visible light communication image is canceled out by the normal phase image and the reverse phase image. Since the temporal resolution of human vision is about 1/60 second, by setting the time for displaying the visible light communication image to less than or equal to this, it is possible to make humans perceive as if the visible light communication image is not being displayed.

As in (1006*c*) in FIG. 40, the transmitter may further insert a black image between the normal phase image and the reverse phase image. In this case, an image illustrated in (1006*d*) in FIG. 40 is obtained as a result of image capture by the receiver. In the image illustrated in (1006*b*) in FIG. 40, the pattern of the normal phase image and the pattern of the reverse phase image are adjacent to each other, which might cause averaging of pixel values at the boundary. In the image illustrated in (1006*d*) in FIG. 40, no such problem occurs.

(Superresolution)

Figure 42:
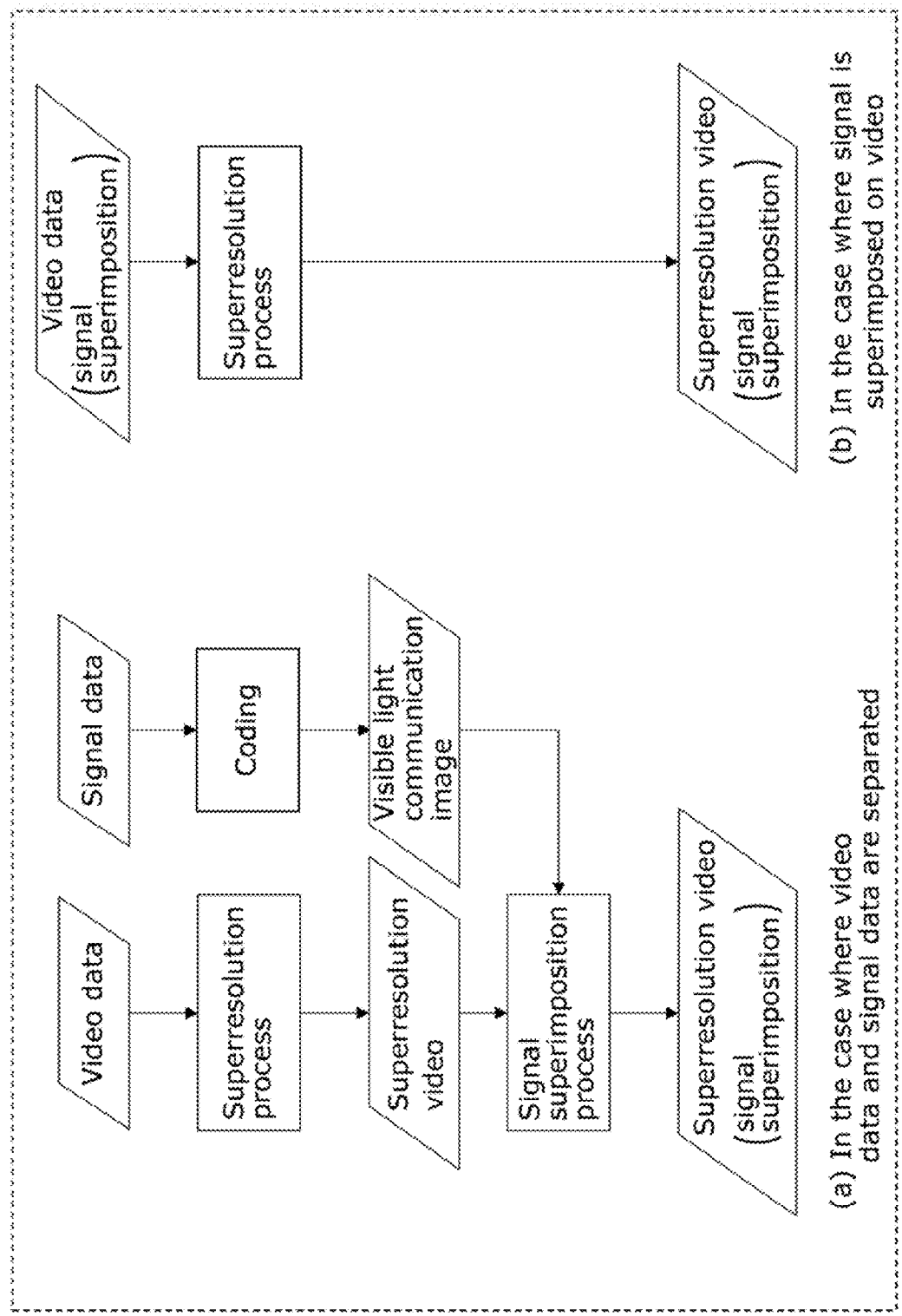
FIG. 42 is a diagram illustrating a superresolution process.

FIG. 42 is a diagram illustrating an encoding scheme for a visible light communication image.

In (a) in FIG. 42, in the case where video data and signal data transmitted by visible light communication are separated, a superresolution process is performed on the video data, and the visible light communication image is superimposed on the obtained superresolution image. That is, the superresolution process is not performed on the visible light communication image. In (b) in FIG. 42, in the case where a visible light communication image is already superimposed on video data, the superresolution process is performed so that (1) the edges (parts indicating data by the difference between colors such as black and white) of the visible light communication image are maintained sharp and (2) the average image of the normal phase image and the reverse phase image of the visible light communication image is of uniform luminance. By changing the process for the visible light communication image depending on whether or not the visible light communication image is superimposed on the video data in this way, visible light communication can be performed more appropriately (with reduced error rate).

(Display of Support for Visible Light Communication)

Figure 43:
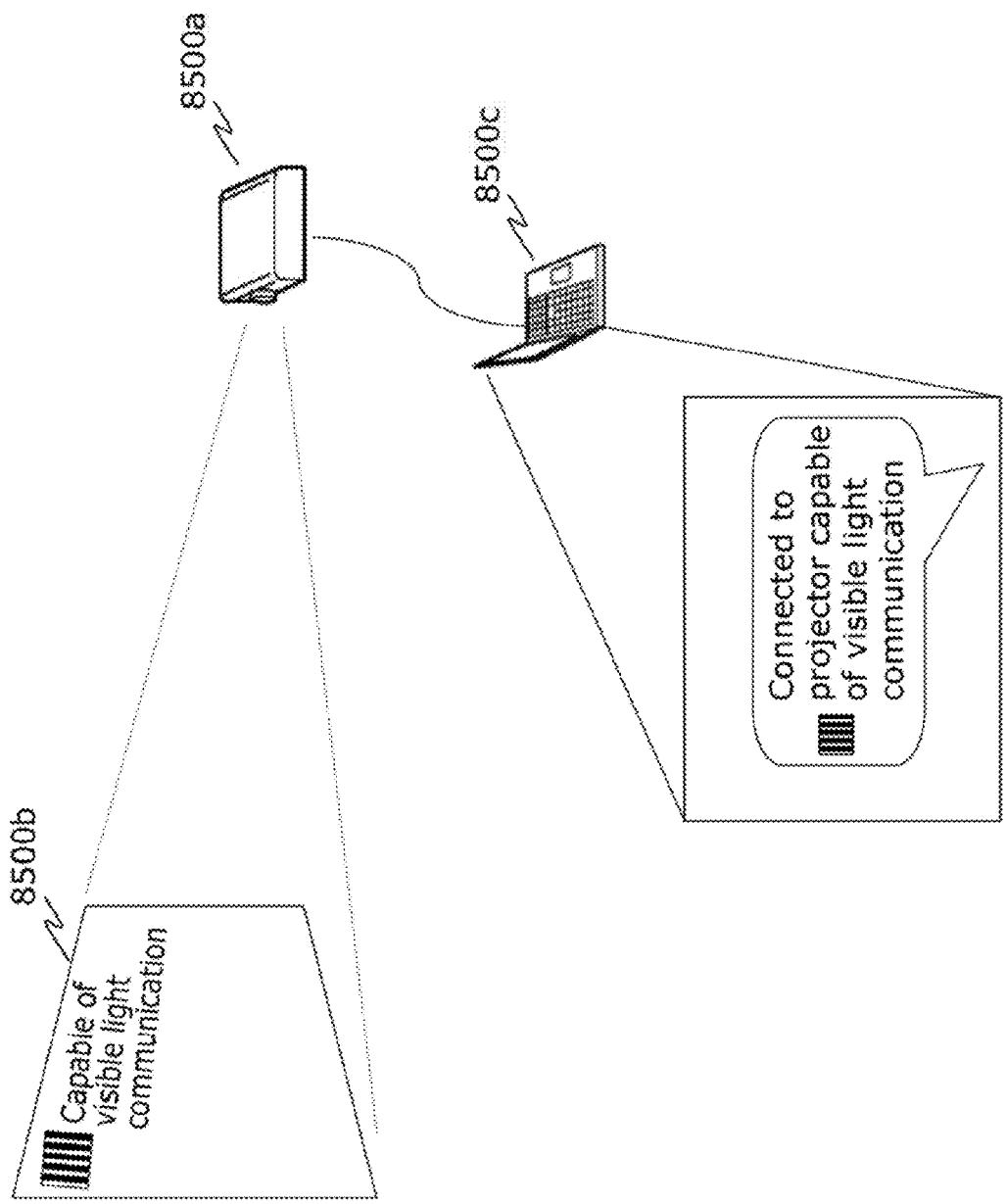
FIG. 43 is a diagram illustrating a display indicating visible light communication capability.

FIG. 43 is a diagram illustrating operation of a transmitter.

A transmitter 8500*a* displays information indicating that the transmitter 8500*a* is capable of visible light communication, by superimposing the information on a projected image. The information is displayed, for example, only for a predetermined time after the transmitter 8500*a* is activated.

The transmitter 8500*a* transmits the information indicating that the transmitter 8500*a* is capable of visible light communication, to a connected device 8500*c*. The device 8500*c* displays that the transmitter 8500*a* is capable of visible light communication. As an example, the device 8500*c* displays that the transmitter 8500*a* is capable of visible light communication, on a display of the device 8500*c*. In the case where the connected transmitter 8500*a* is capable of visible light communication, the device 8500*c* transmits visible light communication data to the transmitter 8500*a*. The information that the transmitter 8500*a* is capable of visible light communication may be displayed when the device 8500*c* is connected to the transmitter 8500*a* or when the visible light communication data is transmitted from the device 8500*c* to the transmitter 8500*a*. In the case of displaying the information when the visible light communication data is transmitted from the device 8500*c*, the transmitter 8500*a* may obtain identification information indicating visible light communication from the data and, if the identification information indicates that the visible light communication data is included in the data, display that the transmitter 8500*a* is capable of visible light communication.

By displaying that the transmitter (lighting, projector, video display device, etc.) is capable of visible light communication or whether or not the transmitter is capable of visible light communication on the projection screen 8500*b* or the display of the connected device 8500*c* in this way, the user can easily recognize whether or not the transmitter is capable of visible light communication. This prevents a trouble of visible light communication even though visible light communication data is transmitted from the device to the transmitter.

(Information Obtainment Using Visible Light Communication Signal)

Figure 44:
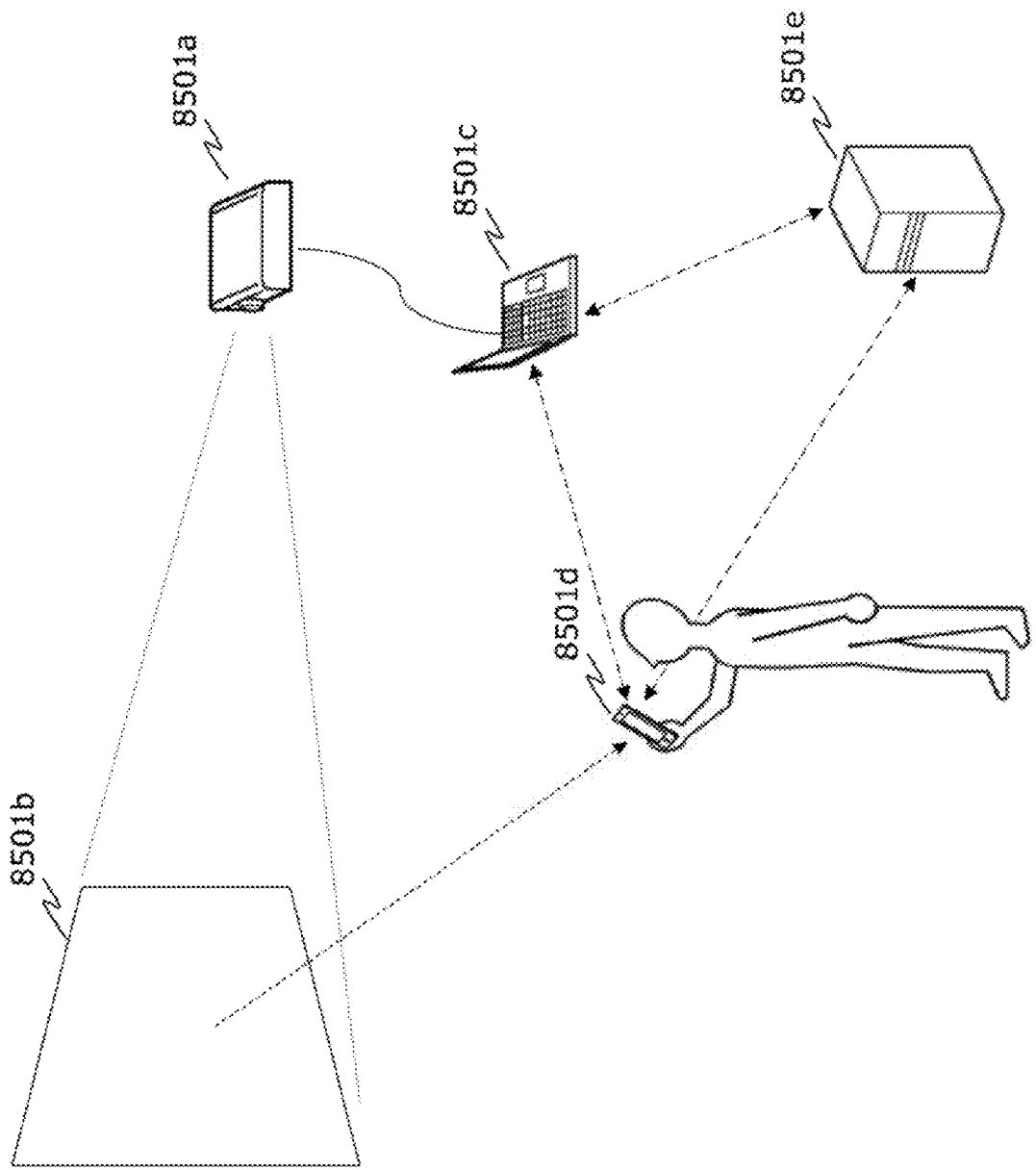
FIG. 44 is a diagram illustrating information obtainment using a visible light communication signal.

FIG. 44 is a diagram illustrating an example of application of visible light communication.

A transmitter 8501a receives video data and signal data from a device 8501c, and displays a visible light communication image 8501b. A receiver 8501d captures the visible light communication image 8501b, to receive a signal included in the visible light communication image. The receiver 8501d communicates with the device 8501c based on information (address, password, etc.) included in the received signal, and receives the video displayed by the transmitter 8501a and its ancillary information (video ID, URL, password, SSID, translation data, audio data, hash tag, product information, purchase information, coupon, availability information, etc.). The device 8501c may transmit, to a server 8501e, the status of transmission to the transmitter 8501a so that the receiver 8501d may obtain the information from the server 8501e.

(Data Format)

Figure 45:
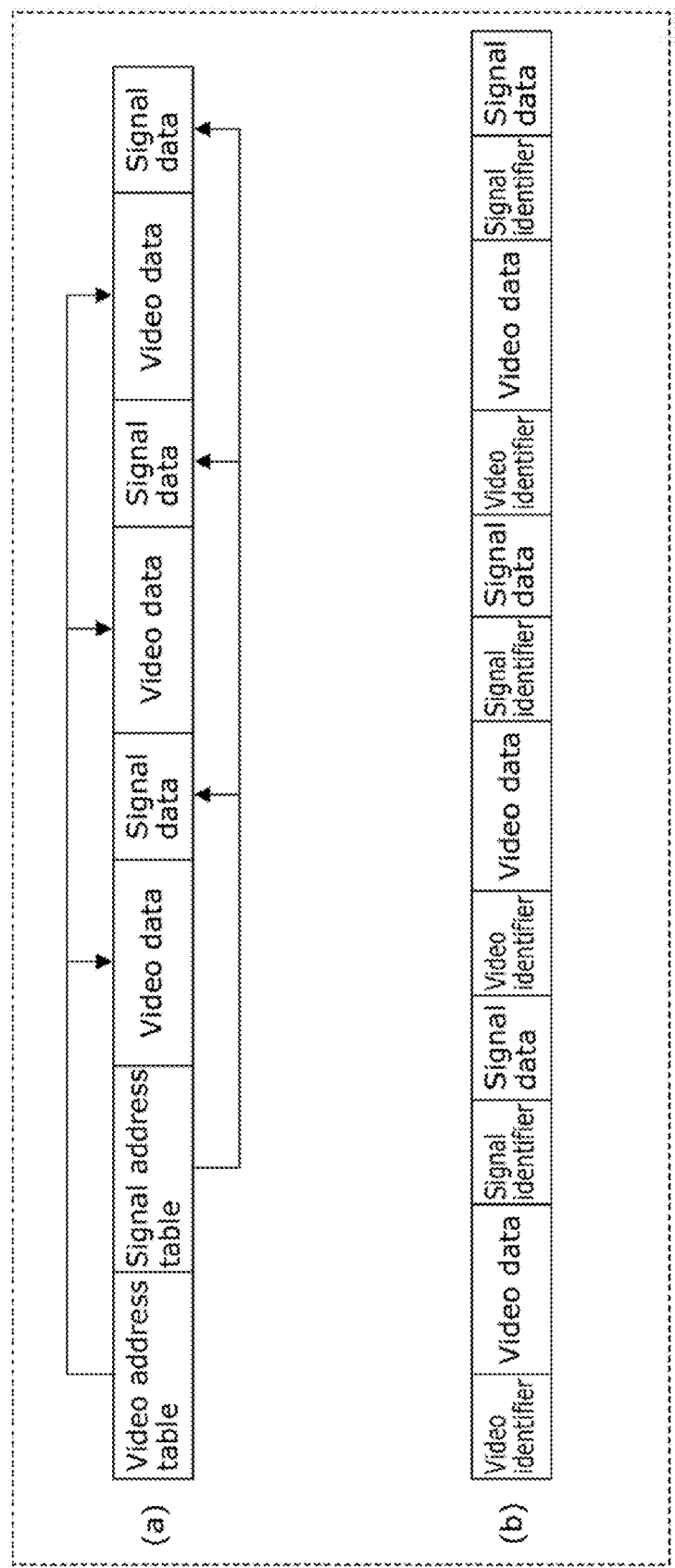
FIG. 45 illustrates a data format obtained by adding signal data for visible light communication to video data.

FIG. 45 is a diagram illustrating a format of visible light communication data.

Data illustrated in (a) in FIG. 45 has a video address table indicating the position of video data in a storage area, and a position address table indicating the position of signal data transmitted by visible light communication. A video display device not capable of visible light communication refers only to the video address table, and therefore video display is not affected even when the signal address table and signal data are included in the input. Backward compatibility with the video display device not capable of visible light communication is maintained in this manner.

In a data format illustrated in (b) in FIG. 45, an identifier indicating that data which follows is video data is positioned before video data, and an identifier indicating that data which follows is signal data is positioned before signal data. Since the identifier is inserted in the data only when there is video data or signal data, the total amount of code can be reduced. Alternatively, identification information indicating whether data is video data or signal data may be provided. Moreover, program information may include identification information indicating whether or not the program information includes visible light communication data. The inclusion of the identification information indicating whether or not the program information includes visible light communication data allows the user to determine, upon program search, whether or not visible light communication is possible. The program information may include an identifier indicating that the program information includes visible light communication data. Furthermore, adding an identifier or identification information on a data basis makes it possible to switch the luminance or switch the process such as superresolution on a data basis, which contributes to a lower error rate in visible light communication.

The data format illustrated in (a) in FIG. 45 is suitable for a situation of reading data from a storage medium such a an optical disc, and the data format illustrated in (b) in FIG. 45 is suitable for streaming data such as television broadcasting. Note that the signal data includes information such as the signal value transmitted by visible light communication, the transmission start time, the transmission end time, the area used for transmission on a display or a projection surface, the luminance of the visible light communication image, the direction of barcode of the visible light communication image, and so on.

(Estimation of Stereoscopic Shape and Reception)

Figure 46:
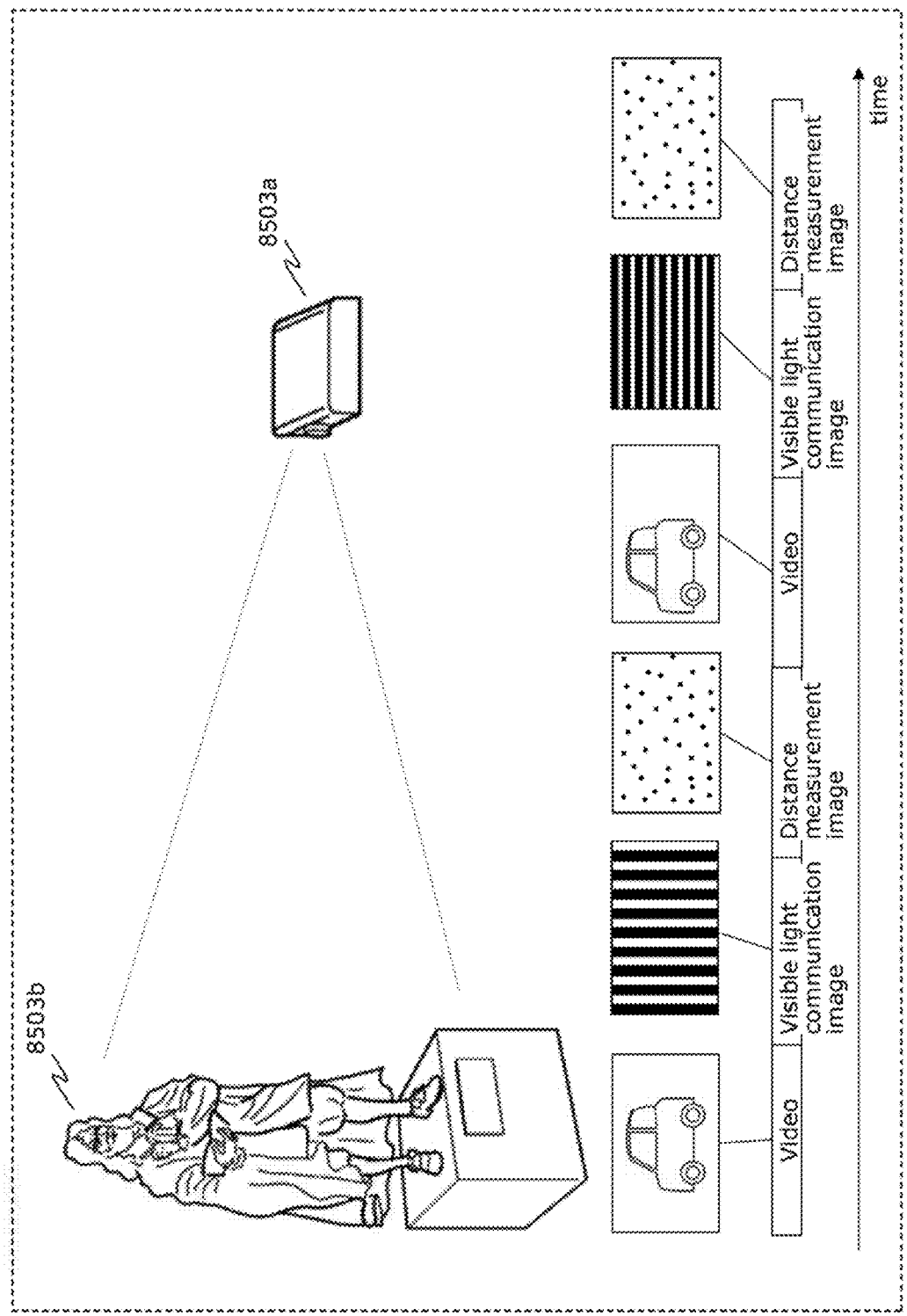
FIG. 46 illustrates an example of an operation of a transmitter for causing reception using a result of estimates of a stereoscopic shape.
Figure 47:
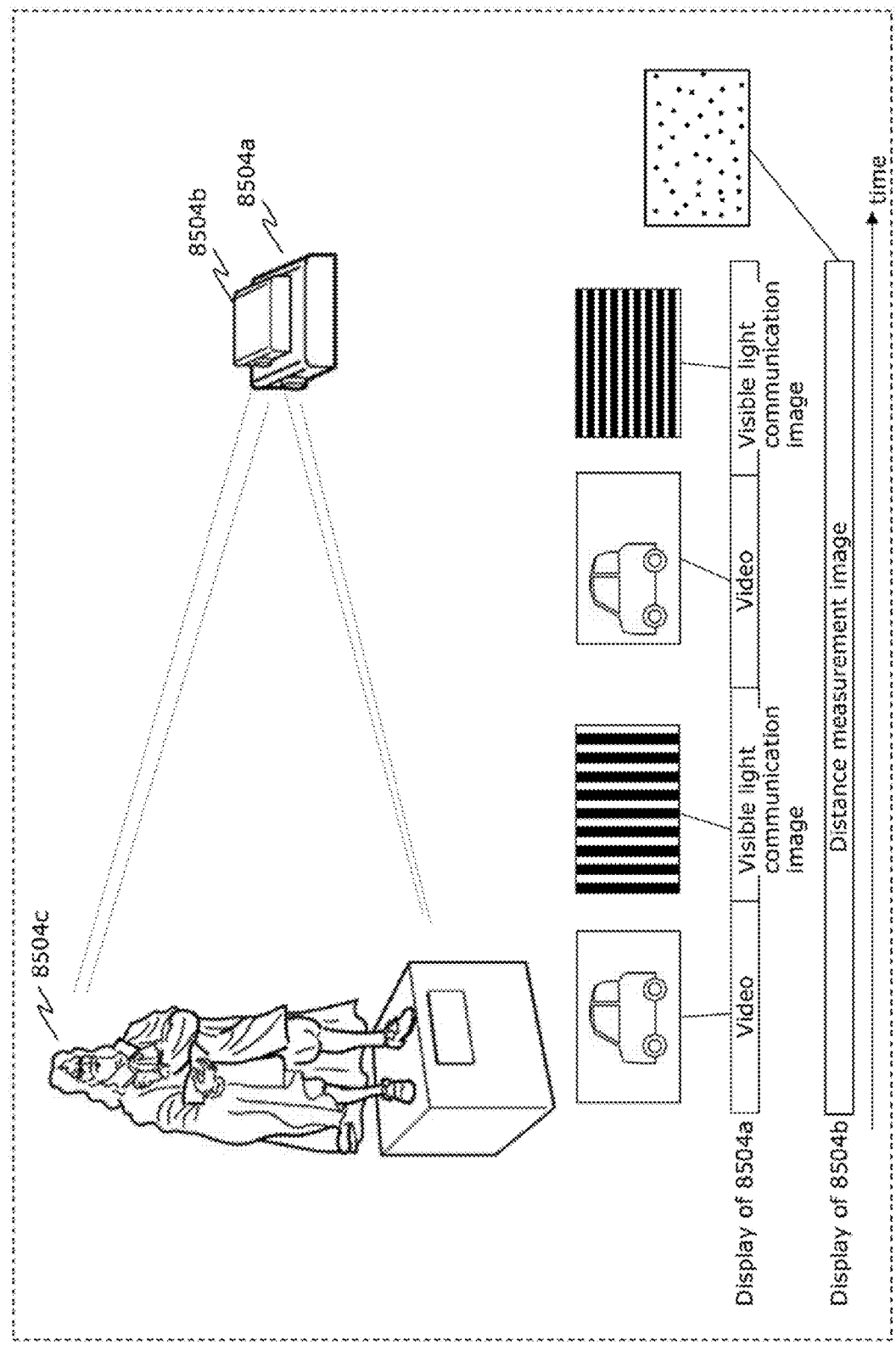
FIG. 47 illustrates an example of a configuration and an operation of a transmitter for causing reception using a result of estimates of a stereoscopic shape.

FIGS. 46 and 47 are diagrams illustrating an example of application of visible light communication.

As illustrated in FIG. 46, a transmitter 8503a such as a projector projects not only video and a visible light communication image but also a distance measurement image. A dot pattern indicated by the distance measurement image is a dot pattern in which the position relation between a predetermined number of dots near an arbitrary dot is different from the position relation between other arbitrary combination of dots. A receiver captures the distance measurement image to specify a local dot pattern, with it being possible to estimate the stereoscopic shape of a projection surface 8503b. The receiver restores the visible light communication image distorted due to the stereoscopic shape of the projection surface to a 2D image, thereby receiving a signal. The distance measurement image and the visible light communication image may be projected by infrared which is not perceivable by humans.

As illustrated in FIG. 47, a transmitter 8504a such as a projector includes an infrared projection device 8504b for projecting a distance measurement image by infrared. A receiver estimates the stereoscopic shape of a projection surface 8504c, and restores a distorted visible light communication image to receive a signal. The transmitter 8504a may project video by visible light, and a visible light communication image by infrared. The infrared projection device 8403b may project a visible light communication image by infrared.

(Stereoscopic Projection)

Figure 48:
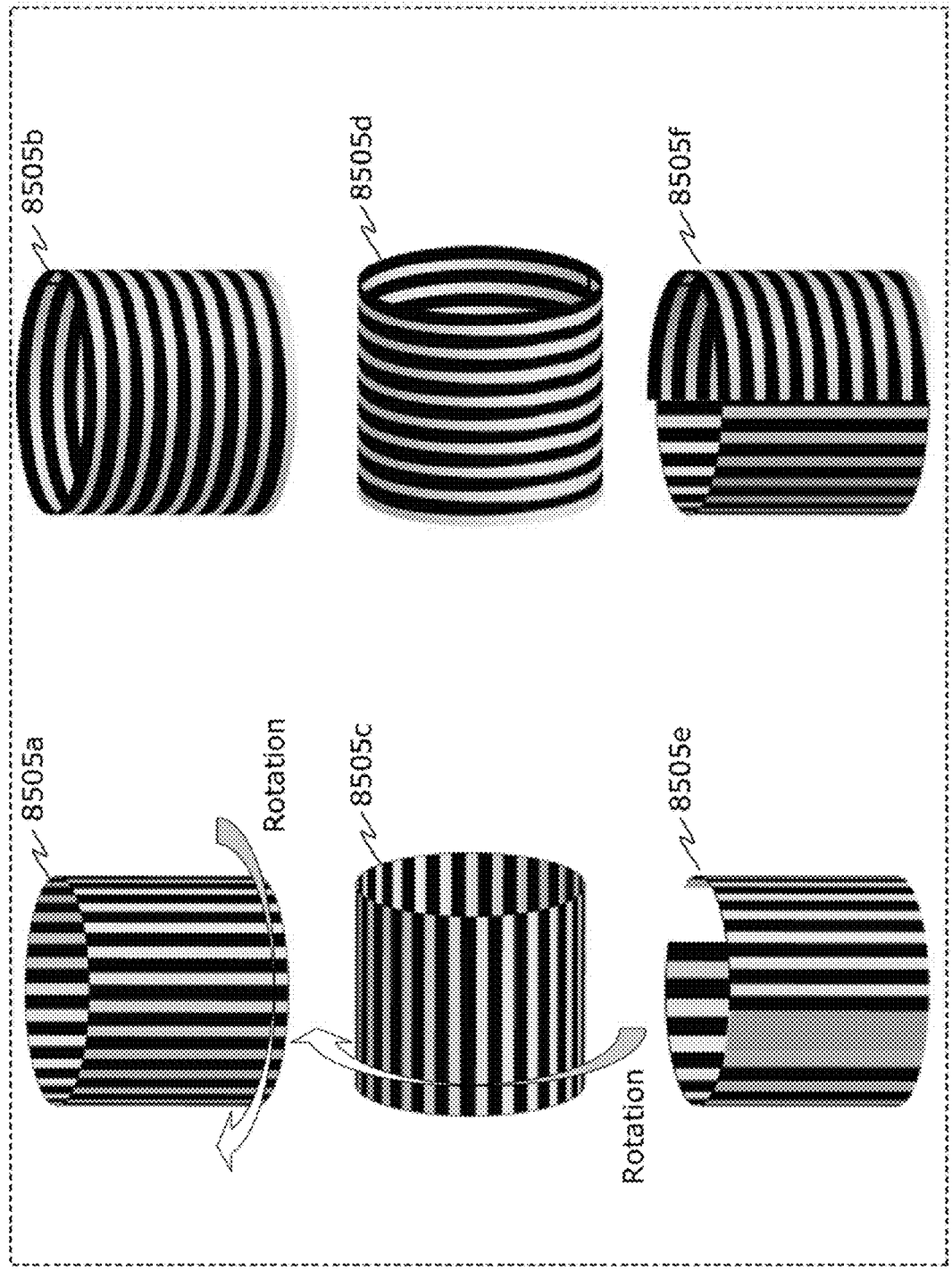
FIG. 48 is a diagram illustrating stereoscopic projection.
Figure 49:
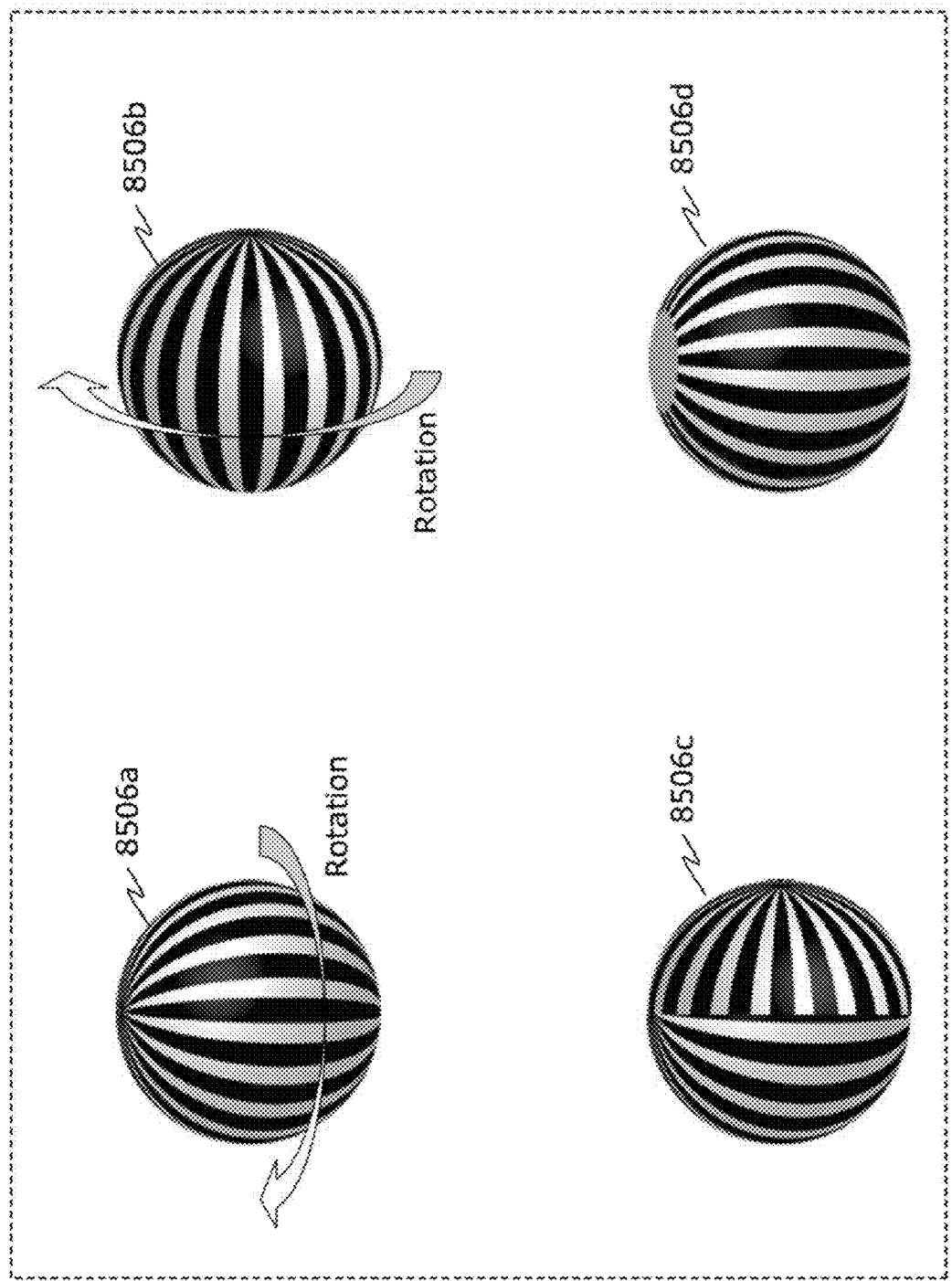
FIG. 49 is a diagram illustrating stereoscopic projection.

FIGS. 48 and 49 are diagrams illustrating a visible light communication image display method.

In the case of performing stereoscopic projection or in the case of displaying a visible light communication image on a cylindrical display surface, displaying visible light communication images 8505a to 8505f as illustrated in FIG. 48 enables reception from a wide angle. Displaying the visible light communication images 8505a and 8505b enables reception from a horizontally wide angle. By combining the visible light communication images 8505a and 8505b, reception is possible even when a receiver is tilted. The visible light communication images 8505a and 8505b may be displayed alternately, or the visible light communication image 8505f obtained by synthesizing these images may be displayed. Moreover, adding the visible light communication images 8505c and 8505d enables reception from a vertically wide angle. The visible light communication image boundary may be expressed by providing a part projected in an intermediate color or an unprojected part, as in the visible light communication image 8505e. Rotating the visible light communication images 8505a to 8505f enables reception from a wider angle. Though the visible light communication image is displayed on the cylindrical display surface in FIG. 48, the visible light communication image may be displayed on a columnar display surface.

In the case of performing stereoscopic projection or in the case of displaying a visible light communication image on a spherical display surface, displaying visible light communication images 8506a to 8506d as illustrated in FIG. 49 enables reception from a wide angle. In the visible light communication image 8506a, the receivable area in the horizontal direction is wide, but the receivable area in the vertical direction is narrow. Hence, the visible light communication image 8506a is combined with the visible light communication image 8506b having the opposite property. The visible light communication images 8506a and 8506b may be displayed alternately, or the visible light communication image 8506c obtained by synthesizing these images may be displayed. The part where barcodes concentrate as in the upper part of the visible light communication image 8506a is fine in display, and there is a high possibility of a signal reception error. Such a reception error can be prevented by displaying this part in an intermediate color as in the visible light communication image 8506d or by not projecting any image in this part.

Embodiment 2

Figure 50:
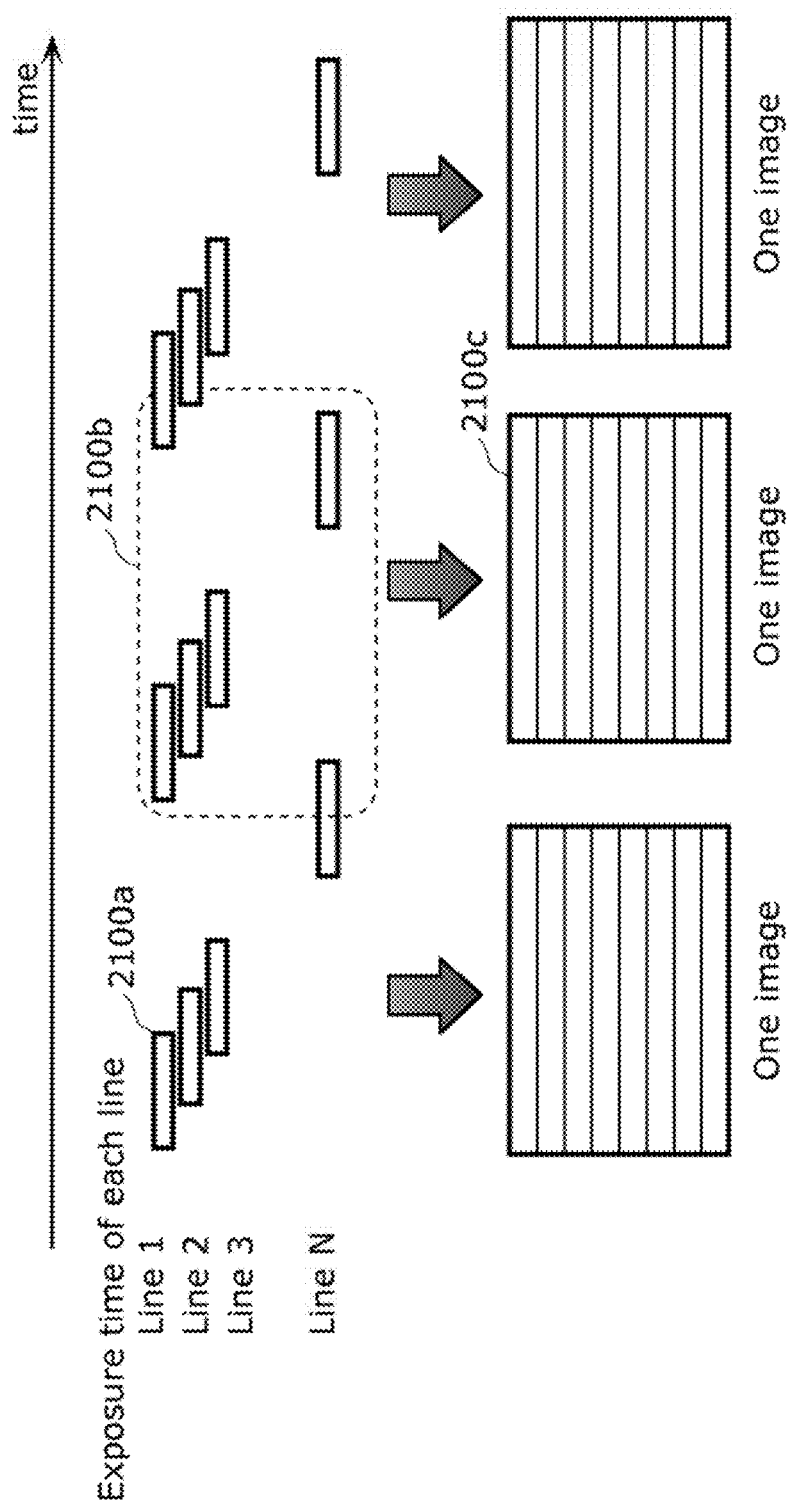
FIG. 50 is a diagram illustrating an example of an observation method of luminance of a light emitting unit in Embodiment 2.

The following describes Embodiment 2.
(Observation of Luminance of Light Emitting Unit)
An imaging method is proposed in which, when one image is to be captured, the exposure starts and ends at different points in time for each imaging element instead of exposure of all the imaging elements at the same timing. FIG. 50 illustrates an example where the imaging elements in one line are exposed at the same time, and the exposure start time is shifted in the order from the closest line in an imaging operation. Here, the imaging elements exposed at the same time are referred to as an exposure line, and a line of pixels on an image which corresponds to these imaging elements is referred to as a bright line.

Figure 51:
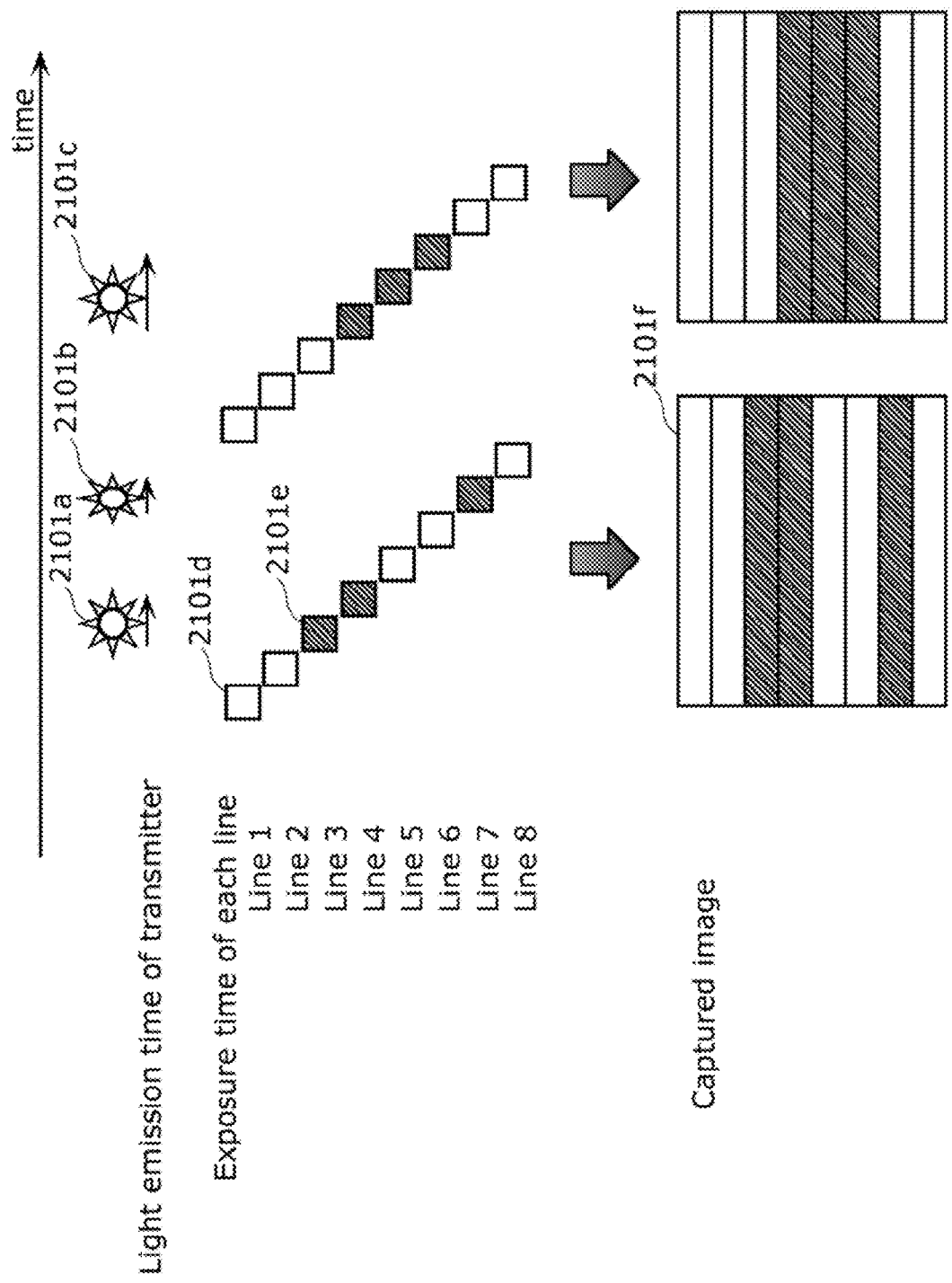
FIG. 51 is a diagram illustrating an example of an observation method of luminance of a light emitting unit in Embodiment 2.

When an image is captured with the imaging elements the entire surfaces of which are illuminated with light from a flickering light source, a bright line (a line of brightness or darkness of pixel values) appears along an exposure line on the captured image as illustrated in FIG. 51. By recognizing this bright line pattern, it is possible to estimate a change in light source luminance at a speed which exceeds the imaging frame rate. This allows communication at a speed higher than or equal to the imaging frame rate by transmitting a signal as the change in light source luminance. In the case where the light source represents the signal with two kinds of luminance values, the lower one of the luminance values is referred to as LOW (LO), and the higher one of the luminance vales is referred to as HIGH (HI). It may be that LOW is a state in which the light source emits no light or in which the light source emits light weaker than in HIGH.

By this method, information transmission is performed at the speed higher than the imaging frame rate.

In the case where the number of exposure lines whose exposure times do not overlap each other is 20 in one captured image and the imaging frame rate is 30 fps, it is possible to recognize a luminance change in a period of 1 millisecond. In the case where the number of exposure lines whose exposure times do not overlap each other is 1000, it is possible to recognize a luminance change in a period of $\frac{1}{30000}$ second (about 33 microseconds). Note that the exposure time is set to less than 10 milliseconds, for example.

FIG. 51 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and I is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 52:
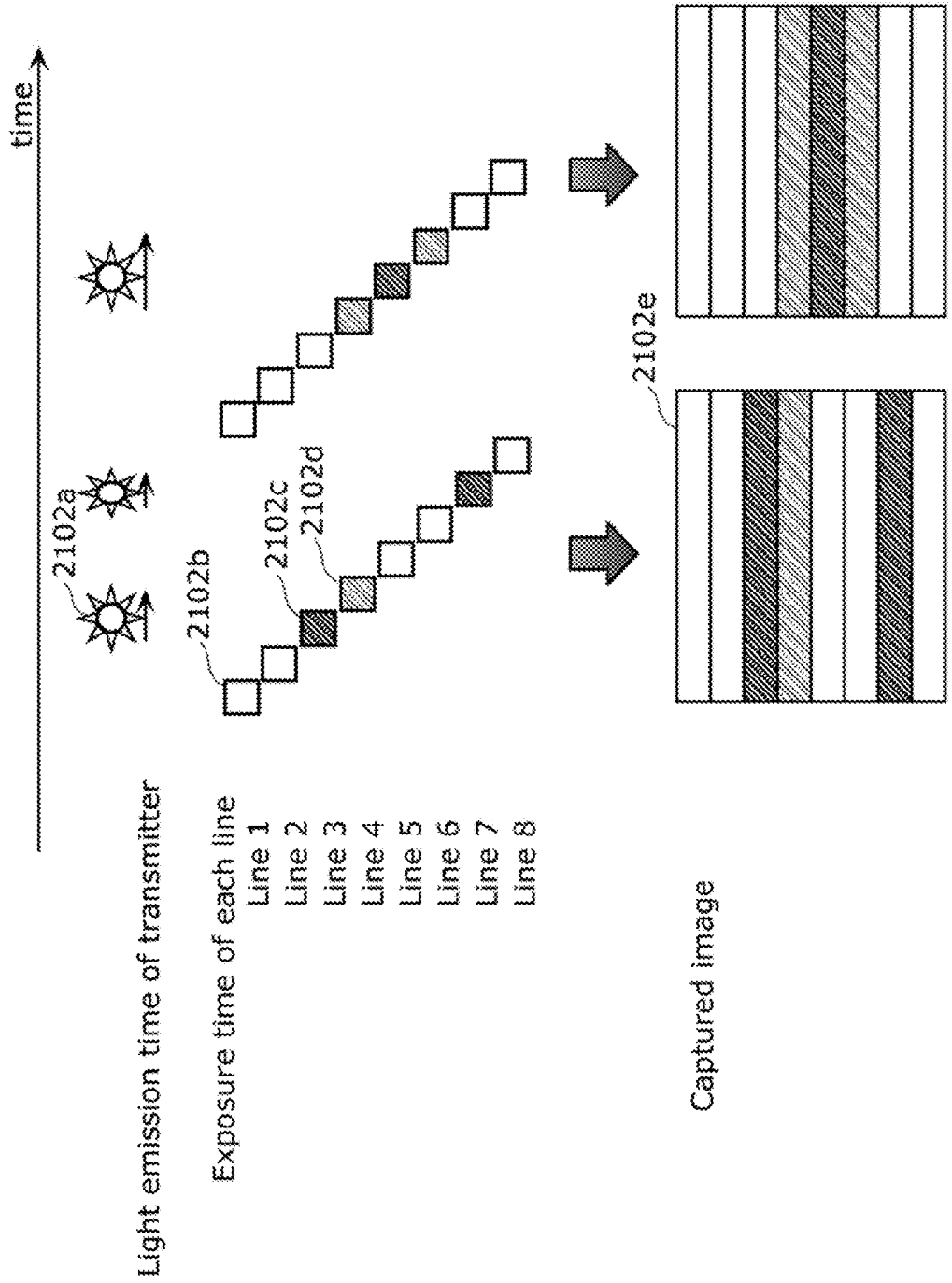
FIG. 52 is a diagram illustrating an example of an observation method of luminance of a light emitting unit in Embodiment 2.

If the exposure state of each exposure line caused by the light emission of the light emitting unit is recognizable in a plurality of levels as illustrated in FIG. 52, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

FIG. 53A illustrates a situation where, before the exposure of one exposure line ends, the exposure of the next exposure line starts. Specifically, this configuration is that the exposure times of adjacent exposure lines temporally partially overlap each other. With such a configuration, (1) the number of samples within a predetermined length of time can be set larger as compared to the case where it is not until the end of the exposure time of one exposure line that the exposure of the next exposure line starts. The increased number of samples within the predetermined length of time makes it possible to more appropriately detect a light signal generated by a light transmitter that is a subject. This means that the error rate in detection of the light signal can be reduced. Furthermore, (2) the exposure time of each exposure line can be set longer as compared to the case where it is not until the end of the exposure time of one exposure line that the exposure of the next exposure line starts, with the result that even in the case where the subject is dark, a brighter image can be obtained. In other words, the S/N ratio can be improved. It is to be noted that the configuration does not need to be such that the exposure times of all the adjacent pairs of the exposure lines temporally partially overlap each other, that is, the configuration may be such that the exposure times of part of the adjacent pairs of the exposure lines do not temporally partially overlap each other. With the configuration in which the exposure times of part of the adjacent pairs of the exposure lines do not temporally partially overlap each other, the generation of an intermediate color due to the overlapped exposure times on the imaging screen can be reduced so that a bright line can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 53B:
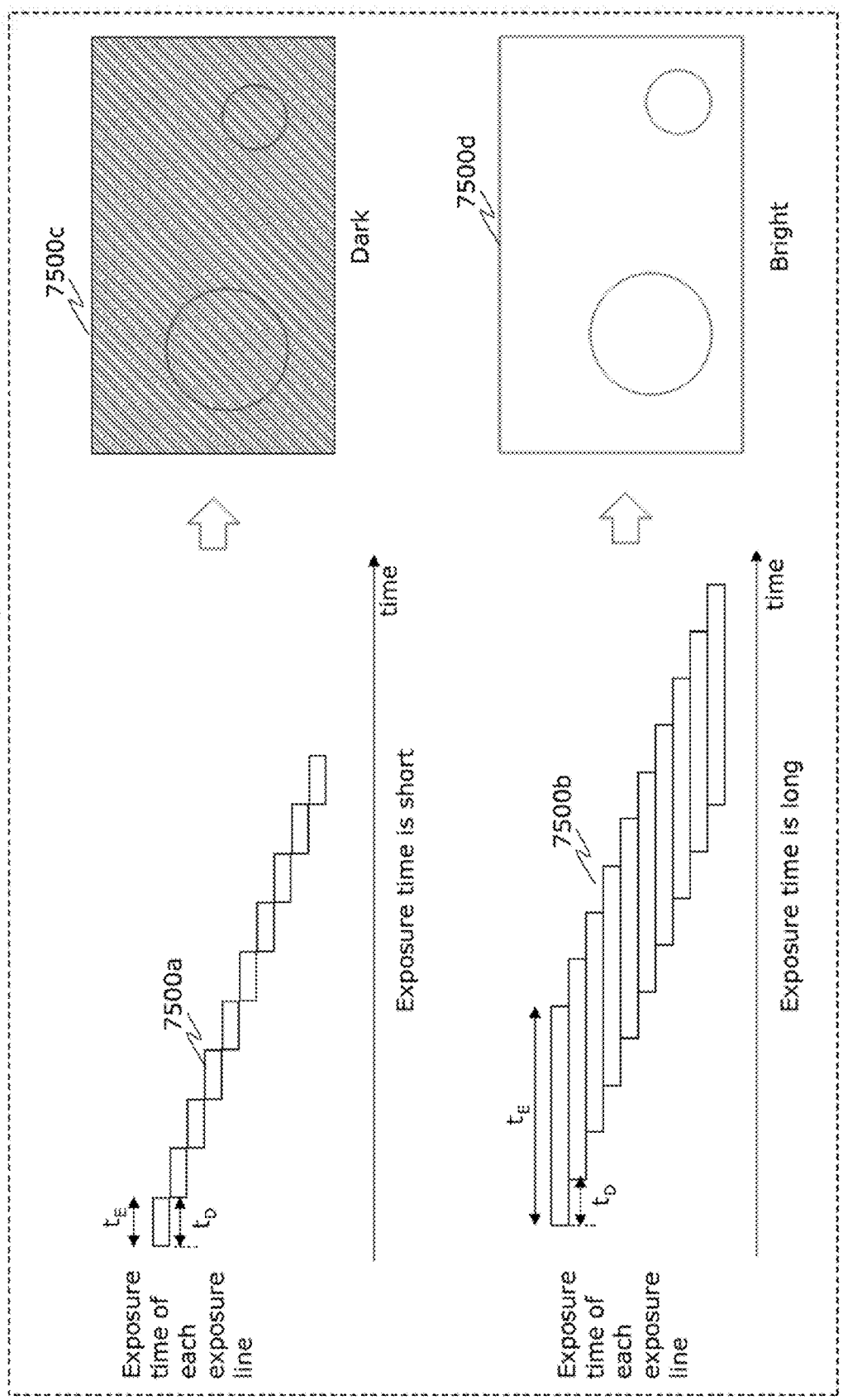
FIG. 53B is a diagram illustrating an example of an observation method of luminance of a light emitting unit in Embodiment 2.

FIG. 53B illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 53C:
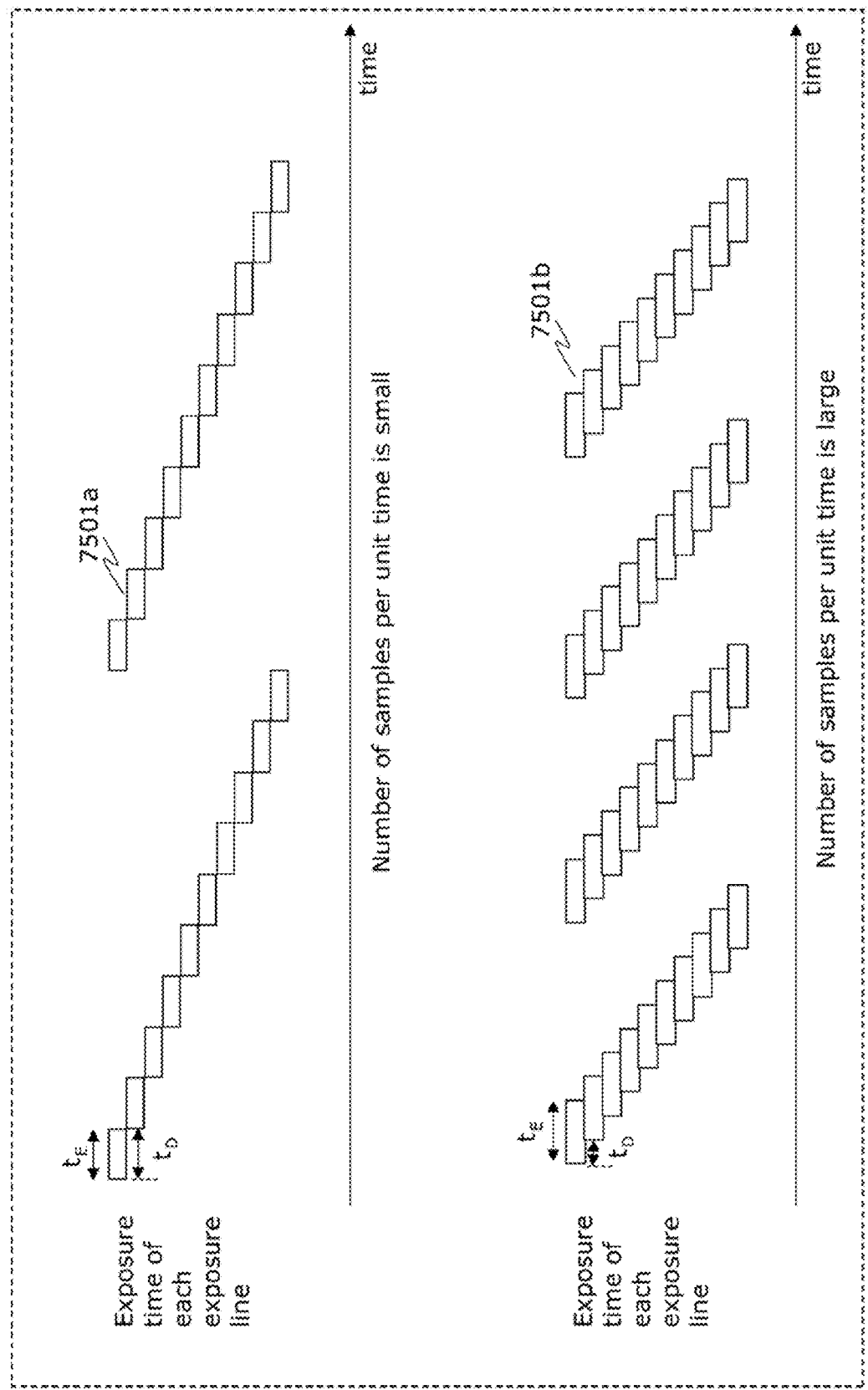
FIG. 53C is a diagram illustrating an example of an observation method of luminance of a light emitting unit in Embodiment 2.

FIG. 53C illustrates the influence of the difference in exposure start time of each exposure line in the case where the exposure time is the same. In 7501*a*, the exposure end time of one exposure line and the exposure start time of the next exposure line are the same. In 7501*b*, the exposure of one exposure line ends after the exposure of the next exposure line starts. The structure in which the exposure times of adjacent exposure lines partially overlap each other as in 7501*b* allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 53B and 53C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore 1/2f at the shortest. Besides, since 4-value information needs to be received within the time of 1/2f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 53D:
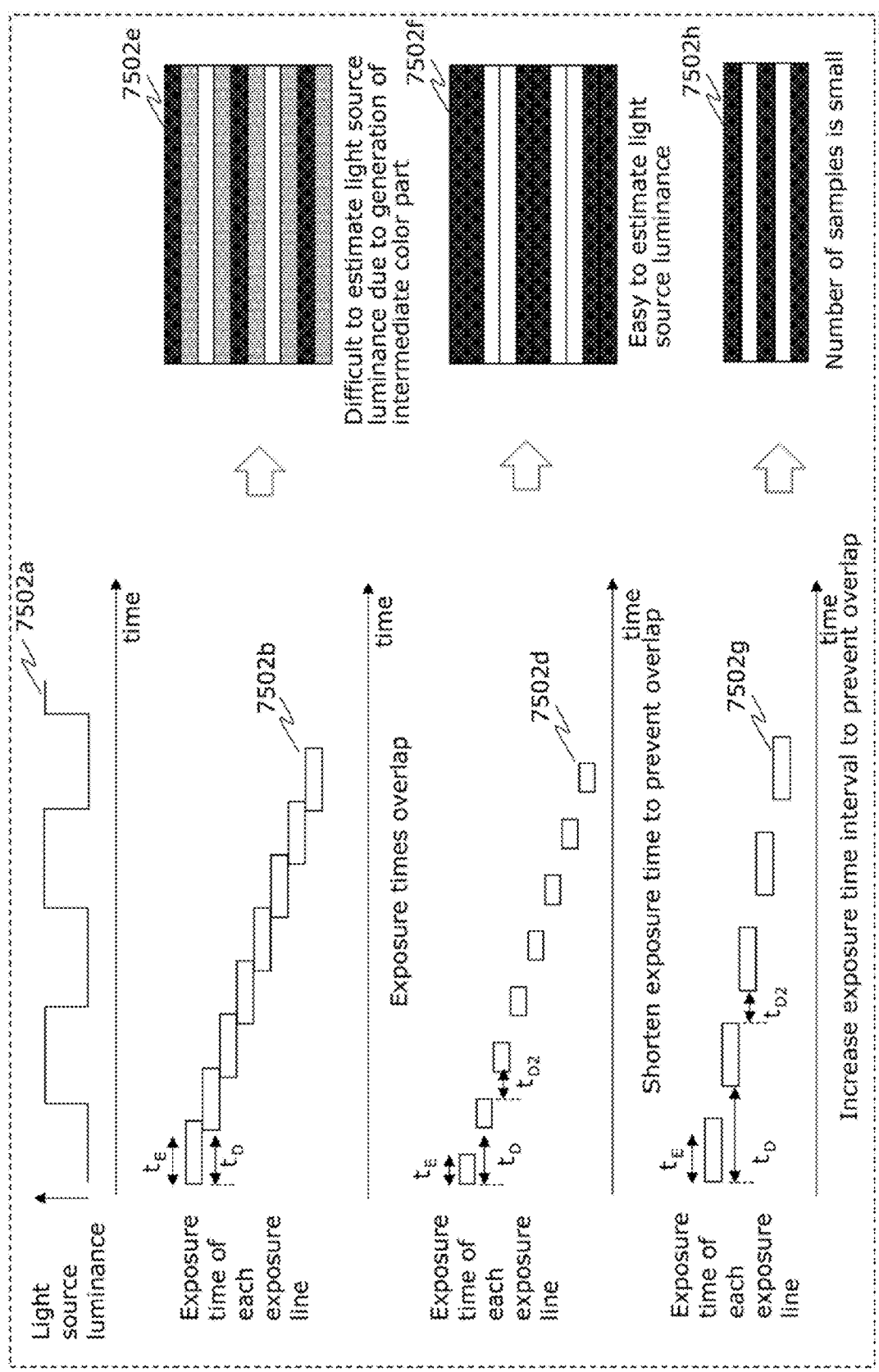
FIG. 53D is a diagram illustrating an example of an observation method of luminance of a light emitting unit in Embodiment 2.

FIG. 53D illustrates the advantage of using a short exposure time in the case where each exposure line does not overlap in exposure time. In the case where the exposure time is long, even when the light source changes in luminance in a binary fashion as in 7502*a*, an intermediate-color part tends to appear in the captured image as in 7502*e*, making it difficult to recognize the luminance change of the light source. By providing a predetermined non-exposure vacant time (predetermined wait time) $t_{D2}$ from when the exposure of one exposure line ends to when the exposure of the next exposure line starts as in 7502*d*, however, the luminance change of the light source can be recognized more easily. That is, a more appropriate bright line pattern can be detected as in 7502*f*. The provision of the predetermined non-exposure vacant time is possible by setting a shorter exposure time $t_E$ than the time difference $t_D$ between the exposure start times of the exposure lines, as in 7502*d*. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502*g*. This structure allows a longer exposure time to be used, so that a brighter image can be captured. Moreover, a reduction in noise contributes to higher error tolerance. Meanwhile, this structure is disadvantageous in that the number of samples is small as in 7502*h*, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures.

FIG. 53E illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503*d*, from which the luminance change of the light source is easily recognizable. In the case where $2t_E>t_S$, a bright line pattern different from the luminance change of the light source might be obtained, making it difficult to recognize the luminance change of the light source from the captured image.

FIG. 53F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

FIG. 53G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

FIG. 53H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 53I:
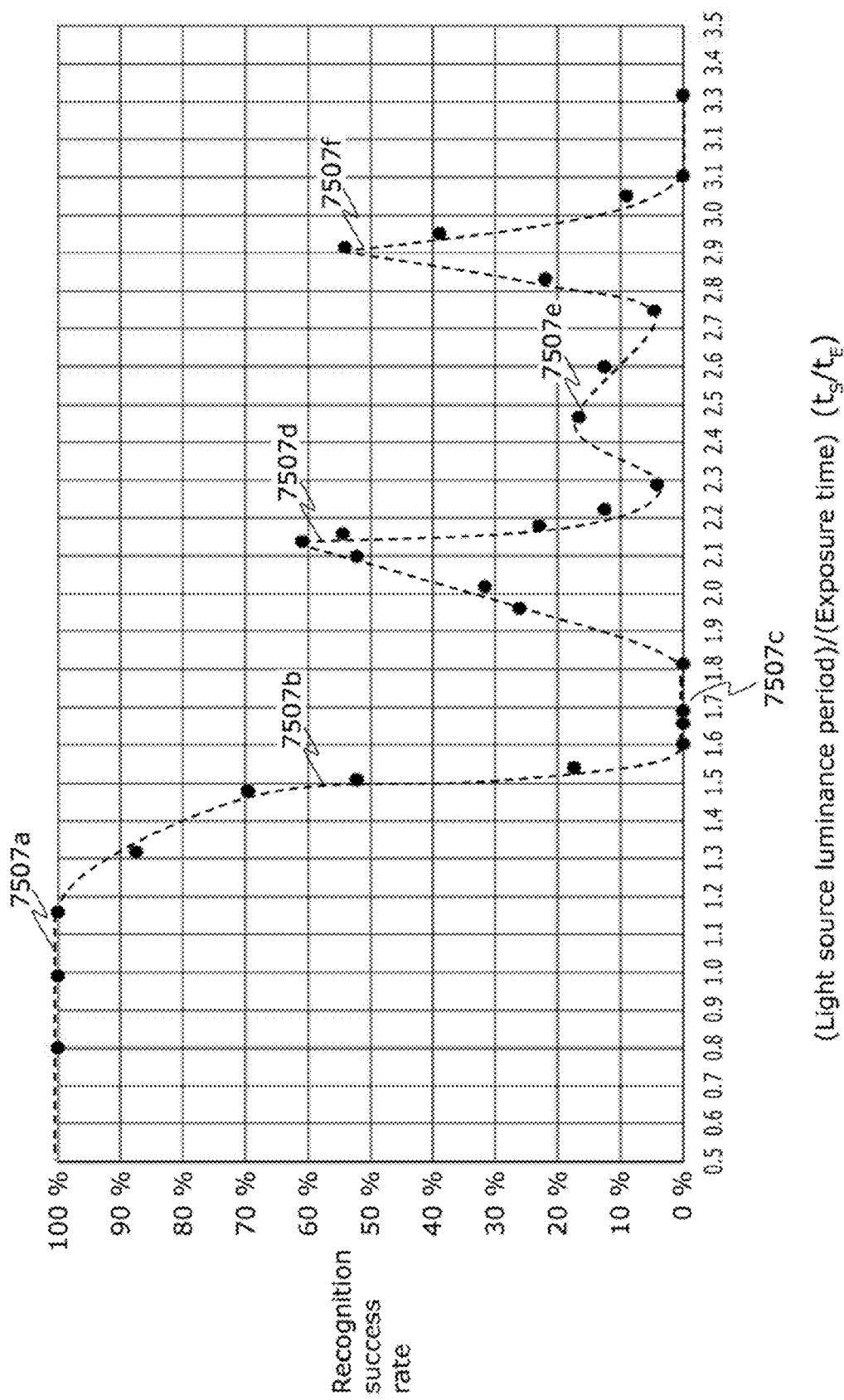
FIG. 53I is a diagram illustrating an example of an observation method of luminance of a light emitting unit in Embodiment 2.

FIG. 53I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 54.

Figure 55:
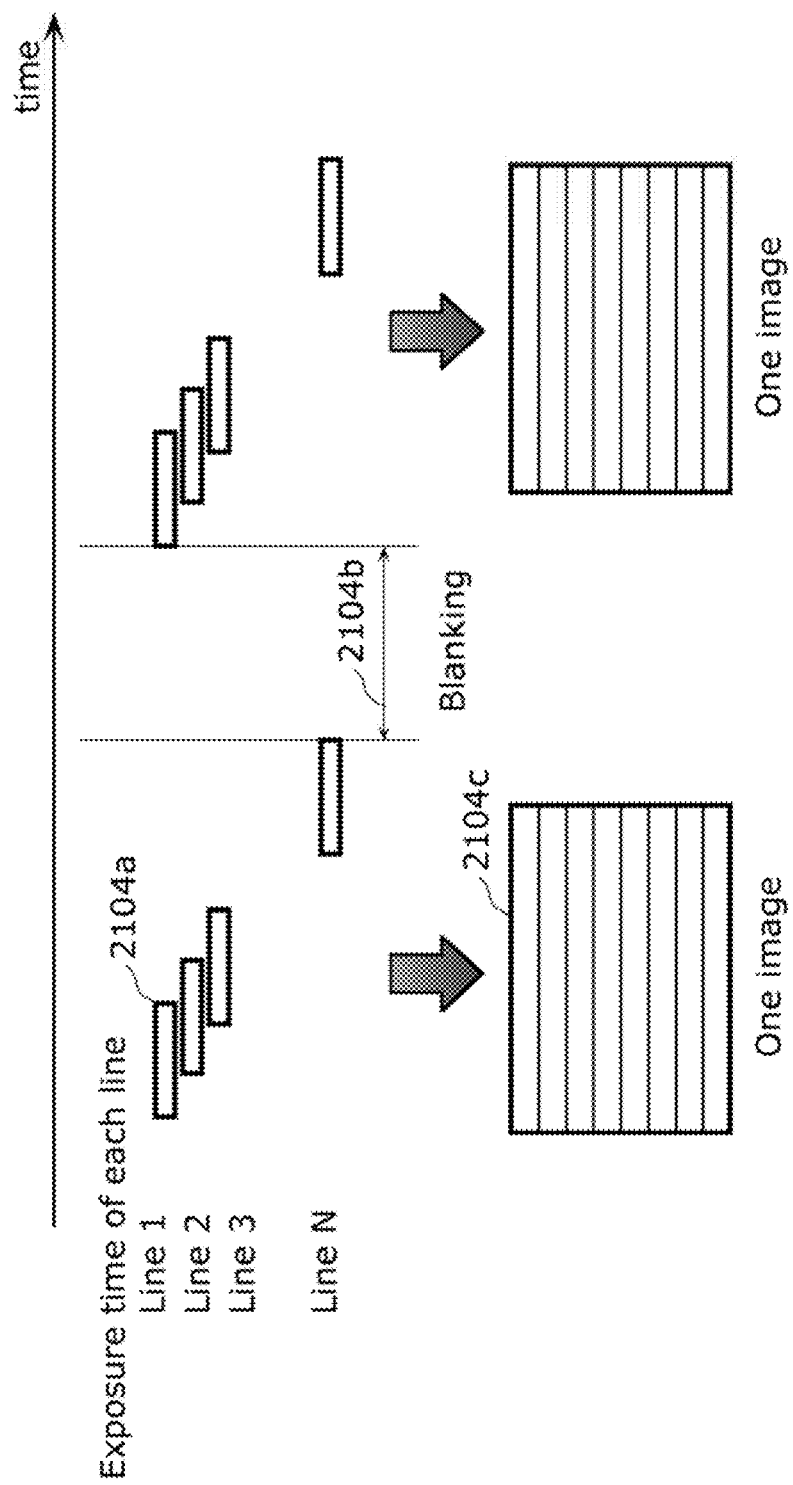
FIG. 55 is a diagram illustrating an example of an observation method of luminance of a light emitting unit in Embodiment 2.

Depending on imaging devices, there is a time (blanking) during which no exposure is performed, as illustrated in FIG. 55.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 3

Transmission of Identifier Indicating Transmission Order

In the case where the display apparatus receives the communication signal from outside through HDMI (registered trademark) or the like, placing, at the beginning, the identifier indicating that the communication includes the encoded image is mentioned above, and additionally creating identifier information including the orientation, size, and even display order of the encoded image, and outputting the encoded image based on the identifier information makes it possible that a situation in which the encoded image is displayed most appropriately can be provided using a smaller amount of communication.

Furthermore, regarding the identifier, it is desired that together with the identifier indicating that the communication signal is to be transmitted, an identifier indicating that the data size is 128 bits or less be included at the same time.

Furthermore, in the case where the signal is not divided into a plurality of signal blocks, it is desired that an identifier indicating that the data length is 64 bits or less be included.

(Complementing Encoded Image by Encoding Audio)

Although signals related to the video signal or other signals can be transmitted using the encoded image and the receiver can obtain additional information using the received signals, there are cases where the encoded image is temporarily in a blind spot, for example, with the result that the signals cannot be obtained from the image, to which the following complementing method may be applied: an encoded audio signal is output from a speaker or the like, then recorded by a microphone or the like included in the receiver and thereby decoded to complement the signals. At this time, such a method is desirably adopted in which the signal types of the audio signal and the video signal are changed in synchronization, but it is not always necessary that the same signal is transmitted as the audio signal and the video signal, that is, any method can be sufficiently effective as the complementing method as long as the same information can ultimately be obtained through the path in the information received by the receiver after reception of the transmitted signal. Furthermore, as to audio, a signal for obtaining information related to audio may be transmitted. When the audio signal coming from the speaker is in a high-toned range of 17 KHz band, people will barely feel the transmitted signals as noise or an unpleasant sound on a normal event site or in the like place with a relatively large amount of noise and in addition, it is possible to input and output the signal by directly allocating a certain range of digital audio signals.

(Measure Taken when a Plurality of Projectors are Used)

In the case where a plurality of projectors are used to project video, the following measure is desirably taken.

(Processing on Connecting Portion of when a Plurality of Projectors are Used to Project Continuous Video)

Figure 56:
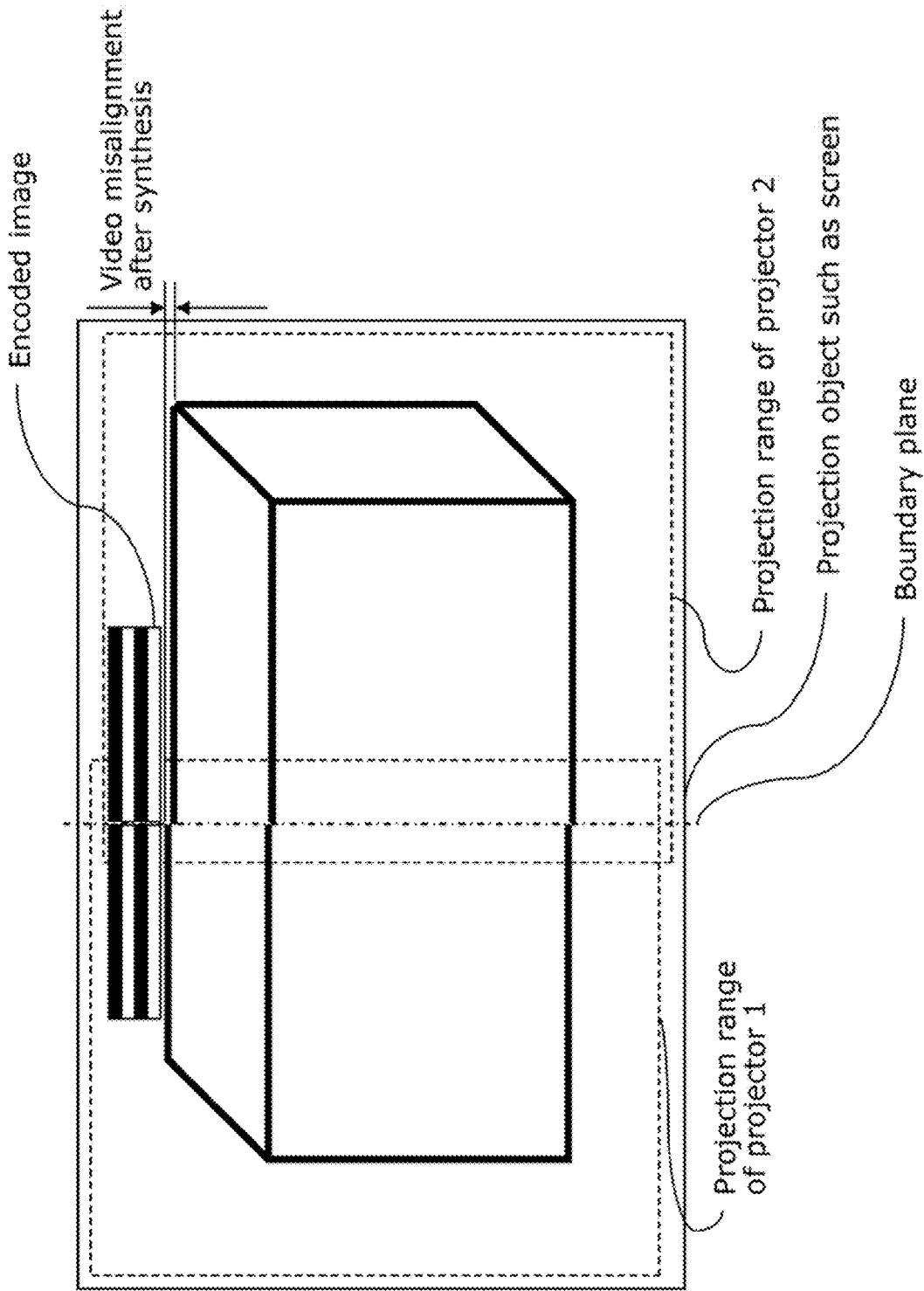
FIG. 56 virtually illustrates an amount of misalignment between video and signals of when encoded images are synthesized and projected using two projectors.

FIG. 56 virtually illustrates an amount of misalignment between video and signals of when encoded images are synthesized and projected using two projectors. As illustrated in this figure, when a plurality of projectors are used to display continuous video, the projection positions of these images are both corrected to maintain their continuity in the connecting area so that the video can be viewed at least as being continuous, and the encoded signal is also required to have continuity equal to or more than the video.

As an example, the arrangement is set so that regions in which the plurality of projectors project images partially overlap each other, and video misalignment is corrected so that the image misalignment in output video is within one to a few pixels, in order that the video signal obtained by summing output from the overlapping regions will maintain certain continuity in luminance, chromaticity, etc., with the video signal in the non-overlapping regions and in order that the misaligned images will have continuity to such a degree that their discontinuity is generally not clear. Furthermore, another conceivable method is, for example, that the output signals are corrected in a manner that even when projectable regions overlap each other, a boundary plane is set for each of the projectable regions so that projection ranges will not overlap but be continuous. However, the continuity of the encoded images in the present disclosure is strongly required to be around one pixel, desirably within one pixel, due to the restrictions on the signal processing in the receiver. Regarding the correction on the positions of the projectors, there is a method in which images projected in advance or at the time of video projection are captured so that the correction is sequentially updated, or alternatively, it may be that the correction is made in advance on a projection object that will be a target, and then a data table for correction is created before projection. As an image for calibration for use in the correction, an image having a checkered pattern may be output. Even when the projection screen includes a curved line or is a tilted plane, it is possible to obtain a parameter for the correction by detecting positional distortion and luminance at each point in the checkered pattern. It is to be noted that more appropriate correction for reception can be made when the checkered pattern has a pitch equal to the minimum unit of the encoded image. Furthermore, when the images having the checkered pattern with bright and dark parts reversed are inserted also as one set, the inserted images will be disturbance to the video signal, which has an effect that makes them less recognizable.

In the latter case, the same or like processing may be performed also on the encoded image, but as a result of continuing video projection, misalignment of the images projected by the plurality of projectors may be seen gradually at the boundary plane due to heat of the main body of each of the projectors or the like cause. As a measure against this, the following measure is conceivable. Specifically, the video signal is updated with new images at certain time intervals such as 60 images per second, and since each of these needs to be corrected, fine adjustment is temporally difficult, but in terms of the degree of human eye recognition to moving pictures, slight misalignment will not be greatly conspicuous in most video, and the encoded image does not always need to be updated with a new signal on a per frame basis, meaning that it is possible that, for example, a linear pattern for calibration across the display region covered by the plurality of projectors, e.g., a pattern with horizontal stripes perpendicular to the boundary plane, is output, then the output projection images are captured, and continuity thereof in the boundary area is detected, followed by feedback, to take a measure to further reduce misalignment of the encoded image. It is to be noted that repeatedly giving feedback for a few frames in sequence makes it possible to display images with very high accuracy. It is to be noted that the pattern for calibration may be the above-stated checkered pattern.

Furthermore, the same or like measure can be taken for luminance in the overlapping area. In the case where the overlapping region is present, each output is adjusted so that the luminance and chromaticity in the combined video projected by the plurality of projectors each has continuity. In the case of the encoded signal, luminance discontinuity will appear as a part darken in black or brightened in white in the boundary region in a resultant image. Furthermore, in the case where the positional misalignment occurs between the projected images as described above, it appears like a double line in the captured image, which can be a cause of erroneous recognition; therefore, it is necessary not only to correct the misalignment, but also to correct luminance.

Figure 57:
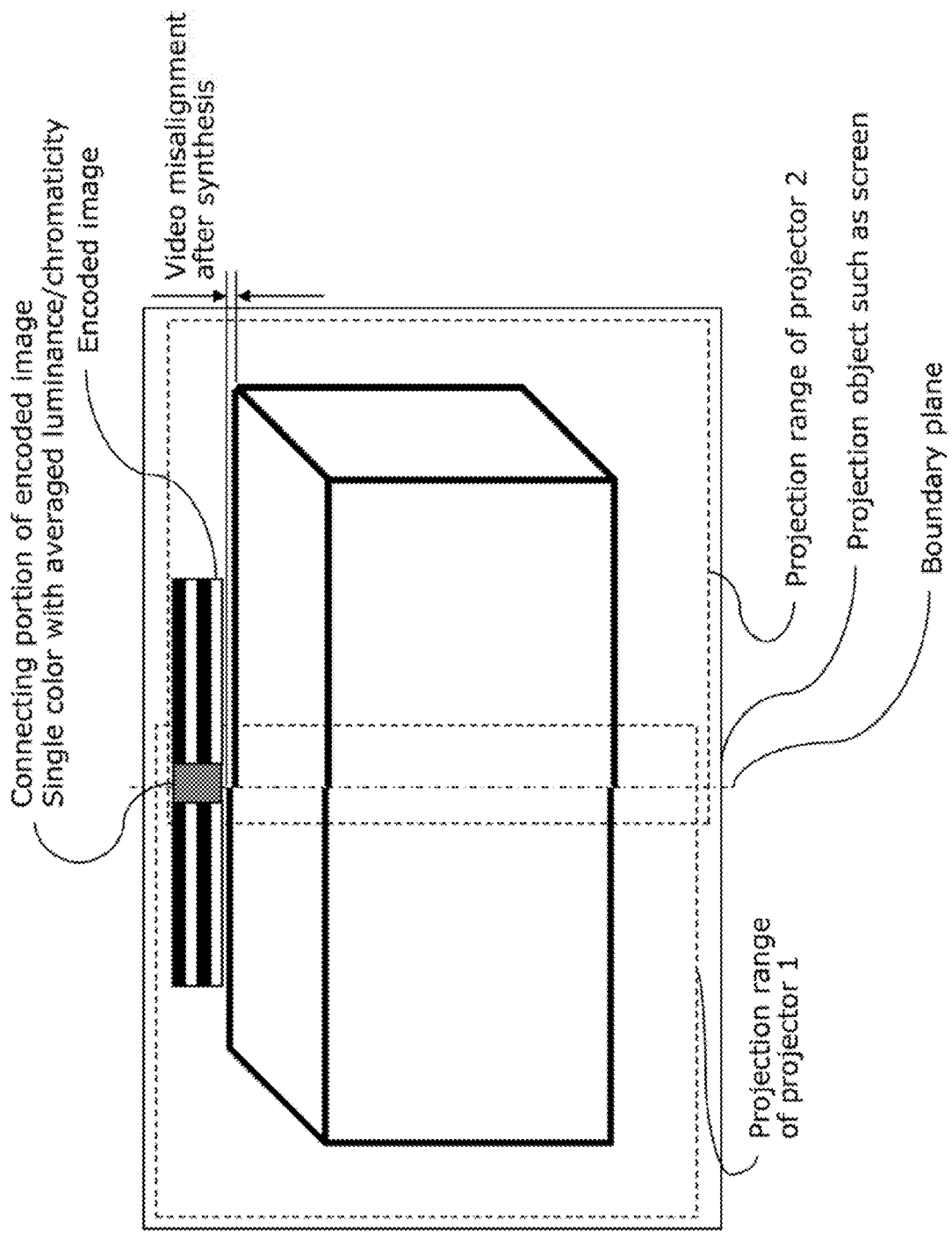
FIG. 57 virtually illustrates a process on a joint between encoded images which are synthesized and projected using two projectors.

FIG. 57 virtually illustrates a process on a joint between encoded images which are synthesized and projected using two projectors.

A means which solves these problems easily is described with reference to FIG. 57. FIG. 57 virtually illustrates a process on a joint between encoded images which are synthesized and projected using two projectors. As illustrated in FIG. 57, it may be possible to insert, to a certain portion of the boundary region, a single-color region with a grayscale substantially equal to the average luminance and chromaticity of the encoded image. It goes without saying that in the above-described case where the encoded image and the inverse image thereof are combined, for example, the average luminance and chromaticity of the combined images based on a total thereof is desirably used in the calculation. When this measure is taken, the signal transmission is not possible in a certain region on and around the boundary area, but it is possible to significantly reduce erroneous signal recognition and moreover, avoid the adverse effect that the boundary plane in the video looks especially conspicuous due to the encoded signal. Of course, in combination of the above content, projecting in the overlapping region an image of only the encoded signal from one of the projectors while the other projector outputs nothing to the overlapping region will be effective as a solution, but, furthermore, in the case where there is a possibility that the boundary changes during image projection, such as a case where the overlapping region changes over time due to heat of the projectors or the like cause, another effective method is displaying a corrected gray scale only on and around the area likely subject to the change so as not to give an impact on the video while providing the largest possible region in which the signal can be received.

It is to be noted that, regarding the synchronization of the video signals from the plurality of projectors, it is sufficient that the synchronization is within one frame, and it is desired that an error of the synchronization be within 10 usecs although the timing of output of the encoded signal depends on the output width. This is to avoid erroneous data recognition caused due to a difference in timing when an image in the boundary region is captured; as mentioned above, the light emission time is desirably 20 usecs or more in order to avoid interference with external light, and, therefore, if an error of at least half of 20 usecs occurs in one image, this is to avoid that the region is greatly influenced by the interference with external light of 10 usecs or less. In order to achieve this, the plurality of projectors are synchronized normally in the video display period and in order to output the encoded signal, points in time at which the black signal is firstly output are synchronized in the same or like manner as the video signal, but the timing for the light sources to start light emission is controlled by a trigger in a signal system different from that for the video signal, and at least in the period equivalent to a sum of the error in the video signal and the period in which the encoded signal is displayed, and each of the projectors has its light source turned off while being in a video output mode to output the corresponding encoded signal and then, the light sources are turned off, followed by turning on the light sources of the projectors in synchronization, with the result that the temporal synchronization of the encoded signal can be performed with high accuracy. In the case where the encoded signal is input through the HDMI (registered trademark) or the like in synchronization with the video signal, the synchronization accuracy is not very different between the video signal and the encoded image, meaning that it is possible to increase the synchronization accuracy in the transmission of the encoded signal by improving the synchronization accuracy for the video signal or by transmitting the encoded signal also as an image which can be displayed for a relatively long period of time which includes a synchronization error and in addition, controlling the light sources.

(Measure Taken in Application to Projection Mapping)

The following describes what measure is particularly desirably taken in the case where images are projected on a building, a structure, a designed article, a natural terrain, a natural structure, etc., which is other than a screen.

(Measure for Different Reflectance, Colors, Etc., of Projection Object)

It is necessary to adopt such methods in which elements having an impact on how the projected image looks, such as reflectance, color, etc., of the projection screen, are measured in advance to create a table of factors of the respective primary colors for correction so that the encoded image is output after corrected in the same manner as the correction made on the video signal or in which a device that captures the video in synchronization with the projector and calculates a correction factor for each point in time is placed near the projector to sequentially correct projection images through observation. This is not very different from the correction method for the video signal; the encoded image also requires the same or like correction on luminance and chromaticity. This is because, when the receiver performs separate processing on data of a bright region and data of a dark region in a captured image, a discontinuous change in luminance in each of the regions depending on the location causes a trouble such as difficulty in determining whether the image is in the bright state or the dark state. As to this trouble, taking a measure as above will make significant improvement.

Figure 58:
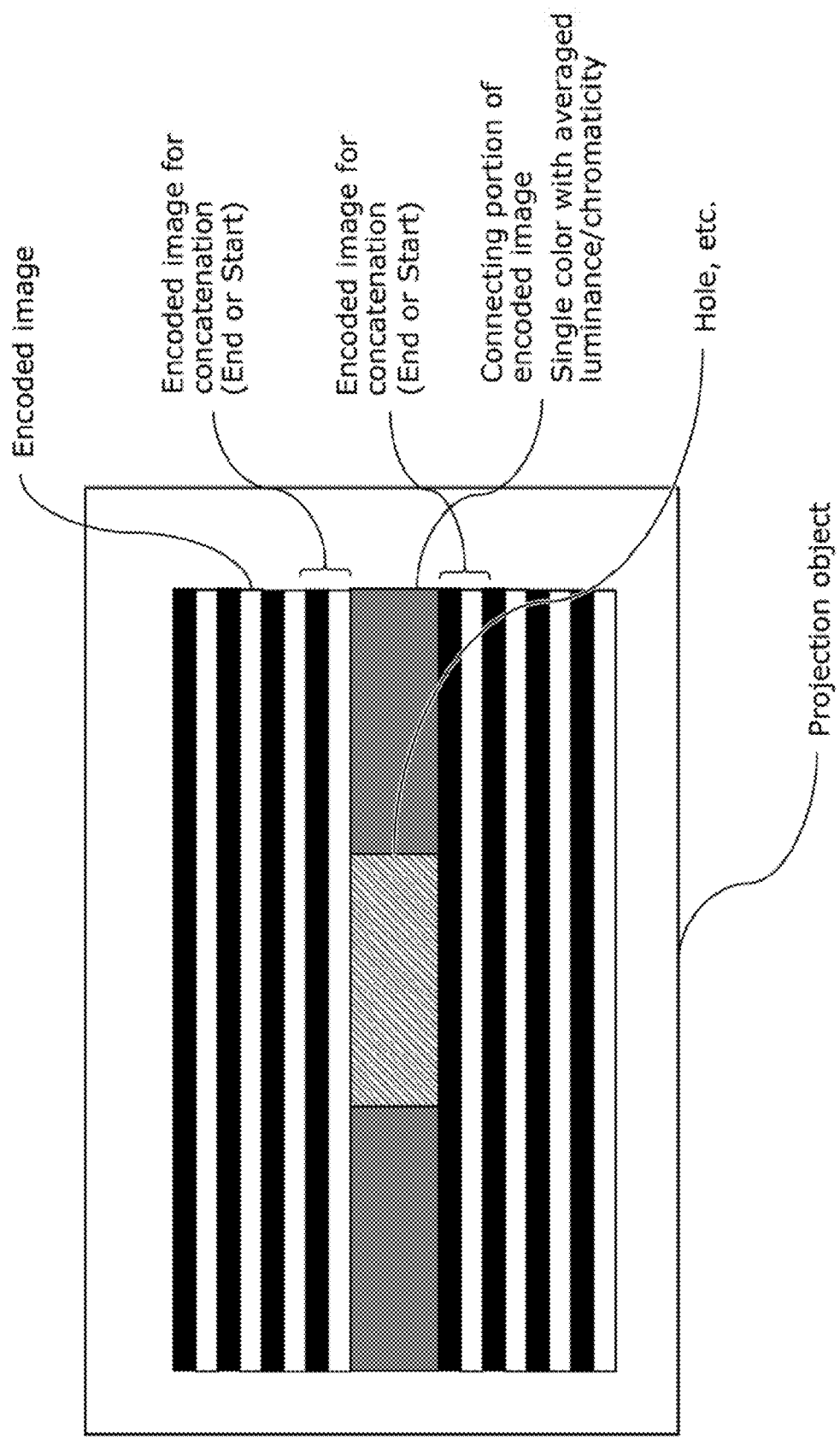
FIG. 58 virtually illustrates a measure taken for an encoded image when an object on which images are projected has a hole, etc.

In particular, with reference to FIG. 58, the description is made on a measure taken especially in the case where the reflectance is zero or very low, such as the case where the projection screen has a hole, etc. FIG. 58 virtually illustrates a measure taken for an encoded image when an object on which images are projected has a hole, etc. As illustrated in FIG. 58, in the case where the reflectance is zero or very low, such as the case where the projection screen has a hole, etc., no image is projected based on the striped signal that passes through the region having zero or very low reflectance, and in the signal of the encoded image in very proximate areas that does not pass through the region having zero reflectance, an identifier indicating that the interruption is to start is displayed while, at the other end, an identifier for resuming and continuing the signal present before the interruption is displayed so that erroneous signal recognition can be avoided.

It is to be noted that, in the case where images are projected on an object other than a screen, the receiver desirably extends the exposure time for capturing images so that a data amount in the direction of time axis increases as much as possible, to avoid disturbance caused due to the projection screen.

(Measure Taken when Projection Light Reaches Back Side of Projection Object)

In the case where the projectable region is larger than the projection object and the projection light reaches the back side of the projection screen, including the case where images are projected on the background surface to provide a stereoscopic effect or the like where the projection screen and the region on the back side which the projection light reaches are relatively not very different in distance, the encoded image is desirably projected in a limited region which excludes the projection screen on the back side. This aims to avoid an increase in erroneous recognition caused by interference of the signal projected on the back side with the signal projected on the main projection screen in the case of a large projector having respective light sources of primary colors, such as a projector using laser in particular.

(Measure Taken when Projection Object has Vertical or Horizontal Plane)

In the case where images are projected on a building, a structure, etc., the projection screen thereof may include a plane, and the plane is made up of a combination of a vertically long plane, a horizontally long plane, and so on.

In this case, it is possible to improve the reception probability by selectively outputting the horizontally-striped encoded image to a vertically extending plane such as a vertical pillar while outputting the vertically-striped encoded image to a horizontally extending plane such as a horizontal pillar. A specific method is described with reference to FIG. 59.

Figure 59:
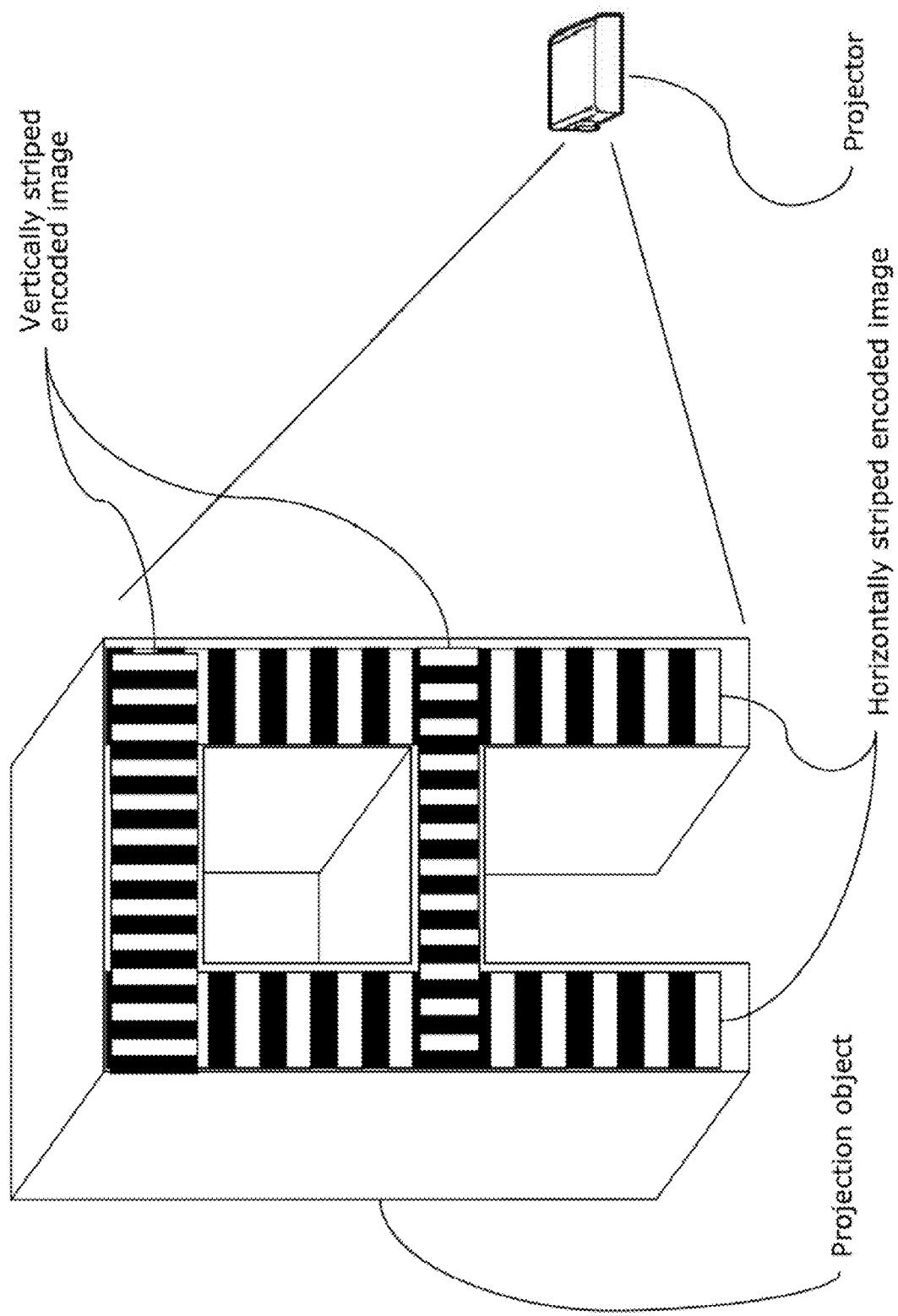
FIG. 59 virtually illustrates an example of an encoded image of when an object on which images are projected has vertical and horizontal pillars, etc.

FIG. 59 virtually illustrates an example of an encoded image of when an object on which images are projected has vertical and horizontal pillars, etc.

In the case where information such as the shape, surface reflectance, color, etc., of the projection object is obtained in advance and then the video signal is corrected and thereafter outputted, the region in which the original signal and the corrected signal at the video display position have linearity maintained means that the region is a plane; therefore, a determination is made on the shape of such a region that is a plane. Because the plane which has as great a continuous length as possible is desired, image processing is performed to detect in which direction the shape of such region is the longest plane, meaning that a range from which signals can be obtained over a great length is determined. According to the determined information, determinations are made on whether the encoded signals in the vertical direction or the horizontal direction, or in a combination thereof, or at an angle therebetween, are selectively displayed, or the encoded signals in highly probable directions are sequentially displayed in turns, and when the encoded signals are thus displayed, the reception probability can be expected to improve.

Furthermore, it may be that aside from the encoded image, an identifier for determining in which orientation the encoded image is directed is inserted in form of a very short sequence and is displayed for determining decoding priorities in the receiver or prompts a recipient who is holding the receiver for a direction in which the reception is to be effected. It is to be noted that instead of using an image for determination different from the encoded image, applicable methods are to transmit a determination signal using flickering light and to make instructions about the optimum position, etc., in addition to an application download on the receiver, using a means such as Wifi.

It is to be noted that when the encoded image and the brightness and darkness-reversed image thereof are displayed, an applicable method is to display the identification signal therebetween so that the reception probability in the next frame increases and that displaying them in the very short period of time makes them as inconspicuous as possible.

(Information Classification According to Field of View in Capturing Images)

It may be that the receiver captures the encoded image displayed, decodes the encoded image, thereby receives the transmitted signal, and transmits, based on the received signal, the captured image to the server or the like which is a transmission destination allocated in advance or a transmission destination determined based on the received signal, with the result that the server can determine the ID and one block size (the size of the image information) obtained from the irradiation subject through the image projection and transmission, and based on a result of this determination, guidance to different information is performed. Furthermore, it may be that the server transmits, to the projector, the position of the person who is holding the receiver and based on this information, the encoded image or a combination thereof which a recipient can receive easily is inserted into the video and thus projected. Moreover, depending on data of a plurality of images, etc., received by the receiver and transmitted to the server or the like, the type of information to be transmitted back from the server to the receiver may be different. For example, it may be possible to adopt a method in which records of images captured in various directions, at various angles, from various locations, and so on, are transmitted so that a recipient is intrigued by such collection just like collecting ink stamp designs.

Furthermore, according to the point in time when the received image is obtained, the type of the information to be transmitted back from the server can be changed so that different information, that is, various combinations of received information, is transmitted back according to video while the received information is small in amount.

Embodiment 4

Figure 60:
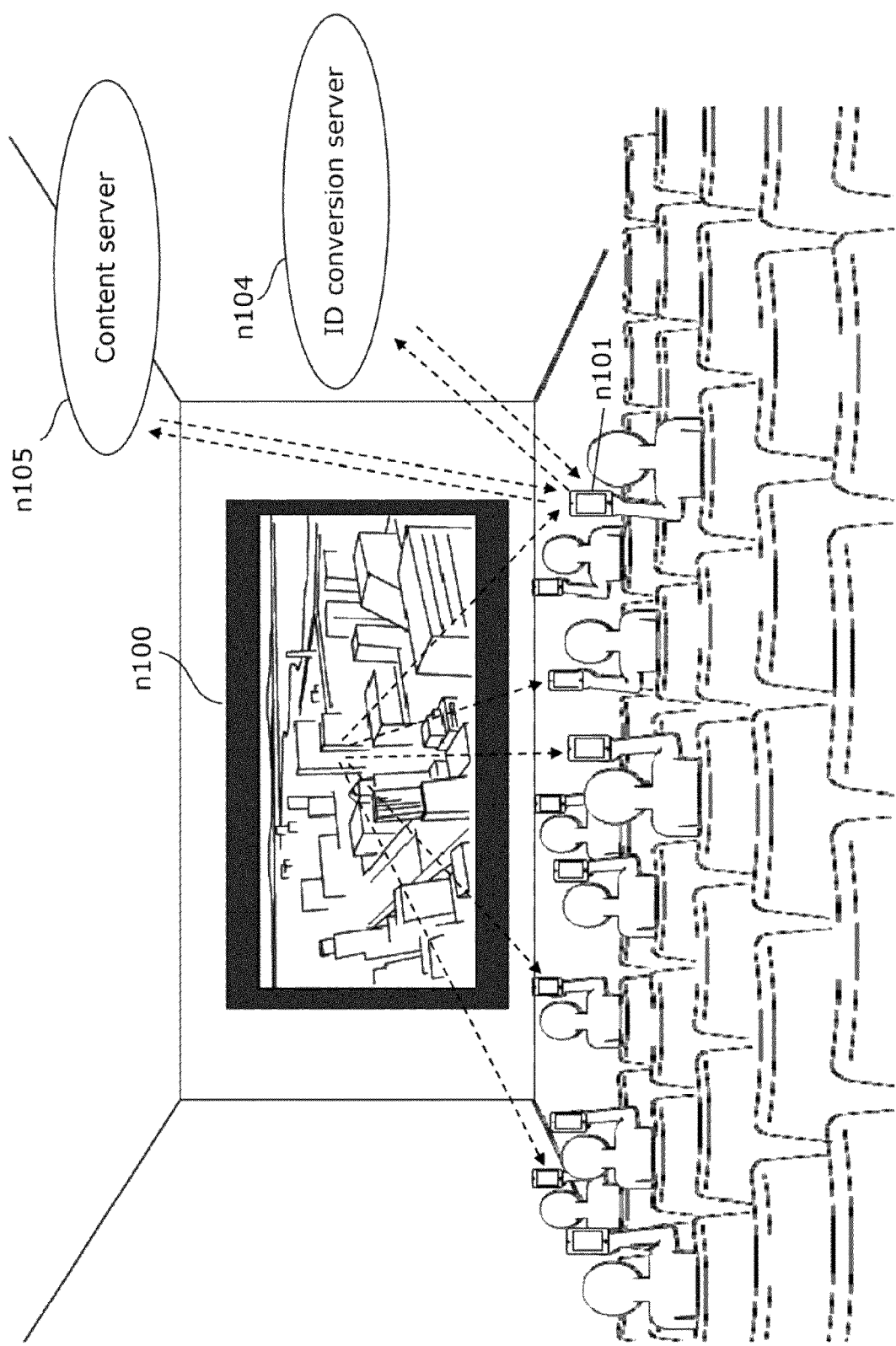
FIG. 60 conceptually illustrates an embodiment.

FIG. 60 explains an outline of a use case of this embodiment.

A large screen n100 has a visible light communication function and transmits information. A mobile device n101 has a reception function for visible light communication and further has a function of connection to an ID conversion server n104 and the Internet. The large screen n100 transmits different ID for each scene of a movie being played, and the mobile device n101 obtains such ID and thereby obtains, through the ID conversion server n104, the Internet, etc., information related to video content being displayed on the screen n100, such as multilingual subtitle information for the scene, information on equipment used in the scene, and making-of video, for example.

Figure 61:
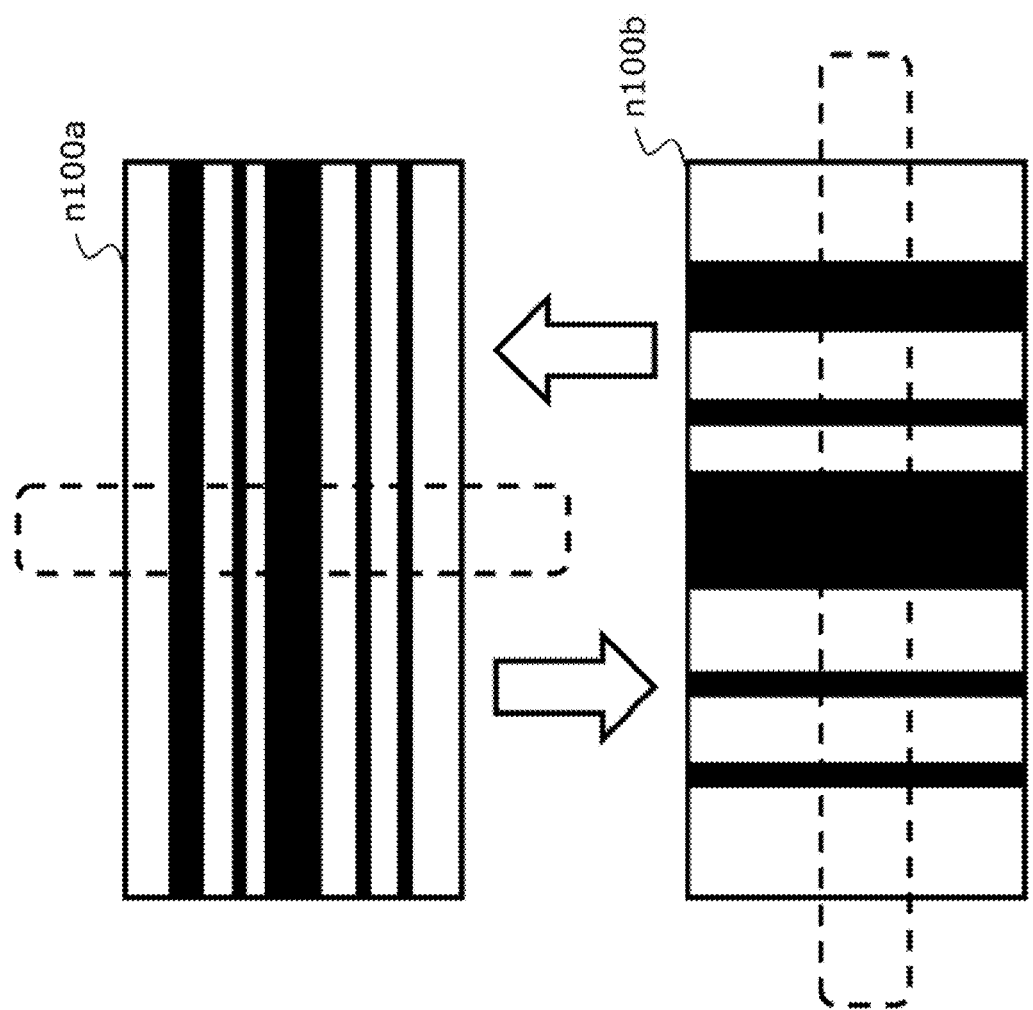
FIG. 61 explains barcode information displayed on a screen.

FIG. 61 schematically illustrates a case where the large screen n100 displays a bar-code pattern and such information is received through the visible light communication. It is unknown whether a user of the mobile device n101 is holding the mobile device in the vertical direction or the horizontal direction. Therefore, it is desired that horizontal barcodes and vertical barcodes be displayed alternately.

Figure 62:
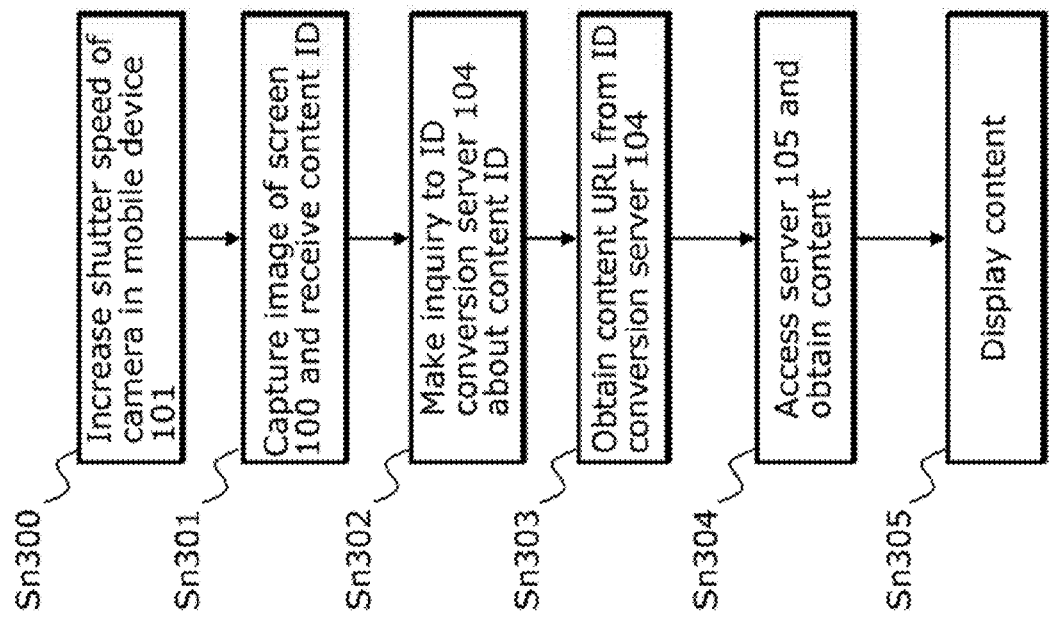
FIG. 62 is a flowchart for obtaining information by a mobile device.

FIG. 62 illustrates a basic flowchart of this embodiment.

In Step Sn300, the shutter speed of a camera in the mobile device n101 is increased; in Step Sn301, an image of the screen n100 is captured, and content ID is received; in Step Sn302, an inquiry is made to the ID conversion server n104 about the content ID; in Step Sn303, content URL is obtained from the ID conversion server n104; in Step Sn304, the server n105 is accessed, and content is obtained; and in Step Sn305, the content is displayed.

In the case where a user receives content in the flow as illustrated in FIG. 62, it is assumed that in a large movie theater, a concert venue, etc., many users will make inquiries to the ID conversion server n104 at the same time. Accordingly, when the mobile device n101 accesses the ID conversion server n104 using a wireless communication function, for example, it is assumed that the concentrated wireless communication load will cause an access failure.

Figure 63:
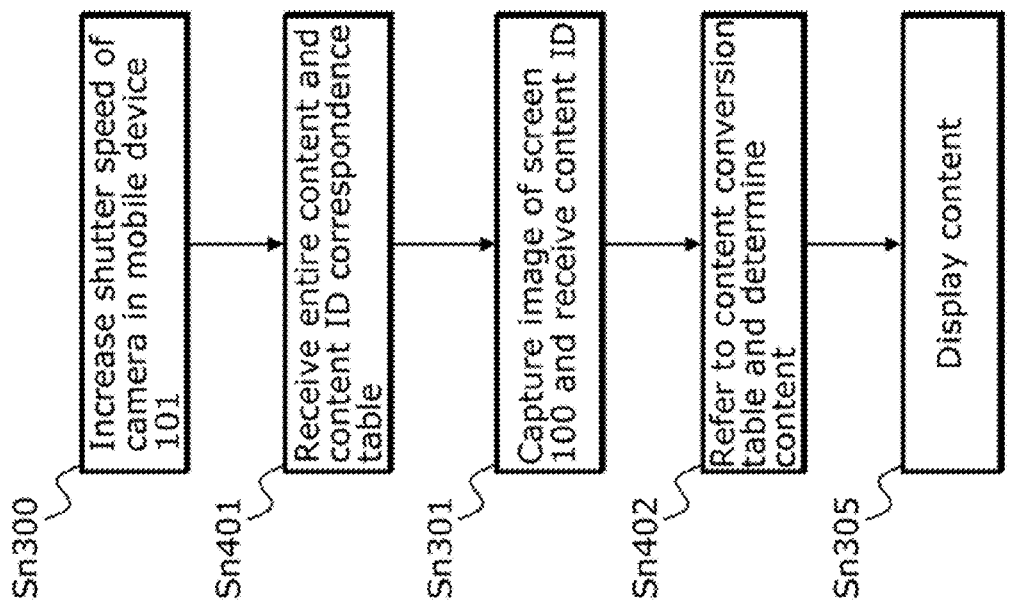
FIG. 63 is a flowchart for obtaining information by a mobile device.

As a means for solving this problem, described with reference to FIG. 63 is a system in which content and a content ID correspondence table are received in advance, and without inquiries to the ID conversion server n104, content information is displayed on the mobile device n101.

In Step Sn300, the shutter speed of a camera in the mobile device n101 is increased; in Step Sn401, the entire content and the content ID correspondence table are received; in Step Sn301, an image of the screen n100 is captured, and content ID is received; in Step Sn402, content is determined with reference to a content conversion table; and in Step Sn305, the content is displayed.

Figure 64:
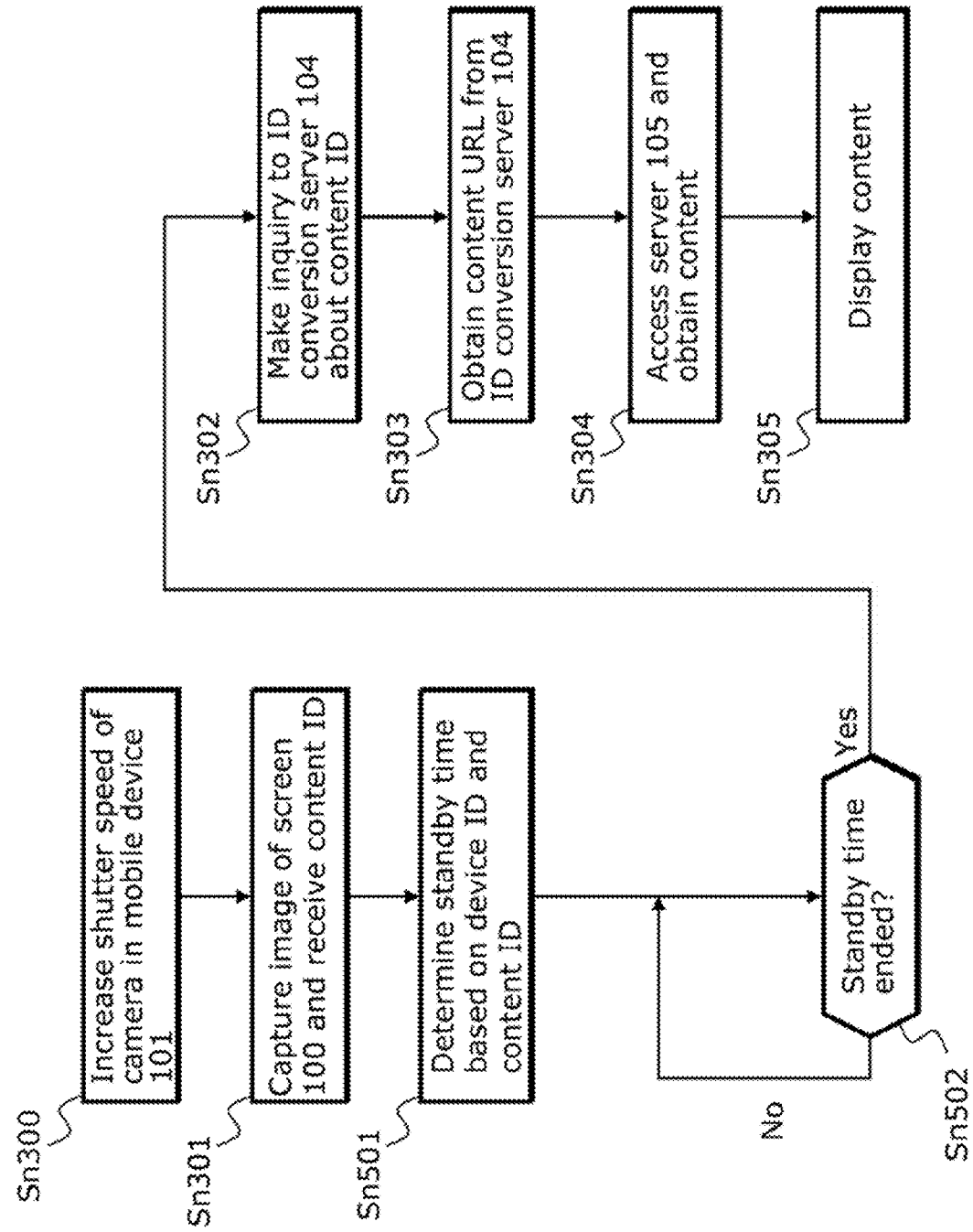
FIG. 64 is a flowchart for obtaining information by a mobile device.

Furthermore, it is also possible to reduce the load by distributing, as illustrated in FIG. 64, the timings of access to the ID conversion server n104 using device ID and content ID as keys in order that communication accesses are not concentrated.

The shutter speed of the camera in the mobile device n101 is increased; in Step Sn301, an image of the screen n100 is captured, and content ID is received; in Step Sn501, standby time is determined based on the device ID and the content ID; and in Step Sn502, whether or not the standby time ends is checked and when the result is Yes, the process proceeds to Step Sn302, while, when the result is No, the process returns to Step Sn502 for recheck.

In Step Sn302, an inquiry is made to the ID conversion server n104 about the content ID; in Step Sn303, content URL is obtained from the ID conversion server n104; in Step Sn304, the server n105 is accessed, and content is obtained; and in Step Sn305, the content is displayed.

Figure 65:
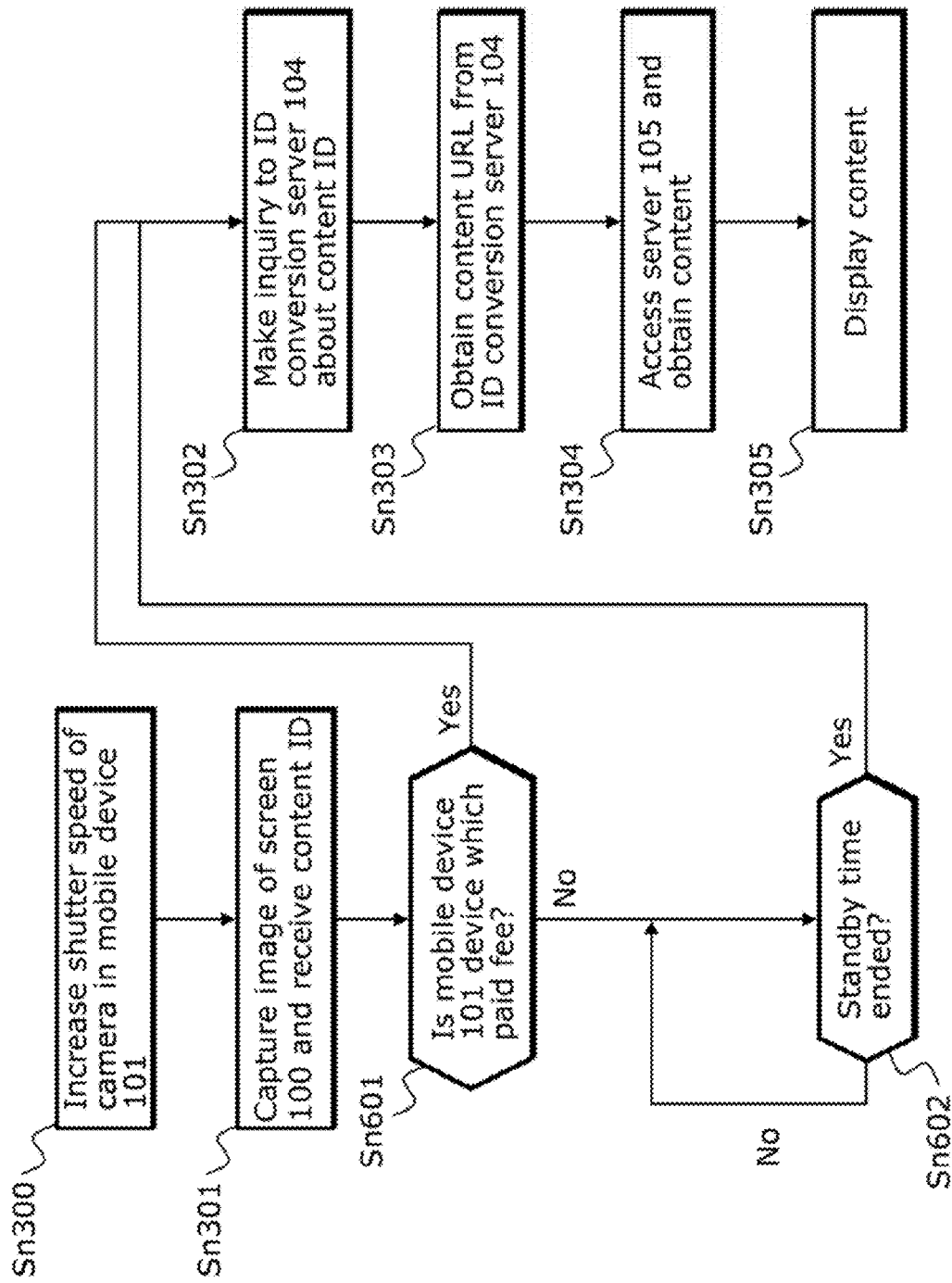
FIG. 65 is a flowchart for obtaining information by a mobile device.

Furthermore, as illustrated in FIG. 65, a system is applicable in which a user of the mobile device n101 that paid a fee is immediately permitted to access the ID conversion server n104 while a user who has not paid the fee is permitted to access the ID conversion server n104 after a predetermined length of standby time. Improved convenience for users who pay fees can increase the number of users who pay fees.

In Step Sn300, the shutter speed of the camera in the mobile device n101 is increased; in Step Sn301, an image of the screen n100 is captured, and content ID is received; and in Step Sn601, whether or not the mobile device n101 is a device that paid a fee is checked and when the result is Yes, the process proceeds to Step Sn302, while, when the result is No, the process proceeds to Step Sn602.

In Step Sn302, an inquiry is made to the ID conversion server n104 about the content ID; in Step Sn303, content URL is obtained from the ID conversion server n104; in Step Sn304, the server n105 is accessed, and content is obtained; and in Step Sn305, the content is displayed.

In Step Sn602, whether or not the standby time ends is checked and when the result is Yes, the process proceeds to Step Sn302, while, when the result is No, the process returns to Step Sn602 for recheck.

Figure 66:
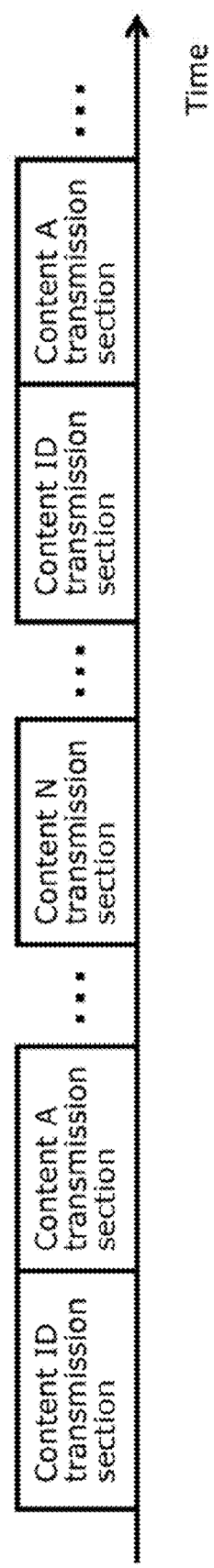
FIG. 66 explains information displayed on a screen.

Furthermore, the screen n100 is capable of distributing not only the content ID but also the content itself. At this time, the screen n100 desirably transmits the content ID and content A to content N in respective time slots as illustrated in FIG. 66.

Figure 67:
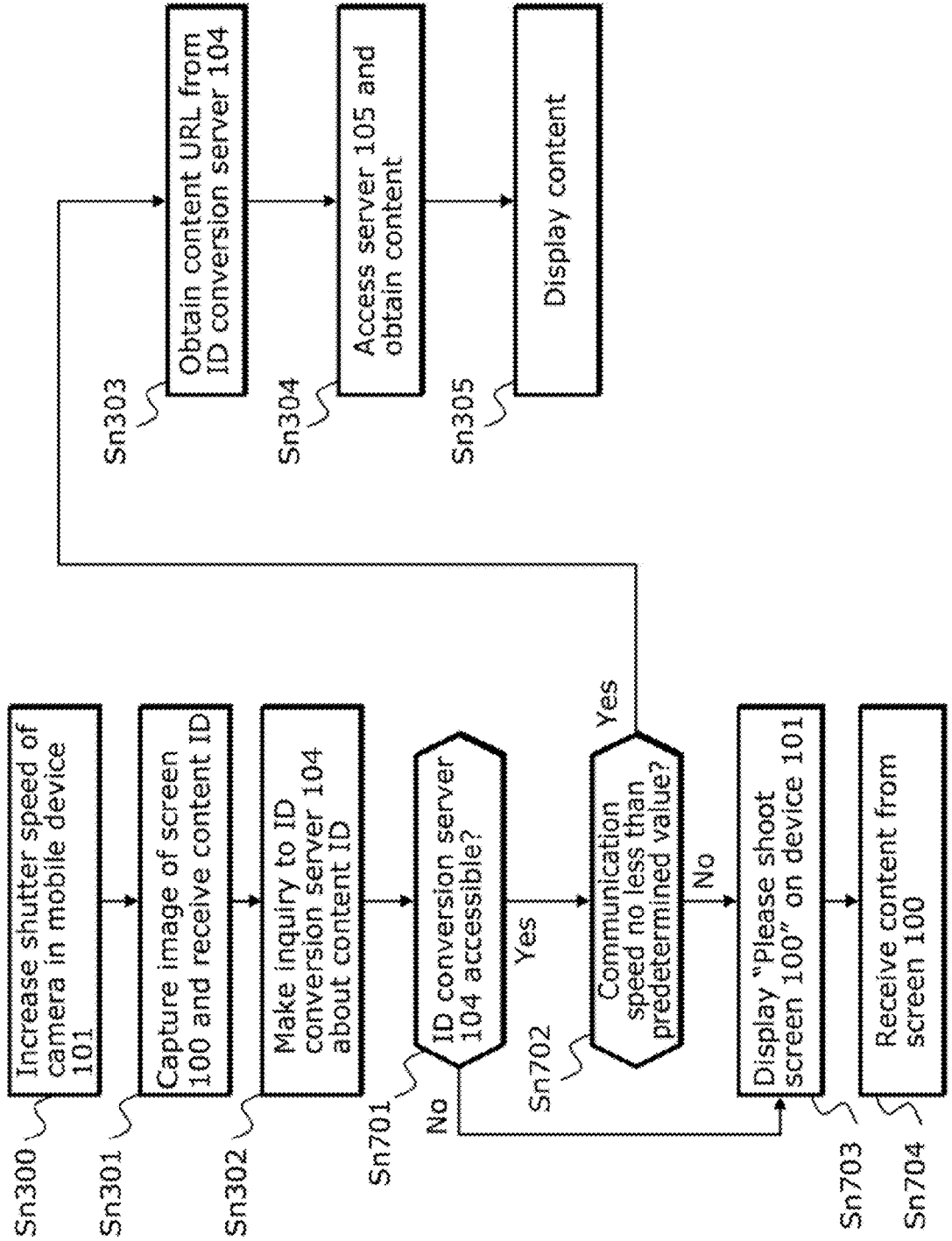
FIG. 67 is a flowchart for obtaining information by a mobile device.

Furthermore, as illustrated in FIG. 67, when the screen n100 is distributing content, it is also possible to adopt a configuration in which information is obtained from the screen n100 when the ID conversion server n104 is not accessible due to concentrated load or the like cause.

In Step Sn300, the shutter speed of the camera in the mobile device n101 is increased; in Step Sn301, an image of the screen n100 is captured, and content ID is received; in Step Sn302, an inquiry is made to the ID conversion server n104 about the content ID; in Step Sn701, whether or not the ID conversion server n104 is accessible is checked and when the result is Yes, the process proceeds to Step Sn702, while, when the result is No, the process proceeds to Step Sn703.

In Step Sn702, whether or not the communication speed is higher than or equal to a predetermined value is checked and when the result is Yes, the process proceeds to Step Sn303, while, when the result is No, the process proceeds to Step Sn703.

In Step Sn303, content URL is obtained from the ID conversion server n104; in Step Sn304, the server n105 is accessed, and content is obtained; and in Step Sn305, the content is displayed.

In Step Sn703, "Please shoot screen n100" is displayed on the mobile device n101, and in Step Sn704, content is received from the screen n100.

It is to be noted that in this embodiment, the ID conversion server and the content server may be the same and the above-described technique for load reduction may be used to avoid the concentrated accesses to the content server n105.

Embodiment 5

Figure 68:
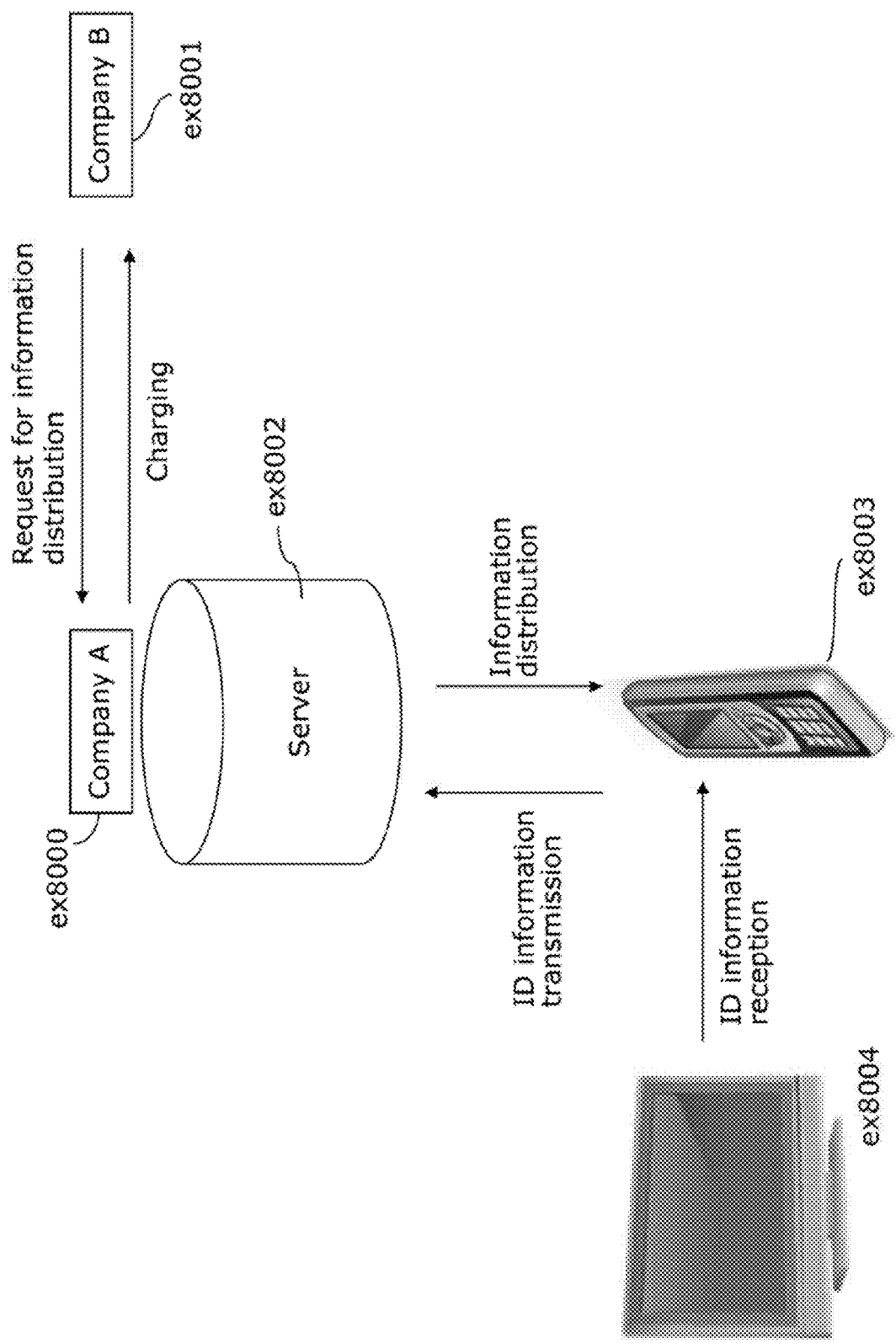
FIG. 68 is a diagram illustrating a service provision system using the display method, the reception method, etc., described in any of the foregoing embodiments.

FIG. 68 illustrates a service provision system using the display method, the reception method, etc., described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

FIG. 69 illustrates service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

FIG. 70 illustrates service provision flow in another example. The description of the same steps as those in FIG. 69 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

FIG. 71 illustrates service provision flow in another example. The description of the same steps as those in FIG. 70 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

As above, the embodiment which the Applicants contemplate as the best mode and other embodiments have been provided with reference to the drawings and the detailed descriptions. These are provided to illustrate the subject matter recited in the Claims to those skilled in the art with reference to the particular embodiments. Therefore, the structural elements recited in the appended drawings and the detailed descriptions may include not only structural elements indispensable for solving the problems but also other structural elements. Accordingly, just because these dispensable structural elements are stated in the appended drawings or the detailed descriptions, these dispensable structural elements should not be immediately acknowledged as being indispensable. Furthermore, within the scope of the Claims and a range equivalent thereto, the above-described embodiments may be subject to various modifications, replacement, addition, omission, etc.

Furthermore, the present disclosure includes the following video display apparatus. Specifically, this video display apparatus comprises: a first signal processing unit configured to output, on a per frame basis, a plurality of images obtained by dividing an input video signal; a second signal processing unit configured to generate an encoded image by encoding an input visible light communication signal, generate a visible light communication image by placing the encoded image at a predetermined position, and determine a display timing at which the visible light communication image is displayed; a display control unit configured to perform control to insert the visible light communication image to the images outputted by the first signal processing unit, at the display timing determined by the second signal processing unit, and cause the visible light communication image and the images to be displayed; and a display unit configured to display, according to the control by the display control unit, the images outputted by the first signal processing unit and the visible light communication image.

Furthermore, the video display apparatus is a video display apparatus capable of outputting a visible light communication signal and comprises: a display surface on which video is displayed; a visible light communication signal control unit configured to generate an image including a striped image on the display surface of the display panel based on a video signal, the striped image being generated by encoding the visible light communication signal and forming the visible light communication signal into an image on a predetermined regular basis; a display control unit configured to perform control to display the video; a visible light communication signal encoded image integration control unit configured to reorganize a series of video signals to be displayed, by mixing, into the video, the image generated by encoding the visible light communication signal, for a very short length of time; and a display surface on which these video signals are displayed.

Furthermore, the second signal processing unit may be configured to set the very short length of time for which the visible light communication image is displayed to 1 millisecond or less, desirably 0.2 milliseconds or less.

Furthermore, the video may be output which includes, in the image including the striped image generated by encoding the visible light communication signal, the striped image that is at least one integrated set of visible light signals and includes an image with stripes not parallel to an edge side of the display surface or includes a plurality of images with stripes which are perpendicular to each other or form an acute angle.

Furthermore, a feature may be that sequentially after the period in which the striped image generated on the display surface of the display unit by encoding the visible light communication signal and forming the visible light communication signal into an image on a predetermined regular basis is displayed, a striped image formed by supplementing each pixel of the predetermined striped image is displayed on the display surface.

Although the video display method according to one or more aspects has been described above based on the embodiments, these embodiments do not restrict the present disclosure. Various modifications to these embodiments that can be conceived by those skilled in the art, and forms configured by combining structural elements in different embodiments without departing from the teachings in the present disclosure may be included in the scope of one or more of the aspects.

Figure 72B:
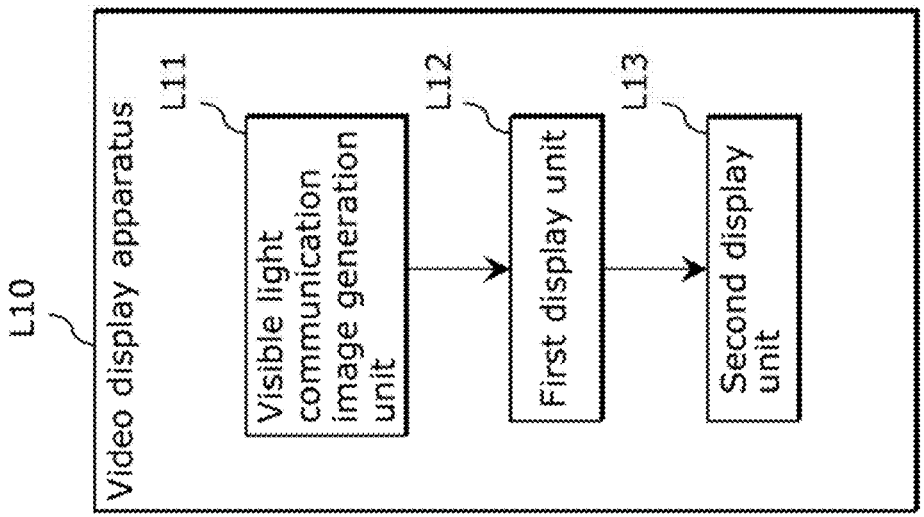
FIG. 72B is a block diagram of a video display apparatus according to an aspect in the present disclosure.
Figure 72A:
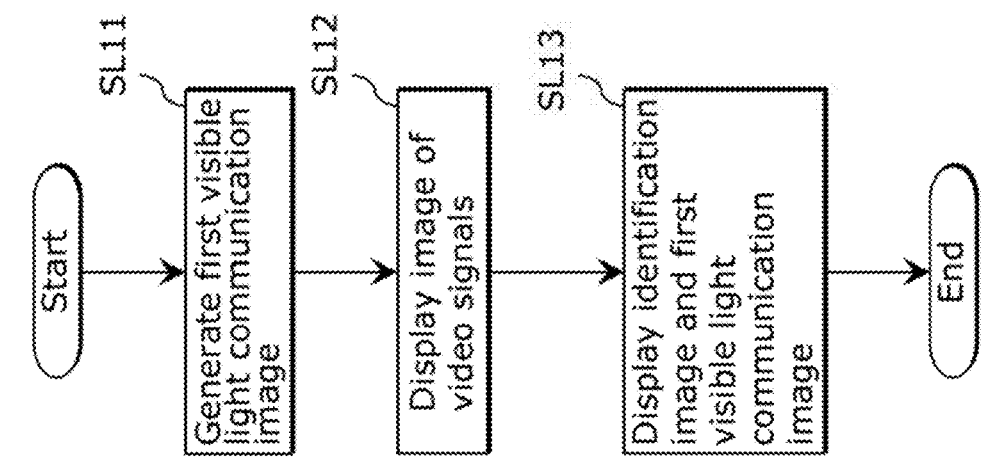
FIG. 72A is a flowchart of a video display method according to an aspect in the present disclosure.

FIG. 72A is a flowchart of a video display method according to an aspect in the present disclosure.

The video display method according to an aspect in the present disclosure is a video display method of displaying, on a per frame basis, an image included in a video signal, and includes Steps SL11 to SL13.

Specifically, this video display method comprises: a visible light communication image generation step SL11 of generating a first visible light communication image by encoding a visible light communication signal, the first visible light communication image being an image having a stripe pattern for visible light communication; a first display step SL12 of displaying, in a predetermined frame, the image included in the video signal; and a second display step SL13 of displaying, in the predetermined frame, the first visible light communication image sequentially after an identification image that is an image having luminance uniformly lower than average luminance of the image that is displayed.

FIG. 72B is a block diagram of a video display apparatus according to an aspect in the present disclosure.

A video display apparatus L10 according to an aspect in the present disclosure is a video display apparatus which displays, on a per frame basis, an image included in a video signal, and includes structural elements L11 to L13.

Specifically, this video display apparatus L10 comprises: a visible light communication image generation unit L11 configured to generate a first visible light communication image by encoding a visible light communication signal, the first visible light communication image being an image having a stripe pattern for visible light communication; a first display unit L12 configured to display, in a predetermined frame, the image included in the video signal; and a second display unit L13 configured to display, in the predetermined frame, the first visible light communication image sequentially after an identification image that isg an image having luminance uniformly lower than average luminance of the image that is displayed.

In these video display method and video display apparatus L10 illustrated in FIG. 72A and FIG. 72B, the first visible light communication image is displayed after a totally black image or a uniformly gray image is displayed as an identification image, for example, with the result that a uniformly black or gray line indicating the start position of the visible light communication signals appears in a captured image obtained by using an image sensor of sequential exposure type capturing images displayed in respective frames. Therefore, the visible light communication signals can be easily read out from the captured image. As a result, it is possible to appropriately transmit the visible light communication signals.

It is to be noted that each of the structural elements in each of the above-described embodiments may be configured in the form of an exclusive hardware product, or may be realized by executing a software program suitable for the structural element. Each of the structural elements may be realized by means of a program executing unit, such as a CPU or a processor, reading and executing the software program recorded in a recording medium such as a hard disk or a semiconductor memory. For example, the program causes a computer to execute the video display method indicated in the flowchart of FIG. 72A.

INDUSTRIAL APPLICABILITY

The video display method, the video display apparatus, the receiver, and the communication method according to the present disclosure enable safe and active acquisition of information other than images and are, therefore, usable in various applications such as the transfer of image-attached information and information transmission in various scenes in a sense that such active properties allow necessary information to be safely obtained as much as needed from signage, information terminals, information display devices outside, let alone devices such as televisions, personal computers, or tablets in homes.

The invention claimed is:

1. A video display method of displaying, on a per frame basis, an image included in a video signal, the video display method comprising:
generating a first visible light communication image by encoding a visible light communication signal, the first visible light communication image being an image having a stripe pattern for visible light communication;
displaying, in a predetermined frame, the image included in the video signal;
displaying, in the predetermined frame, the first visible light communication image sequentially after an identification image that is an image having luminance uniformly lower than average luminance of the image that is displayed,
switching a pitch of the first visible light communication image to a different pitch and generating a second visible light communication image, wherein pitch is the interval between stripes in the stripe pattern; and
displaying the second visible light communication image after displaying the first visible light communication image, the second visible light communication image being an image having a stripe pattern for visible light communication,
wherein in the displaying of the second visible light communication image, the image has a stripe pattern configured with a different minimum pitch from the stripe pattern of the first visible light communication image.

2. The video display method according to claim 1, further comprising:
capturing the first visible light communication image; and
providing, according to a result of the capturing, an instruction to change the pitch of the stripe pattern,
wherein in the displaying of the second visible light communication image, the second visible light communication image is displayed when the instruction is provided.

3. The video display method according to claim 1, further comprising:
identifying a focal distance for displaying the first visible light communication image on a screen by projection using a projector lens; and
determining, according to the focal distance, a total number of first visible light communication images to be displayed as the first visible light communication image,
wherein in the displaying of the first visible light communication image sequentially after an identification image, the first visible light communication images the total number of which is determined are arranged and displayed on the screen.

4. The video display method according to claim 1, further comprising:
notifying a terminal device which outputs the video signal of identification information indicating that a display apparatus which displays the image included in the video signal is capable of displaying the first visible light communication image.

5. The video display method according to claim 1,
wherein, in a case that a resolution of the second visible light image is lower than the first visible light image, the pitch of the stripe pattern of the second visible light image is larger than the pitch of the stripe pattern of the first visible light image, and in a case that the resolution of the second visible light image is higher than the first visible light image, the pitch of the stripe pattern of the second visible light image is smaller than the pitch of the stripe pattern of the first visible light image.

6. The video display method according to claim 1,
wherein the stripe pattern of the first visible light communication image and the stripe pattern of the second visible light communication image each include a plurality of solid bright lines having a uniform color.

7. The video display method according to claim 5,
wherein the first visible light communication image and the second visible light communication image have a plurality of stripe patterns, a number of the stripe patterns in the first visible light image is different from a number of the stripe patterns in the second visible light image.

8. The video display method according to claim 7,
wherein, in a case that the resolution of the second visible light image is lower than the first visible light image, the number of the stripe patterns of the second visible light image is smaller than the number of the first visible light image, and in a case that the resolution of the second visible light image is higher than the first visible light image, the number of the stripe patterns of the second visible light image is larger than the number of the first visible light image.

9. A video display apparatus, on a per frame basis, an image included in a video signal, the video display apparatus including a processor, the processor executes operations comprising:
generating a first visible light communication image by encoding a visible light communication signal, the first visible light communication image being an image having a stripe pattern for visible light communication;
displaying, in a predetermined frame, the image included in the video signal;
displaying, in the predetermined frame, the first visible light communication image sequentially after an identification image that is an image having luminance uniformly lower than average luminance of the image that is displayed,
switching a pitch of the first visible light communication image to a different pitch and generating a second visible light communication image, wherein pitch is the interval between stripes in the stripe pattern; and
displaying the second visible light communication image after displaying the first visible light communication image, the second visible light communication image being an image having a stripe pattern for visible light communication,
wherein in the displaying of the second visible light communication image, the image has a stripe pattern configured with a different minimum pitch from the stripe pattern of the first visible light communication image.

10. The video display apparatus according to claim 9,
wherein, in a case that a resolution of the second visible light image is lower than the first visible light image, the pitch of the stripe pattern of the second visible light image is larger than the pitch of the stripe pattern of the first visible light image, and in a case that the resolution of the second visible light image is higher than the first visible light image, the pitch of the stripe pattern of the second visible light image is smaller than the pitch of the stripe pattern of the first visible light image.

11. The video display apparatus according to claim 10,
wherein the first visible light communication image and the second visible light communication image have a plurality of the stripe patterns, a number of the stripe patterns in the first visible light image is different from a number of the stripe patterns in the second visible light image.

12. The video display apparatus according to claim 11, wherein, in a case that the resolution of the second visible light image is lower than the first visible light image, the number of the stripe patterns of the second visible light image is smaller than the number of the first visible light image, and in a case that the resolution of the second visible light image is higher than the first visible light image, the number of the stripe patterns of the second visible light image is larger than the number of the first visible light image.

13. A non-transitory recording medium storing computer software for use in a computer that obtains information from a subject, the computer software causing the computer to execute instructions comprising:

generating a first visible light communication image by encoding a visible light communication signal, the first visible light communication image being an image having a stripe pattern for visible light communication;

displaying, in a predetermined frame, the image included in the video signal;

displaying, in the predetermined frame, the first visible light communication image sequentially after an identification image that is an image having luminance uniformly lower than average luminance of the image that is displayed, switching a pitch of the first visible light communication image to a different pitch and generating a second visible light communication image wherein, pitch is the interval between stripes in the stripe pattern; and displaying a second visible light communication image after displaying the first visible light communication image, the second visible light communication image being an image having a stripe pattern for visible light communication, wherein in the displaying of the second visible light communication image, the image has a stripe pattern configured with a different minimum pitch from the stripe pattern of the first visible light communication image.

* * * * *